(12) United States Patent
Denison

(10) Patent No.: US 10,453,291 B2
(45) Date of Patent: *Oct. 22, 2019

(54) INTELLIGENT KEY SYSTEM

(71) Applicant: Mobile Tech, Inc., Lake Oswego, OR (US)

(72) Inventor: William D. Denison, North Barrington, IL (US)

(73) Assignee: MOBILE TECH, INC., Lake Oswego, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,787

(22) Filed: Apr. 22, 2019

(65) Prior Publication Data

US 2019/0251775 A1 Aug. 15, 2019

Related U.S. Application Data

(60) Division of application No. 16/152,085, filed on Oct. 4, 2018, now Pat. No. 10,269,202, which is a
(Continued)

(51) Int. Cl.
*G07F 5/26* (2006.01)
*G07C 9/00* (2006.01)
(Continued)

(52) U.S. Cl.
CPC ........... *G07F 5/26* (2013.01); *G07C 9/00571* (2013.01); *G07F 9/026* (2013.01); *G07F 11/002* (2013.01);
(Continued)

(58) Field of Classification Search
CPC .. E05B 2047/0096; G05B 2219/24206; G05B 2219/25062; G05B 2219/2613;
(Continued)

(56) References Cited

U.S. PATENT DOCUMENTS

| 883,335 A | 3/1908 | O'Connor |
| 3,444,547 A | 5/1969 | Surek |

(Continued)

FOREIGN PATENT DOCUMENTS

| AT | 506665 A1 | 10/2009 |
| CA | 2465692 A1 | 11/2004 |

(Continued)

OTHER PUBLICATIONS

U.S. Appl. No. 61/620,621, filed Apr. 5, 2012.
(Continued)

*Primary Examiner* — Omeed Alizada
(74) *Attorney, Agent, or Firm* — Thompson Coburn LLP

(57) ABSTRACT

Techniques for using wireless electronic keys with devices are disclosed. For example, a computer system can program an access code into a programmable wireless electronic key. An action or function of the device can then be made contingent on there being a match between the access code from the key and an access code known by the device. Further still, other operational control parameters (such as time limits) can be programmed into the key to restrict the ability of the key to control an action or function of the device. Also, audit data such as device access history can be wirelessly transferred from a device to an electronic key, whereupon the key can later transfer this audit data to a computer for analysis.

70 Claims, 81 Drawing Sheets

Related U.S. Application Data continuation of application No. 13/182,891, filed on Jul. 14, 2011, which is a continuation-in-part of application No. 12/261,843, filed on Oct. 30, 2008, now abandoned, which is a continuation of application No. 11/185,110, filed on Jul. 20, 2005, now abandoned, which is a continuation-in-part of application No. 11/010,661, filed on Dec. 13, 2004, now Pat. No. 7,373,352, and a continuation-in-part of application No. 10/838,449, filed on May 4, 2004, now Pat. No. 7,821,395, which is a continuation-in-part of application No. 10/329,626, filed on Dec. 26, 2002, now Pat. No. 6,900,720, said application No. 13/182,891 is a continuation-in-part of application No. 11/111,559, filed on Apr. 21, 2005, now abandoned, which is a continuation-in-part of application No. 11/010,661.

(60) Provisional application No. 60/528,831, filed on Dec. 11, 2003, provisional application No. 60/344,221, filed on Dec. 27, 2001.

(51) Int. Cl.
  *G07F 9/02* (2006.01)
  *G07F 11/00* (2006.01)
  *E05B 47/00* (2006.01)

(52) U.S. Cl.
  CPC .......... *E05B 2047/0096* (2013.01); *G05B 2219/24206* (2013.01); *G05B 2219/25062* (2013.01); *G05B 2219/2613* (2013.01)

(58) Field of Classification Search
  CPC ..... G07C 9/00571; G07F 11/002; G07F 5/26; G07F 9/026
  See application file for complete search history.

(56) References Cited

U.S. PATENT DOCUMENTS

| | | | |
|---|---|---|---|
| 3,733,861 A | 5/1973 | Lester |
| 3,780,909 A | 12/1973 | Callahan et al. |
| 4,031,434 A | 6/1977 | Perron et al. |
| 4,053,939 A | 10/1977 | Nakauchi et al. |
| 4,075,878 A | 2/1978 | Best |
| 4,117,465 A | 9/1978 | Timblin |
| 4,167,104 A | 9/1979 | Bond |
| 4,205,325 A | 5/1980 | Haygood et al. |
| 4,206,491 A | 6/1980 | Ligman et al. |
| 4,268,076 A | 5/1981 | Itoi |
| 4,335,931 A | 6/1982 | Kinnear |
| 4,353,064 A | 10/1982 | Stamm |
| 4,354,189 A | 10/1982 | Lemelson |
| 4,354,613 A | 10/1982 | Desai et al. |
| 4,369,442 A | 1/1983 | Werth et al. |
| 4,384,688 A | 5/1983 | Smith |
| 4,391,204 A | 7/1983 | Mitchell et al. |
| 4,509,093 A | 4/1985 | Stellberger |
| 4,590,337 A | 5/1986 | Engelmore |
| 4,594,637 A | 6/1986 | Falk |
| 4,611,205 A | 9/1986 | Eglise |
| 4,670,747 A | 6/1987 | Borras et al. |
| 4,672,375 A | 6/1987 | Mochida et al. |
| 4,674,454 A | 6/1987 | Phairr |
| 4,688,036 A | 8/1987 | Hirano et al. |
| 4,703,359 A | 10/1987 | Rumbolt et al. |
| 4,709,202 A | 11/1987 | Koenck et al. |
| 4,714,184 A | 12/1987 | Young et al. |
| 4,720,700 A | 1/1988 | Seibold et al. |
| 4,727,369 A | 2/1988 | Rode et al. |
| 4,746,919 A | 5/1988 | Reitmeier |
| 4,760,393 A | 7/1988 | Mauch |
| 4,766,746 A | 8/1988 | Henderson et al. |
| 4,772,878 A | 9/1988 | Kane |
| 4,779,090 A | 10/1988 | Micznik et al. |
| 4,791,280 A | 12/1988 | O'Connell et al. |
| 4,811,012 A | 3/1989 | Rollins |
| 4,827,395 A | 5/1989 | Anders et al. |
| 4,829,290 A | 5/1989 | Ford |
| 4,829,296 A | 5/1989 | Clark et al. |
| 4,839,639 A | 6/1989 | Sato et al. |
| 4,857,914 A | 8/1989 | Thrower |
| 4,887,292 A | 12/1989 | Barrett et al. |
| 4,898,493 A | 2/1990 | Blankenburg |
| 4,918,431 A | 4/1990 | Borras |
| 4,926,996 A | 5/1990 | Eglise et al. |
| 4,942,393 A | 7/1990 | Waraksa et al. |
| 4,952,864 A | 8/1990 | Pless et al. |
| 4,967,305 A | 10/1990 | Murrer et al. |
| 5,021,776 A | 6/1991 | Anderson et al. |
| 5,043,720 A | 8/1991 | Laurienzo |
| 5,065,356 A | 11/1991 | Puckette |
| 5,072,213 A | 12/1991 | Close |
| 5,090,222 A | 2/1992 | Imran |
| 5,109,530 A | 4/1992 | Stengel |
| 5,113,182 A | 5/1992 | Suman et al. |
| 5,140,317 A | 8/1992 | Hyatt, Jr. et al. |
| 5,146,205 A | 9/1992 | Keifer et al. |
| 5,176,465 A | 1/1993 | Hoisted |
| 5,184,855 A | 2/1993 | Waltz et al. |
| 5,245,329 A | 9/1993 | Gokcebay |
| 5,246,183 A | 9/1993 | Leyden |
| 5,272,475 A | 12/1993 | Eaton et al. |
| 5,278,547 A | 1/1994 | Suman et al. |
| 5,280,518 A | 1/1994 | Danler et al. |
| 5,280,527 A | 1/1994 | Gullman et al. |
| 5,337,588 A | 8/1994 | Chhatwal |
| 5,339,250 A | 8/1994 | Durbin |
| 5,343,077 A | 8/1994 | Yoshida et al. |
| 5,347,267 A | 9/1994 | Murray |
| 5,347,419 A | 9/1994 | Caron et al. |
| 5,349,345 A | 9/1994 | Vanderschel |
| 5,389,919 A | 2/1995 | Warren et al. |
| 5,392,025 A | 2/1995 | Figh et al. |
| 5,394,718 A | 3/1995 | Hotzl |
| 5,473,236 A | 12/1995 | Frolov |
| 5,473,318 A | 12/1995 | Martel |
| 5,475,375 A | 12/1995 | Barrett et al. |
| 5,477,041 A | 12/1995 | Miron et al. |
| 5,479,151 A | 12/1995 | Lavelle et al. |
| 5,506,575 A | 4/1996 | Ormos |
| 5,543,782 A | 8/1996 | Rothbaum et al. |
| 5,552,777 A | 9/1996 | Gokcebay et al. |
| 5,561,420 A | 10/1996 | Kleefeldt et al. |
| 5,575,515 A | 11/1996 | Iwamoto et al. |
| 5,602,536 A | 2/1997 | Henderson et al. |
| 5,617,082 A | 4/1997 | Denison et al. |
| 5,625,338 A | 4/1997 | Pildner et al. |
| 5,625,349 A | 4/1997 | Disbrow et al. |
| 5,636,881 A | 6/1997 | Stillwagon |
| 5,661,470 A | 8/1997 | Karr |
| 5,673,034 A | 9/1997 | Saliga |
| 5,685,436 A | 11/1997 | Davet |
| 5,686,902 A | 11/1997 | Reis et al. |
| 5,742,238 A | 4/1998 | Fox |
| 5,745,044 A | 4/1998 | Hyatt, Jr. et al. |
| 5,767,792 A | 6/1998 | Urbas et al. |
| 5,771,722 A | 6/1998 | DiVito et al. |
| 5,774,053 A | 6/1998 | Porter |
| 5,774,058 A | 6/1998 | Henry et al. |
| 5,774,059 A | 6/1998 | Henry et al. |
| 5,805,074 A | 9/1998 | Warren et al. |
| 5,813,257 A | 9/1998 | Claghorn et al. |
| 5,841,866 A | 11/1998 | Bruwer et al. |
| 5,861,807 A | 1/1999 | Leyden et al. |
| 5,873,276 A | 2/1999 | Dawson et al. |
| 5,886,644 A | 3/1999 | Keskin et al. |
| 5,894,277 A | 4/1999 | Keskin et al. |
| 6,005,487 A | 12/1999 | Hyatt, Jr. et al. |
| 6,038,491 A | 3/2000 | McGarry et al. |
| 6,039,496 A | 3/2000 | Bishop |

(56) References Cited

U.S. PATENT DOCUMENTS

| | | |
|---|---|---|
| 6,040,771 A | 3/2000 | Kim |
| 6,068,305 A | 5/2000 | Myers et al. |
| 6,130,602 A | 10/2000 | O'Toole et al. |
| 6,170,775 B1 | 1/2001 | Kovacik et al. |
| 6,204,764 B1 | 3/2001 | Maloney |
| 6,211,747 B1 | 4/2001 | Trichet et al. |
| 6,219,700 B1 | 4/2001 | Chang et al. |
| 6,236,435 B1 | 5/2001 | Gertz |
| 6,318,137 B1 | 11/2001 | Chaum |
| 6,323,782 B1 | 11/2001 | Stephens et al. |
| 6,339,731 B1 | 1/2002 | Morris et al. |
| 6,342,830 B1 | 1/2002 | Want et al. |
| 6,345,522 B1 | 2/2002 | Stillwagon et al. |
| 6,359,547 B1 | 3/2002 | Denison et al. |
| 6,380,855 B1 | 4/2002 | Ott |
| 6,384,709 B2 | 5/2002 | Mellen et al. |
| 6,386,906 B1 | 5/2002 | Burke |
| 6,401,059 B1 | 6/2002 | Shen et al. |
| 6,437,740 B1 | 8/2002 | De Champlain et al. |
| 6,457,038 B1 | 9/2002 | Defosse |
| 6,472,973 B1 | 10/2002 | Harold et al. |
| 6,476,717 B1 | 11/2002 | Gross et al. |
| 6,483,424 B1 | 11/2002 | Bianco |
| 6,496,101 B1 | 12/2002 | Stillwagon |
| 6,502,727 B1 | 1/2003 | Decoteau |
| 6,525,644 B1 | 2/2003 | Stillwagon |
| 6,575,504 B2 | 6/2003 | Roatis et al. |
| 6,581,421 B2 | 6/2003 | Chmela et al. |
| 6,581,986 B2 | 6/2003 | Roatis et al. |
| 6,584,309 B1 | 6/2003 | Whigham |
| 6,659,382 B2 | 12/2003 | Ryczek |
| 6,684,671 B2 | 2/2004 | Beylotte et al. |
| 6,693,512 B1 | 2/2004 | Frecska et al. |
| 6,717,517 B2 | 4/2004 | Przygoda, Jr. |
| 6,725,138 B2 | 4/2004 | DeLuca et al. |
| 6,731,212 B2 | 5/2004 | Hirose et al. |
| 6,748,707 B1 | 6/2004 | Buchalter et al. |
| 6,761,579 B2 | 7/2004 | Fort et al. |
| 6,786,766 B1 | 9/2004 | Chopra |
| 6,799,994 B2 | 10/2004 | Burke |
| 6,831,560 B2 | 12/2004 | Gresset |
| 6,867,685 B1 | 3/2005 | Stillwagon |
| 6,874,828 B2 | 4/2005 | Roatis et al. |
| 6,882,282 B1 | 4/2005 | Lie-Nielsen et al. |
| 6,896,543 B2 | 5/2005 | Fort et al. |
| 6,900,720 B2 | 5/2005 | Denison et al. |
| 6,946,961 B2 | 9/2005 | Frederiksen et al. |
| 6,961,401 B1 | 11/2005 | Nally et al. |
| 6,975,202 B1 | 12/2005 | Rodriguez et al. |
| 6,977,576 B2 | 12/2005 | Denison et al. |
| 7,015,596 B2 | 3/2006 | Pail |
| 7,053,774 B2 | 5/2006 | Sedon et al. |
| 7,081,822 B2 | 7/2006 | Leyden et al. |
| 7,101,187 B1 | 9/2006 | Deconinck et al. |
| 7,132,952 B2 | 11/2006 | Leyden et al. |
| 7,135,972 B2 | 11/2006 | Bonato |
| 7,145,434 B2 | 12/2006 | Mlynarczyk et al. |
| 7,154,039 B1 | 12/2006 | Marszalek et al. |
| 7,209,038 B1 | 4/2007 | Deconinck et al. |
| 7,287,652 B2 | 10/2007 | Scholen et al. |
| 7,295,100 B2 | 11/2007 | Denison et al. |
| 7,317,387 B1 | 1/2008 | Cova et al. |
| 7,325,728 B2 | 2/2008 | Arora et al. |
| 7,373,352 B2 | 5/2008 | Roatis et al. |
| 7,385,504 B2 | 6/2008 | Agrawal et al. |
| 7,385,522 B2 | 6/2008 | Belden, Jr. et al. |
| 7,387,003 B2 | 6/2008 | Marszalek et al. |
| 7,394,346 B2 | 7/2008 | Bodin |
| 7,446,659 B2 | 11/2008 | Marsilio et al. |
| 7,456,725 B2 | 11/2008 | Denison et al. |
| 7,482,907 B2 | 1/2009 | Denison et al. |
| 7,495,543 B2 | 2/2009 | Denison et al. |
| 7,522,047 B2 | 4/2009 | Belden, Jr. et al. |
| 7,626,500 B2 | 12/2009 | Belden, Jr. et al. |
| 7,667,601 B2 | 2/2010 | Rabinowitz et al. |
| 7,688,205 B2 | 3/2010 | Ott |
| 7,710,266 B2 | 5/2010 | Belden, Jr. et al. |
| 7,724,135 B2 | 5/2010 | Rapp et al. |
| 7,737,843 B2 | 6/2010 | Belden, Jr. et al. |
| 7,737,844 B2 | 6/2010 | Scott et al. |
| 7,737,845 B2 | 6/2010 | Fawcett et al. |
| 7,737,846 B2 | 6/2010 | Belden, Jr. et al. |
| 7,744,404 B1 | 6/2010 | Henson et al. |
| 7,762,457 B2 | 7/2010 | Bonalle et al. |
| 7,762,470 B2 | 7/2010 | Finn et al. |
| 7,821,395 B2 | 10/2010 | Denison et al. |
| 7,909,641 B1 | 3/2011 | Henson et al. |
| 7,969,305 B2 | 6/2011 | Belden, Jr. et al. |
| 7,971,845 B2 | 7/2011 | Galant |
| 8,009,348 B2 | 8/2011 | Zehner et al. |
| D649,076 S | 11/2011 | Alexander |
| 8,102,262 B2 | 1/2012 | Irmscher et al. |
| D663,972 S | 7/2012 | Alexander et al. |
| 8,499,384 B2 | 8/2013 | Zerhusen |
| 8,558,688 B2 | 10/2013 | Henson et al. |
| 8,698,618 B2 | 4/2014 | Henson et al. |
| 8,749,194 B1 | 6/2014 | Kelsch et al. |
| 8,847,759 B2 | 9/2014 | Bisesti et al. |
| 8,884,762 B2 | 11/2014 | Fawcett et al. |
| 8,896,447 B2 | 11/2014 | Fawcett et al. |
| 8,955,807 B2 | 2/2015 | Alexander et al. |
| 8,963,498 B2 | 2/2015 | Ferguson |
| 8,989,954 B1 | 3/2015 | Addepalli et al. |
| 9,092,960 B2 | 7/2015 | Wheeler |
| 9,097,380 B2 | 8/2015 | Wheeler |
| 9,135,800 B2 | 9/2015 | Fawcett et al. |
| 9,171,441 B2 | 10/2015 | Fawcett et al. |
| 9,220,358 B2 | 12/2015 | Wheeler et al. |
| 9,269,247 B2 | 2/2016 | Fawcett et al. |
| 9,303,809 B2 | 4/2016 | Reynolds et al. |
| 9,373,236 B2 | 6/2016 | Oehl et al. |
| 9,396,631 B2 | 7/2016 | Fawcett et al. |
| 9,443,404 B2 | 9/2016 | Grant et al. |
| 9,478,110 B2 | 10/2016 | Fawcett et al. |
| 9,576,452 B2 | 2/2017 | Fawcett et al. |
| 9,659,472 B2 | 5/2017 | Fawcett et al. |
| 9,959,432 B2 | 5/2018 | Blaser et al. |
| 10,026,281 B2 | 7/2018 | Henson et al. |
| 10,269,202 B2 | 4/2019 | Denison |
| 2001/0000430 A1 | 4/2001 | Smith et al. |
| 2001/0049222 A1 | 12/2001 | Fort et al. |
| 2002/0014950 A1 | 2/2002 | Ayala et al. |
| 2002/0024418 A1 | 2/2002 | Ayala et al. |
| 2002/0024420 A1 | 2/2002 | Ayala et al. |
| 2002/0063157 A1 | 5/2002 | Hara |
| 2002/0085343 A1 | 7/2002 | Wu et al. |
| 2002/0099945 A1 | 7/2002 | McLintock et al. |
| 2002/0133716 A1 | 9/2002 | Harif |
| 2002/0162366 A1 | 11/2002 | Chmela et al. |
| 2003/0007634 A1 | 1/2003 | Wang |
| 2003/0010859 A1 | 1/2003 | Ryczek |
| 2003/0030539 A1 | 2/2003 | McGarry et al. |
| 2003/0127866 A1 | 7/2003 | Martinez et al. |
| 2003/0128101 A1 | 7/2003 | Long |
| 2003/0234719 A1 | 12/2003 | Denison et al. |
| 2004/0003150 A1 | 1/2004 | Deguchi |
| 2004/0039919 A1 | 2/2004 | Takayama et al. |
| 2004/0077210 A1 | 4/2004 | Kollmann |
| 2004/0133653 A1 | 7/2004 | Defosse et al. |
| 2004/0174264 A1 | 9/2004 | Reisman et al. |
| 2004/0178885 A1 | 9/2004 | Denison et al. |
| 2004/0201449 A1 | 10/2004 | Denison et al. |
| 2004/0207509 A1 | 10/2004 | Mlynarczyk et al. |
| 2005/0017906 A1 | 1/2005 | Man et al. |
| 2005/0024227 A1 | 2/2005 | Dunstan |
| 2005/0073413 A1 | 4/2005 | Sedon et al. |
| 2005/0088572 A1 | 4/2005 | Pandit et al. |
| 2005/0165806 A1 | 7/2005 | Roatis et al. |
| 2005/0184857 A1 | 8/2005 | Roatis et al. |
| 2005/0206522 A1 | 9/2005 | Leyden et al. |
| 2005/0212656 A1 | 9/2005 | Denison et al. |
| 2005/0231365 A1 | 10/2005 | Tester et al. |
| 2005/0285716 A1 | 12/2005 | Denison et al. |
| 2006/0001541 A1 | 1/2006 | Leyden et al. |

(56) References Cited

U.S. PATENT DOCUMENTS

| | | |
|---|---|---|
| 2006/0038654 A1 | 2/2006 | Khalil |
| 2006/0047692 A1 | 3/2006 | Rosenblum et al. |
| 2006/0170533 A1 | 8/2006 | Chioiu et al. |
| 2006/0219517 A1 | 10/2006 | Cheng et al. |
| 2006/0281484 A1 | 12/2006 | Kronlund et al. |
| 2007/0075914 A1 | 4/2007 | Bates |
| 2007/0159328 A1 | 7/2007 | Belden et al. |
| 2007/0164324 A1 | 7/2007 | Denison et al. |
| 2007/0229259 A1 | 10/2007 | Irmscher et al. |
| 2007/0245369 A1 | 10/2007 | Thompson et al. |
| 2008/0094220 A1 | 4/2008 | Foley et al. |
| 2008/0168806 A1 | 7/2008 | Belden et al. |
| 2008/0169923 A1 | 7/2008 | Belden et al. |
| 2008/0222849 A1 | 9/2008 | Lavoie |
| 2009/0007390 A1 | 1/2009 | Tsang et al. |
| 2009/0033492 A1 | 2/2009 | Rapp et al. |
| 2009/0051486 A1 | 2/2009 | Denison et al. |
| 2009/0061863 A1 | 3/2009 | Huggett et al. |
| 2009/0173868 A1 | 7/2009 | Fawcett et al. |
| 2010/0065632 A1 | 3/2010 | Babcock et al. |
| 2010/0315197 A1 | 12/2010 | Solomon et al. |
| 2011/0053557 A1 | 3/2011 | Despain et al. |
| 2011/0068919 A1 | 3/2011 | Rapp et al. |
| 2011/0254661 A1 | 10/2011 | Fawcett et al. |
| 2011/0276609 A1 | 11/2011 | Denison |
| 2011/0283754 A1 | 11/2011 | Ezzo et al. |
| 2011/0303816 A1 | 12/2011 | Horvath et al. |
| 2011/0309934 A1 | 12/2011 | Henson et al. |
| 2012/0037783 A1 | 2/2012 | Alexander et al. |
| 2012/0043451 A1 | 2/2012 | Alexander et al. |
| 2012/0074223 A1 | 3/2012 | Habraken |
| 2012/0126943 A1 | 5/2012 | Biondo et al. |
| 2012/0205325 A1 | 8/2012 | Richter et al. |
| 2012/0205326 A1 | 8/2012 | Richter et al. |
| 2012/0217371 A1 | 8/2012 | Abdollahzadeh et al. |
| 2012/0280810 A1 | 11/2012 | Wheeler |
| 2012/0286118 A1 | 11/2012 | Richards |
| 2013/0026322 A1 | 1/2013 | Wheeler et al. |
| 2013/0043369 A1 | 2/2013 | Wheeler |
| 2013/0109375 A1 | 5/2013 | Zeiler et al. |
| 2013/0161054 A1 | 6/2013 | Allison et al. |
| 2013/0168527 A1 | 7/2013 | Wheeler et al. |
| 2013/0196530 A1 | 8/2013 | Cheatham et al. |
| 2013/0238516 A1 | 9/2013 | Moock et al. |
| 2013/0268316 A1 | 10/2013 | Moock et al. |
| 2013/0294740 A1 | 11/2013 | Teetzel et al. |
| 2014/0043162 A1 | 2/2014 | Siciliano et al. |
| 2014/0091932 A1 | 4/2014 | Mohiuddin et al. |
| 2014/0168884 A1 | 6/2014 | Wylie |
| 2014/0237236 A1 | 8/2014 | Kalinichenko et al. |
| 2014/0266573 A1 | 9/2014 | Sullivan |
| 2014/0277837 A1 | 9/2014 | Hatton |
| 2014/0313010 A1 | 10/2014 | Huang et al. |
| 2015/0022332 A1 | 1/2015 | Lin |
| 2015/0048625 A1 | 2/2015 | Weusten et al. |
| 2015/0091729 A1 | 4/2015 | Phillips et al. |
| 2015/0178532 A1 | 6/2015 | Brule |
| 2015/0213067 A1 | 7/2015 | Yin |
| 2015/0279130 A1 | 10/2015 | Robertson et al. |
| 2015/0348381 A1 | 12/2015 | Fawcett et al. |
| 2016/0028713 A1 | 1/2016 | Chui et al. |
| 2016/0042620 A1 | 2/2016 | Dandie et al. |
| 2016/0239796 A1 | 8/2016 | Grant et al. |
| 2016/0307209 A1 | 10/2016 | Marszalek |
| 2016/0307415 A1 | 10/2016 | Marszalek et al. |
| 2016/0307416 A1 | 10/2016 | Marszalek et al. |
| 2016/0308952 A1 | 10/2016 | Marszalek et al. |
| 2016/0335859 A1 | 11/2016 | Sankey |
| 2016/0371944 A1 | 12/2016 | Phillips et al. |
| 2016/0379455 A1 | 12/2016 | Grant et al. |
| 2017/0154508 A1 | 6/2017 | Grant et al. |
| 2017/0193780 A1 | 7/2017 | Moock et al. |
| 2017/0300721 A1 | 10/2017 | Blaser et al. |
| 2018/0144593 A1 | 5/2018 | Henson et al. |

FOREIGN PATENT DOCUMENTS

| | | |
|---|---|---|
| DE | 202009013722 U1 | 1/2011 |
| EP | 0745747 A1 | 12/1996 |
| EP | 1575249 A2 | 9/2005 |
| ES | 1058183 U | 11/2004 |
| FR | 2595227 A1 | 9/1987 |
| FR | 2768906 A1 | 4/1999 |
| FR | 2868459 A1 | 10/2005 |
| GB | 2427056 A | 12/2006 |
| GB | 2440600 A | 2/2008 |
| JP | 4238979 A | 8/1992 |
| JP | H0573857 U | 10/1993 |
| JP | 0689391 A | 3/1994 |
| JP | H0668913 A | 3/1994 |
| JP | 1997-259368 | 10/1997 |
| JP | 3100287 B2 | 10/2000 |
| KR | 20140126675 A | 10/2014 |
| WO | 1997031347 A1 | 8/1997 |
| WO | 2004038670 A1 | 5/2004 |
| WO | 2009042905 A1 | 4/2009 |
| WO | 2012039794 A1 | 3/2012 |
| WO | 2012069816 A1 | 5/2012 |
| WO | 2012151130 A2 | 11/2012 |
| WO | 2013015855 A2 | 1/2013 |
| WO | 2013068036 A1 | 5/2013 |
| WO | 2013134484 A1 | 9/2013 |
| WO | 2014019072 A1 | 2/2014 |
| WO | 2014107184 A2 | 7/2014 |
| WO | 2014134718 A1 | 9/2014 |
| WO | 2015050710 A2 | 4/2015 |
| WO | 2015051840 A1 | 4/2015 |
| WO | 2015/112336 A1 | 7/2015 |
| WO | 2016130762 A1 | 8/2016 |
| WO | 2016/179250 A2 | 11/2016 |

OTHER PUBLICATIONS

U.S. Appl. No. 61/774,870, filed Mar. 8, 2013.
U.S. Appl. No. 61/884,098, filed Sep. 29, 2013.
Underwriters Laboratories Inc. report on High Security Electronic Locks, Type 2, Mar. 9, 1992.
Prosecution History for U.S. Appl. No. 16/152,085, now U.S. Pat. No. 10,269,202, filed Oct. 4, 2018.
"Cabinet Lock", accessed from https://web.archive.org/web/20041016145022/https://intellikey.com/cabinet.htm, dated Oct. 16, 2004, accessed Jun. 23, 2016, 1 page.
"Cylinders", accessed from https://web.archive.org/web/20041016151707/http://intellikey.com/cylinders.htm, dated Oct. 16, 2004, accessed Jun. 23, 2016, 1 page.
"Cylindrical Lock", accessed from https://web.archive.org/web/20041225181341/http://intellikey.com/cylindrical.htm, dated Dec. 25, 2004, accessed Jun. 23, 2016, 1 page.
"EZ 123 Demo", accessed from https://web.archive.org/web/19990422192601/http://www.intellikey.com/Downloads/Quantum/QuantumDemo.html, dated Apr. 22, 1999, accessed Jun. 23, 2016, 1 page.
"EZ123", accessed from https://web.archive.org/web/20041016172233/http://intellikey.com/ez123.htm, dated Oct. 16, 2004, accessed Jun. 23, 2016, 1 page.
"Gate Lock", accessed from https://web.archive.org/web/20041226222338/http://intellikey.com/gatelock.htm, dated Dec. 26, 2004, accessed Jun. 23, 2016, 1 page.
"Intelligent Key", accessed from https://web.archive.org/web/20001009070818/http://www.intellikey.com/prod_key.html, dated Oct. 9, 2000, accessed Jun. 23, 2016, 2 pages.
"Intellikey—Product Gallery", accessed from https://web.archive.org/web/19970101150529/http://intellikey.com/products.html, dated Jan. 1, 1997, accessed Jun. 23, 2016, 4 pages.
"Intellikey Controller", accessed from https://web.archive.org/web/20041017140614/http://intellikey.com/controller.htm, dated Oct. 17, 2004, accessed Jun. 23, 2016, 1 page.
"Intellikey Key", accessed from https://web.archive.org/web/20041017122940/http://intellikey.com/key.htm, dated Oct. 17, 2004, accessed Jun. 23, 2016, 1 page.

(56) References Cited

OTHER PUBLICATIONS

"Key Processing Unit", accessed from https://web.archive.org/web/20041017124515/http://intellikey.com/kpu.htm, dated Oct. 17, 2004, accessed Jun. 23, 2016, 1 page.
"Key Programming Unit", accessed from https://web.archive.org/web/20021115195312/http://www.intellikey.com/site/keyProgrammingUnit.htm, dated Nov. 15, 2002, accessed Jun. 23, 2016, 1 page.
"Lock Programming Unit", accessed from https://web.archive.org/web/20021115200156/http://www.intellikey.com/site/lockProgrammingUnit.htm, dated Nov. 15, 2002, accessed Jun. 23, 2016, 1 page.
"Lock Programming Unit", accessed from https://web.archive.org/web/20041017130030/http://intellikey.com/lpu.htm, dated Oct. 17, 2004, accessed Jun. 23, 2016, 1 page.
"Pad-e-Lock", accessed from https://web.archive.org/web/20041017131156/http://intellikey.com/padelock.htm, dated Oct. 17, 2004, accessed Jun. 23, 2016, 1 page.
"Products", accessed from https://web.archive.org/web/20041213212916/http://intellikey.com/products.htm, dated Dec. 13, 2004, accessed Jun. 23, 2016, 1 page.
"Quantum", accessed from https://web.archive.org/web/20041017132045/http://intellikey.com/quantum.htm, dated Oct. 17, 2004, accessed Jun. 23, 2016, 1 page.
"System 1000", accessed from https://web.archive.org/web/20001009123951/http://web.intellikey.com/prod_sys1k.html, dated Oct. 9, 2000, accessed Jun. 23, 2016, 3 pages.
"System Overview", accessed from https://web.archive.org/web/20041213055854/http://www.intellikey.com/systems.htm, dated Dec. 13, 2004, accessed Jun. 23, 2016, 4 pages.
"Technology", accessed from https://web.archive.org/web/20041213214001/http://intellikey.com/technology.htm, dated Dec. 13, 2004, accessed Jun. 23, 2016, 1 page.
¼ page advertisement for AMSEC, Apr. 1992.
American Security Products Co, retail Price list excerpts regarding, among other things, KPL100, Jan. 1, 1993.
American Security Products Co. KPL 100 Flyer, 1992.
American Security Products Co. price list excerpts regarding, among other things, KPL 100, Oct. 15, 1990.
AMSEC Invoice for Wall Safe WS1014 with Optional KPL 100 Installed, Nov. 6, 1992.
Amsec KPL-100 Digital Keypad Lock Installation Instructions, Dec. 4, 1990.
AMSEC, KPL100 Digital Lock Operating Instructions, date unknown.
Corrected Petition for Inter Partes Review of Claims 1-24 of U.S. Pat. No. 9,269,247, Case IPR2016-00898, Apr. 19, 2016, pp. 1-65.
Corrected Petition for Inter Partes Review of Claims 1-34 of U.S. Pat. No. 9,135,800, Case IPR2016-00895, Filed Apr. 19, 2016, pp. 1-66.
Corrected Petition for Inter Partes Review of Claims 35-49 of U.S. Pat. No. 9,135,800, Case IPR2016-00896, Filed Apr. 19, 2016, pp. 1-64.
Dallas Semiconductor Corporation data sheet for DS2405, 1995.
Decision Institution of Inter Partes Review for U.S. Pat. No. 9,269,247, Case IPR2016-00898, dated Sep. 29, 2016, pp. 1-29.
Decision Institution of Inter Partes Review for U.S. Pat. No. 9,269,247, Case IPR2016-00899, Sep. 29, 2016, pp. 1-25.
Decision Institution of Inter Partes Review of U.S. Pat. No. 9,396,631, Case IPR2017-00344, dated May 26, 2017, pp. 1-17.
Decision Institution of Inter Partes Review of U.S. Pat. No. 9,396,631, Case IPR2017-00345, dated May 26, 2017, pp. 1-18.
Decision of Institution of Inter Partes Review of U.S. Pat. No. 7,737,844, Case IPR2016-01915, filed Mar. 30, 2017, pp. 1-30.
Decision of Institution of Inter Partes Review of U.S. Pat. No. 7,737,846, Case IPR2016-01241, Dec. 20, 2016, pp. 1-22.
Decision of Institution of Inter Partes Review of U.S. Pat. No. 8,884,762, Case IPR2016-00892, filed Oct. 7, 2016, pp. 1-25.
Decision of Institution of Inter Partes Review of U.S. Pat. No. 9,135,800, Case IPR2016-00895, Filed Oct. 13, 2016, pp. 1-29.
Decision of Institution of Inter Partes Review of U.S. Pat. No. 9,135,800, Case IPR2016-00896, Filed Oct. 13, 2016, pp. 1-23.
Declaration of Christopher J. Fawcett in Support of Patent Owner's Response of U.S. Pat. No. 7,737,846, Case IPR2016-01241, Mar. 3, 2017, pp. 1-25.
Declaration of Christopher J. Fawcett in Support of Patent Owner's Responses for IPR2016-00895 and IPR2016-00896 dated Jan. 11, 2017, pp. 1-55.
Declaration of Harry Direen, Ph. D, P.E. In Support of Patent Owner's Preliminary Responses for IPR2016-00892,-00895, -00896, -00898, and -00899, filed Jul. 18, 2016, pp. 1-41.
Declaration of Thaine Allison in Support of Patent Owner's Reply to Petitioner's Opposition to Patent Owner's Motion to Amend, Inter Partes Review of U.S. Pat. No. 7,909,641, Case IPR2013-00122, dated Feb. 5, 2014, pp. 1-13.
Declaration of Thaine H. Allison III for U.S. Pat. No. 9,269,247, Case IPR2016-00898, dated Apr. 11, 2016, pp. 1-102.
Declaration of Thaine H. Allison III for U.S. Pat. No. 9,269,247, Case IPR2016-00899, Apr. 11, 2016, pp. 1-106.
Declaration of Thaine H. Allison III for U.S. Pat. No. 9,396,631, Case IPR2017-00344, Nov. 22, 2016, pp. 1-96.
Declaration of Thaine H. Allison III for U.S. Pat. No. 9,396,631, Case IPR2017-00345, Nov. 22, 2016, pp. 1-92.
Declaration of Thaine H. Allison III for U.S. Pat. No. 9,478,110, Case IPR2017-01900, Jul. 25, 2017, pp. 1-93.
Declaration of Thaine H. Allison III, for U.S. Pat. No. 9,478,110, Case IPR2017-01901, dated Jul. 27, 2017, pp. 1-117.
Declaration of Thaine H. Allison, III for U.S. Pat. No. 8,884,762, Case IPR2016-00892, filed Apr. 11, 2016, pp. 1-116.
Declaration of Thaine H. Allison, III for U.S. Pat. No. 9,135,800, Case IPR2016-00895, Filed Apr. 11, 2016, pp. 1-115.
Declaration of Thaine H. Allison, III for U.S. Pat. No. 9,135,800, Case IPR2016-00896, Filed Apr. 11, 2016, pp. 1-103.
Declaration of Thaine H. Allison, III, U.S. Pat. No. 7,737,844, Case IPR2016-01915, filed Jul. 30, 2016, pp. 1-117.
Declaration of Thaine H. Allison, III, U.S. Pat. No. 7,737,846, Case IPR2016-01241, Jun. 15, 2016, pp. 1-104.
Deposition of Thaine Allison, III, taken in behalf of Petition, dated Feb. 24, 2014, U.S. Pat. No. 7,909,641, Case IPR2013-00122, pp. 1-198.
English Translation of JP 1997-259368, Oct. 3, 1997.
Excerpts from American Security Products Co. Product Catalog, regarding, among other things, KPL 100, Jan. 1992.
Excerpts from Bruce Schneier, Applied Cryptography: Protocols, Algorithms, and Source Code in C, 1994, 14 pages.
Final Written Decision, Inter Partes Review Case IPR2016-00892, U.S. Pat. No. 8,884,762 B2, Sep. 28, 2017, 71 pages.
Final Written Decision, Inter Partes Review Case IPR2016-01241 U.S. Pat. No. 7,737,846 B2, Dec. 19, 2017, 34 pages.
Final Written Decision, Inter Partes Review Case IPR2016-01915, U.S. Pat. No. 7,737,844 B2, Mar. 28, 2018, 51 pages.
Final Written Decision, Inter Partes Review Cases IPR2016-00895 and IPR2016-00896, U.S. Pat. No. 9,135,800 B2, Oct. 12, 2017, 82 pages.
Final Written Decision, Inter Partes Review Cases IPR2016-00898 and IPR2016-00899, U.S. Pat. No. 9,269,247 B2, Sep. 28, 2017, 78 pages.
Final Written Decision, Inter Partes Review Cases IPR2017-00344 and IPR2017-00345, U.S. Pat. No. 9,396,631 B2, May 24, 2018, 94 pages.
Final Written Decision, Inter Partes Review Cases IPR2017-01900 and IPR2017-01901, U.S. Pat. No. 9,478,110 B2, Feb. 12, 2019, 71 pages.
International Search Report and Written Opinion for PCT/US2011/037235 dated Oct. 21, 2011.
International Search Report and Written Opinion for PCT/US2017/027801 dated Aug. 29, 2017.
Locksmith Ledger Advertisement for American Security Products Co. regarding, among other things, KPL 100, Dec. 1990.
Mobile Tech Inc.'s Reply to Patent Owner's Response of U.S. Pat. No. 7,737,846, Case IPR2016-01241, May 15, 2017, pp. 1-29.
Mobile Tech Inc.'s Reply to Patent Owner's Response of U.S. Pat. No. 8,884,762, Case IPR2016-00892, filed Apr. 13, 2017, pp. 1-30.
Mobile Tech Inc.'s Reply to Patent Owner's Response of U.S. Pat. No. 9,135,800, Case IPR2016-00895, filed Apr. 13, 2017, pp. 1-32.

(56) References Cited

OTHER PUBLICATIONS

Mobile Tech Inc.'s Reply to Patent Owner's Response of U.S. Pat. No. 9,269,247, Case IPR2016-00899, Apr. 13, 2017, pp. 1-31.
Mobile Tech Inc.'s Reply to Patent Owner's Response, Inter Partes Review of U.S. Pat. No. 9,269,247, Case IPR2016-00898, Apr. 13, 2017, pp. 1-31.
Patent Owner's Preliminary Response of U.S. Pat. No. 7,737,844, Case IPR2016-01915, filed Jan. 4, 2017, pp. 1-43.
Patent Owner's Preliminary Response of U.S. Pat. No. 7,737,846, Case IPR2016-01241, Sep. 30, 2016, pp. 1-62.
Patent Owner's Preliminary Response of U.S. Pat. No. 8,884,762, Case IPR2016-00892, filed Jul. 18, 2016, pp. 1-53.
Patent Owner's Preliminary Response of U.S. Pat. No. 9,135,800, Case IPR2016-00895, Filed Jul. 18, 2016, pp. 1-62.
Patent Owner's Preliminary Response of U.S. Pat. No. 9,135,800, Case IPR2016-00896, Filed Jul. 18, 2016, pp. 1-56.
Patent Owner's Preliminary Response of U.S. Pat. No. 9,269,247, Case IPR2016-00898, Jul. 19, 2016, pp. 1-57.
Patent Owner's Preliminary Response of U.S. Pat. No. 9,396,631, Case IPR2017-00344, dated Mar. 20, 2017, pp. 1-42.
Patent Owner's Preliminary Response of U.S. Pat. No. 9,396,631, Case IPR2017-00345, dated Mar. 20, 2017, pp. 1-35.
Patent Owner's Preliminary Response, U.S. Pat. No. 9,269,247, Case IPR2016-00899, dated Jul. 19, 2016, pp. 1-54.
Patent Owner's Response of U.S. Pat. No. 8,884,762, Case IPR2016-00892, filed Jan. 18, 2017, pp. 1-42.
Patent Owner's Response of U.S. Pat. No. 7,737,844, Case IPR2016-01915, filed Jul. 12, 2017, pp. 1-38.
Patent Owner's Response of U.S. Pat. No. 9,135,800, Case IPR2016-00895, Filed Jan. 11, 2017, pp. 1-68.
Patent Owner's Response of U.S. Pat. No. 9,135,800, Case IPR2016-00896, Filed Jan. 11, 2017, pp. 1-60.
Patent Owner's Response of U.S. Pat. No. 9,269,247, Case IPR2016-00899, Jan. 18, 2017, pp. 1-46.
Petition for Inter Partes Review of Claims 1-18 of U.S. Pat. No. 7,737,846, Case IPR2016-01241, Jun. 21, 2016, pp. 1-73.
Petition for Inter Partes Review of Claims 1-19 of U.S. Pat. No. 7,737,844, Case IPR2016-01915, filed Sep. 30, 2016, pp. 1-76.
Petition for Inter Partes Review of Claims 1-27 of U.S. Pat. No. 8,884,762, Case IPR2016-00892, filed Apr. 14, 2016, pp. 1-65.
Petition for Inter Partes Review of Claims 1-29 of U.S. Pat. No. 9,396,631, Case IPR2017-00344, Nov. 29, 2016, pp. 1-65.
Petition for Inter Partes Review of Claims 1-29 of U.S. Pat. No. 9,396,631, Case IPR2017-00345, dated Nov. 29, 2016, pp. 1-63.
Petition for Inter Partes Review of Claims 1-36 of U.S. Pat. No. 9,478,110, Case IPR2017-01901, dated Jul. 31, 2017, pp. 1-71.
Petition for Inter Partes Review of Claims 1-9 and 11-36 of U.S. Pat. No. 9,478,110, Case IPR2017-01900, Jul. 31, 2017, pp. 1-68.
Petition for Inter Partes Review of Claims 25-37 of U.S. Pat. No. 9,269,247, Case IPR2016-00899, dated Apr. 14, 2016, pp. 1-65.
Prosser, C.A. Test Record No. 1 on samples of the Model KPL electro-mechanical Group 2 combination lock, Mar. 9, 1992. Revised Mar. 18, 1996.
Reasons for Substantial New Question of Patentability Determination and Supplemental Examination Certificate, Inter Partes Review of U.S. Pat. No. 7,909,641, Case IPR2013-00122, Feb. 7, 2013, pp. 1-12, Exhibit 1019.
Supplemental Declaration of Harry Direen, Ph.D, P.E. in Support of Patent Owner's Responses for IPR2016-00892, -00895, -00896, -00898, and -00899, Inter Partes Review of U.S. Pat. No. 9,396,631, Case IPR2017-00344, Jan. 10, 2017, pp. 1-29.
U.S. Appl. No. 61/607,802, filed Mar. 7, 2012.

5043 — SOFTWARE REGISTRATION MENU

ENTER CRADLE LABEL#   CD SOFTWARE LABEL:   CHECK THIS BOX IF YOU ARE AN INDEPENDENT

5042

BOTTLER NAME:   BUSINESS UNIT (IF APPLICABLE):

MARKET UNIT (IF APPLICABLE):

CONTACT NAME: FIRST AND LAST:   ADDRESS:

CITY, STATE   ZIP

PHONE: XXX-XXX-XXXX   FAX: XXX-XXX-XXXX

5044

EMAIL:

STEP 1. CLICK HERE AFTER ENTERING ABOVE

GENERATE SYSTEM ID#   BACK

STEP 2. IF THIS STATION IS CONNECTED TO A PRINTER, CLICK ON "GET REGISTRATION BUTTON TO PRINT OUT YOUR REGISTRATION, IF NOT, WRITE DOWN ALL INFO SHOWN HERE AND FAX IT TO: 847-640-7008

STEP 3. CLICK HERE AFTER RECEIVING REGISTRATION #

5045

GET REGISTRATION #   GO NEXT

REGISTRATION NUMBER APPEARS

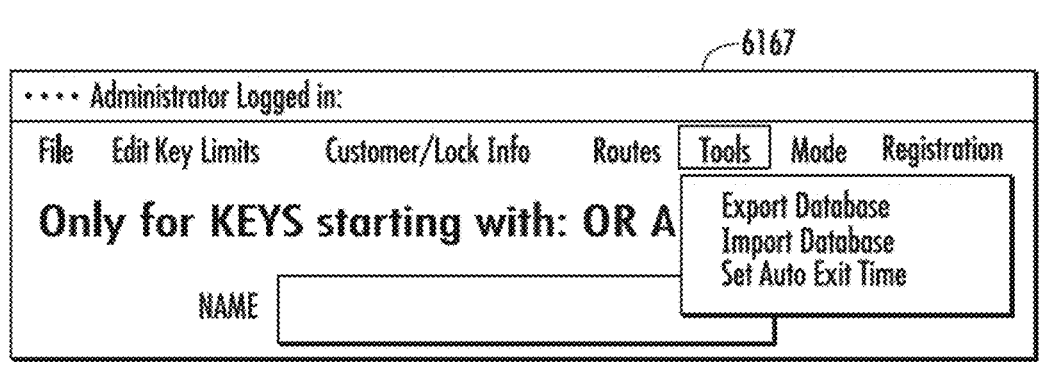
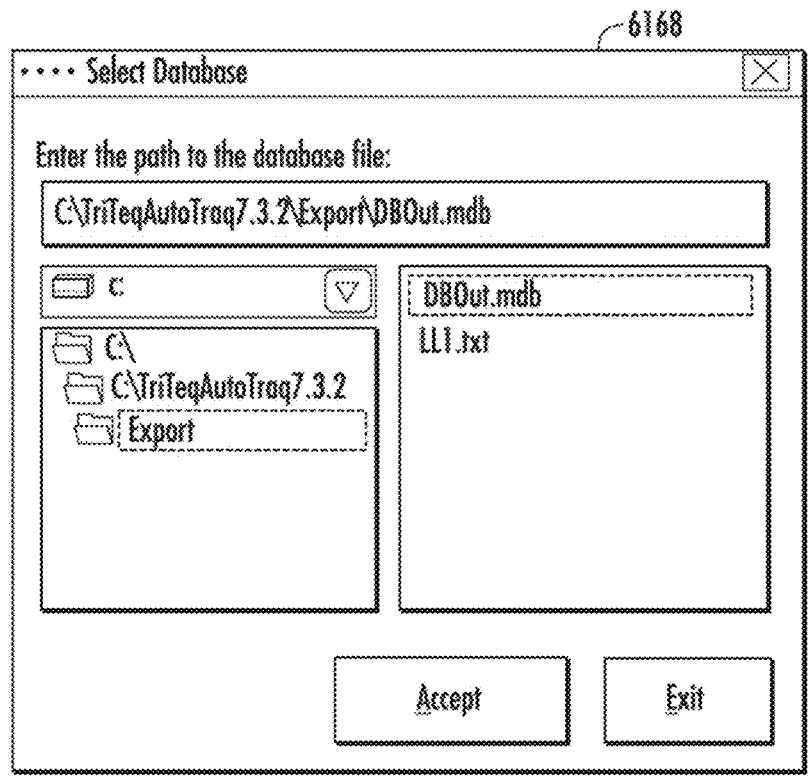
FIG. 54

Scheduled Task Wizard

Select the time and day you want this task to start.

Start Time:
4:00 AM

Perform this task:
- ◉ Every Day
- ○ Weekdays
- ○ Every [1]

Start date:
8/11/2003

[<Back] [Next>] [Cancel]

5193

Scheduled Task Wizard

Enter the name and address of a user. The task will Run as if it were started by that user.

Enter the user name: TRITEQ\Colin
Enter the password: xxxxxx
Confirm password: xxxxxx

[<Back] [Next>] [Cancel]

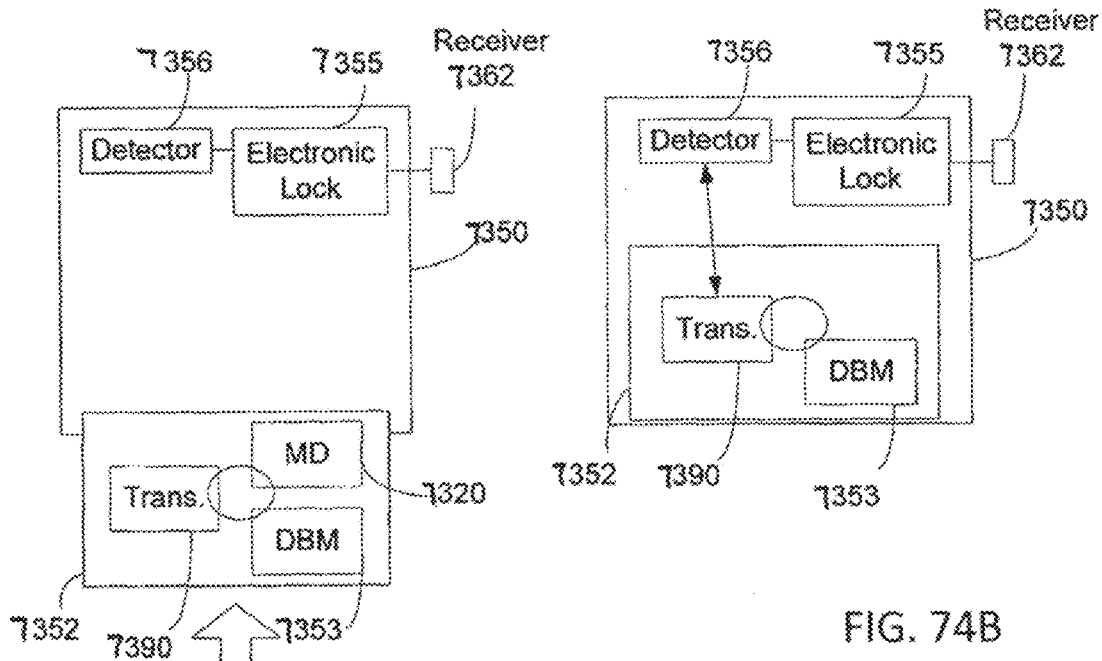
FIG. 74A
FIG. 74B
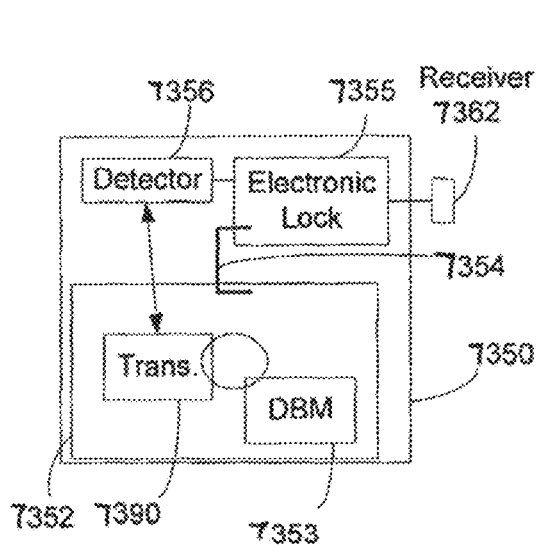
FIG. 74C
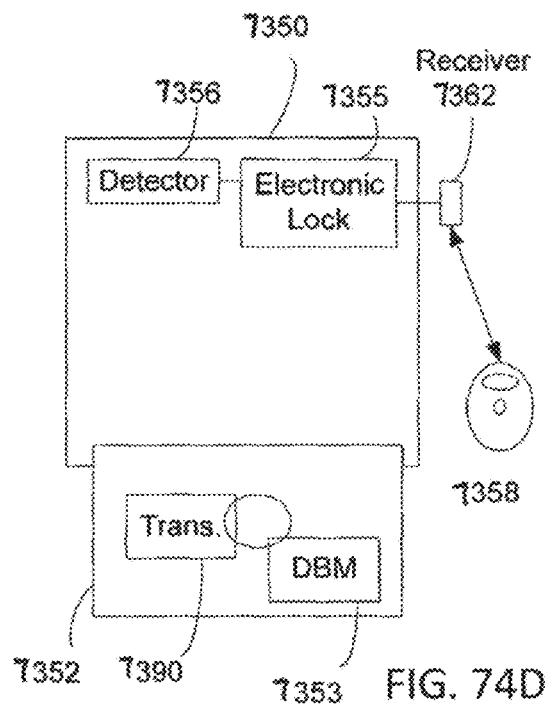
FIG. 74D

INTELLIGENT KEY SYSTEM

CROSS-REFERENCE AND PRIORITY CLAIM TO RELATED APPLICATIONS

This application is a divisional of U.S. patent application Ser. No. 16/152,085, filed Oct. 4, 2018, and issued as U.S. Pat. No. 10,269,202, which is a continuation of U.S. patent application Ser. No. 13/182,891, filed Jul. 14, 2011, where the '891 application is (1) a continuation-in-part of U.S. patent application Ser. No. 12/261,843, filed Oct. 30, 2008, and now abandoned, where the '843 application is a continuation of U.S. patent application Ser. No. 11/185,110, filed Jul. 20, 2005, and now abandoned, where the '110 application is a continuation-in-part of (i) U.S. patent application Ser. No. 11/010,661, filed Dec. 13, 2004, and issued as U.S. Pat. No. 7,373,352, where the '661 application claims the filing priority benefit of U.S. Provisional Application Ser. No. 60/528,831, filed Dec. 11, 2003, and (ii) U.S. patent application Ser. No. 10/838,449, filed May 4, 2004, and issued as U.S. Pat. No. 7,821,395, where the '449 application is a continuation-in-part of U.S. patent application Ser. No. 10/329,626, filed Dec. 26, 2002, and issued as U.S. Pat. No. 6,900,720, where the '626 application claims the filing priority benefit of U.S. Provisional Application Ser. No. 60/344,221, filed Dec. 27, 2001, and (2) a continuation-in-part of U.S. patent application Ser. No. 11/111,559, filed Apr. 21, 2005, where the '559 application is a continuation-in-part of U.S. patent application Ser. No. 11/010,661, filed Dec. 13, 2004, and now U.S. Pat. No. 7,373,352, where the '661 application claims the filing priority benefit of U.S. Provisional Application No. 60/528,831, filed on Dec. 11, 2003; and where each of these listed applications and patents is hereby incorporated herein by reference.

This application is also related to U.S. patent application Ser. Nos. 12/853,721, 12/853,739 and 12/853,754, filed Aug. 10, 2010, each of which is hereby incorporated by reference.

TECHNICAL FIELD OF THE INVENTION

This invention relates to methods for controlling and recording the security of an enclosure, such as vending machines, coolers, fountain dispensers, storage boxes, shipping containers, power tools, etc., and more particularly to a system and methods where the enclosure security is controlled by one or more microprocessors and can be operated by a wireless electronic key, and for controlling and managing operations of devices that collect location information and uses the location information and other parameters for controlling the operations of field devices.

BACKGROUND OF THE INVENTION

An electronic access control device, such as an electronic combination lock or an electronic alarm system, allows the user to activate or deactivate the access control without the use of the conventional key and mechanical lock mechanism. With the development of microprocessor integrated circuits, it is becoming common to implement microprocessor-based control circuitry in electronic access control devices. Electronic access control devices are known, for example, from U.S. Pat. No. 5,021,776. In this device, and other common electronic access control devices, a microprocessor is used in combination with a keypad and an electrically programmable read only memory (EPROM). The microprocessor compares the combination entered in the keypad by the operator with the combination stored in the EPROM. If the two combinations match, the microprocessor opens the lock.

There are problems associated with previous electronic access control devices. One area of problems concerns the manufacture of the devices, including the difficulty in programming the non-volatile memory, such as the EPROM, for storing the access code and other useful information for the operation of the device. EPROMs, which usually require parallel programming, interrupt the manufacturing process in that they restrict when the manufacturer can program the device. A manufacturer would prefer to program the access code into the EPROM as the last step in the manufacturing process. However, with parallel EPROMs, burning in the code after the device has manufactured is difficult. After the device is soldered together, the manufacturer must contend with integrated circuit pin clips and must worry about interference with other circuitry on the manufactured device. Further, manufacturing, with known electronic access control devices, requires many pin connections which increase manufacturing cost.

Related to the problems associated with the pin connections of the microprocessor integrated circuit (IC) is the concern of device reliability and ease of use. When the device contains a significant number of pin connections, the reliability of the device decreases. Further, serial access to the EPROM to determine the electronic access code is easier than parallel access in terms of pin connections. When the user forgets or loses the access code in the EPROM, a locksmith could plug into the device and retrieve the access code serially without breaking into the safe. However, with parallel EPROMs, serial access is not available.

One common problem associated with previous electronic locks is their potential vulnerability to tampering. A conventional electronic lock receives an access code via an input device such as a keypad or electronic key reader, verifies the access code, and then energizes a solenoid, relay, motor, or the like to open the lock. This arrangement is vulnerable to tampering because if the control circuit is somehow broken in or removed, one can open the lock by "hot-wiring" the control lines for activating the lock-opening mechanism.

Another technically challenging problem is related to the need to provide electrical energy to power the operation of the electronic access control device. For many applications, it is desirable to use a portable or alternative energy source, such as a battery, to power the access control device. A battery, however, has a rather limited amount of electrical energy stored therein. Thus, in many applications it is important to reduce the power consumption of the control circuit and peripheral devices of the access control device to extend the service life of the batteries.

For instance, it is typical to use a solenoid-operated lock in an electronic lock. The consumed by the solenoid in opening the lock is quite significant. Thus, the battery can be rapidly drained by the repeated operation of the solenoid. As another example, it is common to include a low-battery detection circuit in an electronic lock to provide a warning signal to the user when the battery voltage falls below a predetermined level. The operation of the low-battery detection circuit, however, also consumes electrical energy and contributes to the draining of the battery.

Some electronic locks are provided with electronic keys. When an electronic key is presented to a key reader of an associated electronic lock, it transmits an access code to the electronic lock. By using an electronic key, the user does not have to enter manually the access code by means of a keypad. In certain applications, a remote control unit is used which has a radio transmitter to send the access code to the lock without direct electrical contact with the electronic lock.

Although electronic keys are a convenient feature, they have their associated problems. One problem is related to the unauthorized use of the keys. For example, many hotels provide safes equipped with electronic locks in their hotel rooms. Such safes typically allow the hotel guests to set their own access codes. In cases where the hotel guests forget the access codes they set, the hotel management has to send someone with a master key which has a master access code stored therein to open the safes. There is a danger that such a master key may be used for unauthorized opening of other safes in the hotel.

Another problem associated with the use of an electronic key or a wireless access code transmitter is that the key or the transmitter may be lost easily, or the user may simply forget to bring the key or transmitter. This problem is especially serious if the electronic access control device does not provide other means, such as a keypad, for entering the access code.

Vending machines are widely used in various locations as automated means for selling items such as soft drinks, snacks, etc. Traditional vending machines are equipped with mechanical locks, which can be unlocked with a corresponding mechanical key to open the door of the machine to allow reloading of goods and collection of money.

One significant problem with conventional vending machines is the difficulties in managing the distribution and usage of the keys to ensure the security of the locks on the vending machines. The process of collecting money from the vending machines scattered at different places is a very manpower-intensive operation that requires many employees to go into the field with numerous mechanical keys for operating the locks on the vending machines. It requires a considerable amount of attention and efforts to manage and track the distribution of the keys to the field workers to keep the keys secure.

Moreover, the mechanical keys and lock cores of vending machines are a point of attack for vandals. The keys can be lost or copied easily, and the stolen or copied keys may then be used by an unauthorized person to access the machines, and it is difficult to discover such misuses and security breaches. Also, a skilled vandal can easily pick or drill-out the lock core tumblers and measure the key cuts of the lock core tumblers to re-produce a like key and compromise the security. In the event a security breach is identified, the mechanical lock cores of the affected vending machines typically have to be manually replaced, which is a time-consuming and very costly process. Furthermore, mechanical keys and locks are devices that cannot be partially limited in operation they operate indefinitely if in use. Also, they do not have the ability to record access operation attempts of their operation.

In addition, appliances, such as vending machines, fountain drink dispensers, coolers, etc., are used in various commercial settings, and there is always a need to control access to or operations of those devices. For instance, vending machines have to be serviced on a regular basis to replenish goods and collect money, and it is necessary to control the access to the machines so that only authorized personnel may open the machines at allowed times. As another example, it may be desirable to control the operation of a given appliance, such as a fountain drink dispenser, such that the appliance cannot be used unless the authorization for its usage is renewed. Moreover, in many cases, it is desirable to be able to monitor the location of an appliance such that its access or usage can be denied if the appliance has been stolen or otherwise removed from its intended location. Similar needs to control the access and operations of other devices used in the field, such as power tools, storage boxes, shipping containers, etc., based on various parameters such as time, location, number of access, personnel authorization, etc., are also felt in many different industries.

SUMMARY OF THE INVENTION

It is a general object of the present invention to develop an electronic access control device which is easier to manufacture and more reliable to operate, and provides improved security to prevent tampering or unauthorized access.

It is an object of the present invention to provide an electronic access control device with a non-volatile memory for storing an access code that permits the manufacturer of the device to easily insert the access code into the device and then read out the code for verification.

It is an object of the present invention to provide an electronic access control device that provides significantly enhanced security and reduced vulnerability to tampering as compared to previous electronic locks.

It is an object of the present invention to develop an electronic access control device which has fewer total components and pin connections for smaller device area and greater reliability.

It is another object of the present invention to develop an electronic access control device with a solenoid-operated lock which has reduced power consumption by reducing the power used in operating the solenoid.

It is a related object of the present invention to develop an electronic access control device that has an improved low-battery detection circuit which has minimized energy consumption.

It is another more specific object of the present invention to provide an electronic access control system with a master key for a plurality of remote electronic locks that effectively prevents the unauthorized use of the master key.

It is also a general object of the invention to provide a system and method for accessing or controlling operations of devices in the field that enables the use of location information to determine whether a field device should be accessed or enabled to operate based on the location and other operation limit parameters.

The present invention accomplishes these and other objects and overcomes the drawbacks of the prior art. First, there is provided an electronic access control device which reduces the number of pin connections required to manufacture, to read, to program, and to operate the device. The device multiplexes the inputs and outputs of the microprocessor IC so that a single pin can function as an input in one mode and an output in another. The microprocessor determines, based on the mode of operation, whether a pin functions as an input or an output.

The electronic access control device of the present invention has a communication port connected to selected pins of the microprocessor IC for accessing the non-volatile memory for storing an access code. Through the communication port, the manufacturer can interact with the microprocessor to store an access code into the non-volatile memory and retrieve the access code for verification. By virtue of the provision of the communication port, the factory-programmed access code can be saved into the non-volatile memory after the control circuitry is completely assembled.

In one embodiment, the electronic access control device has a microprocessor IC with a plurality of pins, a keypad for inputting user-entered access codes and a non-volatile memory, such as an EEPROM, external of the microprocessor for storing an access code. At least one of the IC pins is connected to both the keypad and the non-volatile memory for receiving the user-entered code from the keypad and transferring data between the IC and the memory.

In accordance with the object of the invention to reduce the vulnerability to tampering, the present invention provides an electronic access control device which has two microprocessors. The first microprocessor is preferably disposed close to the user interface such as a keypad or an electronic key reader. The second microprocessor is preferably disposed close to the lock mechanism and substantially shielded from external access. When the first microprocessor receives a user-entered code, it compares the entered code to a stored access code. If those two codes match, the first microprocessor transmits a special communication code to the second microprocessor. The second IC opens the lock if the transmitted communication code matches a stored communication code. Since the second IC is well protected from external access, the risk of tampering by hard-wiring is significantly reduced.

This dual-microprocessor arrangement is advantageously used in a voice activated access control system which has a first microprocessor circuit having speech recognition capability, and a second microprocessor circuit which carries out a commanded operation when receiving a correct communication code from the first microprocessor circuit. The first microprocessor circuit may include a transmitter for wireless transmission of the communication code.

The present invention also provides an effective solution to the problem associated with the intensive need for power of the solenoid. In the present invention, the electronic access control device pulses the power to the solenoid so that the overall power consumption in operating the solenoid is lower. Thus, the battery has a longer life and the lock has an increased number of accesses.

In accordance with a related aspect of the present invention, the electronic access control device employs a low-battery detection circuit that is turned off and therefore consumes no electrical power when the microprocessor is in the sleep mode. The low-battery detection circuit uses a combination of a voltage divider and a transistor to compare the battery voltage and the regulated voltage for determining whether the battery voltage is low, and uses another transistor in series with the voltage divider to selectively turn the current through the voltage divider on and off. When the current through the voltage divider is off, the low-voltage detection circuit does not consume electrical energy.

In the case of an electronic access control system with a master key and a plurality of remote electronic locks, the present invention effectively prevents unauthorized use of the master key. In accordance with the present invention, the master key has a master access code and a number of access stored therein. Each of the remote electronic lock has a key reader to communicating with the master key. When an electronic lock detects in the key a correct master access code and a number of access that is at least one, it opens the associated lock and decrements the number of access in the key by one.

In view of the foregoing, the present invention can provide a vending machine with a field-programmable electronic lock. The electronic lock can learn a key code from a corresponding electronic key. Alternatively, the electronic lock can learn that it should be accessed by an electronic switch controlled by a mechanical lock that can be opened with an associated mechanical key. The electronic lock has a learning process activation device that is accessible only when the door of the vending machine is in the open position. Using the learning process activation device, a service person sets the electronic lock in a learning mode, in which the electronic lock receives a key code transmitted from an electronic key, and stores the key code in a non-volatile memory for future access control of the vending machine. In the case where the lock access is to be controlled by the switch-lock combination, during the learning process the electronic lock controller receives an electronic closure signal from the switch. The lock thus learns that it is to open the door of the vending machine in response of the switch signal in lieu of reception of key codes from electronic keys.

The key-learning process in accordance with the invention allows electronic locks in vending machines to be easily and inexpensively programmed in the field. Thus, the electronic locks do not have to be manufactured with pre-defined permanent key codes and are not tied to any specific electronic keys for field use. There is no need to replace any physical part of the electronic lock in this key-learning process to learn a new key code and/or replacing an old key code. In contrast, mechanical locks conventionally used on vending machines have lock cores that have to be manufactured for specific keys, and once manufactured the lock cores cannot be changed. If the mechanical key is lost, the entire lock cores have to be replaced. More than one electronic key can possess a given keycode. The electronic lock on a vending machine can allow more than one keycode to be learned into the lock and used to access the lock.

The use of the field-programmable electronic locks for vending machines provides an effective way to reduce theft and fraud in terms of unauthorized access to the machines. The electronic keys provide a greater level of key security compared to mechanical keys, as they cannot be copied as easily as conventional mechanical keys. The use of non-contact wireless data communication between the key and the lock prevents breeches of security associated with vandals measuring key cuts, copying keys and picking locks. The use of data encryption in the wireless communications between the key and the lock prevents the key code from being copied by electronic monitoring and eavesdropping. The data transmission between the key and lock may be implemented in the infrared range to provide close-proximity highly directional communication of secure codes to further prevent eavesdropping of the security codes and to prevent accidental unlocking of locks.

The use of programmable electronic locks on vending machines and the associated electronic keys also provides advantages in terms of significant reduction in the costs associated with managing the distribution of the keys for unlocking the machines and the monitoring of the usage of the keys. Key IDs in addition to the key codes used in accessing the lock may be used to distinguish keys having the same key codes. Customized access limitations may be programmed by a supervisor into the electronic keys to restrict when and how they can be used to access the vending machines. Each key may also be programmed with a specific list of lock IDs identifying the electronic locks on vending machines that the key is allowed to unlock.

In accordance with one aspect of the invention, a history of access attempts may be stored in each of the electronic key and the electronic lock for audit purposes. The key may store the access history each time it is used to access an electronic lock on a vending machine. Likewise, each electronic lock on a vending machine may store audit data regarding the access attempts directed to it. The audit data may be transferred from the electronic lock to the electronic key during an unlocking operation, and the audit data of different vending machines collected by an electronic key can be later downloaded to a computer for analysis.

In accordance with another aspect of the invention, the electronic lock may accept more than one type of keys and corresponding key codes. The different key types may be associated with different levels of security of the unlocking operations and the type of data transmitted between the key and lock during the unlocking operations.

In accordance with another aspect of the invention, the electronic lock in a vending machine can work in conjunction with an electronic communication device in the vending machine that is in wireless communication with a home base to accomplish many of the same access control, auditing, and additionally some inventory and money settlement processes.

In accordance with a further aspect of the invention, a mobile control device, such as an electronic key, is used to access or otherwise control the operations of a field device, such as a vending machine, fountain drink dispenser, power tool, storage or shipping container, etc. In a control event in which the mobile control device interacts with the field device to apply the control, the control device receives location information and the ID of the field device, and uses the location data in determining whether the field device should be accessed or enabled. The communication between the mobile control device and the field device may be secured with encryption. The mobile control device may record the location information and the device ID in a control event record which may be later downloaded for auditing. Alternatively, the time-dependent location information may be stored separately in a location sensing device. The control event data and the location information are then downloaded into a management system and combined therein.

These and other features and advantages of the invention will be more readily apparent upon reading the following description of the preferred embodiment of the invention and upon reference to the accompanying drawings wherein:

BRIEF DESCRIPTION OF THE DRAWINGS

FIGS. 40A and 40B are schematic diagrams showing the user interface screen and process for registering the software and the cradle of the key management system;

FIGS. 41A, 41B and 41C are schematic diagrams describing a start-up and refresh sequence of the keys;

FIG. 42A is a schematic diagram showing user interface screens for a user to entering supervisor and administrator modes;

FIG. 43B is a schematic diagram showing user interface screens for the operation of entering key user information;

FIG. 44B is a schematic diagram showing user interface screens for prompting a user of the key management system to enter information regarding a new electronic lock;

FIG. 46 is a schematic diagram showing user interface screens for displaying audit trails data collected by electronic keys from vending machines;

FIGS. 47A and 47B are schematic diagrams showing user interface screens for a process of editing key limit operational parameters;

FIG. 54 shows user interface screens for generating an export file for synchronizing distributed databases;

FIGS. 56-58 show user interface screens involved in scheduling the operation of the key management system for auto start up;

FIGS. 74A-D are schematic diagrams of a security container in the form of a safe that is configured for securely storing valuable items such as mechanical keys;

Figure 1:
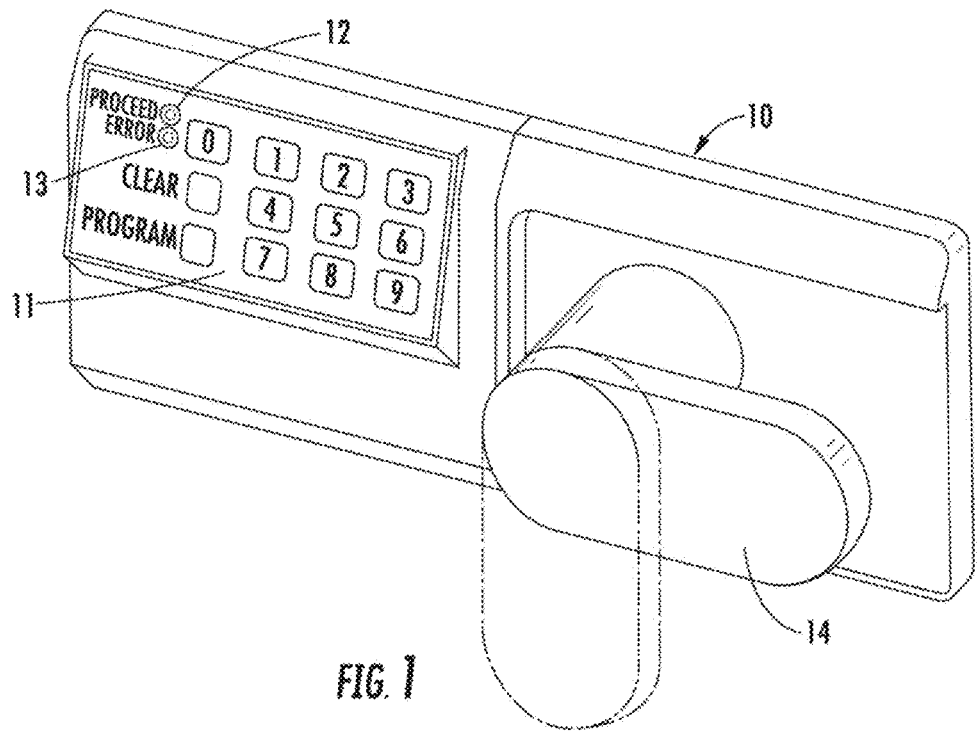
FIG. 1 is a perspective view showing an electronic access control device having a keypad.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE INVENTION

In an embodiment, an electronic system and method is provided for controlling access of devices. For instance, some devices operating in the field are in a relatively unsecured environment, and it is necessary to control the access or usage of the devices so that they are not accessed by unauthorized persons or that they are not used at unauthorized times or places. The devices that may be advantageously controlled using the system and method of the invention include, for example, safes, appliance devices such as vending machines, coolers, fountain drink dispensers, etc., power tools used in construction sites, shipping containers, and many other types of devices. It will be appreciated that the above list is meant only to provide some examples and is by no means intended to limit the applicability of the invention.

Referring to the drawings, there is shown in FIG. 1 an illustrative electronic access control device 10 having a keypad 11, light emitting diodes (LEDs) 12 and 13, and a mechanical lever arm 14. In this illustration, the device is used as a lock for an office safe. The device can also be applied to various applications including locks for vending machines or amusement games.

Figure 2:
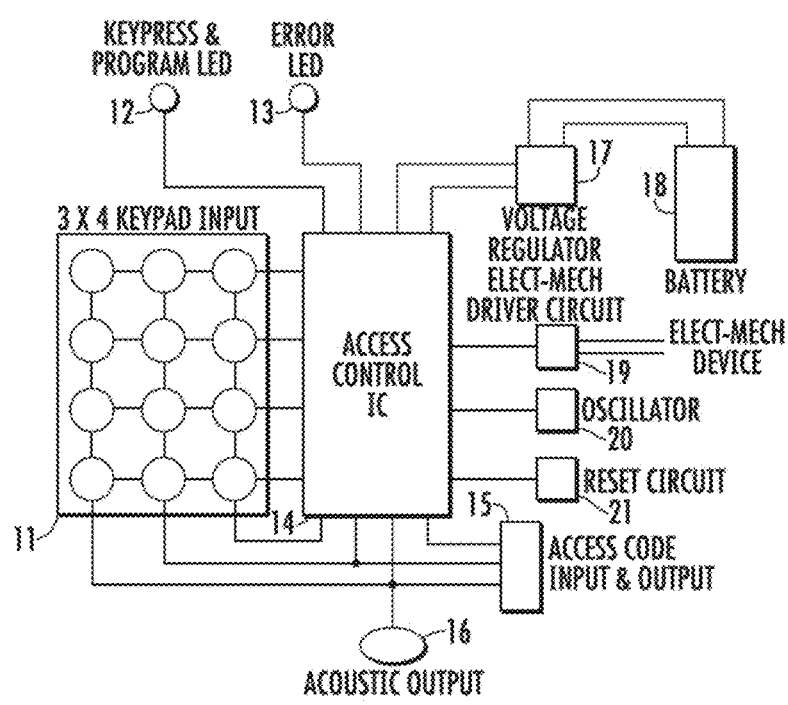
FIG. 2 is a block diagram of the electronic access control device of FIG. 1.

The main components of the electronic access code device are shown in FIG. 2 which include a keypad 11, a microprocessor 14, an access code input and output 15, an acoustic output (a piezo ceramic bender, Model No. KB1-1541) 16, LEDs 12 and 13, a voltage regulator (LM2936Z-5.0) 17, a battery 18, an electromechanical driver output 19, an oscillator 20, and a reset circuit 21. Inputs to the device may take the form of a thumbprint scan, a retinal scan, or a magnetic strip input which may work in conjunction with a keypad or as a sole means of input. Outputs may take the form of an alpha-numeric display which may work in conjunction with an acoustic output or an LED or as a sole means of output.

The manufacturers which provide microprocessors applicable to the device include: Micro-Chip (PIC 16C54, PIC 16C57, PIC 16C71, PIC 16C76); Motorola (MC68HC705J1, MC68HC705K1, MC69HC705P6, MC68HC705P8, MC68HC705P9); National Semiconductor (COP 820C); SGS-Thomson (ST 6210); Texas Instruments (370C311); Zilog (Z84C01).

Figure 3:
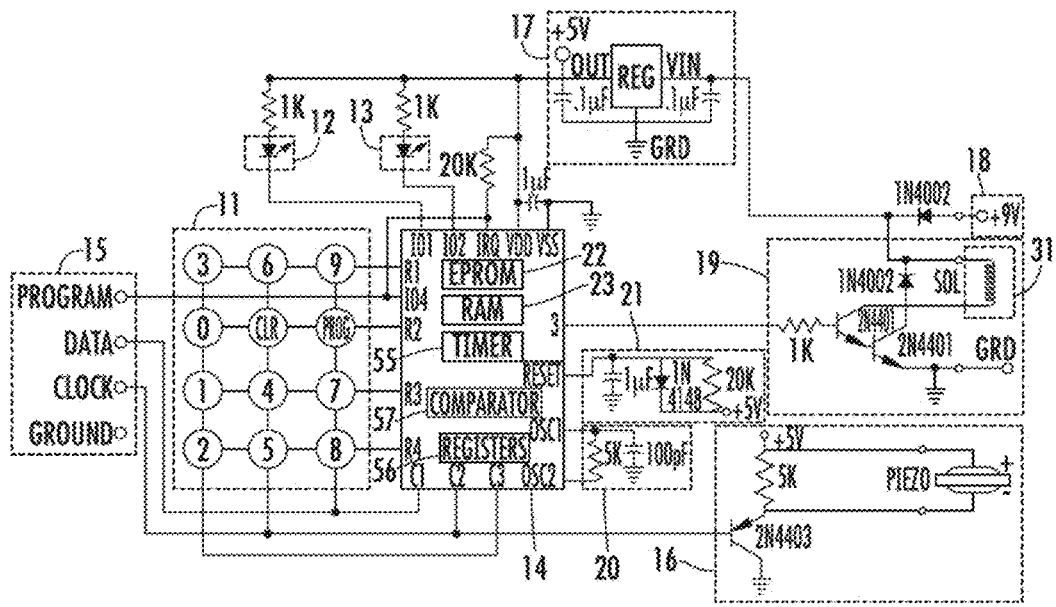
FIG. 3 is the schematic of the electronic access control device.

A more detailed schematic of the device is shown in FIG. 3, highlighting the reduced pin configuration and the serial access to the electrically programmable read only memory (EPROM) 22. Several of the pins on the microprocessor 14 are multiplexed and perform multiple functions, at times used as inputs and at times used as outputs; thereby, the pin configuration is able to use only 9 pins for the keypad input, the acoustic output, and the EPROM 22 reading and writing. For example, the 12 keypad entries are shown in rows and columns. Each keypad entry in a row is connected to the corresponding pin. For example, keypads "3", "6", and "9" are connected to pin R1. Each keypad entry in the same column is connected to a corresponding pin as well. For example, keys "3", "0", "1", and "2" are all connected to pin C3.

Figure 4:
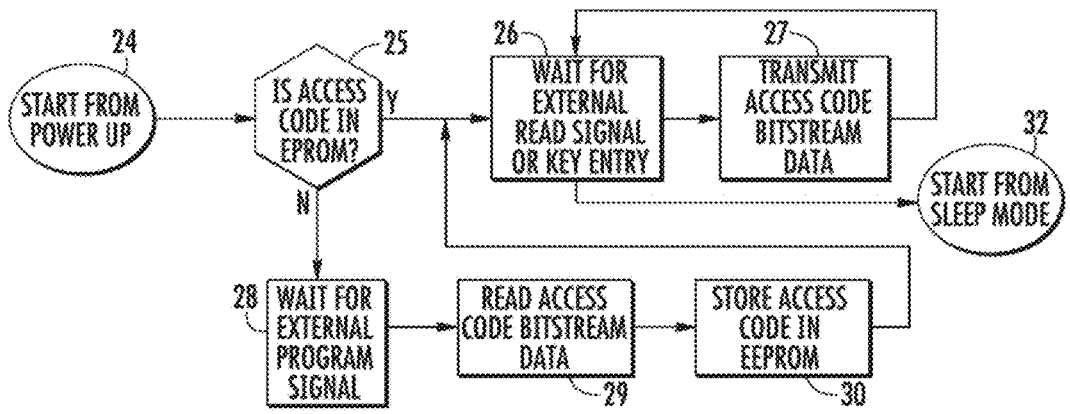
FIG. 4 is the flow chart at power-up of the device.
Figure 5:
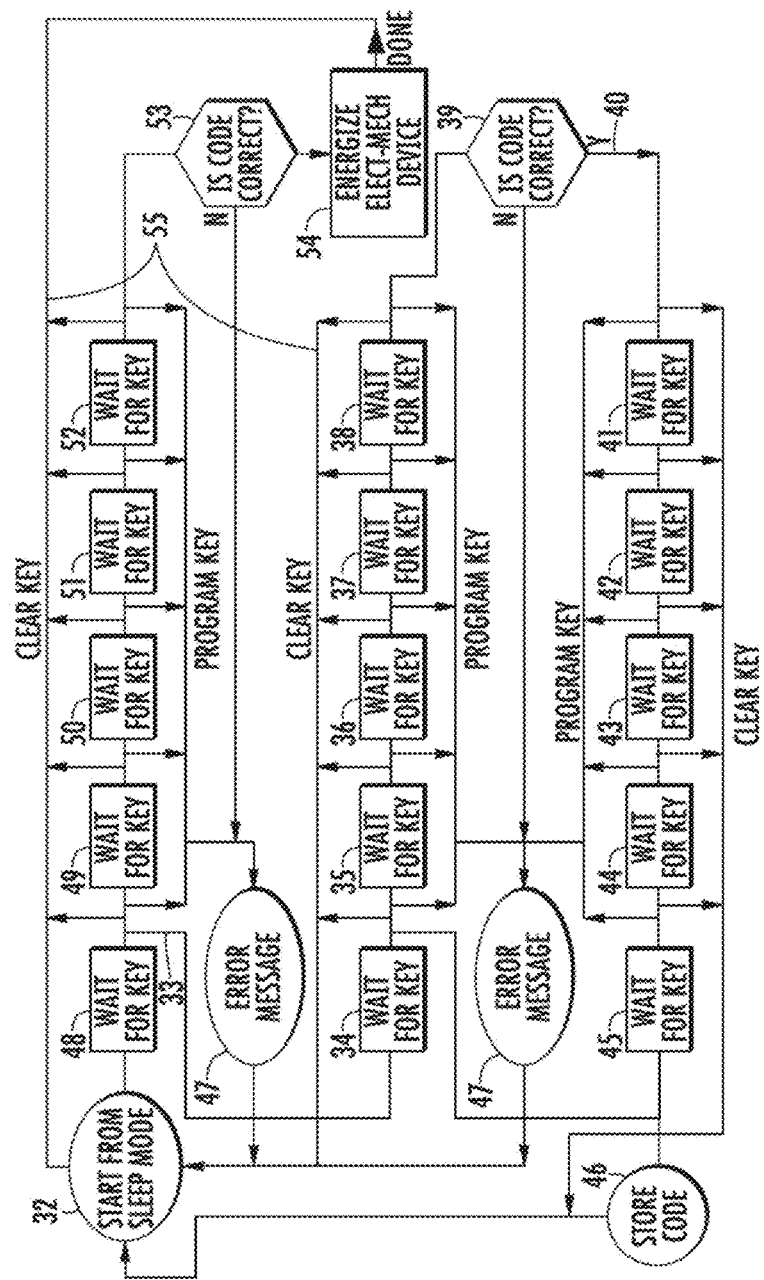
FIG. 5 is the flow chart of the device in normal operation.

The multiplexing of the keypad allows for input of twelve different inputs ("0" through "9", PROG, and CLR) using a four by three configuration, as shown in FIG. 4 and FIG. 5. In particular, there are four rows and three columns in this configuration. In accordance with another embodiment, a keypad with four different inputs allows for as little as a two by two configuration through multiplexing the inputs.

The following example will illustrate the multiplexing with respect to the keypad 11. Normally, in sleep mode, pins R1, R2, R3 and R4 are waiting for an input. When, for example, the keypad "3" is input, pin R1, which keypad "3" is connected to, is triggered signifying to the microprocessor 14 that an interrupt has occurred. The microprocessor 14 then executes an interrupt in the software program and changes one of the four pins (R1, R2, R3 and R4) into an output whereby a logic high is sent to the R1 pin. When a keypad is pressed, it acts as a short circuit; thus, when the microprocessor 14 sends out a logic high, it then senses pins C1, C2 and C3 to determine exactly which keypad in the row has been pressed. In this case, where keypad "3" is input, C3 is high. Pressing keypad "3" acts as a short circuit so that when R1 is sent high, there is a direct electrical connection between pin R1 and C3 via keypad "3". Thus, the microprocessor 14 can determine that keypad "3" was pressed based on R1 and C3 both being logic high.

Another example of using multiple functions as connected to a single pin is the acoustic output 16. The acoustic output 16 is connected, via a transistor, to pin C2. Pin C2 is also connected to keypads "CLR", "4", "5", and "6". When the microprocessor 14 sends an audible signal output, pin C2 acts as an output. When the microprocessor is sensing the keypad input, C2 acts as an input.

A further example of multiple functions as connected to a single pin is the EPROM 22 sensing function. The EPROM 22, as shown in FIG. 3, is part of the microprocessor 14. The DATA line (bidirectional in that the line is able to input data to write and output data to read) and CLOCK line of the EPROM 22 are connected to C1 and C2, respectively. Pins C1 and C2 are connected to the keypad as well. When the PROGRAM signal is input, C1 and C2 function as inputs when writing to the memory location in the EPROM and function as outputs when reading from the memory location in the EPROM 22. Through this arrangement, the manufacturer may serially program the device with the access code. The microprocessor 14 uses registers 56 to transmit the incoming serial data into parallel data for the EPROM 22 to input. Further, the end user may read the EPROM 22 access code serially as well. In reading the EPROM 22, only three pins must be accessed (PROGRAM, DATA, and GROUND). The microprocessor 14 uses registers 56 to transmit the outgoing parallel data from the EPROM 22 to serial form for output.

It will be appreciated that by installing a communication port, namely the access code I/O 15, in the microprocessor-based control circuit, the manufacturer of the device can access the EPROM by interacting with the microprocessor 14 via the communication port. By virtue of this arrangement, the manufacturer can program the access code into the EPROM as the last step in the manufacturing process, i.e., after the control circuit has been fully assembled. Thus, there is no longer the need to use a EPROM that is pre-programmed with access codes, or to attempt to input the access code into the EPROM by means of pin clips or the like during the manufacturing process. This ability to program the EPROM after the completion of the control circuit imparts significant flexibility, efficiency, and reliability to the manufacturing process.

The operation of the electronic access code device is shown in flowchart form in FIG. 4 and FIG. 5. FIG. 4 shows the initialization sequence of the device upon power-up 24. The microprocessor, which contains an EPROM 22 and a random access memory (RAM) 23, checks to see if there is an access code stored 25 in the EPROM 22. The microprocessor 14 performs this operation by checking if a proprietary bit sequence is set, wherein the particular sequence of bits signifies that the EPROM 22 has a stored access code. If the bit sequence is present, the EPROM 22 contains the access code, whereby the microprocessor 14 waits for input from the keypad or waits for an external read signal 26 from the microprocessor 14.

If the bit sequence is not present, the EPROM 22 does not contain the access code in its memory. The microprocessor 14 must then wait for the external program signal 28 which signifies that the access code is being written to the EPROM 22. The external program signal, as shown in FIG. 3, is labeled PROGRAM and is connected to pin 104 and pin IRQ of the microprocessor 14. In this mode, when the PROGRAM signal is toggled, this signifies that the access code is being burned into the EPROM 22. The microprocessor 14 then uses the CLOCK and DATA lines to clock in the data thereby reading the access code. Then, the microprocessor 14 stores the access code into memory 30. The microprocessor 14 subsequently sets the proprietary bit sequence on the EPROM 22 signifying that the EPROM 22 contains the access code. Finally, the microprocessor 14 waits for input from the keypad or waits for an external read signal 26 from the microprocessor 14.

The EPROM 22 can also be used to store features other than the access code. It can be used to determine such things as: (1) the amount of time the solenoid 31 is to be energized upon opening the lock; (2) the number of key presses in the access code; (3) the option of disabling the permanent access code temporarily when a new-access code is stored in RAM 23; (4) the device serial number; and (5) the date and time the device was manufactured or put in service. These features allow the manufacturer to deliver to an original equipment manufacturer (OEM) customer a generic electronic lock assembly. The OEM customer may then characterize all the specific lock features at the OEM customer facility.

As shown in FIG. 5, after the power-up initialization routine, the microprocessor waits for an entry from the keypad 32. Several functions are available based on the keypad entry. If the program key (PROG key) is first pressed, the operator wishes to input an additional access code 33. In this mode, the microprocessor 14 inputs the next five numbers from the keypad 34, 35, 36, 37, and 38. The comparator 57, within the microprocessor 14, compares the two numbers and checks if the input number matches the access code 39 from the EPROM 22 which is stored in RAM 23. If the two numbers match, this signifies that the operator knows the access code in the EPROM 22 and therefore has clearance to input an additional access code 40. Thus, the microprocessor accepts the next five numbers from the keypad as the additional access code 41, 42, 43, 44, and 45, and stores the new access code 46 in RAM 23. The operator may then input either the access code from the EPROM 22 or the additional access code to open the lock. The operator may repeat this procedure and place additional access codes into RAM 23. The additional access codes will be stored in RAM 23 until the power is removed from the microprocessor 14 at which time the RAM 23 memory will be lost.

An alternate mode of using the PROG key is to disable the permanent access code in the EPROM 22 temporarily when a new access code is entered into RAM 23. After the PROG key is hit, the microprocessor 14 inputs the next five numbers 34, 35, 36, 37 and 38. The comparator 57, within the microprocessor 14, compares the input number with the permanent access code 39 from EPROM 22. If the two numbers match, the microprocessor 14 inputs a second access code 41, 42, 43, 44, 45. In this alternative, when the microprocessor 14 stores in RAM 23 the new access code 46, it disables access to the permanent access code in RAM 23. Therefore, until the battery 18 is turned off, the only access code available is the new access code stored in RAM 23.

If an operator enters the PROG key at any time other than at the first keypad entry from sleep mode, the microprocessor will display the error message 47 by sounding the acoustic output 16 through pin C2 and the LED 13.

If a number from the keypad 11 is first entered while in sleep mode 48, the microprocessor 14 waits until another four numbers are entered 49, 50, 51, and 52, from the keypad 11. The microprocessor 14 then compares the number entered from the keypad 11 with the access code 53 stored in RAM 23. If the numbers match, the microprocessor 14 energizes the solenoid 31 at the output 54. The microprocessor 14 can also energize a DC motor, an electromechanical relay, or a solid-state relay. If the numbers do not match, the error message is sent 47 by sounding the acoustic output at pin C2.

If the clear key on the keypad is entered at any time in the operation of the device, the microprocessor 14 waits 5 seconds before going back into sleep mode and waiting for the next keypad entry.

One feature of the device is a lockout of keypad operations. If the microprocessor 14 receives three consecutive operations which generate error messages 47, the microprocessor 14 will disable operation of the device for two minutes. Any attempt to operate the device in the two minute lockout period will generate an error message 47.

An additional feature of the system is a requirement that a digit must be entered within a specified time. Otherwise, the microprocessor 14 will send an error message 47 if there is a five second lapse between keypad entries.

A further feature of the system is the modulated voltage across the solenoid 31. When the correct access code is input 53 from the keypad 11, the microprocessor 14 energizes the solenoid 31. The microprocessor 14 must supply sufficient power to the solenoid to unlock the lock (i.e., the solenoid must push the plunger in against the coil to open the lock). This involves two different operations. First, the solenoid 31 must physically push the plunger against the coil. Second, the solenoid 31 must keep the plunger pushed against the coil for the specified time in which to keep the lock unlocked.

The first operation (pushing the plunger) is very energy intensive. The solenoid 31 must exert kinetic and potential energy to physically move the plunger against the coil. The second operation (maintaining the position of the plunger) is less energy intensive. The solenoid 31 must exert only potential energy in terms of keeping the plunger compressed against the coil. The device, in order to unlock the lock, supplies the entire battery power necessary for the solenoid 31 to pull the plunger in against the coil. The microprocessor 14 accesses the timer 55, within the microprocessor 14, whereby the timer indicates when to reduce the power. Once the plunger is pulled in, the microprocessor 14 modulates the voltage to the solenoid 31. This reduces the current into the solenoid while the solenoid plunger is held in since the entire DC current is not required to keep the plunger in the closed position relative to the coil. This in turn reduces the total amp-hours of current out of the battery during an access cycle, and the total number of accesses to the device increases.

By way of example, the solenoid 31 requires 300 milliamps of current to pull the plunger in. The microprocessor 14 accesses the timer 55, waiting 0.5 seconds to do that operation. The microprocessor 14 then drops the solenoid current to 150 milliamps. This current is sufficient for the solenoid 31 to keep the plunger flush against the coil. The microprocessor 14 accesses the timer 55 again, waiting for the timer 55 to indicate that three seconds have passed, supplying the lower current to allow the user to open the door. In this manner, the microprocessor 14 uses approximately ½ as much power in the modulated mode.

Figure 6:
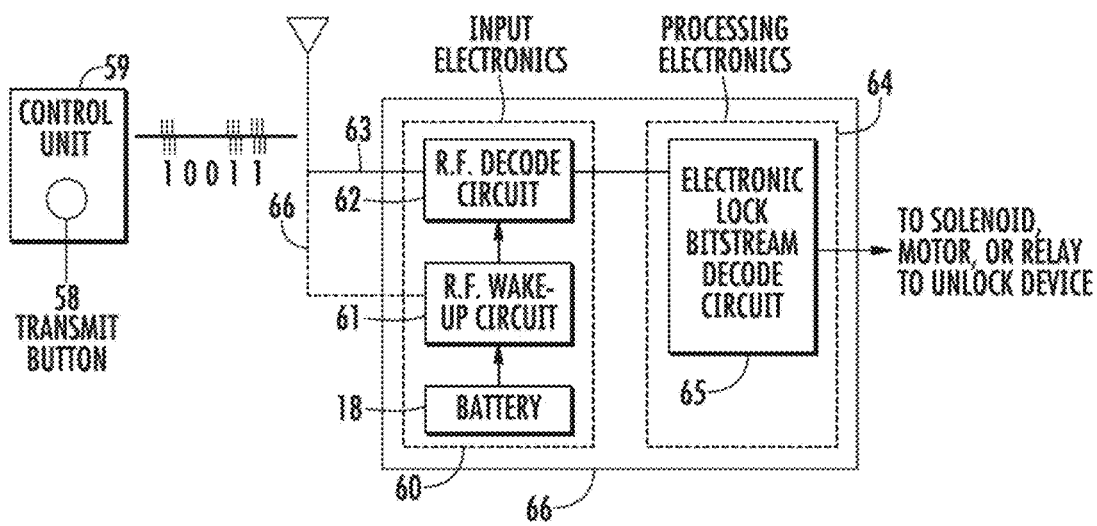
FIG. 6 is a block diagram of a remote access control device.

FIG. 6 highlights another aspect of the invention, the remote operation of the electronic access code device using a battery. The device can be integrated with other electronic devices forming a system of electronic locks. At the center of the system is a central control station whereby each of the devices may be accessed.

The accessed device is designed for low power consumption so that it may operate on a battery for an extended period of time. The remote access device is normally in a sleep mode. In other words, the device is not in active operation. The remote device can "wake-up" from the low power sleep mode in a variety of ways. One method is for the circuitry in the sleep mode device to sense the incoming signal. When the signal is sent, the remote device resumes normal operation. Another method is for the circuitry in the sleep mode device periodically to resume normal operation and sense if there is an incoming signal. If the incoming signal is sent, the circuitry is able to receive the bitstream data that contains the access code. The circuitry thus remains in a low-power sleep-mode condition for the majority of the time, dissipating low power, while no signal is received. The device may then be powered by a battery.

The remote electronic access code device is divided into two parts: the input electronics 60 and the processing electronics 64. The processing electronics 64 contains a microprocessor, an access code input and output, an acoustic output, light emitting diodes (LED), a voltage regulator, and an electromechanical driver output. Thus, the remote device is similar to the microprocessor in processing the input access code, as shown in FIG. 1, except the access code may be input in several ways. In this embodiment, the data stream is input serially into the microprocessor 14 so that a variety of serial inputs may be connected to the input of the microprocessor 14. For example, the access code may be input using a traditional keypad 11 transmitting data in serial mode. Moreover, the data may be input serially using an electromagnetic signal input from the radio frequency (RF), optical frequency or infrared frequency bands. Thus, the microprocessor 14, in this configuration, may accept the input from any one of these inputs.

The input electronics 60 accepts the code sent from the central control. The method of transmitting the code may take several forms including an electromagnetic signal (such as a RF signal sent by an RF serial bitstream transmitter, or an infrared signal) or a data line (telephone line).

When an RF signal is used, the central station transmits a signal via a transmit antenna 63 (transducer that sends radiated electromagnetic fields into space). The radiated waves containing the RF signal contains the bitstream access code which is sent to the input electronics 60. The input electronics 60 contains the RF wake-up 61 and the RF decode circuitry 62. In one embodiment, the RF wake-up circuit 61 is ordinarily in a low power sleep-mode. However, for a 10 millisecond period every 1 second, the RF wake-up circuit 61 senses for an RF bitstream signal. If an RF bitstream signal exists, it remains awake and receives the entire RF bitstream signal. The RF wake-up circuit 61 then sends a wake-up enable signal to the RF decode circuit 62. The RF decode circuit 62, via the antenna 63, translates it into a series of bits and then sends the digital bitstream signal to the processing electronics 65 to determine if the digital bitstream signal contains the access code.

In another embodiment, the RF wake-up circuit 61 remains in low power sleep mode until it senses the RF signal. The RF signal, in this embodiment, contains a low carrier frequency way and a high frequency RF bitstream superimposed on the low frequency carrier wave. When the RF wake-up circuit 61 senses, via the antenna 66, that there is a signal tuned to the low frequency carrier Wave, the RF wake-up circuit 61 sends a wake-up enable signal to the RF decode circuit 62. The RF decode circuit 62 then accepts the RF bitstream access code signal, and translates it into a series of bits for the microprocessor 14.

Figure 7:
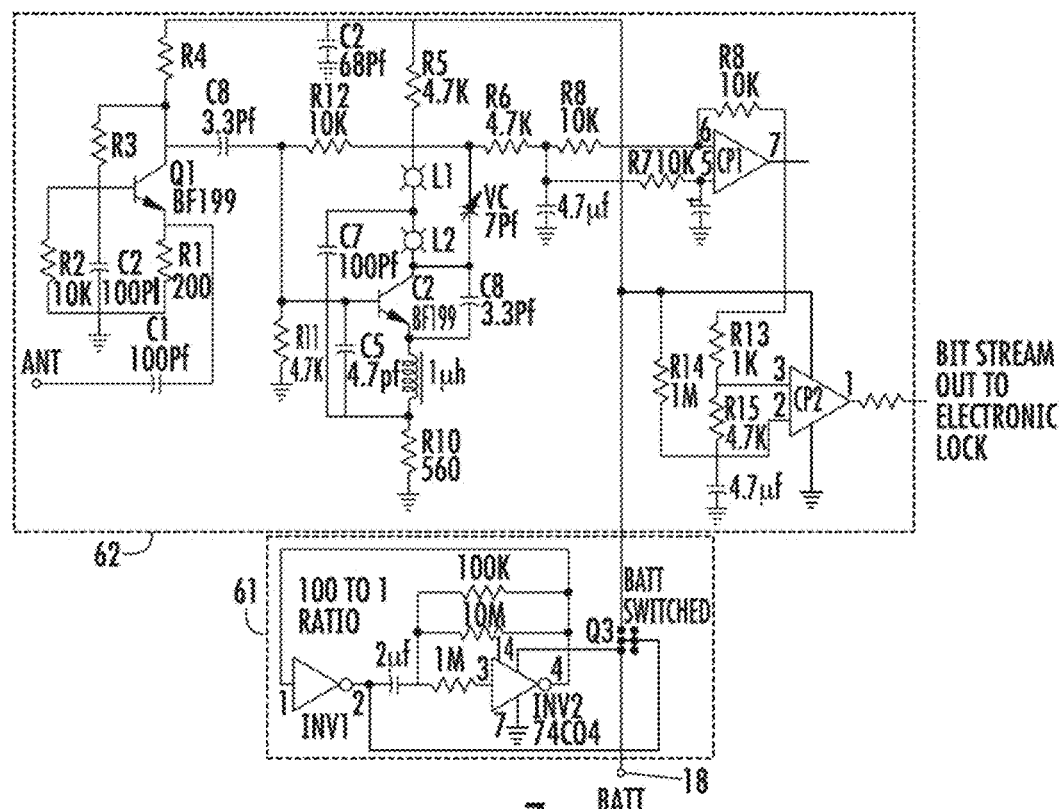
FIG. 7 is a schematic of the input electronics of the remote access control device of FIG. 6.

FIG. 7 shows the schematic of the input electronics 60 wherein the RF wake-up circuit 61 periodically wakes up from a low power sleep mode and senses if there is an incoming RF signal. The RF wake-up circuit 61 consists of two low-power CMOS inverter gates, INV1 and INV2, a CMOS transistor Q3, resistors, and a capacitor. The two inverters INV1 and INV2 are configured in an oscillator configuration in a ratio of 1 to 100. In other words, the oscillator will switch on for $\frac{1}{100}$ of a second. At this time, the CMOS transistor Q3 will turn on and supply the battery power to the RF decode circuitry 62. The RF decode circuitry 62 will only draw battery power for $\frac{1}{100}$ of the time, and thus the battery will last 100 times longer than if the battery were permanently connected to the RF decode circuitry 62.

The RF decode circuitry 62 consists of two bipolar junction transistors Q1, Q2, two Operational Amplifiers, OP1 and OP2, and resistors, capacitors, inductors and diodes connected to these components. The RF input signal is referred to as an on-off keying of high frequency bursts for set time frames. In the present invention, the frequency is set at 320 MHz. A burst of frequency is detected by the Q1 and Q2 transistors with their circuits tuned to the correct frequency (320 MHz in this example). The RF decode circuitry 62 then senses the data bitstream sent in the form of digital 1 data signal and digital 0 dead band of no frequency. Thus, a train of on and off frequency pulses would be received by the antenna, conditioned and amplified by Q1 and Q2 of the RF decode circuitry 62, and converted to bitstream 1 and 0 digital signals by the two operational amplifier signal conditioners OP1 and OP2.

Typically, the operator of the control unit 59 which contains the RF transmitter will enable the RF transmitter with a transmit button 58 to send an RF on-off keying pulse for approximately one second. The RF signal being transmitted is a digital bitstream conditioned to an RF on-off keying signal which takes about two milliseconds in which to transmit one complete signal. The control unit 59 then repeats the signal over and over for the duration that the RF transmitter is enabled. In order for the receiver to detect one complete bitstream from the transmitter, the RF signal only needs to be sampled for two milliseconds during which the transmitter is enabled and transmitting. If the RF transmitter is enabled for one second, the transmitted bitstream signal takes $\frac{1}{500}$ of a second to be transmitted and is repeated 500 times over the entire one second. The receiver is enabled for $\frac{1}{100}$ of a second every second, and will have the opportunity to sample and detect a signal that is $\frac{1}{500}$ of a second in duration, transmitted 500 times over one second. After the $\frac{1}{100}$ of a second, the oscillator, formed by INV1 and INV2, will switch Q3 off, and the battery power to the RF decode circuitry will be shut off. Only the oscillator circuit (INV1 and INV2) will dissipate battery power at a small rate of less than 100 micro-amps.

If less power dissipation by the RF decode circuitry 62 is required, the decode circuitry power duty cycle can be reduced by increasing the oscillator frequency to more than 100 to 1 and thus decreasing the RF decode circuitry 62 sample rate. In order to ensure the RF decode circuitry 62 will be enabled long enough to detect the entire transmitter digital bitstream, the lock CPU would wait for the beginning of the bitstream signal which is received by the RF decode circuitry 62 when the circuitry was enabled and conditioned through OP 1, and then would send an output enable signal back to Q3 to override the oscillator and keep the RF decode circuitry 62 enabled with battery power until the lock. CPU has received the correct amount of bitstream data from the transmitter through the decode circuitry. Thereafter, the lock CPU would disable the Q3 transistor and the RF decode circuitry and let the oscillator go back to its low rate of sampling.

The processing electronics 64 remains in sleep-mode low current operation until a valid on-off keying frequency signal is received while the RF decode circuitry is enabled and a digital bitstream signal is sent to the lock microprocessor 65. Upon transferring the bitstream signal, the microprocessor 14, within the processing electronics, compares the input code with the access code in the comparator. If correct, the solenoid, DC motor, electromechanical relay, or solid-state relay is activated. After this operation, the microprocessor 14 sends a disable signal to the RF wake-up circuit to assume a low power mode.

Figure 8:
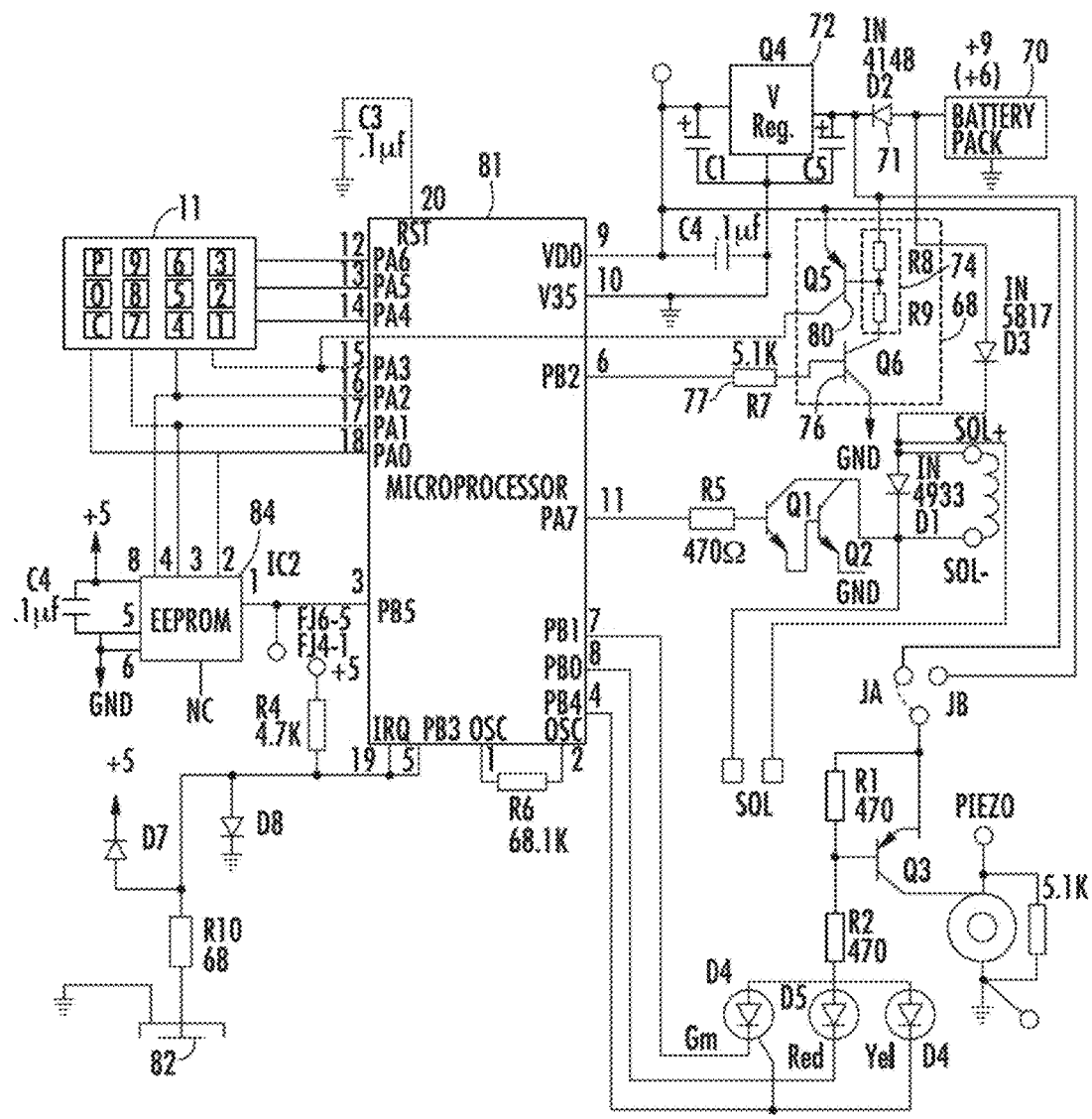
FIG. 8 is a schematic of another embodiment of the electronic control access device which has a non-volatile memory sharing certain pins of a microprocessor with a keypad.

FIG. 8 shows the schematic of another embodiment of the electronic access control device which also multiplexes the inputs and outputs of the pins of the microprocessor to reduce the number of pins required. The microprocessor 81 used in this embodiment is preferably the MC68HRC705J1A integrated circuit (IC) manufactured by Motorola. As illustrated in FIG. 8, the input devices include a keypad 11 and an electronic key reader 82.

In this embodiment, instead of using an EPROM internal of the microprocessor as in the case of the embodiment of FIG. 3, an EEPROM 84 external of the microprocessor 81 is used to store the programmed access code as well as other useful information. The EEPROM 84 used in this embodiment is preferably the 93LC46 IC manufactured by Microchip. Alternatively, a FLASH read-write memory, or any other type of suitable memory, may be used. To effectively use the limited number of pins of the microprocessor 81, the pins are multiplexed such that the keypad 11 and the EEPROM 84 share several communication pins. As illustrated in FIG. 8, pins 16 (PA2), 17 (PA1), 18 (PA0) of the microprocessor 81 are connected to pins 4, 3, and 2 of the EEPROM 84, respectively. These pins of the microprocessor 81 are also connected to the keypad 11 for receiving access codes entered by means of the keypad. Pin 3 (PB5) of the microprocessor 81 is connected to pin 1 of the EEPROM. In this configuration, pins 1-4 of the EEPROM 84 are used, respectively, for chip select, data in, data out, and clock.

In accordance with an aspect of the present invention, the microprocessor-based control circuit further includes a low-battery detection circuit 68 that does not consume electrical power except when a low-battery detection is in progress. As illustrated in FIG. 8, the access control device is powered by a battery pack 70 which includes one or more batteries. The output of battery pack is connected to a voltage regulator 72 which provides a regulated voltage for operating the control circuit. The low-voltage detection circuit 68 includes a voltage divider 74 which has its input end connected to the output of the battery pack 70 (which in the illustrated case is after an isolating diode 71). The voltage divider 74 is connected in series with a transistor 76 to ground. The base of the transistor 76 is connected (via a resister 77) to pin 6 (PB2) of the microprocessor 81. When Pin 6 of the microprocessor 81 is set high, the transistor 76 is turned on, thereby allowing current to flow through the voltage divider 74. When pin 6 is set low, the transistor 76 is turned off, and the current through the voltage divider is cut off. In that case, the output voltage of the voltage divider 74 will be pulled up to that of the battery voltage minus the voltage drop across the diode 71.

The output end of voltage divider 74 is connected to the base of a second transistor 80. The input end of the transistor 80 is connected to the output of the voltage regulator 72, while the output end of the transistor 80 is connected to pin 15 (PA3) of the microprocessor 81. Normally pin 6 of the microprocessor would stay low, and both the transistor 76 and the transistor 80 would be turned off. When a battery voltage test is performed, pin 6 is switched to the high ("1") state to turn on the transistor 76, and the state of pin 15 is sensed by the microprocessor 81 to determine the on/off state of the transistor 80. If the battery voltage is sufficiently high, the output of the voltage divider 74 would be high enough to turn the transistor 80 off. On the other hand, if the battery voltage is low, the output of the voltage divider would be low enough to turn the transistor 80 on, and pin 15 would be switched to the high state.

Figure 9:
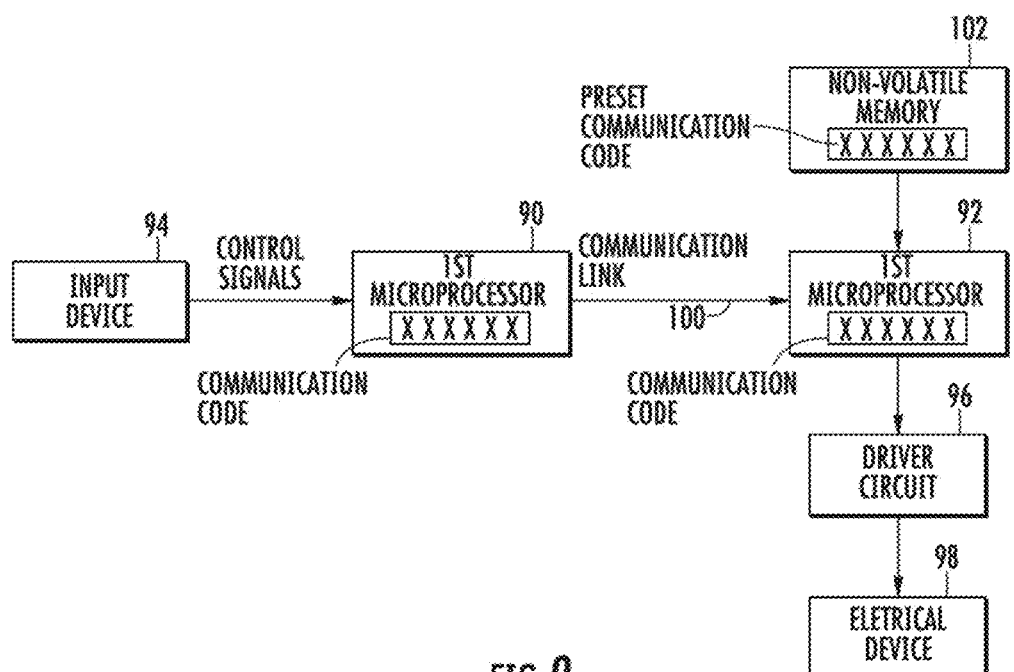
FIG. 9 is a functional block diagram showing an embodiment of an electronic access control device having two microprocessors communicating with each other to provide enhanced security of the device.

In accordance with an important aspect of the present invention, there is provided an electronic access control device that provides substantially enhanced security and reduced vulnerability to tampering by using two microprocessors. FIG. 9 shows generally the functional block diagram of such a device. As illustrated in FIG. 9, the control device has a first microprocessor 90 and a second microprocessor 92. The first microprocessor 90 is connected to an input device 94 for receiving a user-entered control signal signifying a demand to operate an electronic device 98. The second microprocessor 92 controls a driver circuit 96 for energizing the electrical device 98 to effect a desired operation. The electrical device 98 may be, for example, a solenoid, motor, relay, or the like for opening a lock, or, as will be described in greater detail below, the ignition relay of a motorcycle. The first microprocessor 90 may be positioned close to the input device 94, while the second microprocessor 92 may be located close to the electrical device 98 and is preferably well shielded from external access. The two microprocessors are connected by a two-way communication link 100.

As will be described in greater detail below, the user-entered control signal may be, for example, an access code entered using a keypad or electronic key, the operation of an electronic ignition switch controlled by a mechanical lock, or a voice command entered through a voice sensor such as a microphone. Once a user-entered control signal is received, the first microprocessor 90 determines whether the demand to operate the electrical device 98 should be transmitted to the second microprocessor 92. If the demand is to be transmitted, the first microprocessor 90 sends a special communication code to the second microprocessor 92 via the communication link 100. The second microprocessor 92 compares the transmitted communication code with a preset communication code stored in a non-volatile memory 102. If the transmitted code matches the stored code, the second microprocessor 92 activates the driver circuit 96 to energize the electrical device 98.

It will be appreciated that this dual-microprocessor configuration significantly reduces the vulnerability of the device to tampering. Even if a tamperer may gain access to the first microprocessor, it is intended that the second microprocessor is well shielded and therefore cannot be reached easily. Since the second microprocessor responses only to a correct communication code, the tamperer will not be able to use the trick of "hot-wiring" to activate the driver circuit 96.

Moreover, even if the circuit containing the first microprocessor is somehow replaced by another similar microprocessor circuit for which the correct control signal is already known, that new microprocessor is unlikely to know the communication code specific to the second microprocessor 92. In this way, the two microprocessors function as two individual gate keepers. Even if the first microprocessor could be somehow bypassed, the second microprocessor would not activate the driver circuit without receiving the correct communication code.

The microprocessors can also be programmed to implement the "code-hopping" or "rolling-code" scheme used in some existing electronic access control devices to further improve the security of the device. In such a scheme, the preset code stored in the non-volatile memory 102 is used as a seed, and the communication codes stored in the first and second microprocessors are changed as a function of the number of code transmission according to a predefined algorithm based on the seed code. The changes of the communication codes in the two microprocessors are synchronized so that they remain in operative relationship.

Figure 10A:
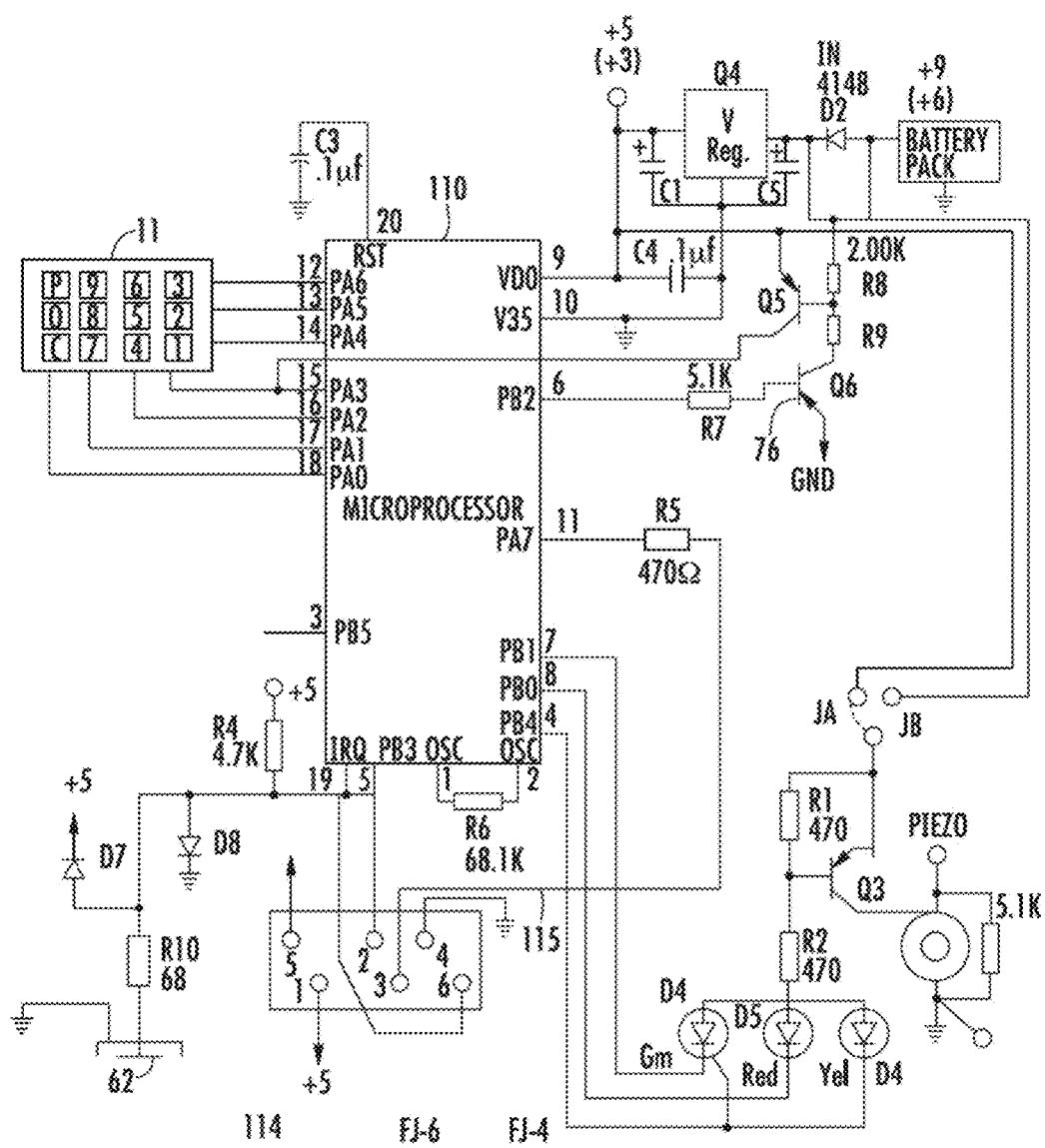
FIGS. 10A and 10B are schematic views together showing an application of the dual-microprocessor configuration of FIG. 9 in an electronic combination lock.
Figure 10B:
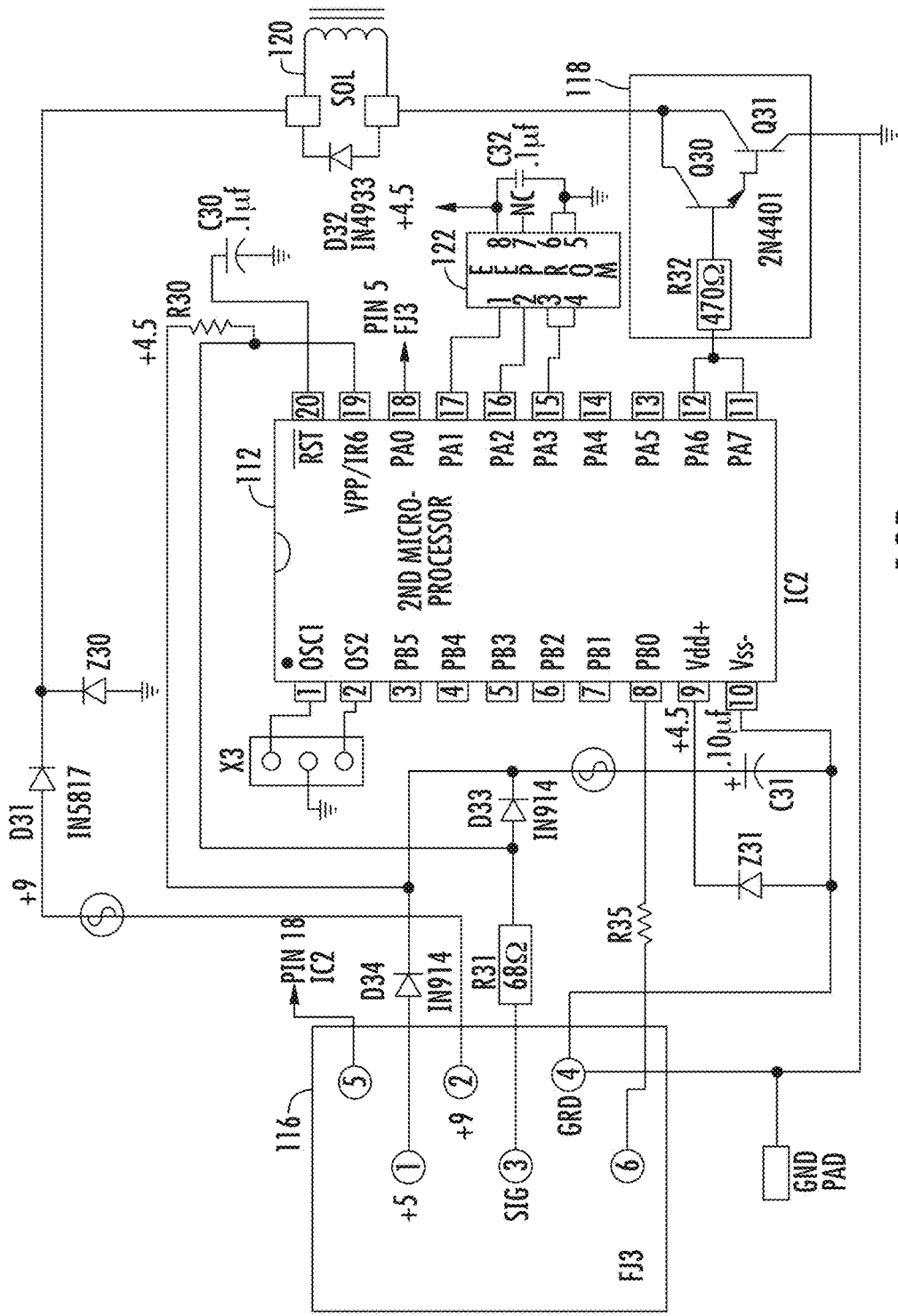

FIGS. 10A and 10B illustrate an application of the dual-microprocessor configuration in an electronic lock. In this embodiment, the control circuit has two halves connected by a cable. The first half, which is shown in FIG. 10A, contains a first microprocessor 110. The second half, shown in FIG. 10B, contains a second microprocessor 112. Pin 11 (PA7) of the first microprocessor 110 is connected to pin 18 (PA0) of the second microprocessor 112 via the cable 115 and the mating connectors 114 and 116 to establish a two-way serial communication channel between the two microprocessors.

The electronic lock has a keypad 11 and an electronic key reader 82 as input devices which are connected to the first microprocessor 110. The second microprocessor 112 controls a energizing circuit 118 for energizing a solenoid 120 to open the lock. When the first microprocessor 110 receives an access code via either the keypad 11 or the key reader 82, it compares the entered access code with an access code stored in its memory. If the entered code matches the stored access code, the first microprocessor 110 transmits a communication code to the second microprocessor 112 via the communication channel described above. The second microprocessor 112 then compares the received communication code with a preset communication code stored in an EEPROM 122. If the two communication codes match, the second microprocessor 112 activates the energizing circuit 118 to energize the solenoid 120 to open the lock.

The correct access code and communication code are preferably stored in the EEPROM 122. During initial power-up, i.e., when the battery is first attached to the electronic lock, the second microprocessor 112 transmits the access code and the communication code to the first microprocessor 110, which then stores the codes in its memory (which may be volatile) for subsequent operation.

Figure 11:
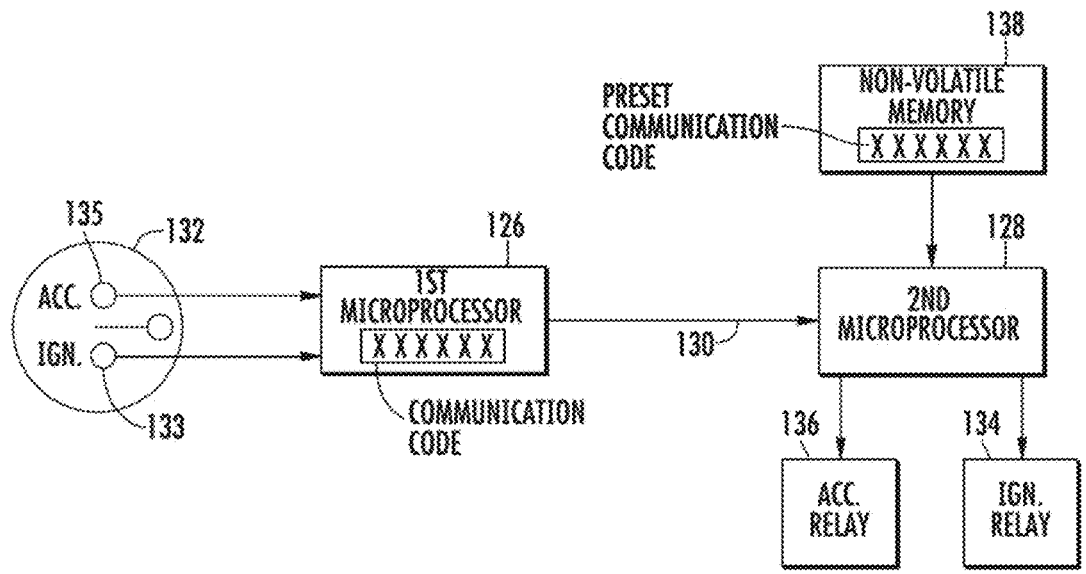
FIG. 11 is a functional block diagram showing an application of the dual-microprocessor configuration of FIG. 9 in an ignition control system for a motorcycle.

The dual-microprocessor configuration illustrated in FIG. 9 can also be advantageously used in other types of applications. For example, FIG. 11 shows an electronic ignition control system for a motorcycle. In this embodiment, the device contains a first microprocessor 126 and a second microprocessor 128 which are connected by a cable 130. A three-position ignition switch 132 is connected to the first microprocessor 126, which may be located close to the ignition switch. The second microprocessor 128 is connected to an ignition relay 134 and an accessory relay 138, and is preferably disposed close to the ignition mechanism of the motorcycle and well protected from external access.

In this arrangement, the ignition switch 132 serves as the input device, and the position of the ignition switch is used as the user-entered control signal. The first microprocessor 126 monitors the switch position. When the ignition switch 132 is turned to the "accessory" position 135, the first microprocessor 126 transmits a communication code together with a switch-position code corresponding to that switch position to the second microprocessor 128. The second microprocessor 128 compares the transmitted communication code with a preset communication code stored in a non-volatile memory 138 which has been programmed at the factory. If the two codes match, the second microprocessor 128 determines from the switch-position code that the switch is set at the accessory position and closes the accessory relay 136.

Similarly, when the ignition switch 132 is turned to the "ignition" position 133, the first microprocessor 126 transmits a communication code and a switch-position code corresponding to the ignition position to the second microprocessor 128. The second microprocessor 128 compares the transmitted communication code with the preset communication code. If the two codes match, the second microprocessor 128 determines from the switch-position code that the switch is set at the ignition position and accordingly closes the ignition relay 134 and the accessory relay 136 to start the engine.

It will be appreciated that due to this dual-microprocessor arrangement, this ignition control system cannot be "hot-wired" to start the engine of the motorcycle like conventional motorcycle ignition control systems. This system is also not susceptible to tampering by replacing the assembly of the ignition switch 132 and the first microprocessor 126 with another such assembly for which an ignition key has been obtained.

Figure 12:
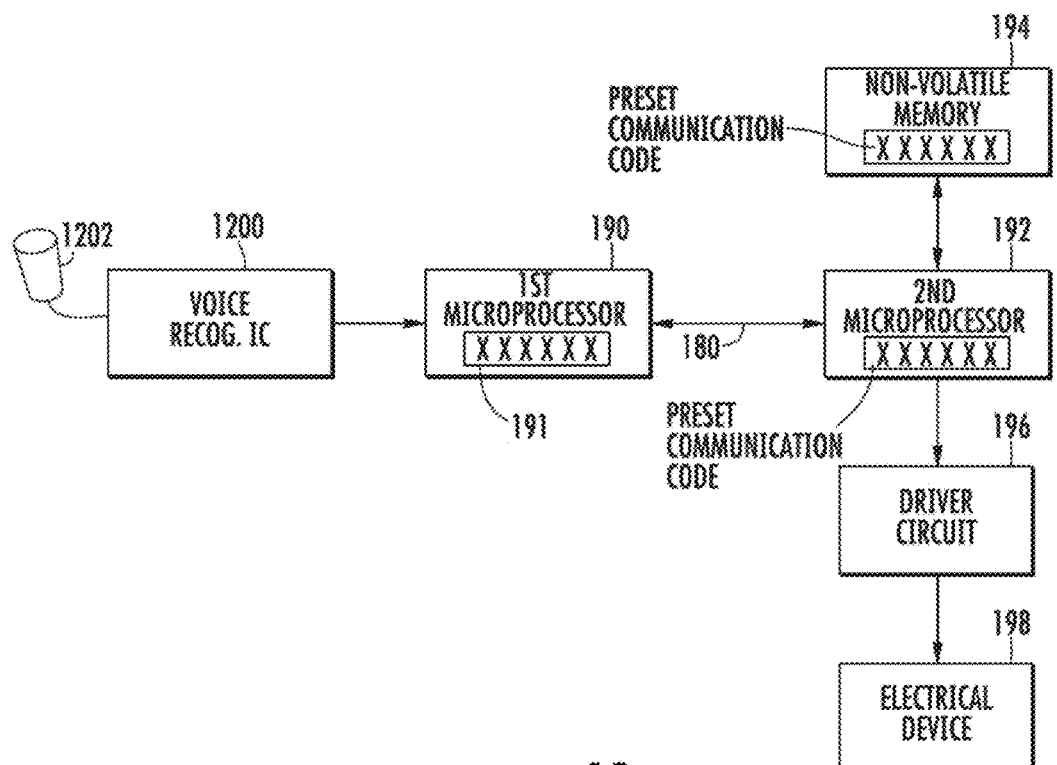
FIG. 12 is a functional block diagram showing an application of the dual-microprocessor configuration of FIG. 9 in a voice controlled access control device.
Figure 13:
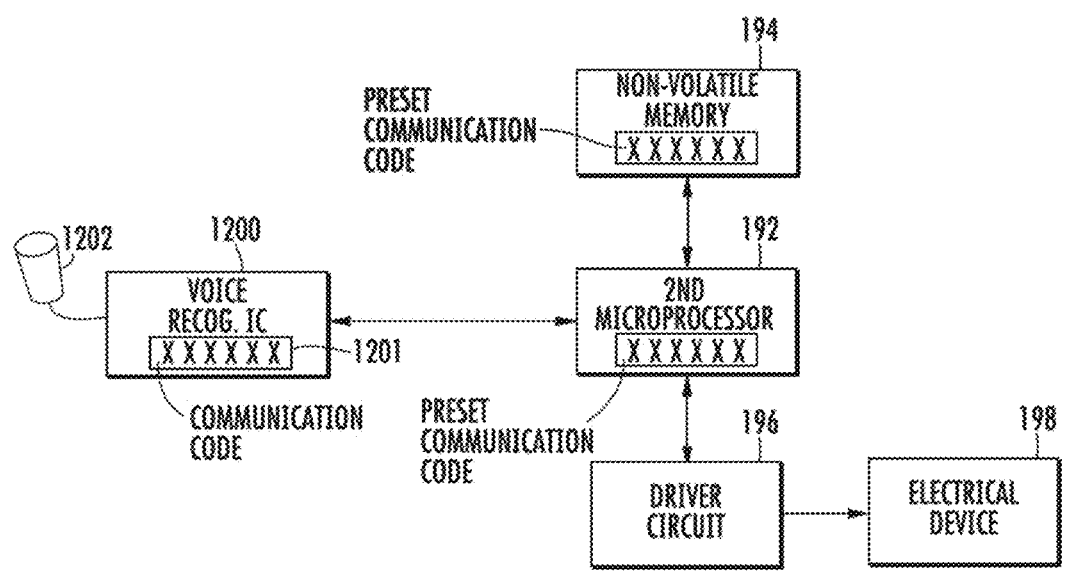
FIG. 13 is a functional block diagram showing another embodiment of the voice controlled access control device.
Figure 14:
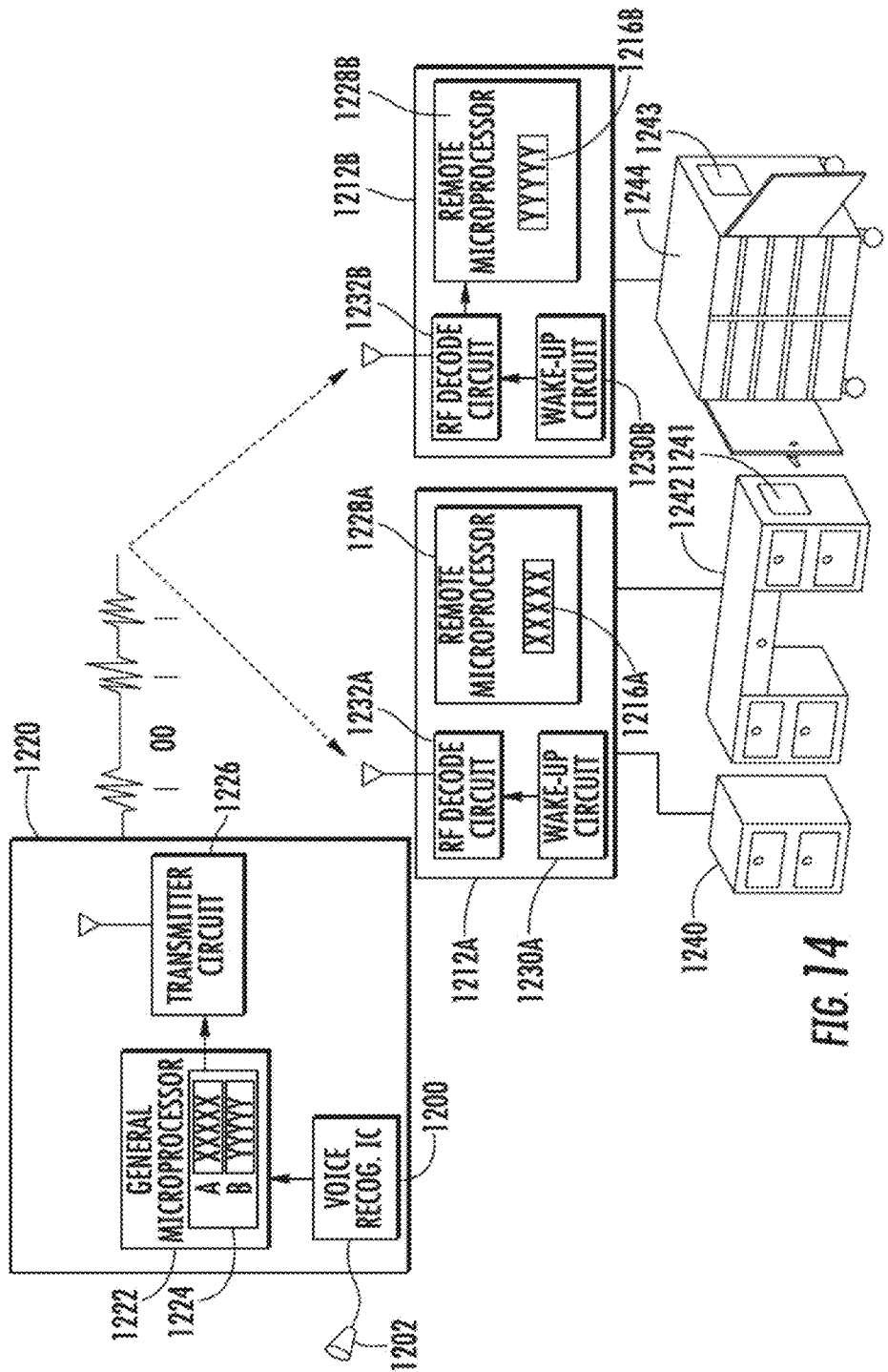
FIG. 14 is a functional block diagram showing another embodiment of the voice controlled access control device which has a central control station and remote devices.

FIGS. 12-14 show another advantageous application of the dual-microprocessor configuration of FIG. 9 which utilizes speech recognition to control the operation of an electronic access control device. As illustrated in FIG. 12, the access control device uses a speech recognition microcomputer integrated circuit (IC) 1200 to process voice commands given by a user. The speech recognition IC 1200 is capable of not only recognizing the commands given but also the voice of the speaker. In other words, the IC is capable of speaker dependent recognition, allowing the user to customize the words to be recognized. Such an IC may be, for example, the RSC-164 microcomputer of Sentry Circuits, Inc.

In the embodiment shown in FIG. 12, the speech recognition IC 1200 has a microphone 1202 connected thereto for receiving voice commands from a user. In this embodiment, the combination of the voice recognition IC 1200 and the microphone 1202 serves generally the function of the input device 94 of FIG. 9. An optional keypad 11 may also be used for entering an access code. After receiving a voice command, the speech recognition IC 1200 analyzes the voice command to recognize the command and the voice pattern of the speaker. If the voice recognition IC 1200 recognizes the voice pattern to be that of an authorized user, it transmits a command code corresponding to the command received to the first microprocessor 190. The first microprocessor 190 transmits an operation code corresponding to the command and a communication code stored in its memory to the second microprocessor 192 via a bidirectional communication link 180. The second microprocessor 192 compares the transmitted communication code with a preset communication code which is stored in a non-volatile memory 194. If the two communication codes match, the second microprocessor 192 activates the driver circuit 196 to energize an electrical device 198 to carry out the operation specified by the operation code.

FIG. 13 shows another embodiment of the voice controlled access control device. In this embodiment, the voice recognition IC 1200, which is a microcomputer in itself, is used to serve the function of the first microprocessor 190 of FIG. 12. Upon receiving a voice command through the microphone 1202, the voice recognition IC 1200 recognizes the command and analyzes the voice pattern of the speaker. If the voice recognition IC 1200 determines that the speaker is an authorized user, it transmits an operation code and a communication code stored in its memory 1201 to the second microprocessor 192. If the transmitted communication code matches a preset communication code, the second microprocessor 192 executes the command by activating the driver circuit 196.

FIG. 14 shows another embodiment of the voice operated access control device which includes a central control station 1220 and one or more remote devices in the arrangement shown generally in FIG. 6. The central control station 1220 may be formed as a hand-held remote control unit which can be conveniently carried and handled by the user. For illustration purposes, two remote devices 1212A, 1212B are shown, each of which has its own unique identification code. The identification codes are stored in the memories 1216A, 1216B of the microprocessors 1228A, 1228B of the respective remote devices. The central control station 1220 has a voice recognition IC 1200 coupled to a microphone 1202 for receiving and recognizing a voice command. If the voice pattern of the speaker matches a voice pattern stored in the voice recognition IC 1200, the voice recognition IC transmits a command code corresponding to the given command to a central microprocessor 1222. The command code may contain a code to indicate which remote device is to be contacted. Alternatively, the determination of which remote device is to be contacted may be made by the central microprocessor according to the command code provided by the voice recognition IC 1200.

The central microprocessor contains a memory 1224 which has the identification codes for the remote devices stored therein. After receiving the command code, the central microprocessor 1222 sends out through the transmitter circuit 1226 a bitstream signal which contains the identification code of the remote device to be addressed and an operation code indicating the operation to be performed. In the preferred embodiment, the bitstream signal is transmitted at a radio frequency (RF). Other suitable transmission bands may also be used.

The remote devices 1212A, 1212B preferably are normally in the sleep mode and can wake up in the ways described in conjunction with FIG. 6. In the illustrated embodiment, each remote device has a wake-up circuit 1230A, 1230B and a radio frequency decode circuit 1232A, 1232B. After receiving the bitstream signal from the central control station 1220, the radio frequency decode circuit of each remote device converts the received RF signal into a computer-compatible binary code which includes the identification code and the operation code. Each remote device then compares the received identification code with its own identification code. If the codes match, the remote device carries out the specified operation.

This voice-activated remote access control system finds many applications in different settings. For example, as illustrated in FIG. 14, the remote access control device 1212A is connected to a file cabinet 1240 and a desk 1242 in an office for locking and unlocking the cabinet drawers and desk drawers. By way of example, when the user gives the voice command "lock desk," the central control station 1220 receives the command through the microphone 1202. If the speaker's voice is recognized, the central control station 1220 sends out a bitstream signal to cause the remote unit 1212A to operate a lock mechanism 1241 in the desk 1240 to lock the desk drawers. As another example illustrated in FIG. 14, the remote device 1212B is used to control a motor 1243 in a tool chest 1244 to lock and unlock the doors and drawers of the tool chest.

Figure 15:
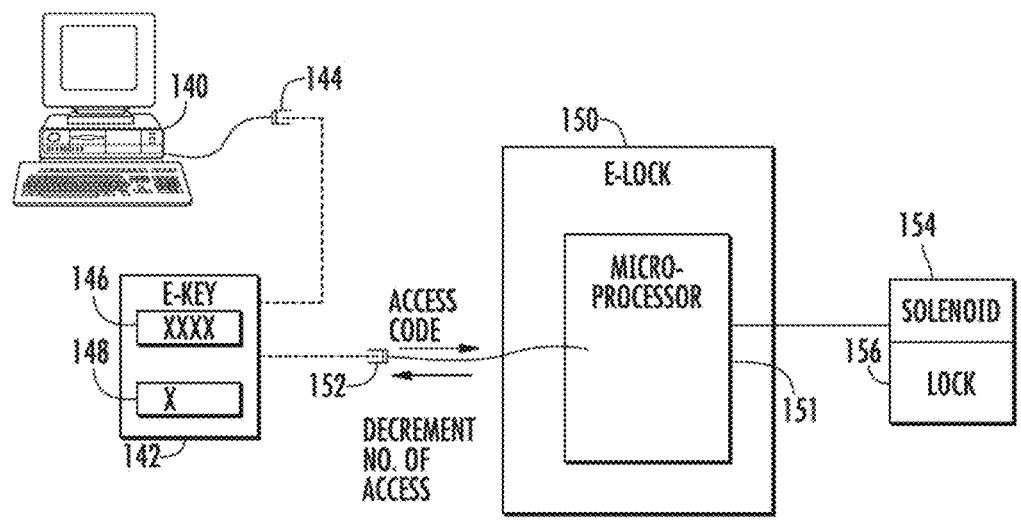
FIG. 15 is a schematic view showing an electronic access control system which has a master key for opening a plurality of remote electronic locks.
Figure 16:
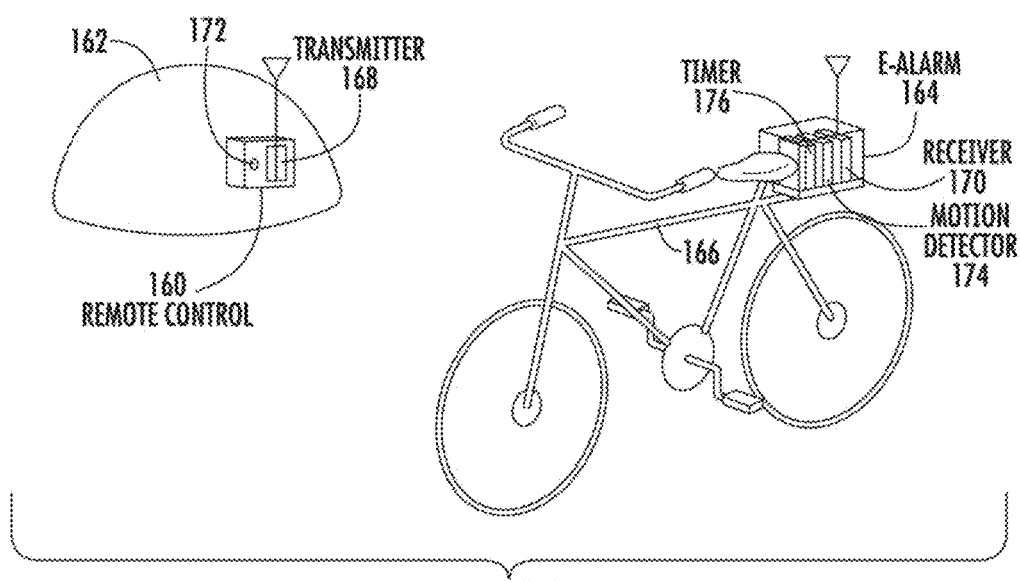
FIG. 16 is a schematic view of an electronic alarm system for a bicycle which has a remote control unit mounted in a riding helmet and an electronic alarm mounted on the bicycle.

In accordance with the object of the present invention to prevent the unauthorized use of electronic keys, there is provided an electronic access control system which has a plurality of remote electronic locks and a master key that has a number of access programmed therein. As illustrated in FIG. 15, the access control system includes a master control device 140 for programming a master access code and the desired number of access into the master key 142. In the illustrated embodiment, the master control device 140 is a personal computer which has an interface device 144, such as a key reader, for communicating with the master key. The master key 142 contains a non-volatile memory which includes an access code storage 146 for storing the master access code specific to the control system, and a counter 148 for storing the number of access allowed. Also shown in FIG. 15 is an electronic lock 150 which can be opened by the master key. The electronic lock has a control circuit based on a microprocessor 151 and a key reader 152 for communicating with the master key. When the master key 142 is presented to the key reader 152, the microprocessor 151 of the electronic lock reads the access code stored in the master key and compares that code to a preset master access code stored in its memory. If the two codes match, the control circuit reads the number of access stored in the master key. If the number of access is one or greater, the microprocessor 151 energizes the solenoid 154 to open the lock 156. In conjunction with the opening of the lock, the microprocessor 151 of the electronic lock 150 decrements the number of access stored in the counter 148 of the master key by one. Thus, if the number of access in the counter 148 is initially set to one, after the opening of the lock the counter is reduced to zero, and the master key cannot be used to open another lock.

In this way, by limiting the number of times the master key 142 can be used to open locks, the unauthorized use of the master key is effectively prevented. For instance, in the setting of a hotel, it is necessary to have a mater key for opening the electronic locks installed in the safes in the hotel rooms. If a hotel guest forgets the access code for the safe in his room, the master key can be programmed with the number of access set to one, and used to open that safe. Since the number of access will be reduced to zero after the lock is opened, the master key cannot be subsequently used to open the safe in another room. The use of the master key is thus strictly controlled.

In accordance with another aspect of the invention, there is provided an alarm system for a bicycle or a similar manually powered vehicle. As illustrated in FIG. 15, this alarm system includes a remote control 160 mounted in the helmet 162 of the rider of the bicycle 166, and an electronic alarm 164 mounted on the bicycle. The remote control 160 has a transmitter 168 for the wireless transmission of a communication code and other types of control signals to the alarm 164 on the bicycle, which has a receiver 170 for receiving the transmitted signals.

In the preferred embodiment, the remote control 160 has a button 172 which when pushed transmits a control signal including the communication code to the alarm 164 on the bicycle to activate or deactivate the alarm. Alternatively, the helmet may be equipped with a keypad for entering an access code by the user. After receiving the access code, the remote control compares the entered access code with a preset access code and transmits the control signals to the electronic alarm on the bicycle when the two access codes match.

The alarm 164 includes a motion detector 174 for sensing the movement of the bicycle 166. If movement of the bicycle is detected by the motion detector 174 when the alarm has been activated, the electronic alarm 164 emits audio and/or visual warning signals to deter the potential theft. A timer 176 is included in the electronic alarm 164 to stop the warning signals after a predetermined amount of time has elapsed.

This bicycle alarm system which has a remote control 172 mounted in the riding helmet 162 has many advantages. Combining the remote control with the riding helmet provides significant convenience to the rider because there is no need to carry the remote control separately. Moreover, because the remote control is integrated in the helmet of the rider, the rider is less likely to lose or misplace the remote control. Furthermore, because the remote control is required to deactivate the alarm system, combining the remote control with the helmet provides an incentive for the rider to wear the helmet when riding the bicycle. In this way, the bicycle alarm system of the present invention contributes to the safety of the rider and helps the rider to obey the law requiring the bicycle rider to wear a helmet.

Figure 17:
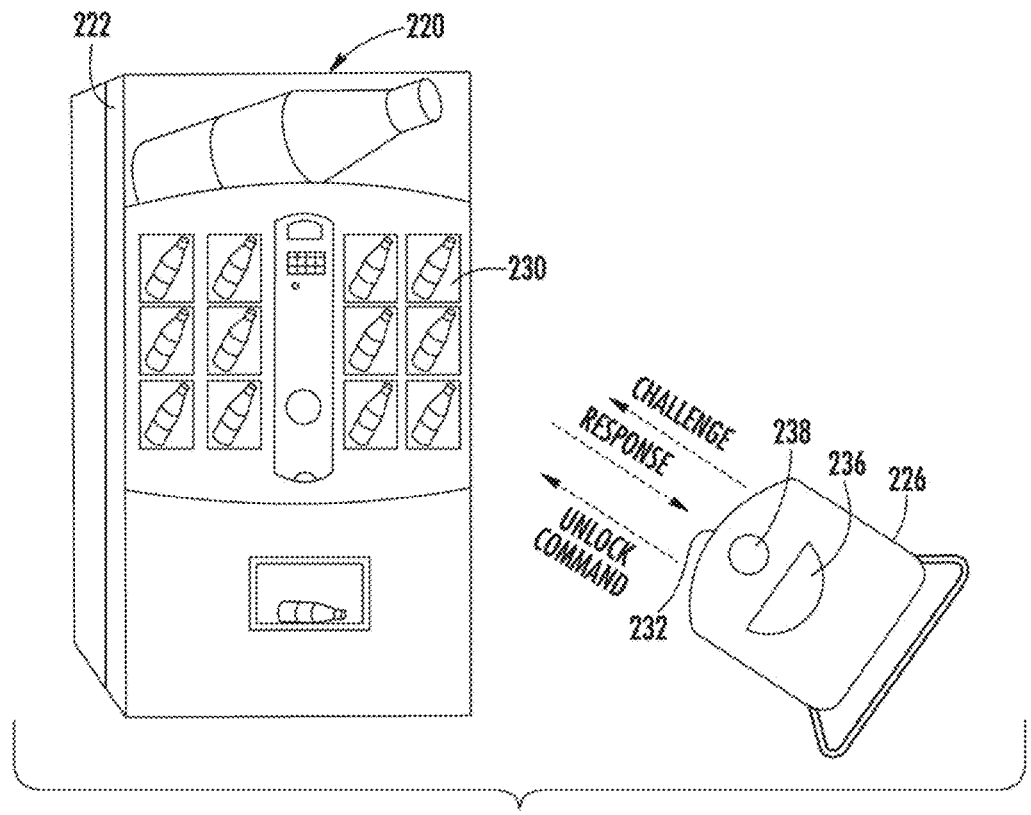
FIG. 17 is a schematic view of a vending machine and an electronic key for opening an electronic lock inside the vending machine.

With reference to FIG. 17, a system and method is disclosed wherein the field devices are vending machines. It will be appreciated that the operative principles of the invention described in connection with this embodiment can be applied to other field devices, as will be described in greater detail below.

Moreover, as will become clear from the following description, the embodiment of the invention implemented for use with vending machines provides significantly improved security and ease of management over conventional vending machines equipped with mechanical locks. The term "vending machine" as used herein means a device that performs a money transaction, which may involve the insertion of cash or commercial paper, or the swiping of a credit and/or debit card, and may (but not required to) dispense an item or items or provide functions in response to the money transaction. In this regard, this term is meant to cover broadly machines commonly used for vending drinks and snacks, ATM stations, change machines, toll machines, coin-operated laundry machines, video arcades, etc. FIG. 17 shows, as an example, a vending machine 220 with an embodiment of an electronic lock mounted therein. The vending machine 220 has a front panel 222 or door that can be opened when the electronic lock is unlocked with a properly programmed electronic key 226. It will be appreciated that the vending machine and the electronic key are not shown to scale in FIG. 17, and the view of the electronic key is significantly enlarged with respect to the vending machine to show its features.

The key 226 and the lock preferably communicate with each other wirelessly, which may be via an infrared or radio frequency (RF) channel. In a preferred embodiment, the wireless communications between the key and the lock is via infrared transmissions. The infrared medium is preferred because it is directional and short range, and the infrared circuitry in the lock is not sensitive to the metal cabinet enclosure of the vending machine. Thus the vending machine will less likely be opened accidentally if the key is accidentally operated of if the key is operated to unlock another vending machine nearby. In addition, the infrared light can travel through the selection buttons on the vending machine. This allows the infrared transceiver of the electronic lock to be positioned behind a selection button 230 of the vending machine, as illustrated in FIG. 17. To that end, the vending machine 220 has an infrared transceiver disposed to receive infrared transmission through its front panel 222, and the electronic key 226 has an infrared transceiver at one end 232. As shown in FIG. 17, in one implementation, the electronic key 226 has a very simple profile, having only a "START" button 236 that can be activated by a user for lock opening and key code learning operations. In a preferred embodiment, the "START" button 236 need not be continuously pressed in order for the key to transmit the encrypted code to the lock. Instead, the user only has to only momentarily press the button 236, and the key will automatically stop transmitting after a few seconds, thus the key will not transmit indefinitely and deplete the battery if the button is stuck down. The electronic key 226 also has a light-emitting diode (LED) 238 exposed through a hole in the housing of the key for indication the operation status of the key.

Figure 18:
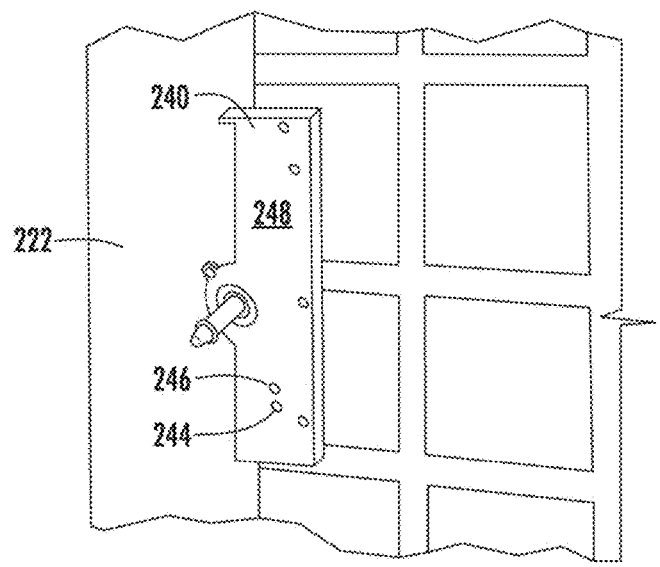
FIG. 18 is a perspective view of an electronic lock assembly mounted on a door of a vending machine.

In accordance with an aspect of the invention, the electronic lock assembly is mounted inside the vending machine 220 to prevent unauthorized access and tampering. It can be physically accessed only when it is properly unlocked and the door 222 or front panel of the vending machine is opened. In one embodiment, as shown in FIG. 18, the electronic lock assembly 248 is mounted on the inside of the door 222, and opening the door of the vending machine exposes the lock assembly housing 240. The electronic lock 248 includes a lock shaft 242 that engages into a corresponding receptacle in the body of the vending machine to prevent the door from being opened when it is in a locked position. The electronic circuit of the lock resides in the housing 240 of the lock assembly. The housing 240 has two holes. Behind one hole 244 is a "LEARN" switch connected to the electronic lock circuit. This switch can be accessed and pressed down with a thin object, such as a screwdriver or a car key. Behind the other hole 246 is a light-emitting diode (LED), which serves as a means for providing an indication of the operational state of the electronic lock during a key code learning operation or a lock opening operation, as will be described in greater detail below.

Figure 19:
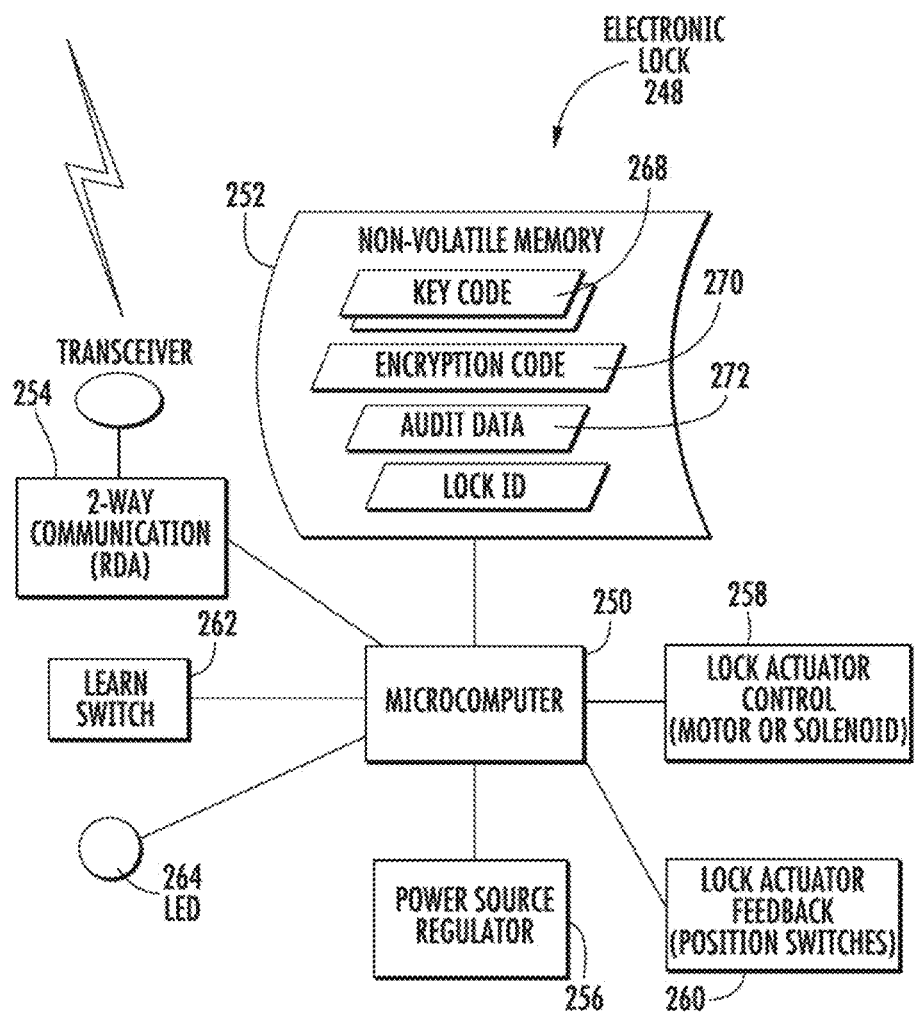
FIG. 19 is a block diagram showing electronic circuit components of an electronic lock used in a vending machine.

Turning now to FIG. 19, in one embodiment, the circuit of the electronic lock 248 comprises a microcomputer 250, a non-volatile memory 252, a half-duplex IRDA infrared communication interface 254 for communicating with an electronic key, a power supply voltage regulator 256, a lock motor or solenoid control circuit 258, position feedback switches 260, a learn switch 262 as mentioned above, and the LED 264 for state indication. The non-volatile memory is for storing key codes 268, encryption codes 270, and audit data 272, as will be described in greater detail below.

In an alternative embodiment, the vending machine with the electronic lock is to be accessed using a mechanical key rather than an electronic key. To that end, the electronic lock includes an interface to a combination (the "switch-lock" combination) of an electrical switch 274 and a mechanical lock 276 that has a cam for moving the switch into a closed or open position. The electrical switch 274 is normally in an open state and is closed when the mechanical lock 276 is opened using an associated mechanical key 278. The open/close state of the switch 276 is detected by the microcomputer 250 and is used to determine whether the mechanical lock 276 is opened or closed. The microcomputer 250 is programmed to unlock the door 222 of the vending machine 220 in response to the closing of the switch contact caused by unlocking of the mechanical lock 276 using the mechanical key 278. Thus, the unlocking process does not involve the passing of a key code between the electronic lock and an electronic key. Accordingly, as described in greater detail below, during a learning process, the electronic lock learns that it is to be accessed using a mechanical key instead of an electronic key with a key code.

Figure 20:
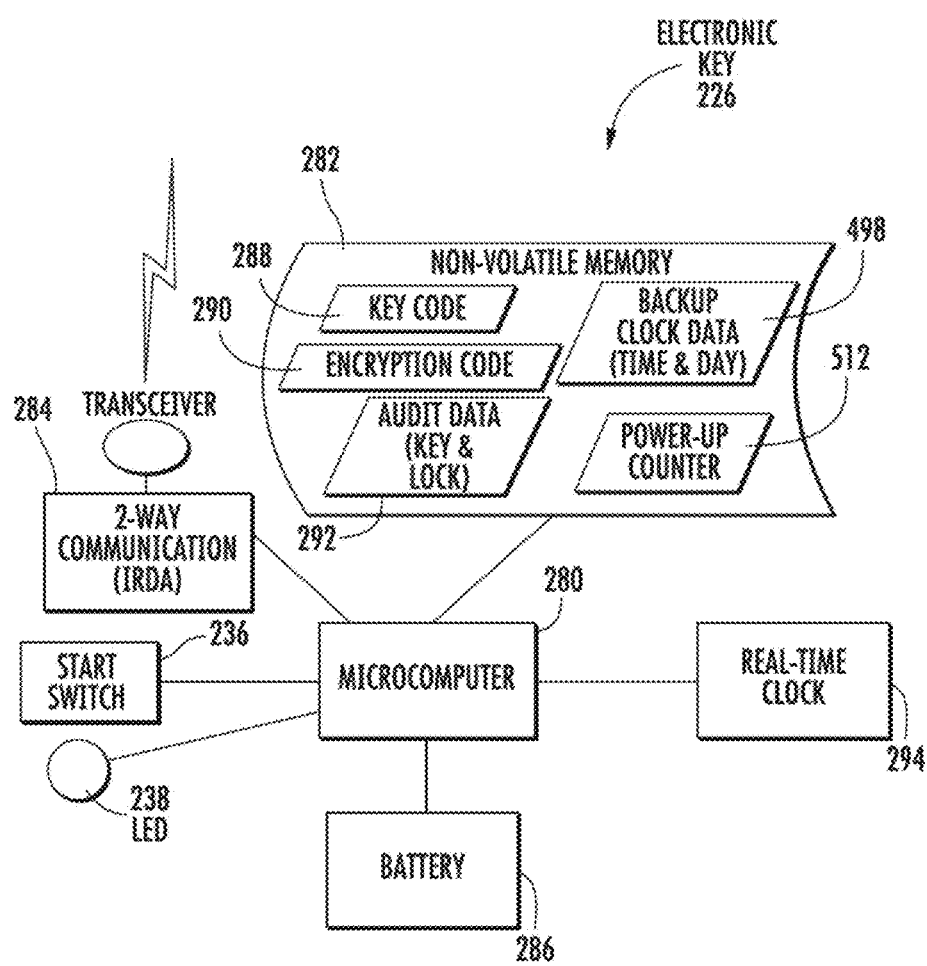
FIG. 20 is a block diagram showing electronic circuit components of an electronic key.

As shown in FIG. 20, in one embodiment, the electronic key 226 includes a microcomputer 280, a non-volatile memory 282, a half-duplex IRDA infrared communication interface 284 for communicating with the electronic lock of a vending machine or with a computer for programming the key, a power source (e.g., a battery) 286, a real-time clock integrated circuit (IC) 294 for generating data indicating the date and time, and the "START" switch 236 and the LED light 238 as mentioned above. The non-volatile memory 282 is for storing a key code 288, encryption codes 290, and audit data 292 generated by the key and/or downloaded from vending machines operated using the key, as will be described below.

The key codes in the keys and the locks of the vending machines are used to define the security and access control strategy of the electronic lock system. Each electronic key 226 has a key code 288 stored therein, and the same key code is stored in the memory 252 of the electronic lock in each vending machine to be operated with the electronic key. During each access attempt, the key code in the electronic key is transferred from the key to the electronic lock using a secured communication method. The electronic lock can be unlocked if the key code it receives from the electronic key matches the key code stored in the memory of the lock.

Figure 21A:
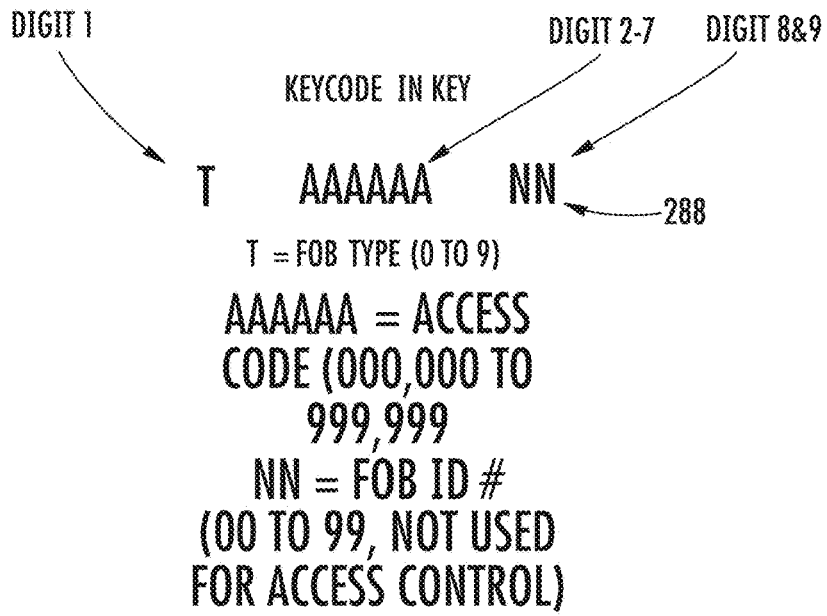
FIGS. 21A and 21B are schematic diagrams showing key codes stored in the memories of an electronic key and an electronic lock, respectively.

In one implementation as shown in FIG. 21A, a key code 268 stored in an electronic key includes seven (7) digits. The first digit of the key code is used to indicate the type of the key. As the value of the key-type digit may go from 0 to 9, there may be up to 10 total key types. As will be described below, in one embodiment of the electronic lock system, there are three different key-types: low-security key, standard key, and auto-tracking key, which correspond to different levels of security in lock-opening operation and audit data collection. The next 6 digits in the key code are the access code (000,000 to 999,999). In addition to the 7 digits representing the key type and access code, a key code stored in the electronic key additionally includes two lower digits, which may be used as the identification (ID) code of that key. In this example, the key ID may vary from 0 to 99. Thus, there may be up to 100 keys that have the same key type and access code but different key ID numbers.

Figure 21B:
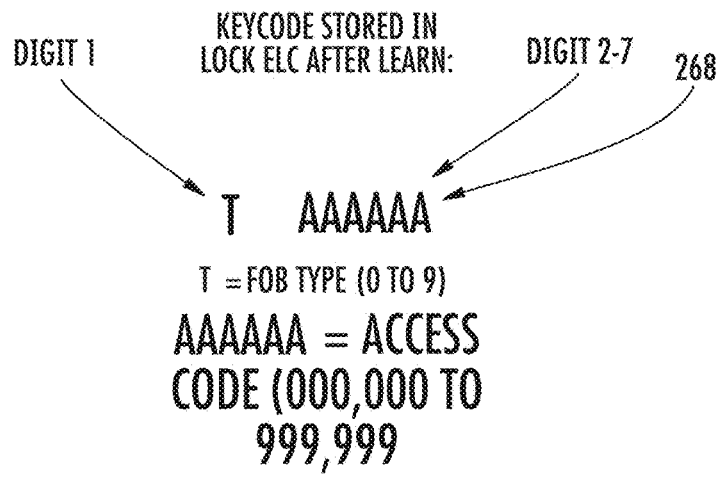

Similarly, as shown in FIG. 21B, a key code 268 stored in the electronic lock has seven (7) digits. The first digit indicates the key type, and the remaining 6 digits are the access code. As mentioned above, there may be up to 10 different key types, and the electronic lock may be programmed to accept a number of key codes of different key types.

In accordance with a feature of the invention, the electronic lock 248 of the vending machine 220 is field-programmable. In other words, the key code or key codes of the electronic lock 248 can be programmed (or "learned") into the non-volatile memory 252 of the lock after the vending machine has been installed in a given location. In a preferred embodiment, the electronic keys to be used to operate the vending machines are programmed with a permanent key code at the factory and ordered by the users of the electronic locks. In the example given above, the users may order up to 100 keys with the same access code. In contrast, the electronic locks to be used in the vending machines are not programmed with any customer-specific key code. Instead, the electronic locks are programmed with a universal code at the factory. The "universal code" is the code put in the lock by the manufacturer of the lock or the vending machine, and is used by the customers to unpack and open the machines after they receive the machines. Thereafter, the electronic locks are installed in the vending machines, which are then shipped to and set up at their respective operating places. In accordance with the invention, the access control strategy is established by "learning" or transferring the access code of the electronic key to be used to operate the machine into the electronic lock via a secured transfer process.

Figure 28:
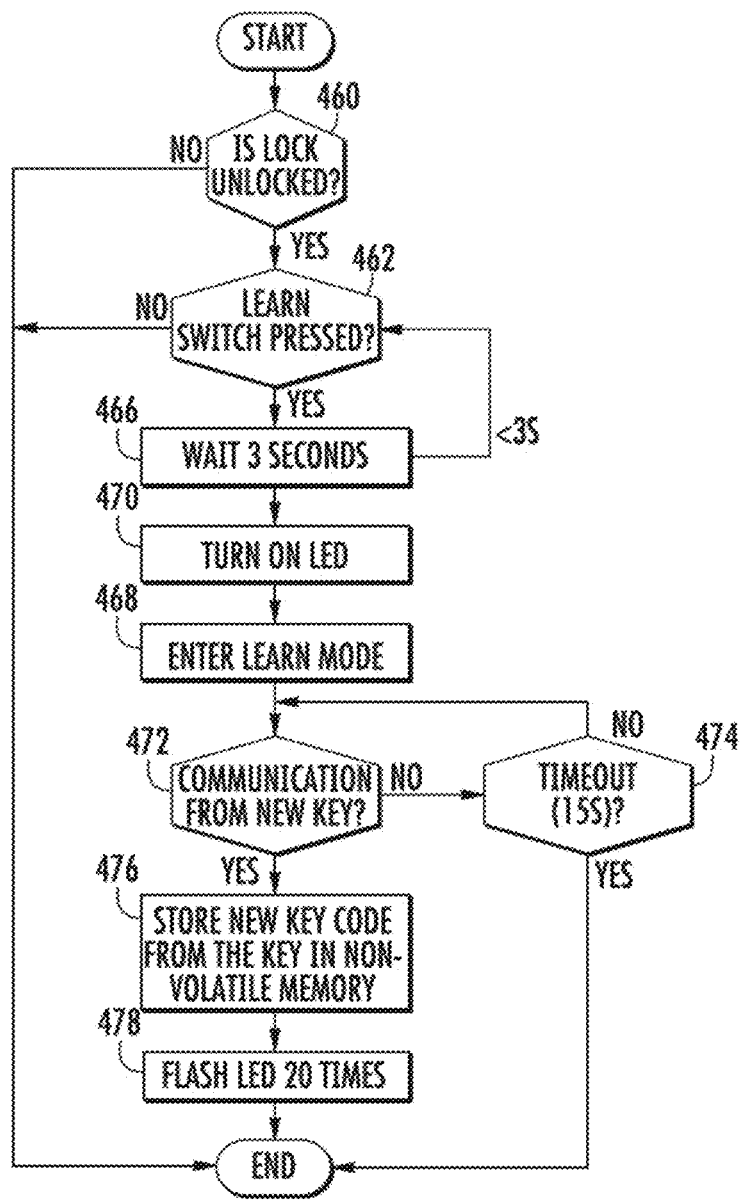
FIG. 28 is a flowchart showing the key code learning process of an embodiment of the electronic lock.

Referring back to FIGS. 17-19 and 28, in one embodiment, to make the electronic lock 248 learn the access code from an associated electronic key 222 or that it is to be controlled by a switch-lock, the service person has to gain access to the LEARN switch 262 of the lock. In addition, it is preferred that the lock microcomputer senses, using the position switches 260, that the lock is in the unlocked position to allow entering into the "learn" mode (step 460 in FIG. 28). To that end, if the door 222 of the vending machine is originally closed and the lock contains the universal key code programmed at the factory, the service person uses a key containing the universal key code to unlock the vending machine and open the door to gain access to the LEARN button of the lock. As mentioned above, the LEARN switch 262 should be at a secured location such that it can be accessed only when the lock is properly unlocked (as opposed to a forced entry) and when the door is open. An assumption in the access control strategy is that an authorized person is servicing and/or reprogramming the lock if the door is properly unlocked and opened. If the microcomputer 250 detects (step 462) that the LEARN switch 262 is pressed (e.g., held for longer than three seconds), it waits (step 466) for the switch to be held in that position for a pre-selected time period (e.g., 3 seconds) and then enters a LEARN process (step 468). In response to the pressing of the learn button, the LED 264 is turn on (step 470). In alternative embodiments, the LEARN switch 262 can be substituted by another activation means that provides a greater level of security, such as a keypad for entering a service authorization code or an electromechanical switch lock that requires a mechanical or another electronic key.

Once the lock 248 is put in the LEARN mode, the service person operates the electronic key 222 containing the desired key code by pressing the button 236 on the key. This causes the key 222 to transmit the key code stored in its memory to the electronic lock. If the electronic key and the lock employ encryption techniques in their communications, the electronic key 222 first encrypts the key code 288 with the encryption codes 290 in its non-volatile memory and then transmits the encrypted code.

The service person is given a pre-selected timeout period (e.g., 15 seconds) to press the key to transmit the key code. To that end, the lock 248 determines whether it has received the transmitted key code (step 472). If it determines (step 474) that a key code transmission is not received within the timeout period, the learning process is terminated. If a key code has been transmitted within the timeout period, the electronic lock 248 receives the transmitted key code via its receiver port 230. If the transmitted code is encrypted, the electronic lock decrypts the received data with the encryption codes 272 in its memory 252. In a preferred embodiment, the encryption codes in the electronic key and the electronic lock are inserted during manufacturing at the factory, and different encryption codes may be used for different vending machine owners (e.g., different soft drink bottlers) so the keys given to one owner may not be learned into and used to access the vending machines of another owner.

If the encryption codes of the key and the lock do not match, the electronic lock will not be able to successfully decrypt the received key code. In that case, the process will end and the lock will not learn the new key code. If, however, the decryption was successful, the lock stores the key code at a proper location in its non-volatile memory 252 according to its key type (step 476). After verifying that the key code is stored correctly in the proper key type location, the lock 248 provides a signal to the service person by flashing the LED 264 to indicate that the LEARN process is successfully completed (step 478). From this point forward, the electronic lock will use the newly learned key code for access control. In other words, it will compare this key code with the key code transmitted from an electronic key to determine whether the door should be unlocked. If there was a key code of the same key type previously stored in the memory 252 prior to the LEARN operation, that old key code will be erased and can no longer be used to access the vending machine.

As mentioned above, in an alternative embodiment, the vending machine equipped with the electronic lock may be accessed with a mechanical key rather than an electronic key. The electronic lock learns that it is to be controlled by the combination of the electrical switch 274 and the mechanical lock in a learning process similar to the one for learning a key code as described above. Specifically, to enable the lock access via the switch-lock, the service person puts the electronic lock into the learn mode by pressing the LEARN switch 262 as described above. Once the electronic lock 248 is in the learn mode, the service person uses the mechanical key 276 to unlock the mechanical lock 276. When the mechanical lock 276 is moved to its unlocked position, its cam closes the contact of the electrical switch 274. The microcomputer 250 of the electronic lock receives the contact-closure signal (i.e., detecting that the electrical switch is closed) and treats the signal as indication that the vending machine is to be accessed using a mechanical key. In response, the microcomputer set its operation mode such that in the future it will unlock the door of the vending machine in response to detecting the closure of the contact of the electrical switch 274. Thus, from this point forward, the vending machine is accessed using the mechanical key 278, which replaces one or more types of electronic keys.

It will be appreciated that the key learning process described above does not require changing or replacing any physical components of the lock. If the electronic key for operating the lock on the vending machine is stolen or lost, the service person will first use a back-up key that has the key code of the key that is lost, or a key that has a different key code that has been previously learned into the lock, to open the door. The service person then uses the key learning process described above to change the key code in the memory of the lock to a new value. This field-programmability of the electronic lock makes key management significantly easier and cost-effective, and provides a greater level of key security compared to mechanical keys. In contrast, with conventional vending machines using mechanical locks, the mechanical keys may be copied or stolen easily, and the entire lock core of each of the vending machines affected has to be replaced in order to change to a different key.

In the illustrated embodiment, one digit in each key code stored in the lock indicates the type of the key, and there may be up to ten different key types. A lock is able to learn one key code for each allowed key type. A key code of a first type may be that learned from a "primary" electronic key for the vending machine, while a key code of a second type may correspond to a different electronic key, such as a "master" key that can be used as a back-up in case the primary key is lost, stolen, broken, or otherwise unavailable.

In a preferred embodiment, as briefly mentioned above, different types of electronic keys (indicated by the different values of the key type digit) are provided that correspond to different levels of security (and the associated complexity of communication) and audit data collection function. The three types of electronic keys are economy key, standard key, switch-lock, and auto-tracking key. The operation of each of these three types of keys is described below.

Figure 22:
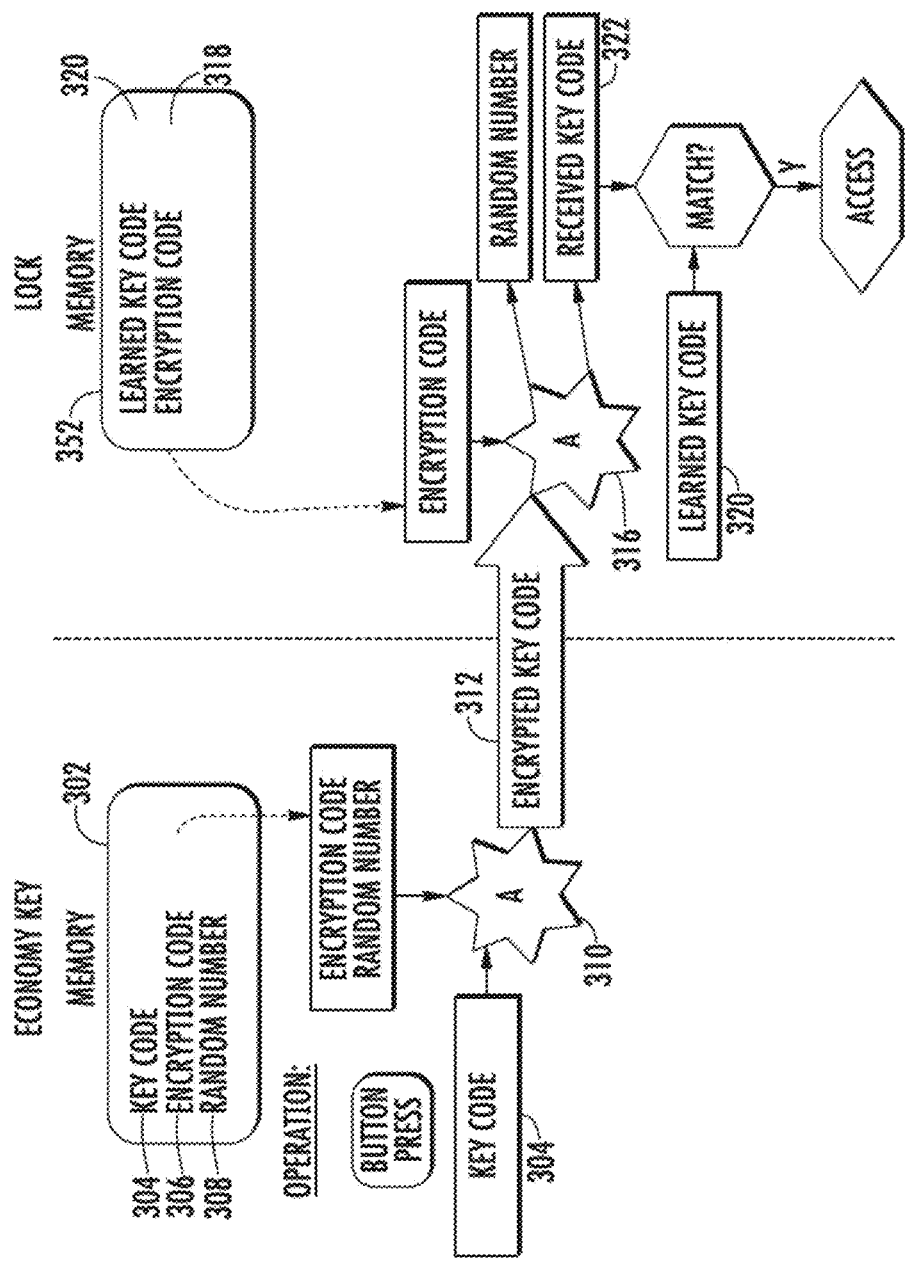
FIG. 22 is a schematic diagram showing the transmission of data between an electronic lock on a vending machine and an electronic key during a simplified unlocking process.

Referring to FIG. 22, the economy key employs a simple one-way communication process for interacting with a corresponding electronic lock on a vending machine. Since the communication process is simpler and the one-way communication does not require a receiver in the key, the key can be built at a lower cost. As shown in FIG. 22, the memory 302 of the economy key contains a key code 304, an encryption code 306, and a random number 308. In a preferred embodiment, the key starts with a given value of the random number, and the random number changes every time the key cycles through a key code transmission. When a user activates the key by pressing the button on the key, the key uses the encryption code to encrypt (step 310) the key code 304 together with the random number 308, and transmits the encrypted number 312 to the electronic lock. When the electronic lock receives the transmitted encrypted data, it decrypts (step 316) the data with the encryption code 318 in its memory 252. The lock then retrieves the key code 322 from the decrypted data and compares it with the key code 320 of the same type in its memory. If the two key codes do not match, the process ends. If they match, the electronic lock proceeds to unlock the door of the vending machine.

Figure 23:
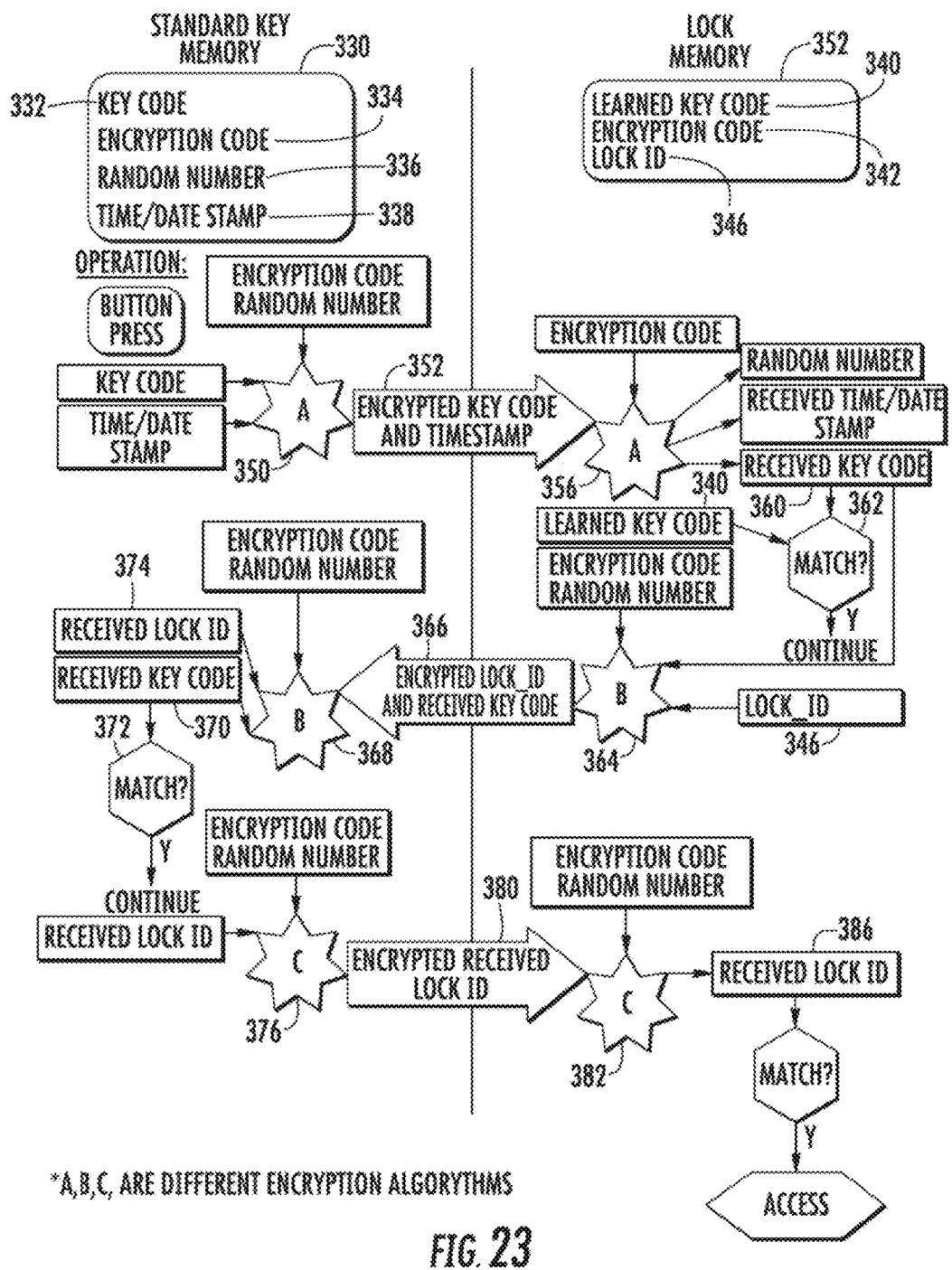
FIG. 23 is a schematic diagram showing communications between an electronic lock on a vending machine and an electronic key during an unlocking process that has higher security than the process in FIG. 22.

In comparison with the economy key, the standard key provides a more secure unlocking process that requires 2-way encrypted communications between the key and the electronic lock. The 2-way communications is in the form of a bidirectional challenge-response process. Referring to FIG. 23, the memory 330 of the key contains the key code 332, the encryption code 334, a real-time clock timestamp 336, and a random number 338. Similarly, the memory 252 of the electronic lock of the vending machine contains a learned key code 340, the encryption code 342, and an ID 346 of the electronic lock. When the service person presses the transmission button on the electronic key, the electronic key encrypts (step 350) the key code 332 in its memory together with the time stamp 336 and the random number 338, and transmits the encrypted key code and timestamp to the electronic lock of the vending machine. The electronic lock receives the transmitted data 352 through its infrared communication interface and decrypts (step 356) the received data with the encryption code 342 in its memory. Next, the electronic lock compares (step 362) the decrypted key code 360 with the key code 340 of the same type in its memory. If the two key codes don't match, the process ends, and the door will not be unlocked. In that case, the electronic lock sends a code to the key to indicate that the key has tried an incorrect key code.

If the two key codes match, the process continues and enters a second phase in which the electronic lock transmits data to the electronic key. Specifically, the lock encrypts (step 364) the key code, the lock ID 346, and the random number. It then transmits the encrypted key code, lock ID, and the random number (originally sent by the key) to the electronic key. The electronic key receives the encrypted data 366 and decrypts (step 368) the data to retrieve the key code and the lock ID. If the key determines (step 372) that the key code 370 returned by the lock matches the key code 332 in the memory of the key, it stores data regarding the access event, including the lock ID, in an audit trail data portion of the key's memory for audit purposes.

The key then proceeds to the third phase of the unlocking process, in which the key communicates to the lock to allow access. To that end, the key encrypts (step 376) the received lock ID and transmits the encrypted lock ID and random number to the lock. The lock receives the transmitted data 380 and decrypts (step 382) the data to retrieve the lock ID. If the received lock ID 386 matches the lock ID 346 stored in the memory of the lock, the microcomputer of the lock proceeds to unlock the door of the vending machine.

The unlocking operation described above has several advantages. It allows the transfer of the lock ID and the key codes between the electronic key and the lock on the vending machine without repeating numbers or a distinguishable pattern of numbers in case of eavesdropping of repeated access attempts. It also prevents a transfer of data between the key and the lock with different encryption codes. Further, it provides a consistent and secure means of data transfer between the key and the lock for a condition where many keys with the same key code will be expected to communicate with many locks on different vending machines containing that key code. This bi-directional challenge-response encryption scheme provides no risk of the keys and the locks going out of sequence, which is a common problem with unidirectional rolling-code encryption systems.

Figure 24:
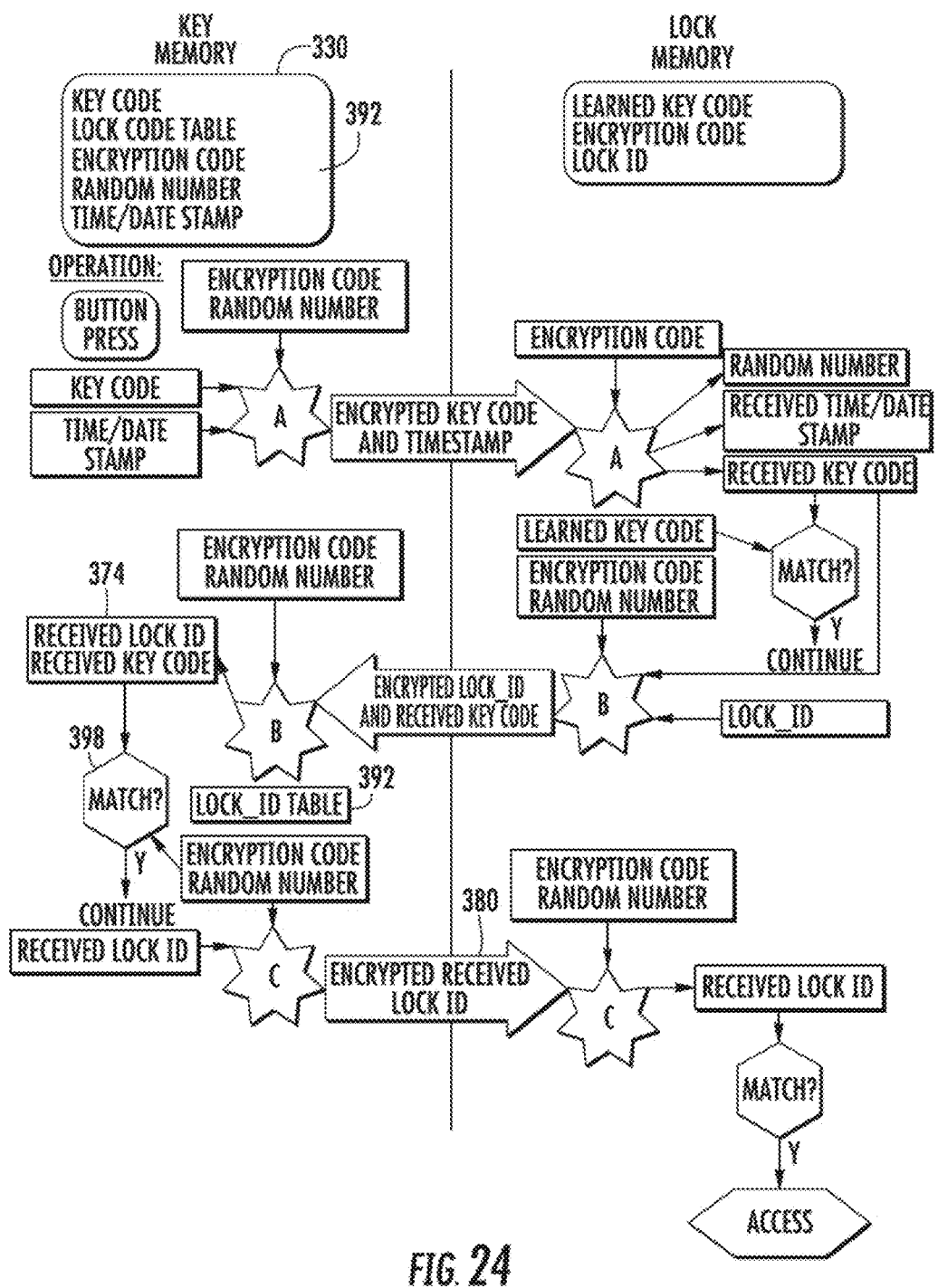
FIG. 24 is a schematic diagram showing communications between an electronic lock on a vending machine and an electronic key during an unlocking process similar to that FIG. 23 but with a step of checking the lock ID for access control.

The lock ID code is used in the unlocking operation described above for generating audit data for audit trail identification purposes and also for data transfer encryption purposes. In an alternative embodiment, however, it is also be used to provide a method for controlling which vending machines a key is allowed to access. In this method, there may be many keys containing the same key code, and there may be many vending machines that have "learned" the same key code. It is possible, however, to specify which vending machines a given key is allowed to access so that a single key cannot open all the vending machines. Referring to FIG. 24, this is accomplished by loading a list of lock ID codes 392 into the memory 330 of that key prior to operation. During an unlocking operation, the key receives a lock ID 374 from the electronic lock on the vending machine and compares the received lock ID with the list of lock IDs 392 in its memory. Only if it is determined (step 398) that the received lock ID 374 matches one of the lock IDs in the list will the key proceed to send the unlock command signal (e.g., the transmission 380 in the third phase) to the electronic lock. As shown in FIG. 24, the unlocking process is otherwise similar to that shown in FIG. 23. This method of access control provides supervisors of the operation the flexibility of allowing or disallowing a given key to access selected vending machines.

In an alternative embodiment, an electronic key may also be programmed with other types of limits of operation of the key. For instance, the key may be programmed with limit registers that contain values chosen by a supervisor to limit the operation of that particular key. In a preferred embodiment, the limit registers 400 (FIG. 20) are part of the non-volatile memory 252. The operation limits include, for example, time of data, date, number of days, number of accesses, number of accesses per day, etc. When the user of the key presses the button on the key to initiate a key code transmission, the microcomputer of the key first compares the limits set in the registers with a real-time clock in the key and an access counter in the key memory. If any of the limits is exceeded, the key will not transmit the key code to the electronic lock and will terminate the operation.

Figure 25:
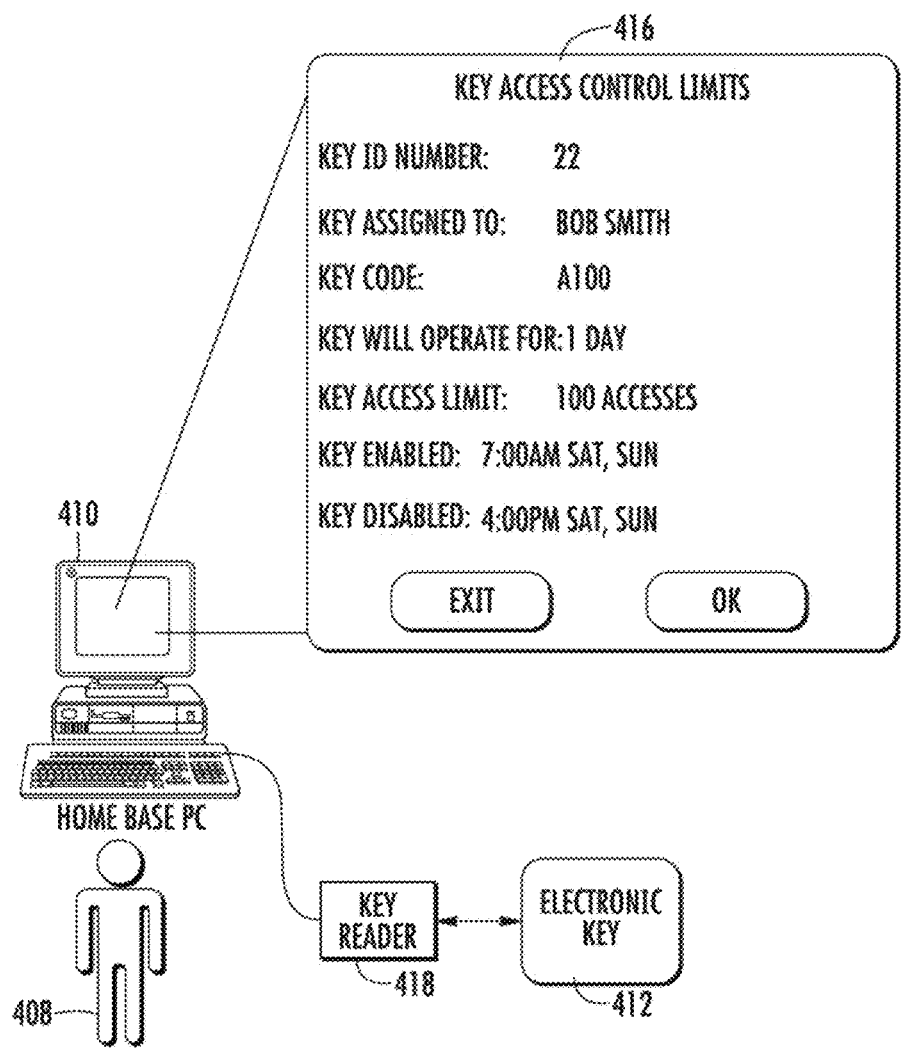
FIG. 25 is a schematic diagram showing a computer used to program operational limitations into an electronic key.

Referring to FIG. 25, the key operation limits may be set by the supervisor 408 of the employee that uses the electronic key 412 to access vending machines in the field. The limits can be selected by using a personal computer (PC) 410 with the appropriate software program. The limits for each key may be customized depending on, for instance, the work schedule or habits of the employee to whom the key is given. For illustration purposes, FIG. 25 shows an exemplary user interface screen 416 for prompting the user 408 to enter the limits After the limits are selected on the PC 410, they are loaded from the PC into the operation limit registers in the electronic key 412 in a communication process between a key read/write device 418 and the key. During this communication process, other types of data, such as data for updating the real-time clock in the key, may also be loaded into the key. Also, the communication process may be used to transfer data, such as the audit trail data collected from vending machines by the key during previous field operations, from the electronic key 412 to the PC 410.

Figure 26:
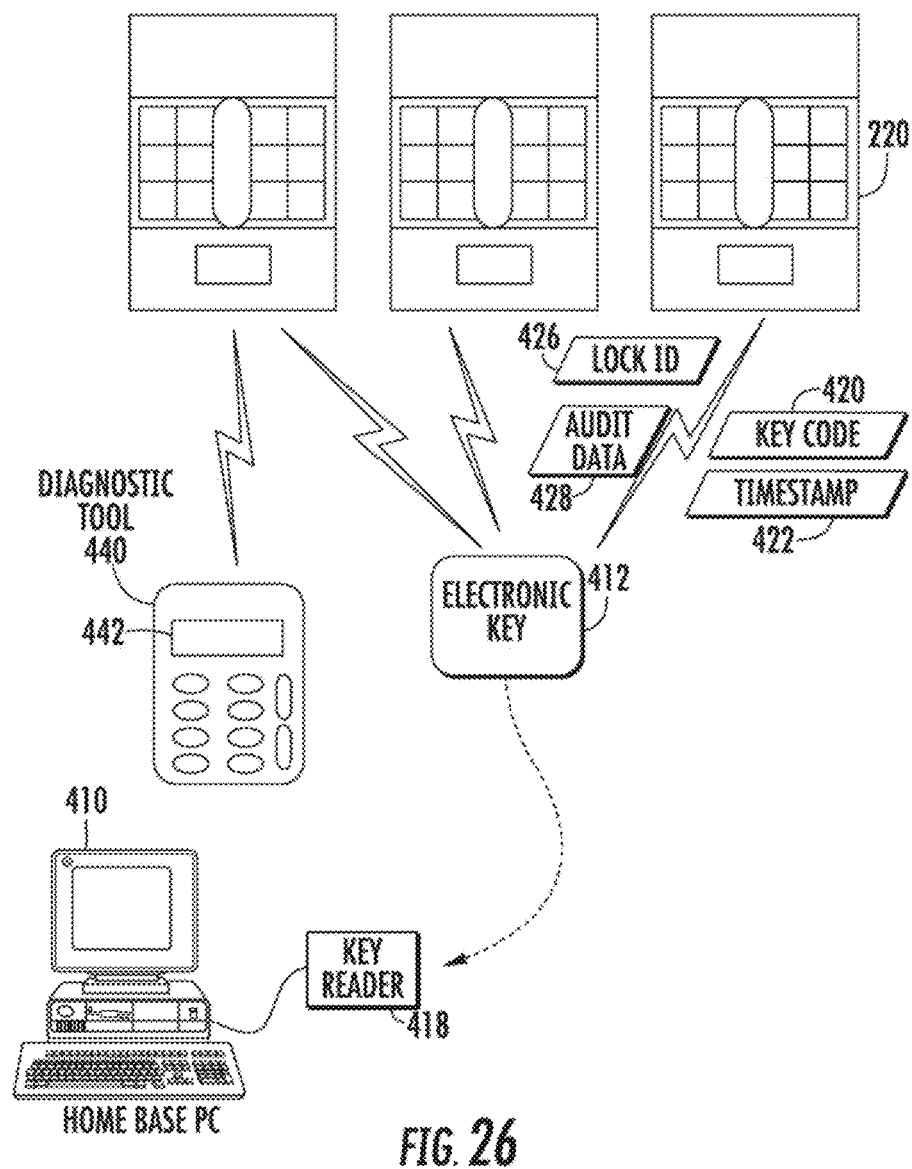
FIG. 26 is a schematic diagram showing the downloading of audit data from vending machines to an electronic key.

In accordance with an aspect and alternative embodiment of the invention, an advantage of electronic keys is that they can be used to record and collect and track the attempted accesses of locks on vending machines in the field. Keys that provide this function are of the "auto-tracking" type mentioned above. Referring to FIG. 26, with an auto-tracking key 412, each access attempt triggers an audit data event in both the electronic key and the electronic lock in the vending machine 220. To that end, a space for audit data is reserved in each of the nonvolatile memories of the key 412 and the lock 248. During an access attempt, the key 412 transfers the key code 420 and a timestamp 422 to the lock. Regardless of whether the access attempt succeeds or fails, the lock stores the key code and timestamp in its audit data memory. In one implementation, the lock will filter the number of accesses from a given key in a given period (e.g., one attempt per key for every 20 minutes) so that it does not create a separate record for each access attempt. It may, however, include data in the record counting the number of access attempts from the key in the time period. This minimizes the chances that when a key is used to make many access attempts in a row it will fill the audit trail memory and erase existing records of previous access attempts. One way to set this time period in the lock is to transfer the value of the period from a key (which is in turn set by a supervisor using a PC) to the lock.

If the access attempt results in a key code mismatch or if the key is disallowed for access because an operation limit in its limit registers is reached, the access process is terminates. In either case, the lock transfers its lock ID 428 to the key 412. The key is expected to store the lock ID and the timestamp in its audit data memory as an invalid access attempt.

If, on the other hand, the access attempt results in a valid match of key code and the key has not exceeded its operation limits, the lock still transfers its lock ID to the key 412. The key 412 then stores the lock ID and timestamp in the audit data memory as a record of a proper access. In addition, as the electronic key is an auto-tracking key, the lock transfers all the audit data 428 entries in its audit data memory to the key. The data in the audit data memory includes the lock ID, a record for each access attempt that includes the entire key code (including the key ID digits) received from the key that made the access attempt, and the timestamp for that access attempt. The auto-tracking key 412 then stores the audit data 428 of the lock in its own nonvolatile memory. In this regard, each key preferably is capable of uploading the audit data memories of 400-500 vending machines. This eliminates the need for a separate process or equipment in the field for performing the same data retrieving function.

When the electronic keys 412 are returned to the home base, the audit data they generated themselves and the audit data they collected from the vending machines 220 can be transferred to a central control computer 410. The audit data can be downloaded to the PC 410 by the supervisor using the key read/write device 418 that is also used for programming the electronic key.

Figure 27:
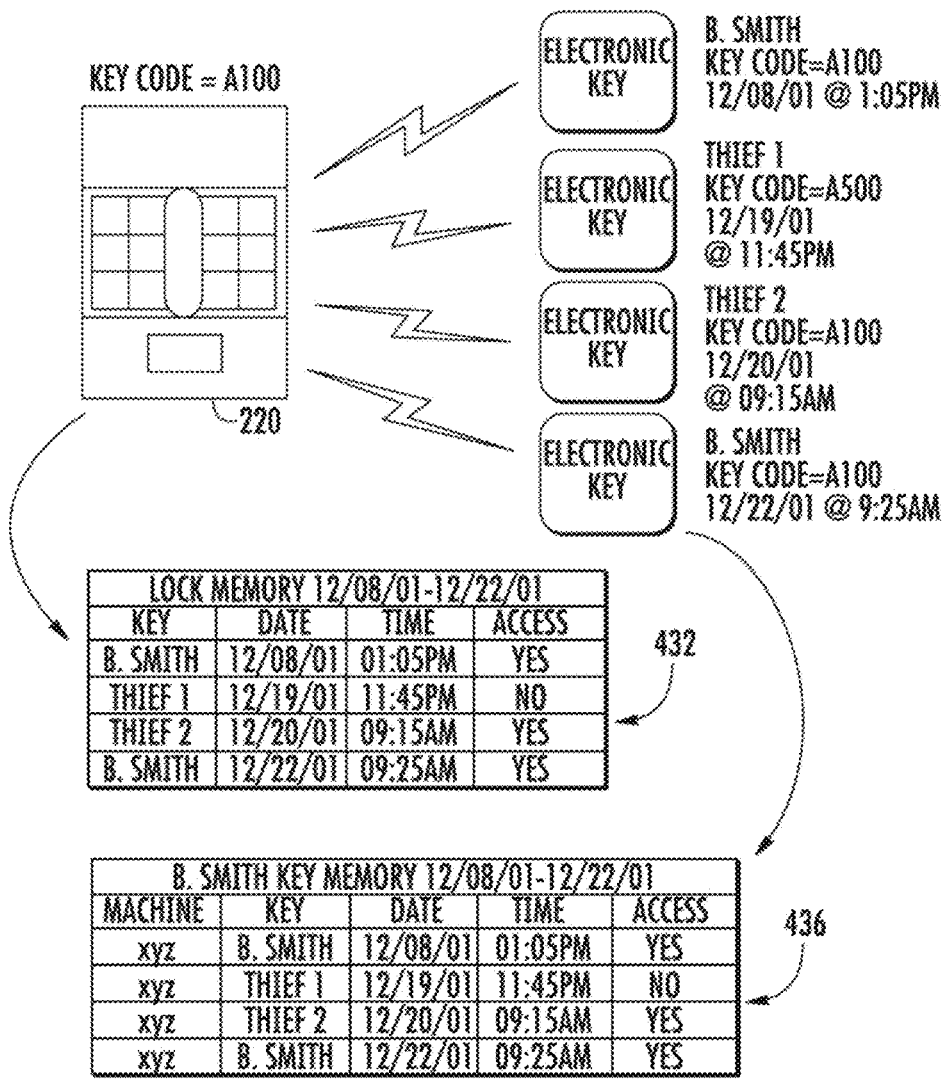
FIG. 27 is a schematic diagram showing an example of audit data uploaded from a vending machine to an electronic key.

By way of example, FIG. 27 shows exemplary audit data collected by an auto-tracking key from a vending machine. In this example, the key code stored in the lock on the vending machine is "A100". The vending machine was accessed using the auto-tracking key on Dec. 8, 2001. Since the key contains the correct key code, the access operation is successful. Thereafter, there were two unauthorized access attempts. The first unauthorized access attempt on Dec. 19, 2001 failed, because the key code ("A500") in the electronic key did not match the key code in the lock. The second unauthorized attempt on December 20 used a stolen key with the right key code and was successful. When the auto-tracking key is used on Dec. 22, 2001 to unlock the vending machine, the audit data 432 stored in the memory of the electronic lock on that vending machine are transferred to the auto-tracking key, which stores the transferred audit data in its own memory. As stored in the key, the audit data 436 identifies the vending machine from which the audit data are uploaded. The audit data 436 stored in the key are later downloading to the home base PC.

Due to the various complexities of this system concerning multiple key users, key codes, and the multiple keys sharing the same key codes, as well as the flexibility provided by the ease of changing access codes of the vending machines in the field, it is often desirable to provide simple diagnostic capabilities to the keys, electronic locks. It may also be desirable to provide special reader tools for use in the field.

In one implementation, the electronic key uses its LED light to provide several diagnostic signals to the user when its START button is pressed and when it is communicating with the electronic lock. If the key correctly communicates with the lock and the key codes match, the LED light is on continuously for about five seconds. If the key correctly communicates with the lock but the key codes do not match, the LED light flashes around five times a second for about five seconds. If the key cannot establish correct communication with the lock, the LED light is set to flash faster, such as 25 times a second, for about five seconds. If the key correctly communicates with the lock and the key codes match, but the operation limits set in the limit registers are exceeded, the LED flashes at a lower frequency, such as three times per second for about 3 seconds. If the START switch of the key is pressed and the key does not communicate with the lock and its operation limits are exceeded, the LED first flash quickly, such as 25 times per second, for up to 5 seconds, and then flash three time per second for up to three seconds.

In a preferred embodiment, a diagnostic tool 440 is used in the field to communicate with electronic locks on vending machines, which provide diagnostic information in the event of problems with the operation of the lock or the door. As shown in FIG. 26, the diagnostic tool 440 includes a display 442 that displays information read from the electronic lock. For instance, the display may show each of the access control key codes stored in the non-volatile memory of the lock, the lock ID of that lock, and any other information pertaining to the state of the electronic lock, such as an indication of whether the lock expects the door to be in a locked or unlocked state based on a position-control feedback measured by the lock circuit.

In a preferred embodiment, security measures are implemented in the electronic key concerning key tampering by replacing the battery in the key. It is possible that the employees or thieves that gain access to the electronic keys will attempt to trick the security of the system by tampering with the key. Since the key contains the clock that provides the time and date of access limiting, it is likely the users will attempt to disable or trick the clock to override the access limits. For example, if the key operation limits are set to only allow accesses between 7 AM and 6 PM, the user may attempt to disconnect the battery of the key in-between lock accesses to stop the clock in the key from counting down the time and disabling the key.

Figure 29:
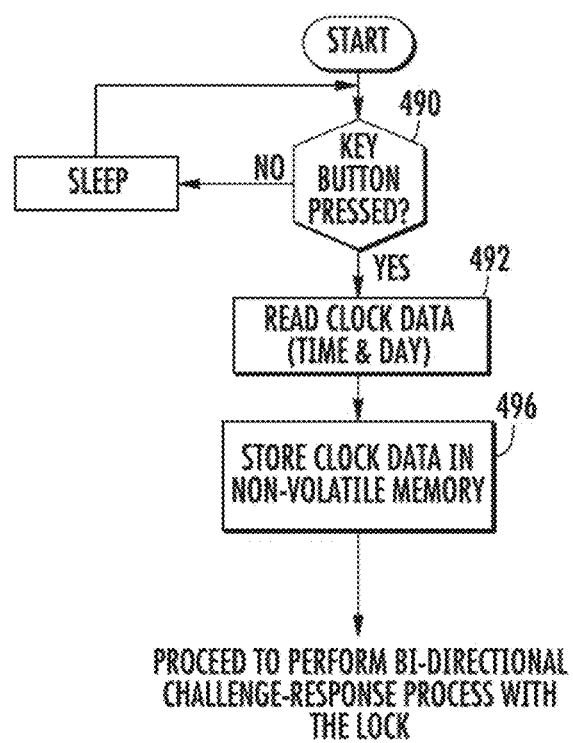
FIG. 29 is a flowchart showing an operation by an embodiment of the electronic key to back up the time and date for restoring the clock of the key in case of a faulty or removed battery.
Figure 30:
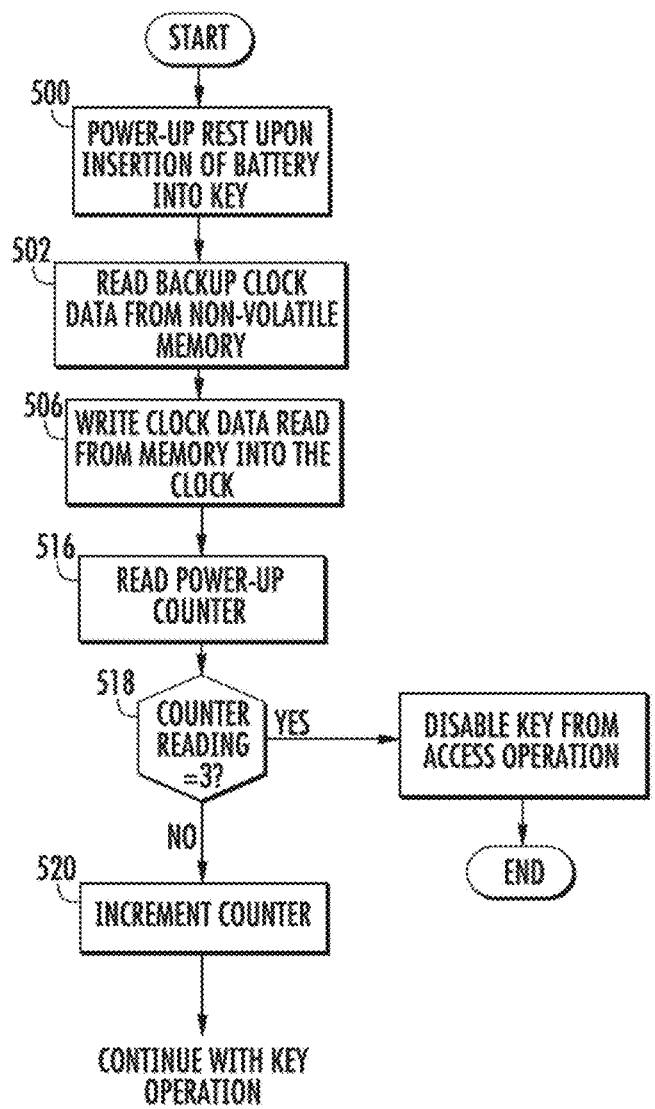
FIG. 30 is a flow chart showing an operation by the electronic key to record the number of power-up of the key to prevent tampering by battery removal.

Referring to FIG. 29, to reduce of risk of clock tampering by removing the battery, the key is programmed such that it will reset its clock back to approximately the correct time and date after the battery is reconnected. This feature is provided for both cases of the battery going low naturally or if it is tampered with by the user. To that end, each time the START button 236 of the key is pressed (step 490), the microcomputer 280 of the key reads the time and date from the clock 294 (step 492), and stores the time and date data 498 in the non-volatile memory 282 of the key (step 496). Alternatively, the key may store the time and date periodically, such as every 1-2 minutes. Referring now to FIG. 30, if the key battery is disconnected and later a battery is inserted into the key, the key starts a power-up process (step 500). The microprocessor is programmed to read the backup time and date 498 stored in the non-volatile memory 282 (step 502) and writes that time and date into the clock 294 (step 506). The clock will then run based on the restored time and date as a substitute until the electronic key is re-docked into the cradle and the home base computer 410 stores a new accurate time and date in the clock of the key. When the restored time and date is in use, the key can still be used to access locks on the vending machines as long as the operation limits of the key are not exceeded.

In addition to the time-restoration feature, the microcomputer 280 in the key employs logic that counts the number of times the battery is removed and will immediately disable the key indefinitely if the battery is disconnected and reconnected more than a pre-selected number of times, such as three times. Specifically, the microprocessor maintains in the non-volatile memory 282 a counter 512 that counts the number of times the key has been powered up since the last docking of the key. This counter 512 is cleared each time the key is docked. Each time a battery is inserted in the key and the microcomputer 280 goes through the power-up process (step 506), the microcomputer 280 reads the counter 502 (step 516). If the microcomputer determines (step 518) that the counter reading has reached the allowed number of power-up, such as 3 times, it disables the key from any access operation. If the allowed number of power-up is not reached, the microcomputer increments the counter (step 520). Thereafter, the key continues with regular key operation, but with each access attempt the key will store a "battery removed" bit with the audit data for that access event in the memories of the lock and the key. This "battery removed" bit indicates that the time and date stamp of the access event is recorded after the key battery was disconnected, and that the accuracy of the time and date is questionable.

Figure 31:
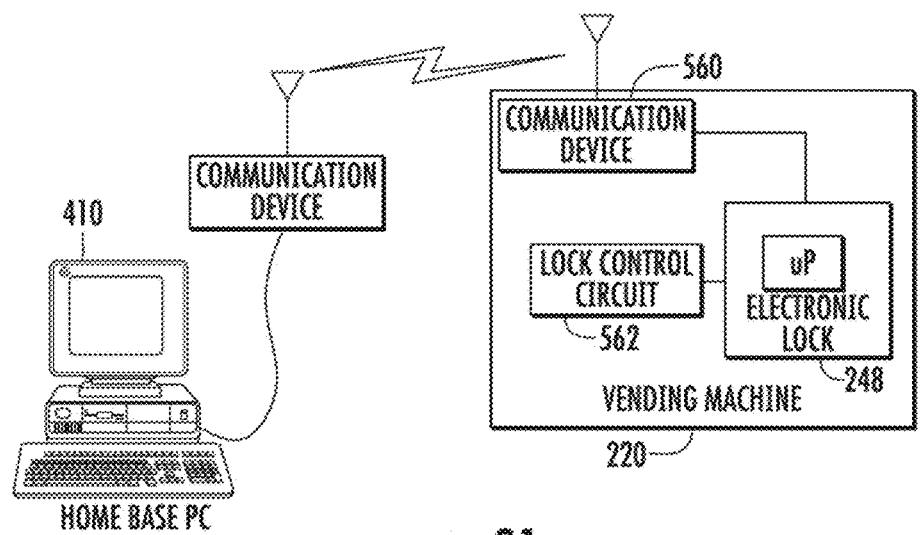
FIG. 31 is a schematic block diagram showing an embodiment of a vending machine that has a communication device that is interfaced to the electronic lock and in wireless communications with a home base for access control and auditing purposes.

Referring to FIG. 31, in accordance with a feature of an alternative embodiment, the vending machine 220 is equipped with an electronic device for communicating with the home base. The communication device 560 preferably communicates wirelessly, such as over a RF channel, to the computer 410 at the home base of the owner of the vending machine. The vending machine also includes a vendor controller electronic circuit 562 for controlling the operation of the lock 248. The vendor controller 562 is connected to the lock 248 and the communication device 560. The electronic lock 248 working together with the vendor controller 562 and the communication electronic device 560 in communication with the home base can accomplish many of the same access control and auditing functions described above and additionally some inventory and money settlement processes. For example, the communication device 560 can receive a command from the home base to disable operation of the lock 560 regardless if an electronic key with the correct key code attempts to access the vending machine. Also for example, the lock 248 can indicate to home base computer 410 through the communication device 560 which keys have attempted to access of the vending machine. This arrangement eliminates the need to use an electronic key to collect, store, and transfer the audit events to the home base via the memory and communication medium of the key.

Moreover, the communication device 560 may be used with the vendor control 562 to keep track of the inventory and the cash transactions of the machine. In many cases, when the service person (route driver) visits the machine, his job is to fill the machine and collect money. During this task, the vendor control 562 is involved in interfacing with the service person to ensure the proper resetting and settlement processes take place, and that the service person closes the door of the vending machine. The vendor controller 562 can inform the home base computer of the open/close state of the vending machine door. In the case the Route Driver does not satisfy the conditions of the vendor controller 562 by way of inventory or monetary or debit card processing, the vendor controller can send a disable signal to the electronic lock 248 so the door of the vending machine cannot be closed and locked. Thus, since the service person cannot leave a vendor unlocked, this process would force him to complete the required resetting and settlement processes so the vendor controller can allow the vendor door to be locked before the service person leaves the vending machine.

Figure 32:
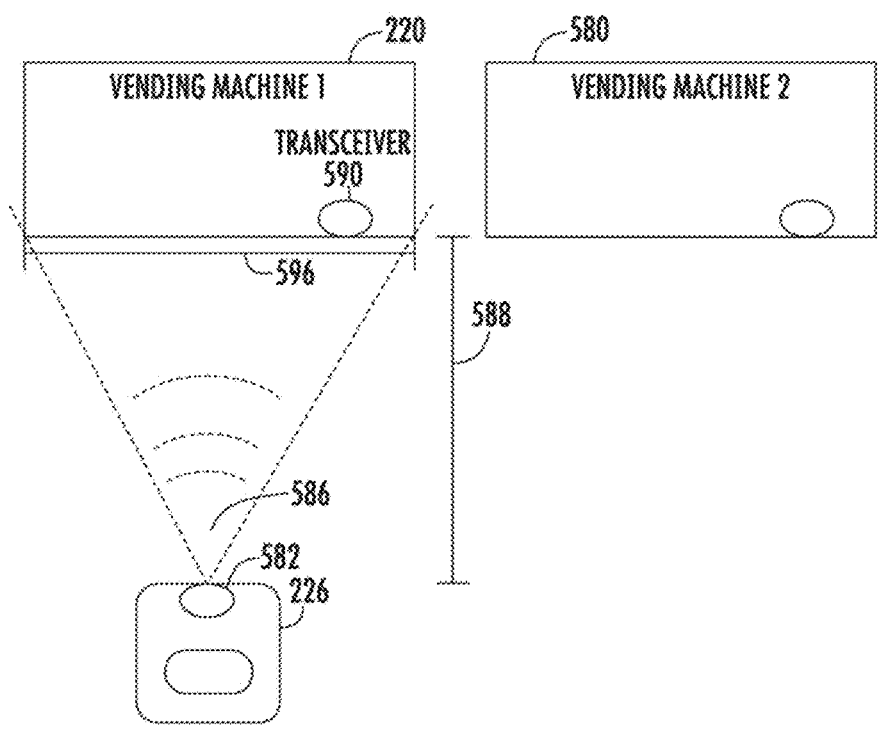
FIG. 32 is a schematic diagram showing vending machines accessible by an electronic key that has a narrow wireless signal transmission pattern to avoid accidental opening of the vending machines.
Figure 33:
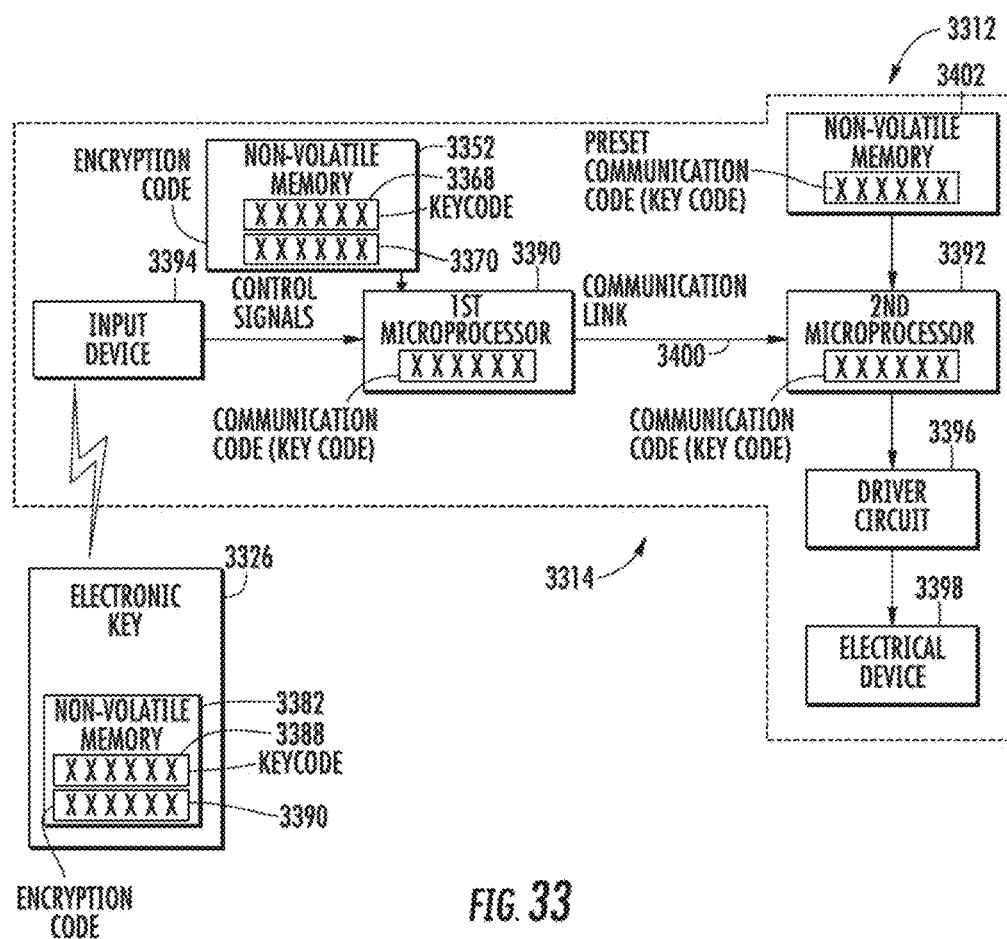
FIG. 33 is a functional block diagram showing an embodiment of an electronic access control device having two microprocessors communicating with each other and wherein the device wirelessly communicates with an electronic key.

Referring now to FIG. 32, in accordance with a feature of a preferred embodiment, the wireless transceiver of the electronic key 226 is designed to have limited transmission range and angle to prevent a vending machine 580 from being accidentally opened due to receiving stray transmission from the key when the key is used to open another vending machine 220 in its vicinity. Specifically, the transmitter 582 of the key 220 has a pre-defined transmission angle 586. Also, due to the limited transmission power of the transmitter 582, the transmission from the key 226 has a limited transmission power range 588, beyond which the signal strength is generally too weak for the transceiver 590 of the electronic lock of the vending machine 220 to reliably detect. In a preferred implementation, the transmission power and the transmission angle 586 of the key 226 is selected such that the width 592 of the transmission pattern at the effective transmission range 588 is about the same or smaller than the width of the vending machine 220. As mentioned above, in a preferred implementation, the transceivers in the keys and the electronic locks on vending machines are infrared transmitters for transmitting and receiving infrared signals. Referring to FIG. 33, a functional block diagram is provided of an embodiment of an electronic access control device having two microprocessors communicating with each other wherein the access control device wirelessly communicates with an electronic key.

In an embodiment, the electronic access control device 3312 can be completely or at least partially mounted within a vending machine 3314. The electronic access control device 3312 can include, but is not necessarily limited to, an input device 3394, a first processor 3390, a non-volatile memory 3352, a second processor 3392, another non-volatile memory 3402, a driver circuit 3396, and an electrical device 3398.

The electronic key 3326 communicates with the input device 3394 of the access control device 3312. The electronic key 3326 preferably includes a non-volatile memory 3382 containing a key code 3388 and an encryption code 3390.

Preferably, the electronic key 3326 uses a wireless means (i.e., radio-frequency, infrared, or the like) to communicate with the input device 3394. Communication between the electronic key 3326 and the input device 3394 can be unidirectional or bidirectional. It is preferred, however, that the data communicated between the electronic key 3326 and the input device 3394 be encrypted as previously described above.

The input device 3394 can comprise a conventional communication interface that uses radio frequency, infrared, or the like for wirelessly communicating with the electronic key. In an embodiment, the input device is a half-duplex IRDA infrared communication interface 254 for communicating with the electronic key. Accordingly, the input device 3394 is mounted on or in the vending machine 3314 so it can receive infrared transmissions.

The input device 3394 provides control signals to the first processor 3390. Although shown in simplified form, the first processor 3390 can include, but is not necessarily limited to, a power supply voltage regulator, a learn switch, an LED for state indication, and a non-volatile memory 3352 for storing key codes 3368, encryption codes 3370, and audit data as previously described above. As will be appreciated by those having ordinary skill in the art, the non-volatile memory 3352 can be integral to, or separate from, the first processor 3390.

The first processor 3390 communicates with the second processor 3392 via a communication link 3400 that can be a conventional data communication bus, wiring, or the like. Further, the second processor 3392 can be a conventional microprocessor device or the like.

In an embodiment, the second processor 3392 is provided with access to a non-volatile memory 3402 and a driver circuit 3396. The non-volatile memory 3402 is conventional and thus can be a CMOS RAM, EEPROM, FLASH, or ROM, that is integral to the second processor 3392 or a standalone device or circuit. The non-volatile memory 3402 preferably stores a preset communication code.

The driver circuit 3396 can include a conventional lock motor driver, solenoid control circuit or the like for operating electrical device 3398 to effect a desired operation. Accordingly, the electrical device 3398 can be, for example, a solenoid, motor, relay, or the like for opening a lock such as a lock on the door of a vending machine.

In an embodiment, but not necessarily, the first processor 3390 can be positioned closed to the input device 3394, while the second processor 3392 can be located close to the electrical device 3396 and well shielded from external access.

In the Learn mode of operation, similar to that previously described above, the electronic key 3326 communicates with the input device 3394 of the access control device 3312. As indicated previously, proper communication between the electronic key 3326 and the access control device 3312 must be established. This can be done by first placing the access control device 3312 in LEARN mode via a switch (262 of FIG. 19). Once the access control device 3312 is put in the LEARN mode, the service person can operate the electronic key 3326 containing preferably at least one desired key code by pressing the button (236 of FIG. 20) on the electronic key. This causes the key 3326 to transmit the key code(s) 3388 stored in its memory to the access control device 3312. If, as preferred, the electronic key 3326 and the access device 3312 employ encryption techniques in their communications, then the electronic key 3326 first encrypts the key code(s) 3388 with the encryption codes 3390 in its non-volatile memory 3382 and then wirelessly transmits the encrypted key code(s).

The input device 3394 receives the wirelessly transmitted encrypted code(s) and provides the data to the first processor 3390. The data is decrypted by the first processor 3390 using the encryption codes 3370 in its associated memory 3352 to obtain the transmitted key code(s) 3388. In a preferred embodiment, the encryption codes 3390 and 3370 in the electronic key 3326 and the access device 3312, respectively, are inserted during manufacturing at the factory and different encryption codes can be used for different vending machine owners (e.g., different soft drink bottlers) so the electronic keys given to one owner may not be learned into and used to access the vending machines of another owner.

As previously indicated above, if the encryption codes of the electronic key and the access control device 3312 do not match, then the access control device will not be able to successfully decrypt the received key code(s). In that case, the process will end and the lock will not learn the new key code(s). If, however, the decryption is successful, then the access control device 3312 will store the key code(s) at a proper location. In an embodiment, at least one key code 3368 can be stored in the non-volatile memory 3352 associated, or part of, the first microprocessor 3390. Further, if desired, another key code can be stored in the non-volatile memory of the second microprocessor 3392.

With the key code(s) stored in the access control device 3312, the device uses the key code(s) for access control. In other words, the access control device 3312 compares the stored key code(s) 3368 with the key code(s) transmitted from the electronic key 3326 to determine whether the vending machine door should be unlocked.

In particular, when a wireless signal is received by the input device 3394, the wireless signal is provided as input data to the first microprocessor 3390 for decryption. The first microprocessor decrypts the input data to obtain at least one transmitted key code that is compared to a key code 3368 stored by a non-volatile memory 3352 associated with the first microprocessor 3390. If the transmitted key code 3388 matches the stored key code 3368, then the first processor 3390 sends a special communication code to the second microprocessor 3392 via communication link 3400. The communication code can, but not necessarily, be encrypted when it is transmitted over the communication link 3400. The communication code can comprise another (i.e., second) key code that is stored in the non-volatile memory 3352 associated with the first microprocessor 3390, or the other (i.e., second) key code can be obtained from the data wirelessly transmitted by the electronic key 3326, or it may have originated from the memory 3402 associated with, or contained within, the second microprocessor 3392.

In the case where the communication code originates in the memory 3402 associated with, or contained within, the second microprocessor 3392, the communication code can be transferred from the second microprocessor memory to the first microprocessor memory (i.e., the memory that is associated or part of the first microprocessor 3390) during an initialization sequence such as during initial power-up. For instance, when power is first applied to the electronic lock, the second microprocessor can transmit the access code and the communication code to the first microprocessor, which then stores the code in memory for subsequent operation. Moreover, encryption and decryption operations between the key 3326 and the lock 3314 can be implemented as described in detail herein.

The second microprocessor 3392 compares the communication code with a communication code stored in the non-volatile memory 3402 associated with the microprocessor. If the communication codes match, then the second microprocessor 3392 activates the driver circuit 3396 to energize the electrical device 3398.

As indicated previously, the electronic access control device 3312 can store in a memory a plurality of access attempt records or an audit trail of the lock access attempt history which can be downloaded externally from the lock to an electronic key or another data storage device. Also as indicated previously, the electronic key 3326 can be controlled by operation limit parameters that will control the operation of the key by a clock and limit parameters. Also as indicated previously, the electronic access control device can communicate diagnostic messages and/or codes to an electronic key or a reading and display device. Also as indicated previously, the electronic access control device 3312 can communicate with a home base, the electronic key, or other device for providing access control and auditing functions. In such an embodiment, the vending machine 3314 can include a vendor controller electronic circuit (562 of FIG. 31) for controlling the operation of the electronic access control device 3312. In such an embodiment, the vendor controller can receive a command from the home base (410 of FIG. 31) to disable operation of the electronic access control device 3312 regardless if an electronic key with the correct key code(s) attempts to access the vending machine. Also, for example, the electronic access control device 3312 can indicate to the home base computer which electronic keys have attempted to access the vending machine. Moreover, the electronic access control device 3312 can transmit its key codes, as encrypted data, when commanded to do so.

Figure 34:
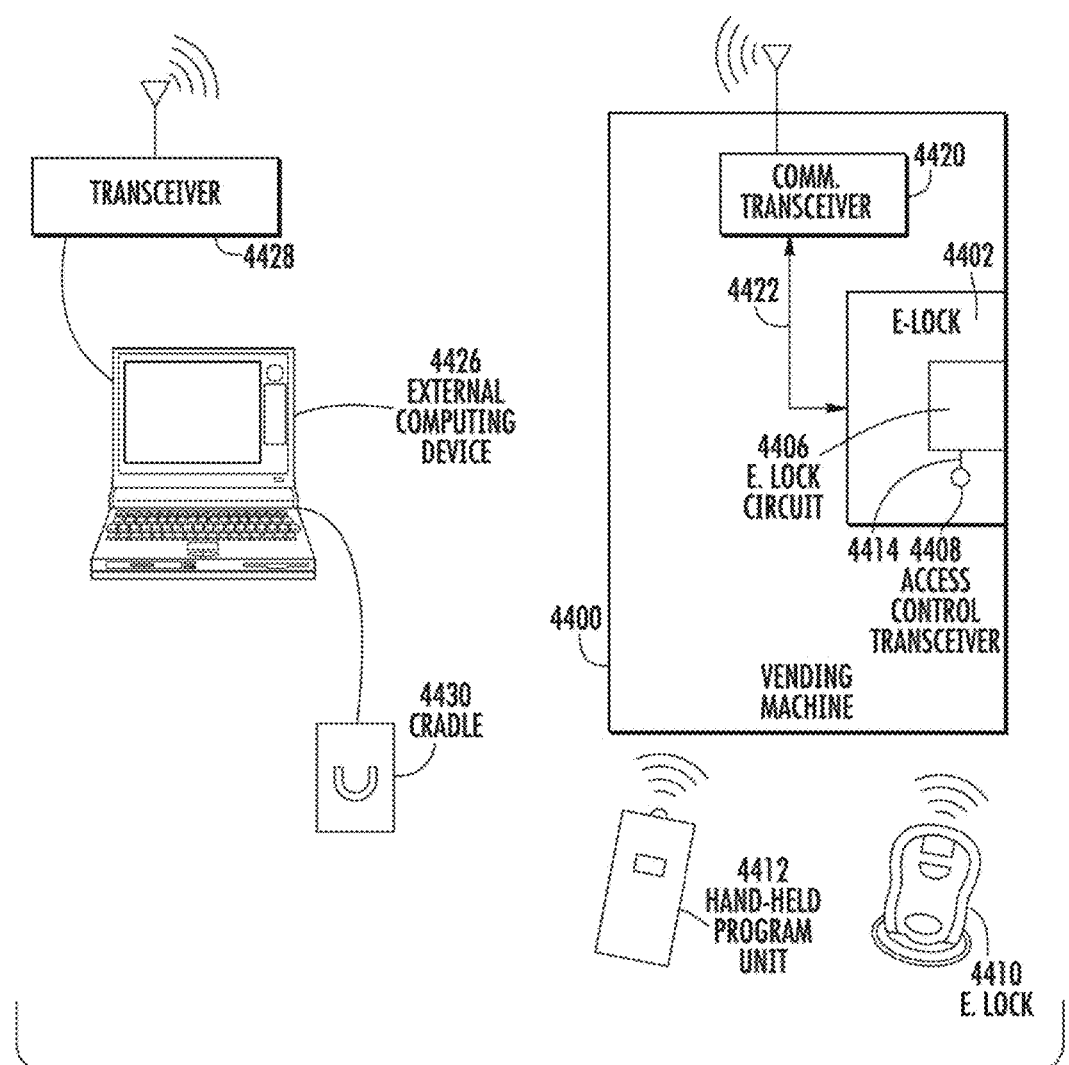
FIG. 34 is a schematic diagram showing a system in which alternative programming schemes for programming the lock of a vending machine in the field may be implemented without requiring the vending machine to be opened before programming.

FIG. 34 shows a system in which one or more programming schemes may be implemented for field-programming the electronic lock 4402 of the vending machine 4400 without having to open the vending machine to access a program switch. Similar to the embodiments described earlier, the vending machine 4400 is equipped with an electronic lock 4402 with a microprocessor-based lock circuit 4406. The lock circuit 4406 includes a wireless transceiver 4408 for wirelessly communicating with an electronic key 4410 and other devices such as a hand-held programming unit 4412, as described in greater detail below. The wireless transceiver 4408, which is mainly used for access control purposes, is connected to the electronic lock circuit 4408 through an access control port 4414. The wireless transceiver 4408 preferably transmits in a carrier band, such as infrared, that has a short transmission range and a well-controlled transmission pattern.

In addition to the access control transceiver 4408, the vending machine 4400 further includes a second wireless transceiver 4420, referred hereinafter as the "lock communication transceiver." The lock communication transceiver 4420 is connected to the electronic lock circuit 4406 through a lock communication port 4422. In contrast with the access control transceiver 4408, the communication transceiver 4420 preferably transmits in a carrier band, such as RF, that has a longer transmission range to enables the lock circuit 4406 to communicate wirelessly with an external computing device 4426 without requiring the external computing device to be in close proximity with the vending machine. To communicate wirelessly with the electronic lock, the external computing device 4426, such as a laptop computer, is equipped with a wireless transceiver 4428. By wirelessly communicating with the electronic lock 4402 of the vending machine, the external computing device 4426 may perform various tasks, including programming the electronic lock circuit 4406 and downloading audit data as described below in connection with one embodiment. As illustrated in FIG. 34, the external computing device 4426 may further include a cradle 4430 for receiving the electronic key 4410 or the hand-held programming unit 4412.

Figure 35:
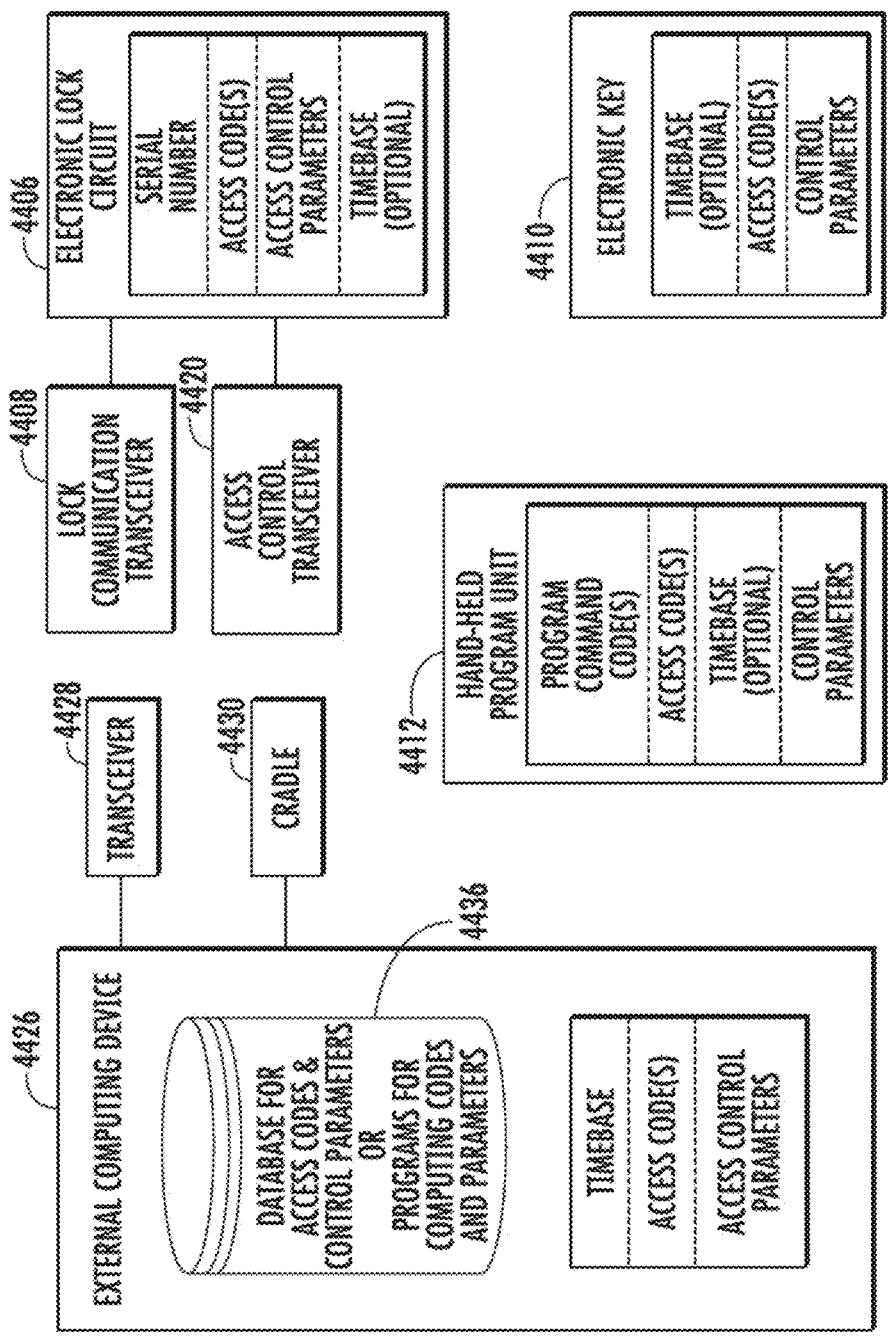
FIG. 35 is a schematic diagram showing data stored in the components in the system of FIG. 34.

FIG. 35 shows the data stored in the components of the system illustrated in FIG. 34. The electronic lock circuit 4406 has a memory that stores the serial number of the lock, one or more access codes, access control parameters, and optionally a digital timebase (i.e., a clock). The electronic key 4410 has stored therein access code(s), control parameters for accessing the lock, and an optional timebase. The hand-held program unit (HHPU) 4412 contains a program command code, access code or codes for accessing locks on vending machines, an optional timebase, and control parameters. The external computing device 4426 has in its memory a timebase, access code or codes for electronic locks on vending machines, and access control parameters for the electronic locks. In addition, the external computing device 4426 may have a database 4436 containing available access codes and control parameters that can be programmed into electronic locks in vending machines. The database 4436 may alternatively or additionally contain programs for computing new access codes and generating control parameters for electronic locks and keys.

Figure 36:
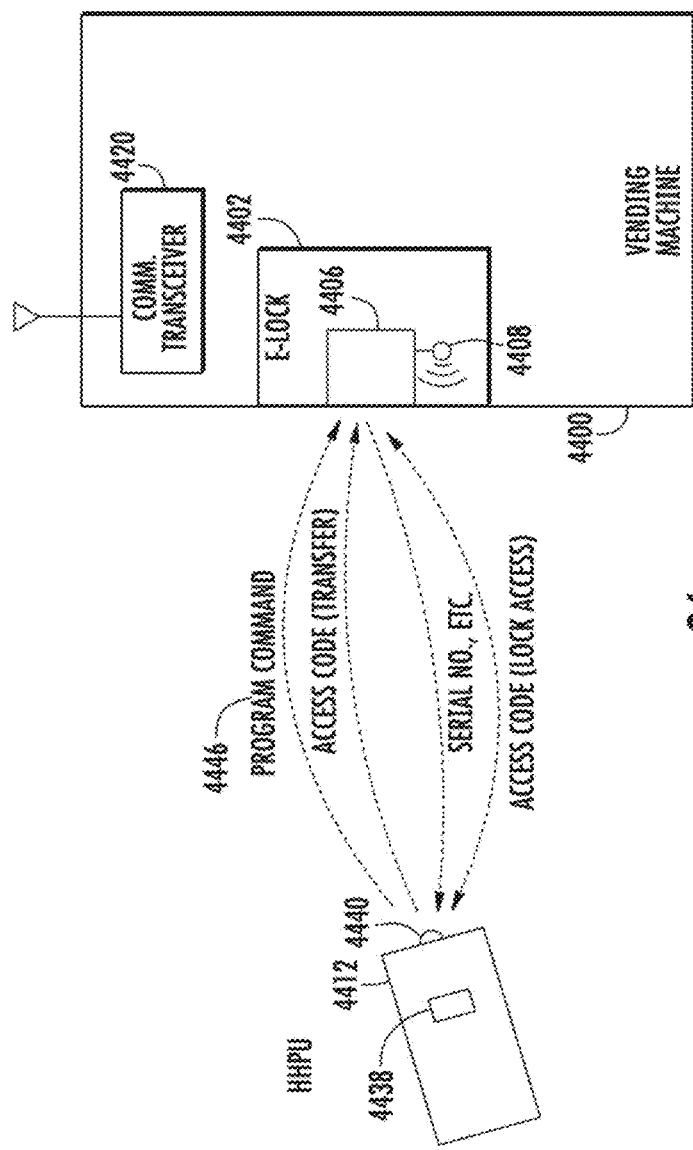
FIG. 36 is a schematic diagram showing an embodiment in which a hand-held program unit is used to program the electronic lock of a vending machine.

Turning now to FIG. 36, in one embodiment, the programming of the electronic lock 4402 of the vending machine 4400 is accomplished by using the hand-held program unit 4412. The hand-held program unit is intended to be portable so that it can be conveniently carried by an operator to the physical location of the vending machine. As illustrated in FIG. 36, the hand-held program unit 4412 preferably has at least one actuation device such as a push button 4438. When the transceiver 4440 of the hand-held program unit 4412 is pointed to the access control transceiver 4408 of the lock and the push button 4438 is pressed, a command code 4446 is transmitted to the lock circuit 4406 of the vending machine 4400. The command code 4446 instructs the lock circuit 4406 to enter a receive mode for receiving a new access code. Next, the new access code is transmitted from the hand-held program unit 4412 to the lock circuit 4406. The lock circuit 4406 receives the new access code and stores the code in its non-volatile memory. The transmission of the new access code may be done automatically by the hand-held program unit 4412, or may require the operator to push the button 4438 or another button designated for triggering the transmission. To ensure the security of the transmissions, the transmissions are preferably encrypted. Moreover, the reprogramming operation may involve a bi-directional challenge-response process similar to the one described above with reference to FIG. 23. The lock circuit 4406 may also have the capability of using access control parameters, such as the allowed number of access, time and day of the access, etc., in addition to the access code to control the access of the lock. The access control parameters may optionally be first stored in the hand-held program unit 4412 and then transmitted along with the new access code from the program unit to the electronic lock during the programming operation.

As part of the code programming process, the electronic lock circuit 4406 may also transmit data such as access codes, its serial number, and/or commands, to the hand-held program unit 4412. For example, after receiving the programming command code 4446, the lock circuit 4406 may send its serial number or current access code to the hand-held program unit 4412, which then selects a new access code for transfer to that lock. In addition, the hand-held program unit 4412 may also take on the function of an electronic key before or after the access code of the lock has been re-programmed.

Figure 37:
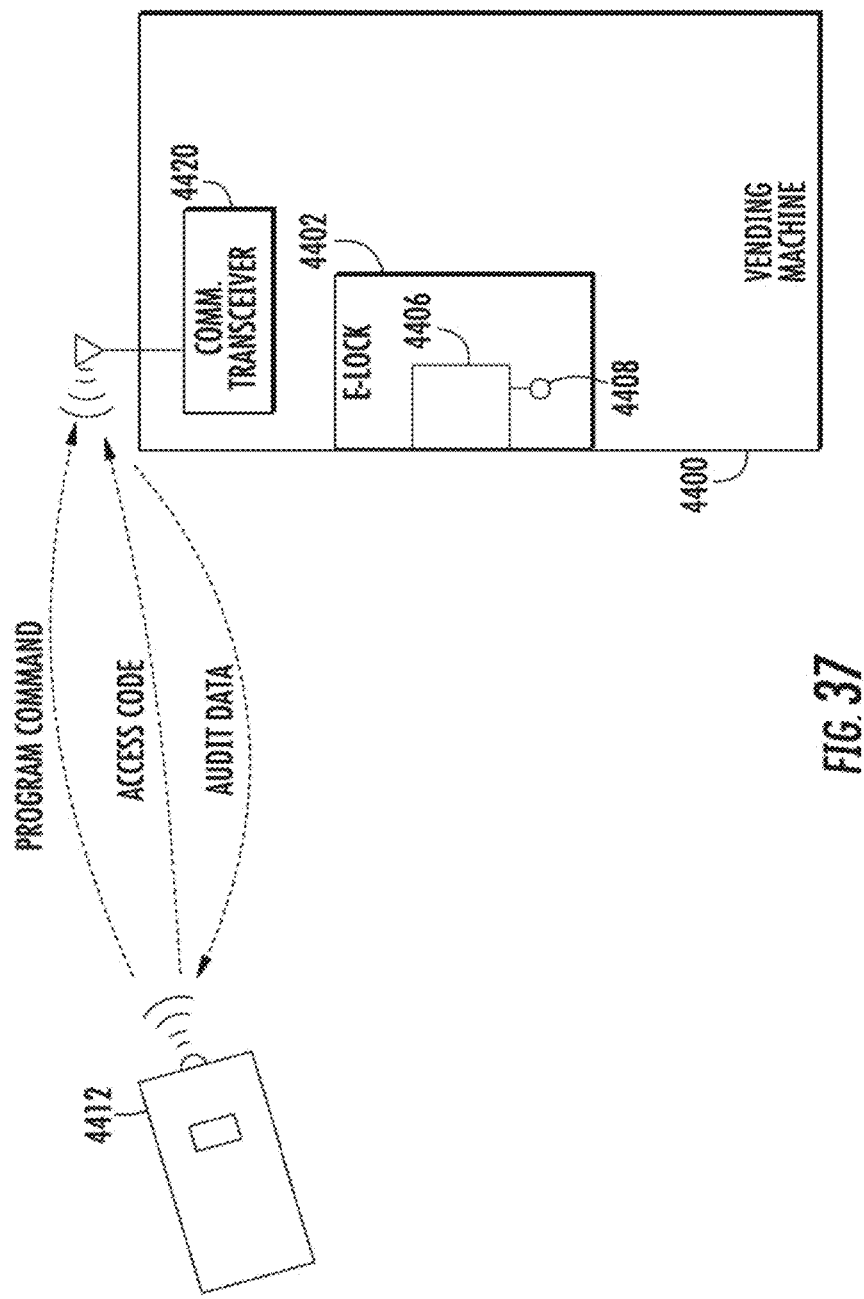
FIG. 37 is a schematic diagram showing an alternative embodiment that also uses a hand-held program unit to program the electronic lock of a vending machine.

FIG. 37 shows an alternative implementation that is similar to that of FIG. 36 in that it also uses the hand-held program unit 4412 to program the electronic lock of the vending machine 4400. The difference is that in the implementation of FIG. 37 the hand-held program unit 4412 communicates with the lock circuit 4406 through the communication transceiver 4420 that is separate from the access control transceiver 4408 normally used for communicating with an electronic key 4410. In this regard, the communication transceiver 4420 may transmit data in either an infrared or an RF band.

Figure 38:
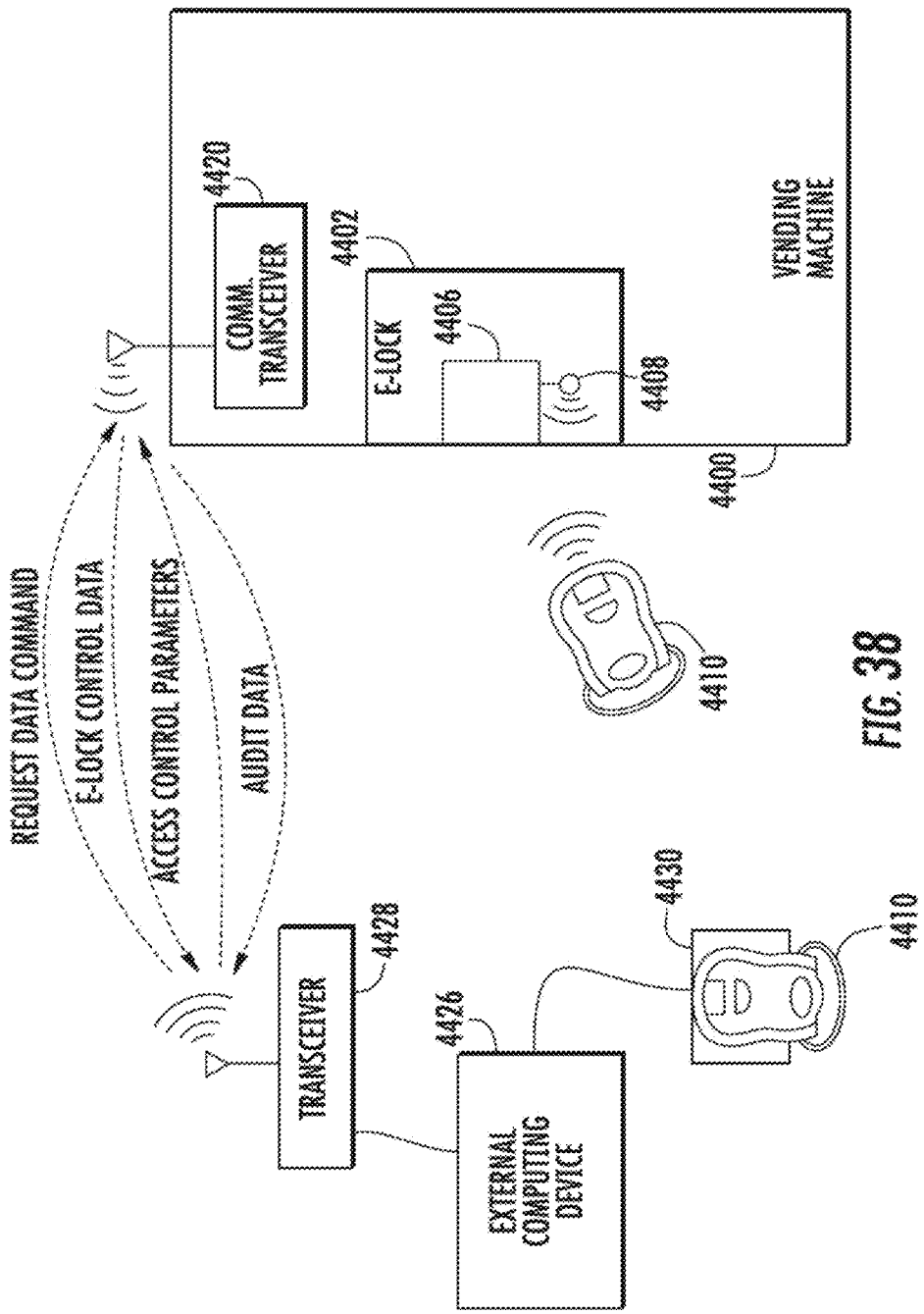
FIG. 38 is a schematic diagram showing another alternative embodiment in which an external computing device is used to remotely program the electronic lock of a vending machine and an electronic key is then used to access the lock.

FIG. 38 shows another embodiment that uses the external computing device 4426 to reprogram the electronic lock 4402. In one implementation, the external computing device 4426 communicates with the electronic lock circuit 4406 through the communication transceiver 4420 that is separate from the access control transceiver 4408. In this programming scheme, the transceiver 4420 preferably operates in the RF range to provide a longer communication distance so that the external computing device 4426 is not required to be brought very close to the vending machine in order to communicate with the lock circuit 4406. Alternatively, however, the transceiver 4420 may operate in the infrared band, which may require the external computing device 4426 to be in direct sight of the lock for wireless communication. In another alternative implementation, the external computing device 4426 may communicate with the lock circuit 4406 through the access control transceiver 4408, although the effective communication distance will be smaller, requiring the external computing device 4426 to be placed closed to the vending machine.

In this embodiment, the lock circuit 4406 preferably has the capability of using access control parameters to control the access of the lock. For example, the access control parameters described above, such as the allowed number of access, time and day of the access, access code, etc., may be stored and used by the lock circuit. To program the lock circuit 4406 with a new access code and/or new control parameters, the external computing device 4426 first polls the electronic lock circuit 4406 of the vending machine by sending a Request Data command. The Request Data command also serves as a program command telling the microprocessor of the lock circuit 4406 to enter a program mode. During the polling process, the external computing device 4426 issues commands to request the lock circuit 4406 to transmit data such as the serial number of the lock, access codes, and/or the audit data of the lock. The lock circuit 4406 responds by transmitting at least the data requested by the external computing device 4426. After receiving the requested data from the lock, the external computing device 4426 may generate a new access code for the lock and/or other information pertaining to accessing the lock, such as encryption codes, time parameters, access control limits, etc. To that end, the external computing device may have a database 4436 that contains appropriate access codes and control parameters that have been calculated previously for electronic locks, electronic keys, or both. Alternatively or additionally, the external computing device 4426 may also have programs that implements mathematical algorithms for computing the access codes and control parameters. Such calculations may generate the access codes randomly or based on a function that includes the time as a variable. The external computing device 4426 then wirelessly transmits the new access code and/or control parameters to the electronic lock circuit 4406 via the wireless communication link between the transceiver 4428 and the communication transceiver 4420. To protect the transmissions from eavesdropping, the transmissions are preferably encrypted. Also, the reprogramming operation may involve a bi-directional challenge-response process similar to the one described above with reference to FIG. 23.

After receiving the new access control data from the external computing device 4426, the electronic lock circuit 4406 recalibrates the lock control functions based on the received data. For example, after receiving the access code or codes and parameters, the lock circuit 4406 may change the access codes and access limits based on the received access control parameters. In this way, the electronic lock is reprogrammed by the external computing device 4426. Next, the external computing device 4426 may optionally be used to program an electronic key 4410 that can be used to visit and access the vending machine 4400 through the access control transceiver 4408. To that end, the electronic key 4410 is connected to the cradle 4430, and the access code that has been programmed into the lock is transmitted via the cradle into the key, together with any other appropriate access control parameters for the key. The key 4410 can then be used to access the vending machine by communicating with the electronic lock circuit 4406 via the access control transceiver 4406 based on the newly programmed access code(s) and control parameters.

By way of example, in the context of servicing vending machines, an operator may drive to the building in which the vending machine is located. In his service vehicle, the operator uses a laptop computer that functions as the external computer device to wirelessly communicate with the electronic lock of the vending machine by sending RF signals. By means of the RF communications, the laptop programs the lock of the vending machine with a new access code and control parameters. For instance, the new access code may be given an active period of 15 minutes, and the operator has to access the vending machine within that time period. The operator also uses the laptop to program the same new access code into an electronic key. The operator then walks up to the vending machine and uses that electronic key to communicate with the lock circuit via the access control infrared transceiver to open the door of the vending machine. In this scenario, the lock of the vending machine and the associated key are programmed "on the spot." After the operator has accessed the vending machine, the access code programmed into the electronic lock may simply go expired. In other words, the lock of the vending machine may not have any valid access code until it is reprogrammed next time by the external computing device.

In an alternative implementation, the same process of programming the lock with an external computing device and then accessing the lock with an electronic key is utilized. In this programming scheme, however, the access information transferred to the electronic lock circuit 4406 is based on access code(s), access limit parameters, etc. that are already in the electronic key 4410. In other words, the external computing device 4426 does not generate the access control information, but instead takes the information from the electronic key. The electronic key, for example, may contain the access codes and access limits for the lock for that day. To reprogram the electronic lock, the electronic key 4410 is placed in the cradle 4430, and the external computing device 4426 reads the access control information from the key and transmits the information to the electronic lock circuit 4406 via the communication transceiver 4420. After the electronic lock is programmed with the new access code and other control parameters, the operator takes the key 4410 to the location of the vending machine and uses the key to access the lock by communicating with the lock via the access control transceiver 4408 based on the new access code and/or operation parameters programmed into the lock.

Before or after the electronic key 4410 is used to access the electronic lock, the lock circuit 4406 may also send audit data for both successful and unsuccessful access attempts to the external computing device 4426 via the communication transceiver 4420. Alternatively, the audit trail data may be downloaded from the lock circuit 4406 into the electronic key 4410 when the key is used to access the electronic lock.

Figure 39:
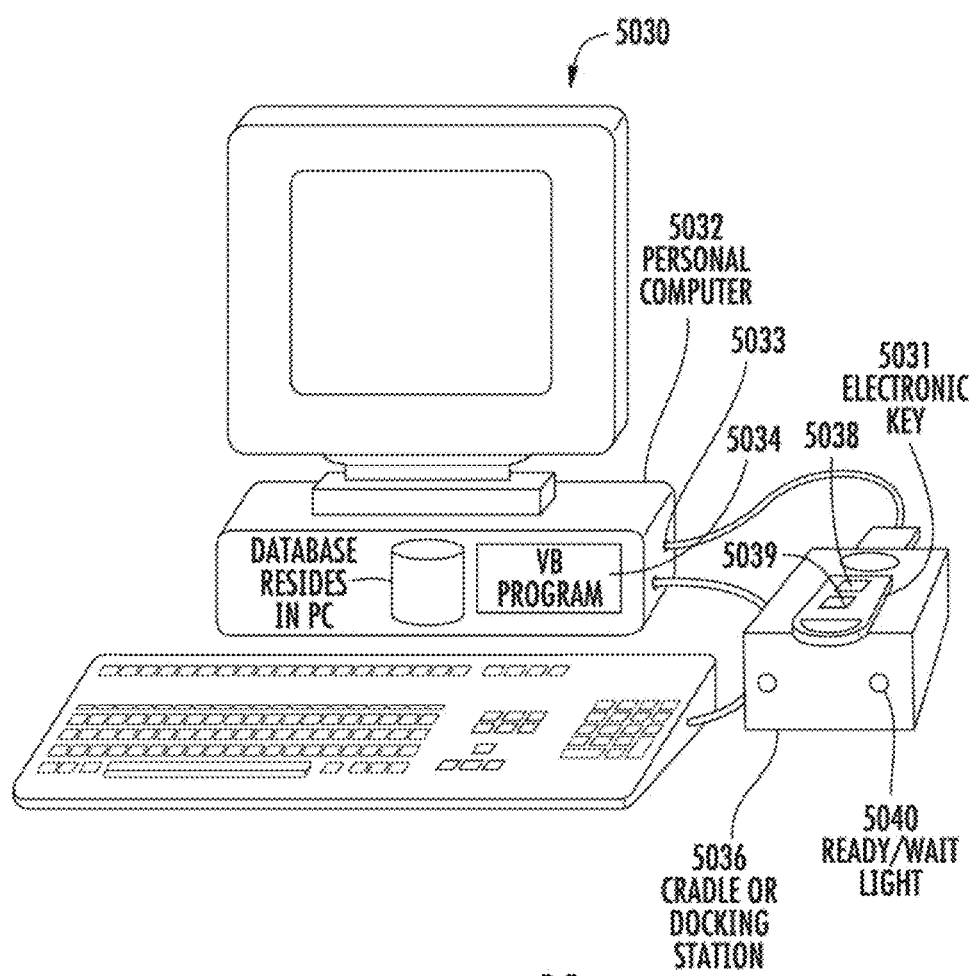
FIG. 39 is a schematic representation of an embodiment of a key management system including a personal computer having a local database and software program, and cradle that functions as an interface for communications between an electronic key and the computer.

To set the access control parameters for electronic keys and to manage the audit data collected by the electronic keys from the vending machines, an electronic key management system (or station) 5030 is provided in an embodiment shown in FIG. 39. The key management system 5030 includes a computer 5032 which may be a desktop personal computer (PC), with appropriate computer software and hardware for carrying out the functionality of key management and database operations. The software program 5034 for key management and database operations may be a Visual Basic program executing on the PC. The computer 5032 also includes a database for storing data for key management and audit data collected from vending machines. As used herein, "database" may include data files as well as a database program. In one implementation, the database 5035 may be a Microsoft ACCESS database residing on the PC 5032.

As illustrated in FIG. 39, the electronic key 5031 includes a status indicating device which may be an LED light 5038, and a push button 5039 that when pressed causes the key to start wireless transmission. To communicate with the electronic key, the key management system 5030 includes an interface device for forwarding and receiving communications to and from an electronic key. In the embodiment illustrated in FIG. 39, the interface device is in the form of a cradle 5036 (or docking station) that interfaces the key to a communication port 5033 on the PC 5032. The cradle 5036 has a receiving place for receiving the electronic key, and indicators such as a ready/wait light 5040.

Figure 40B:
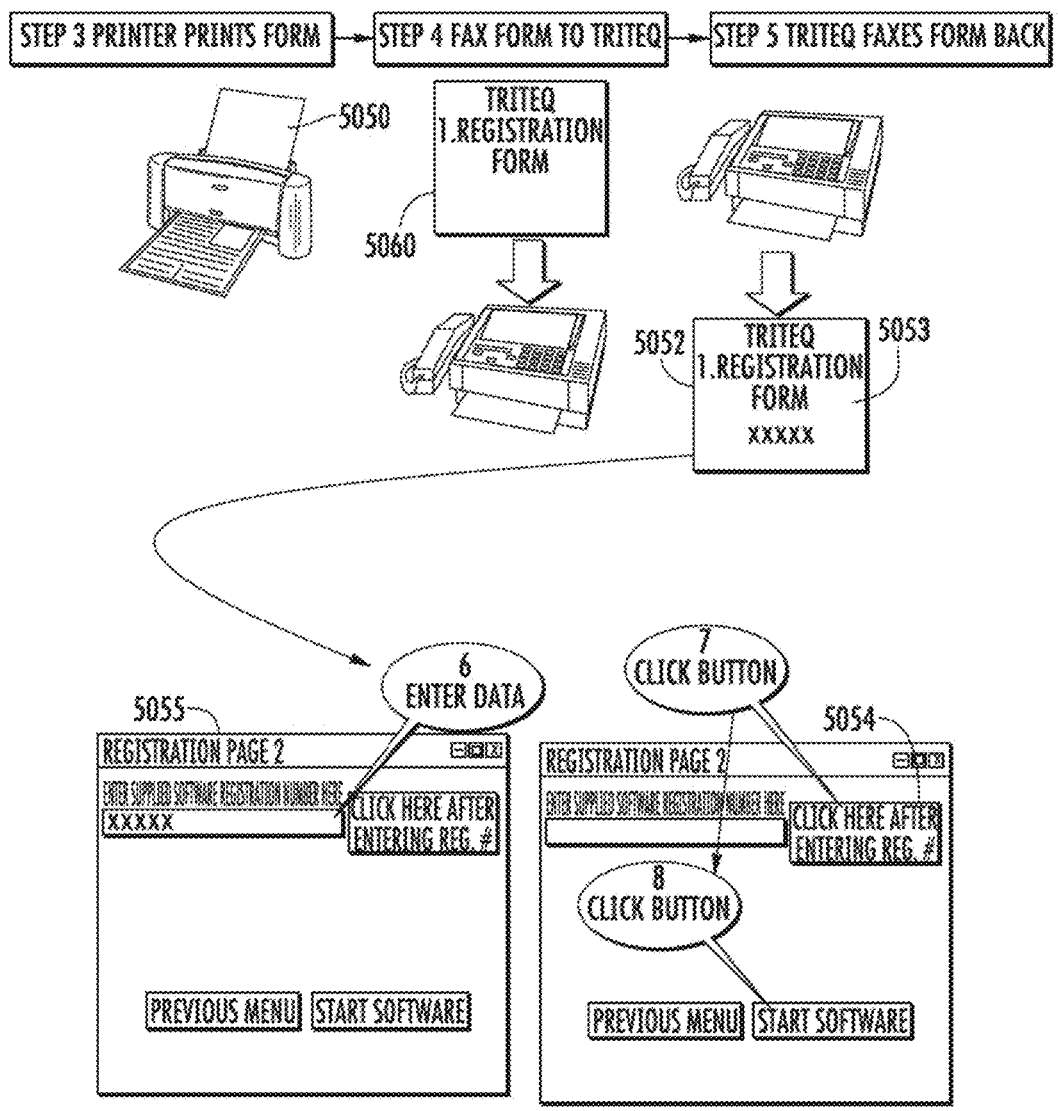

In accordance with a feature of the embodiment, the database 5035, software 5034 and cradle 5036 transceiver interface systems are limited for secure operation on only one particular computer 5032 by means of registration. The software programs and the cradle can properly function only after they are registered with an authorized control center. Thus, a thief cannot install stolen components on a computer at an unauthorized location. The steps of an exemplary registration process are described with reference to FIGS. 40A and 40B. FIG. 40A shows an interface screen that presents a registration form 5042 and a Software Registration Menu. After the software programs are installed on the computer 5032, a user may click on a "registration" tab in the menu bar to bring up this registration form. To fill in the required data, the user looks at the bottom of the cradle 5036 for the cradle serial number, and enters this number into the form 5042. The user looks at the compact disc (CD) containing the key management software for the CD serial number, and enters it into the form. The user also fills in other required information, such as contact information including the bottler name, contract name, address, phone number, etc., into the registration form. Once the registration form 5042 is properly filled, the user clicks on the "Generate System ID#" button 5044. After this button is pushed, the software program generates a system ID number for this system based on the serial numbers and/or other information entered by the user. The system ID number appears at the bottom of the form 5042 under the "Get Registration #) button 5045. The user then clicks on the "Get Registration #" button. In response, the software program generates a registration form containing the user-entered information and the system ID number, and sends the form to the printer for printing, as illustrated in FIG. 40B. This registration form 5050 is then sent, for example via facsimile, to the control center (e.g., TriTeq Corporation) so that the control center can register the key management system using the system ID number. The control center then issues a special code 5053 as a registration number for the user's system. The special code is generated based on the system ID number and possibly other information provided by the registration form 5050. This registration number 5053 may be sent to the user in a registration response form 5052 that may be transmitted via facsimile to the user. The registration number may also be sent via other means of communication, such as email, mail, or voice communication (e.g., a phone call). The user then goes to the next screen 5055 of the user interface for software registration, and enters the received code 5053 into a provided field. After the user clicks an Enter button 5054, the software stores the entered registration number in a special memory location.

The registration process described above links together the serial numbers assigned to and/or embedded in the software 5034, the interface cradle station 5036, and the computer 5032 to create an authorization number stored in the database 5035. Each time the software 5034 is restarted, it reads the serial numbers of each of the components to calculate the authorization number, and then compares this number to the authorization number in the database to make sure they match before operating. If the calculated authorization number does not match the stored authorization number, the software does not allow the user to access the system management functions, and the system is inoperative.

Figure 41A:
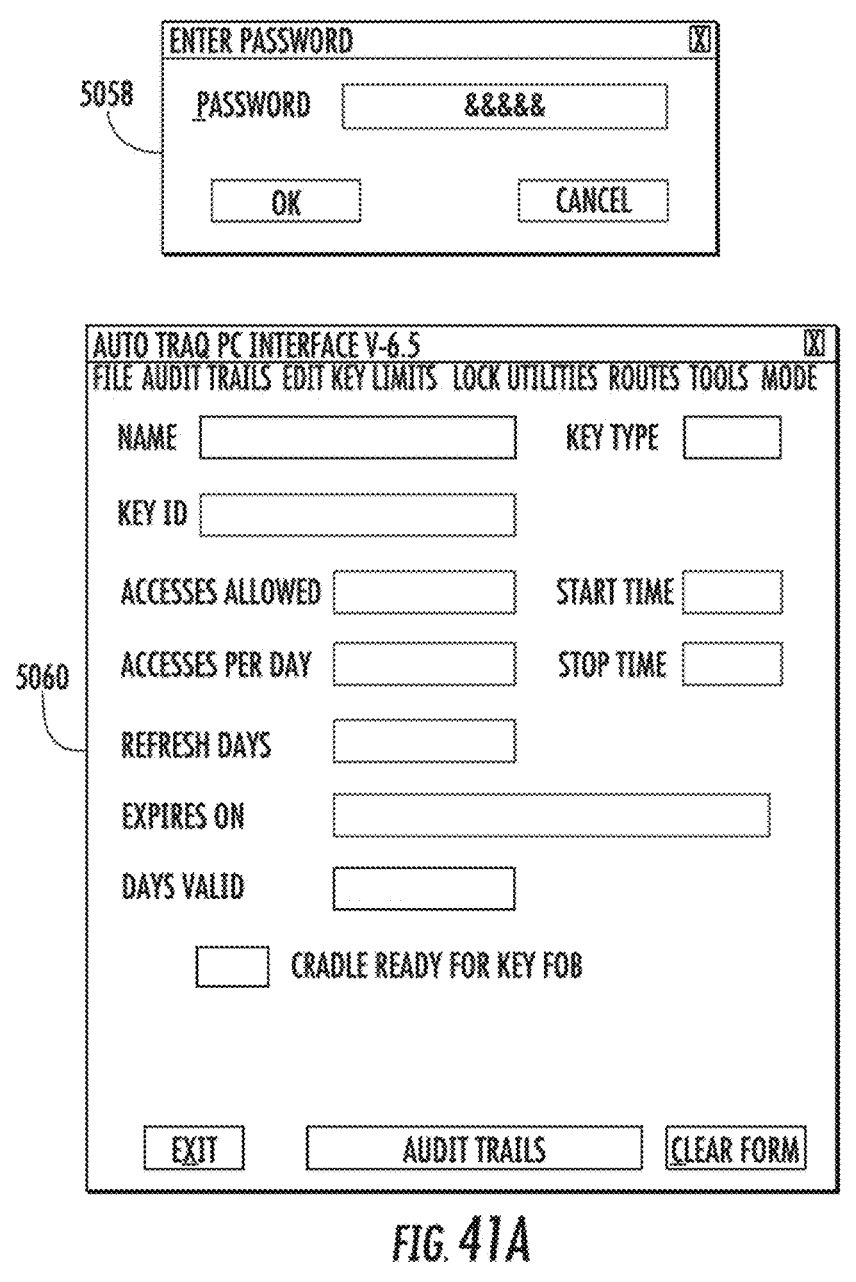
Figure 41B:
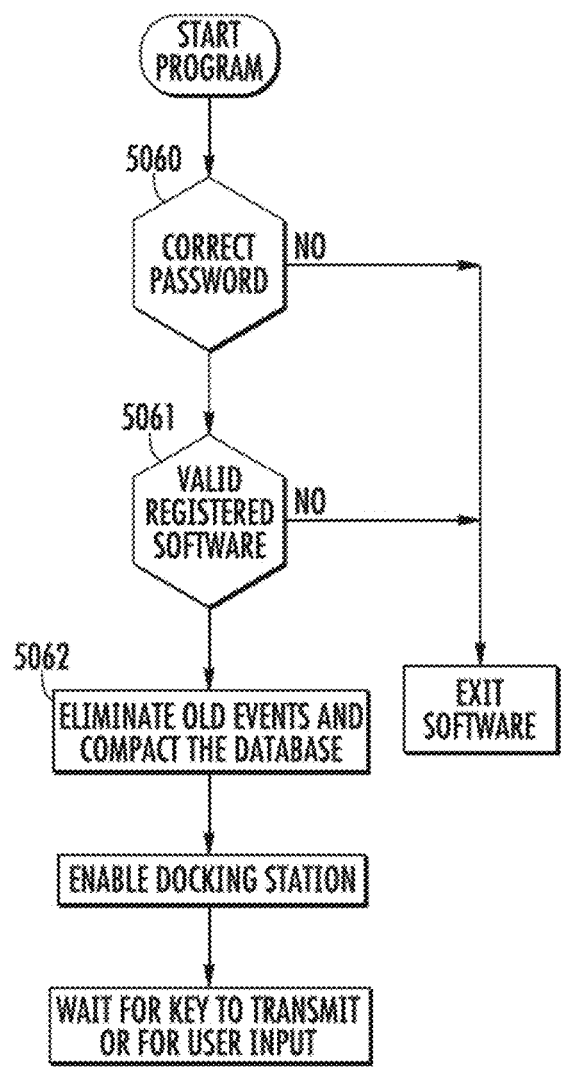

FIGS. 41A & 41B describe how the database interaction with the docking station or cradle is initiated by starting the software system which allows database accesses and data transfer to/from the database. One password is optionally required to initiate the "User" operation mode. As shown in FIG. 41A, after the software is started, the software presents a window 5058 on the computer screen for the entering of a password. The software then presents a key control window 5060 that contains various control parameters or limits for controlling the operations of the electronic key. For instance, the key control screen in FIG. 41A includes fields for the name of the user of the key, the ID number for the electronic key, the key type, the total number of accesses allowed, the allowed number of accesses per day, the start and end times of the operative period of the day, the expiration day and time, and the number of days in which the key is valid, etc.

Referring to FIG. 41B, when the software program 5034 is started, the software presents the password window as shown in FIG. 41A and waits to receive a user mode password. When a password is received, the program determines whether the password is correct (step S060). If the user password is incorrect, the software program exits from operation. If the user password is correct, the program determines whether the system is properly registered in the way described above. If the system is registered, the program works on the database 5034 by eliminating old events and compacting the database (step S062). The program then turns on the cradle 5036, and waits for transmissions from an electronic key docked in the cradle.

Figure 41C:
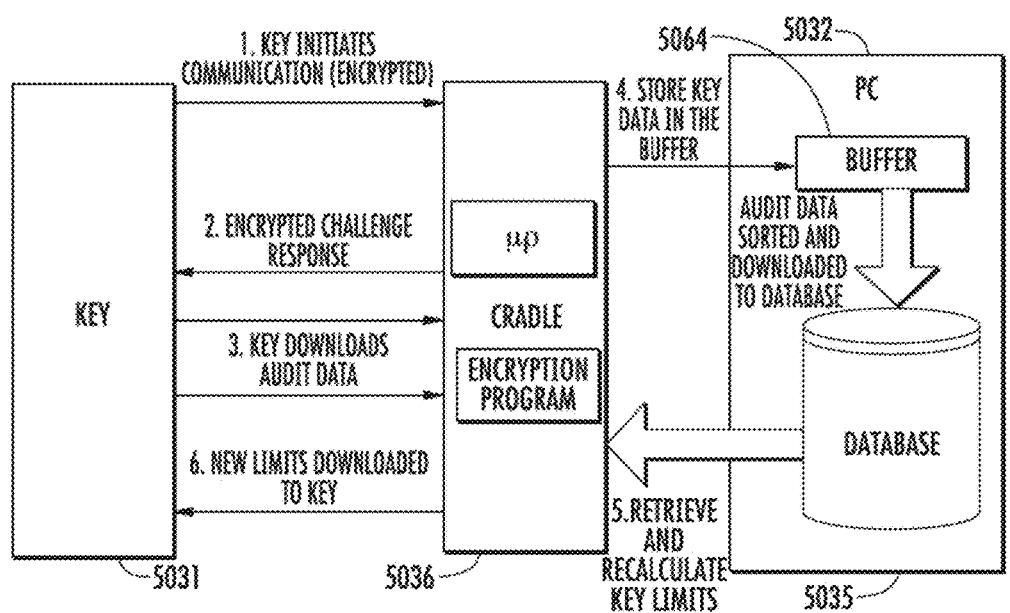

Turning now to FIG. 41C, to initiate a docking or refresh operation of the key 5031, the key is placed within communication distance of the cradle 5036. As shown in FIG. 39, the cradle 5036 may have a receiving location on its top into which the key may be placed. The user then presses the transmit button 5039 of the key 5031 to cause the key to start transmission. The transmission from the key is received by the cradle 5036 and forwarded to the computer 5032. Likewise, communications from the computer 5032 are sent to the cradle 5036, which then transmits the communications to the key 5031. FIG. 41C illustrates that first the key 5031 and cradle 5036 exchange encryption messages to ensure that an authorized key is communicating with the station. To that end, the cradle 5036 includes a microprocessor for providing the processing power and has software programs including an encryption program for handling the encryption/decryption involved in the challenge-response communications and any subsequent communications. Next, if the key contains access audit data collected from vending machines in the field, the data is downloaded from the key and stored in a buffer 5064. The data in the buffer 5064 may then be sorted and loaded into the database 5035. The new operation limits (see FIG. 41A) pre-set by a supervisor for that electronic key are then downloaded into the key 5031.

In accordance with a feature of the embodiment, the operation of refreshing the key and downloading data from the key is automatic, without requiring a user to oversee or activate each of the steps involved in the process. All the user has to do to initiate the key refreshing operation is to place the key 5031 in the cradle 5036 and press the transmit button 5039 of the key, and the software program 5034 will finish the operation without requiring further attention from the user or system administrator. During this process the database 5035 proceeds to service the key without prompting the user to enter any information or data at the computer either before or after the key is initiated. As a result, the key refreshing operation may run in the background, without the need to have an open window on the computer screen, thereby allowing the computer 5032 to be used for other operations such as word processing or communications over the Internet. To service the next key, the previous key is removed, the new key is inserted and its transmit button is pressed. Again, the database proceeds to service the key without prompting the user to enter any information or data at the computer either before or after the key is initiated. The docking or refresh operation can be performed without the supervisors present, which allows the system to perform without daily maintenance.

Figure 42A:
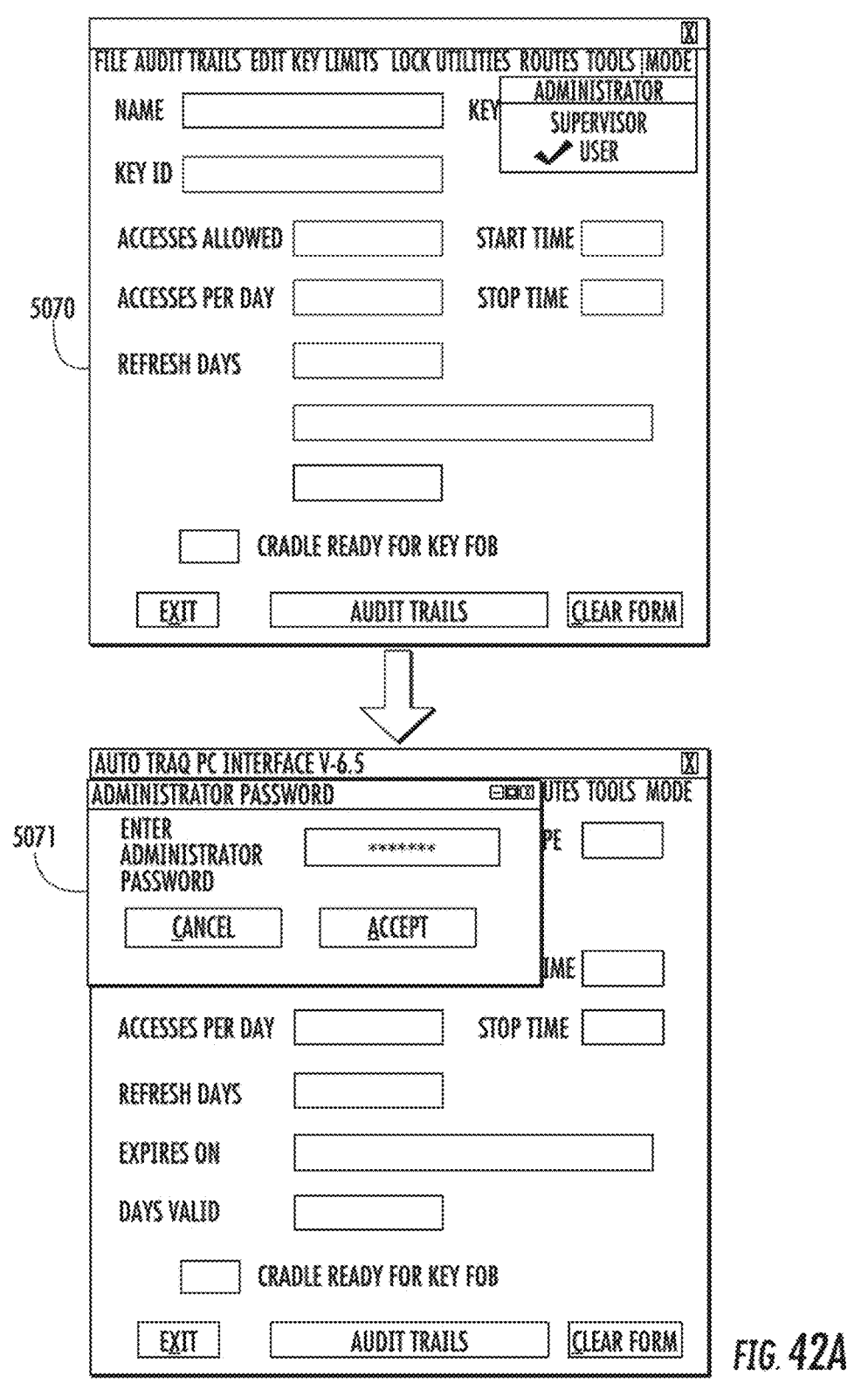
Figure 42B:
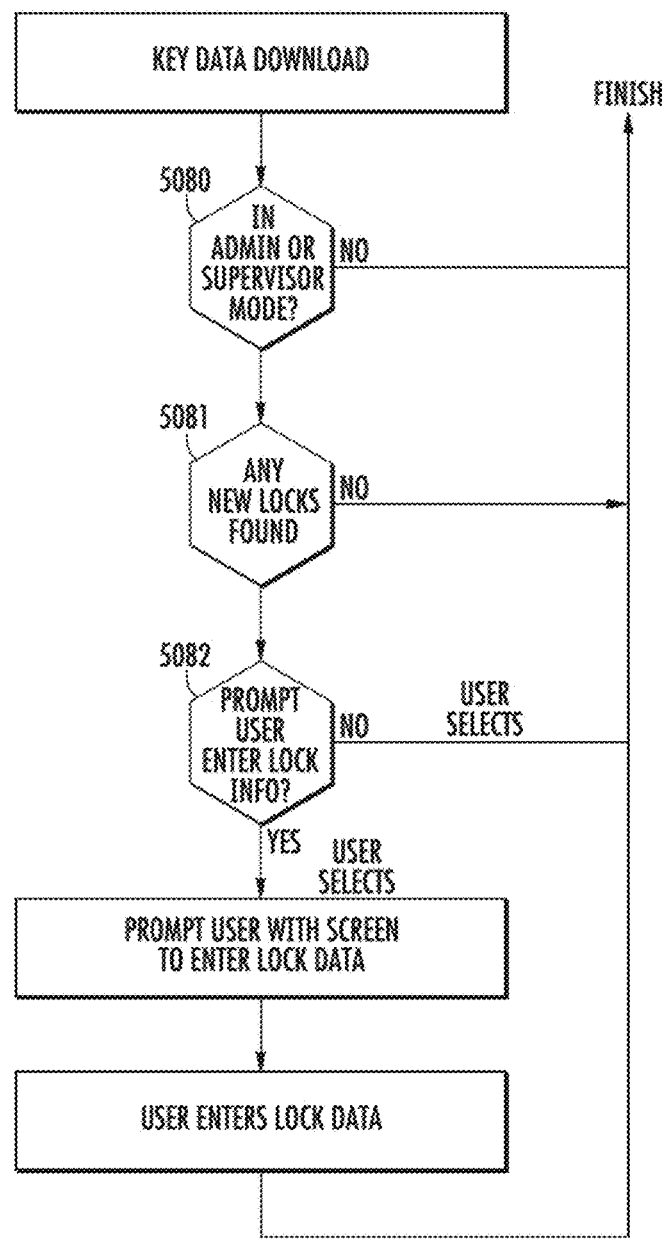
FIG. 42B is a flow chart showing a process for a user to enter electronic lock information.

FIGS. 42A & 42B illustrates an advanced set-up feature of an embodiment of the key management system that is only accessible by entering a secure operating mode, which may be either the "Supervisor" or "Administrator" modes. As shown in FIG. 42A, the software first presents a key control window 5070 similar to that in FIG. 41A. By clicking on the Mode option in the Menu bar, a user can select to run the software in a Supervisor mode or a User mode. Selecting the Supervisor mode causes the software to open a password entry window for either the administrator or supervisor. The user then enters the password as an administrator or supervisor into the field provided. In one implementation, an administrator oversees multiple supervisors, while each supervisor supervises multiple users to which electronic keys are assigned. When a user signs in as the administrator, he can use the software to add or remove supervisors from the key management system as well as administrating the functions of the key management system. A supervisor can use the software to add or remove electronic keys and/or key users, and set or change key limit parameters.

As shown in FIG. 42B, when audit data is downloaded from an electronic key, the software program determines whether it is in the administrator mode or supervisor mode (step S080). If neither, the program finishes the key refreshing operation by loading new key parameters into the key. If the program is in the administrator or supervisor mode, the program checks the audit data received from the key to see whether the data contains identifications of any vending machine electronic lock that is not found in the database (step S081). In this regard, the audit data stored in an electronic key are collected from electronic locks in vending machines accessed using the electronic key. The audit data collected from an electronic lock contains, among other things, a serial number of the electronic lock. It is possible for the electronic lock of a vending machine to be programmed in the field to work with a given key before the ID number of the lock is registered in the database of the key management system. If the key management program finds a new lock serial number in the audit data downloaded from an electronic key, it prompts the user to enter the lock information into the database (step S082). If the user selects not to do so at that time, the program continues the key refreshing operation. If the user selects to enter the lock information, the program present a user interface window (step S083) to allow the user to enter information about the electronic lock (step S084). The program then continues to finish the key refreshing operation.

In accordance with an aspect of the embodiment, the electronic keys contain certain key codes for access authorization purposes. It is desirable to limit which keys can be serviced by which computers such that stolen or lost keys cannot be serviced at computers they are not authorized to be serviced at. Thus, the database preferably contains a feature to limit which serial number sequence keys it will service and which it will not service. If a key is not in this serial number range, the database, computer, and software will refuse to service it. The limit parameters are usually entered into the database by a supervisor just after installing the software.

Key Set-Up

Figure 43A:
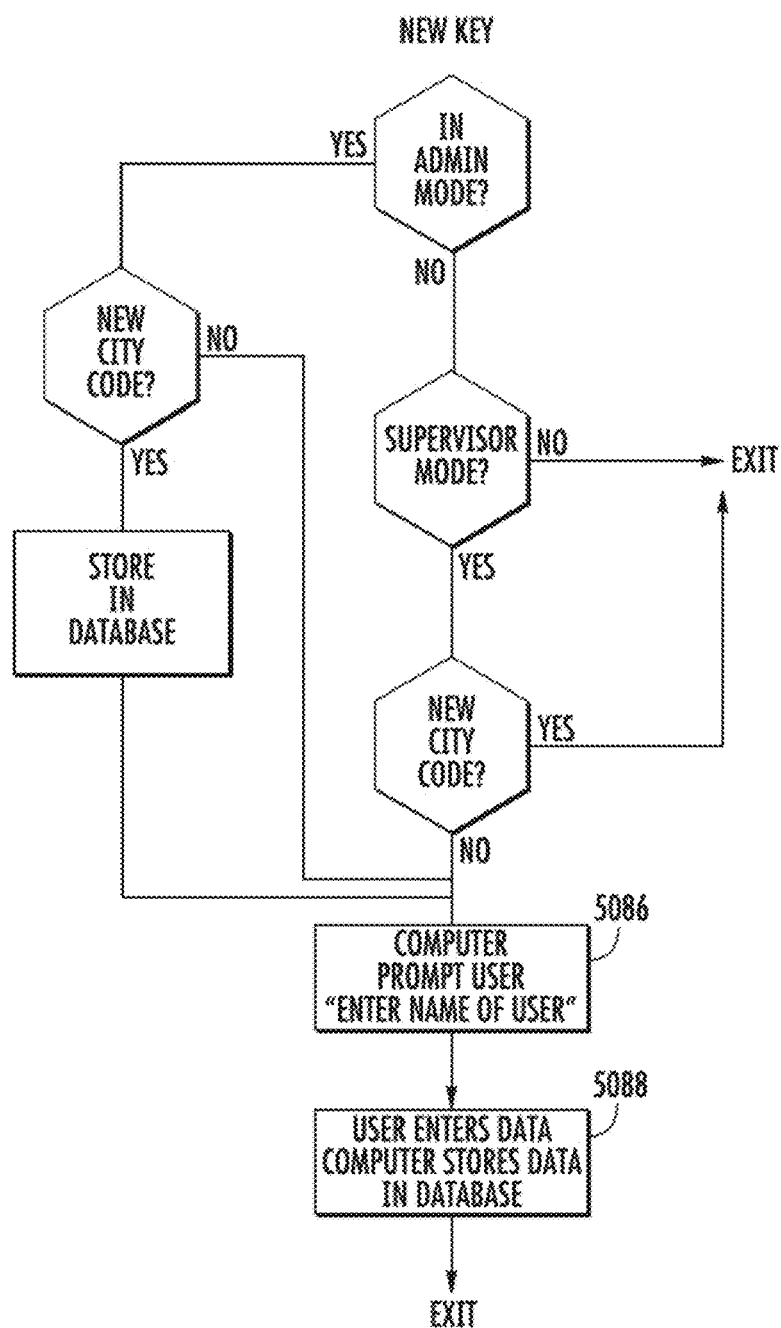
FIG. 43A is a flow chart for a process of starting up or logging in new keys.
Figure 43B:
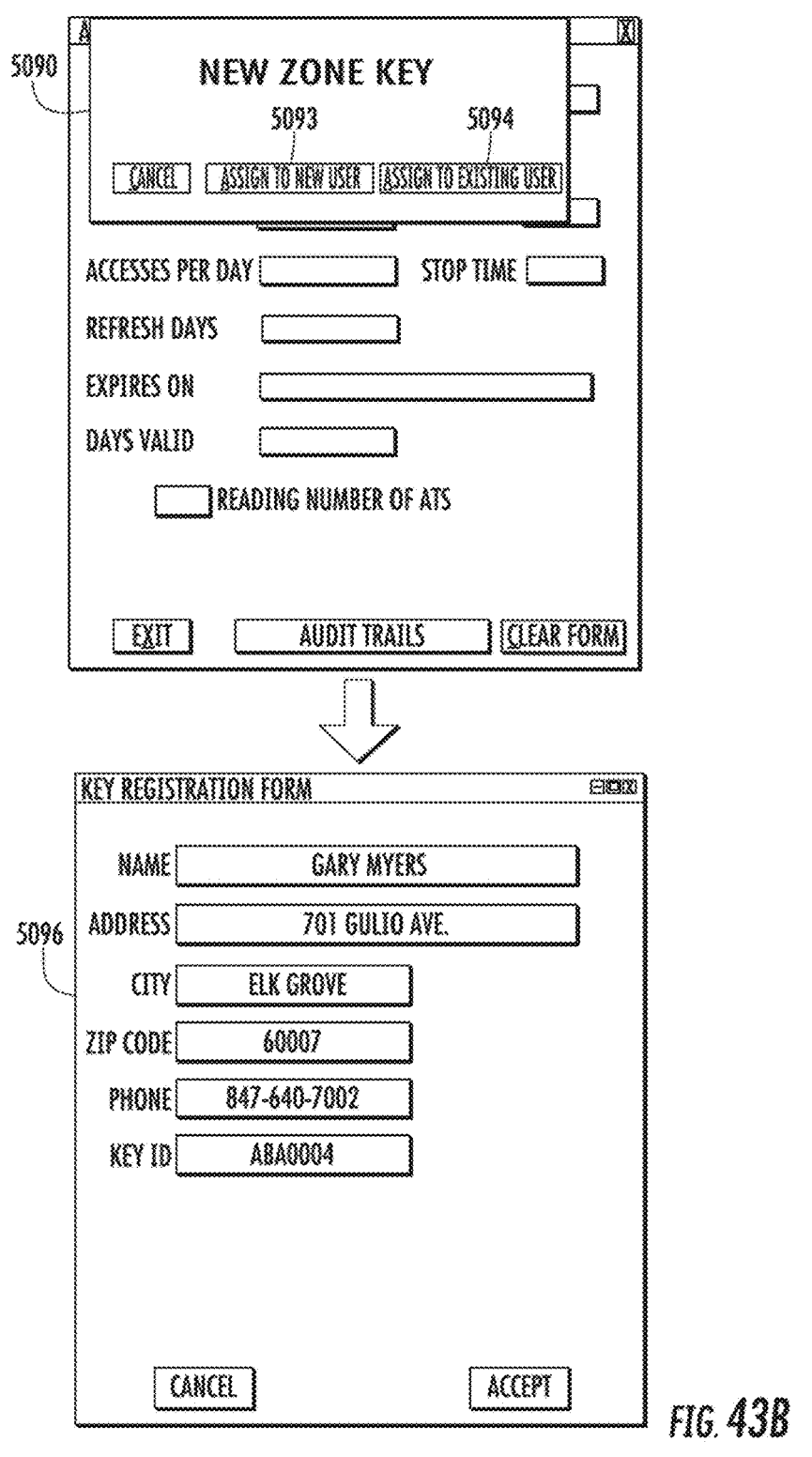

Certain set-up procedures are implemented in the system in order to make the security features of the system useful and easy to use. FIGS. 43A & 43B illustrate these features. First, the electronic keys need to be assigned to the employees. This is accomplished by a simple operation, as shown in FIGS. 43A and 43B. First, a new key never previously initialized (or not contained in the database) is placed within communication distance of the cradle station interface and the transmit button of the key is pressed. Next, the supervisor is prompted to enter the name or identifier of the user to which the key is to be assigned (step S086). The supervisor enters the required data, and the data is stored in the database (step S088). If it is for a new key user, the process is described in FIG. 43B. The software recognizes automatically that a new key is introduced into the system. In one implementation, the key indicator light stays "ON" and the cradle light stays "RED" when it is communicating with the key. Afterward, the program provides the user interface screen 5090 shown in FIG. 43B to prompt the supervisor or administrator to assign the key to either a new user or an existing user. If the supervisor presses the "Assign New User" button 5093, the screen 5096 appears for the supervisor to enter information regarding the new user who is going to use the key. After entering the information, the supervisor clicks on the "Accept" button, and the new user information is stored in the database 5035. Next, the transmit button 5039 of the key is pressed again, and the program presents the key control window to allow the supervisor to set the limits for the key operation. When the user enters this name, the database links the serial number embedded in the non-volatile memory of key with the name for reference purposes. Also, a set of default limits are assigned to the key in the database, such as 200 total accesses, 20 access per day, 6 AM to 6 PM operation, 7 days of operation, Monday through Friday operation. FIG. 43A also illustrates how only the supervisory or administrator sets the database up to allow the territory code to communicate to the database.

In managing the keys in an on-going basis, the supervisor may use the system to check the limit parameter status of the keys to quickly see which keys are either expired or approaching the end of their operation limit parameters. This is accomplished for example by selecting the "Edit Key Limit" menu on the main screen of FIG. 42A. In response, the program displays a list of the registered electronic keys and for each key the expected time and date the key will exceed its limits in a row and column format for viewing by the user.

Figure 44A:
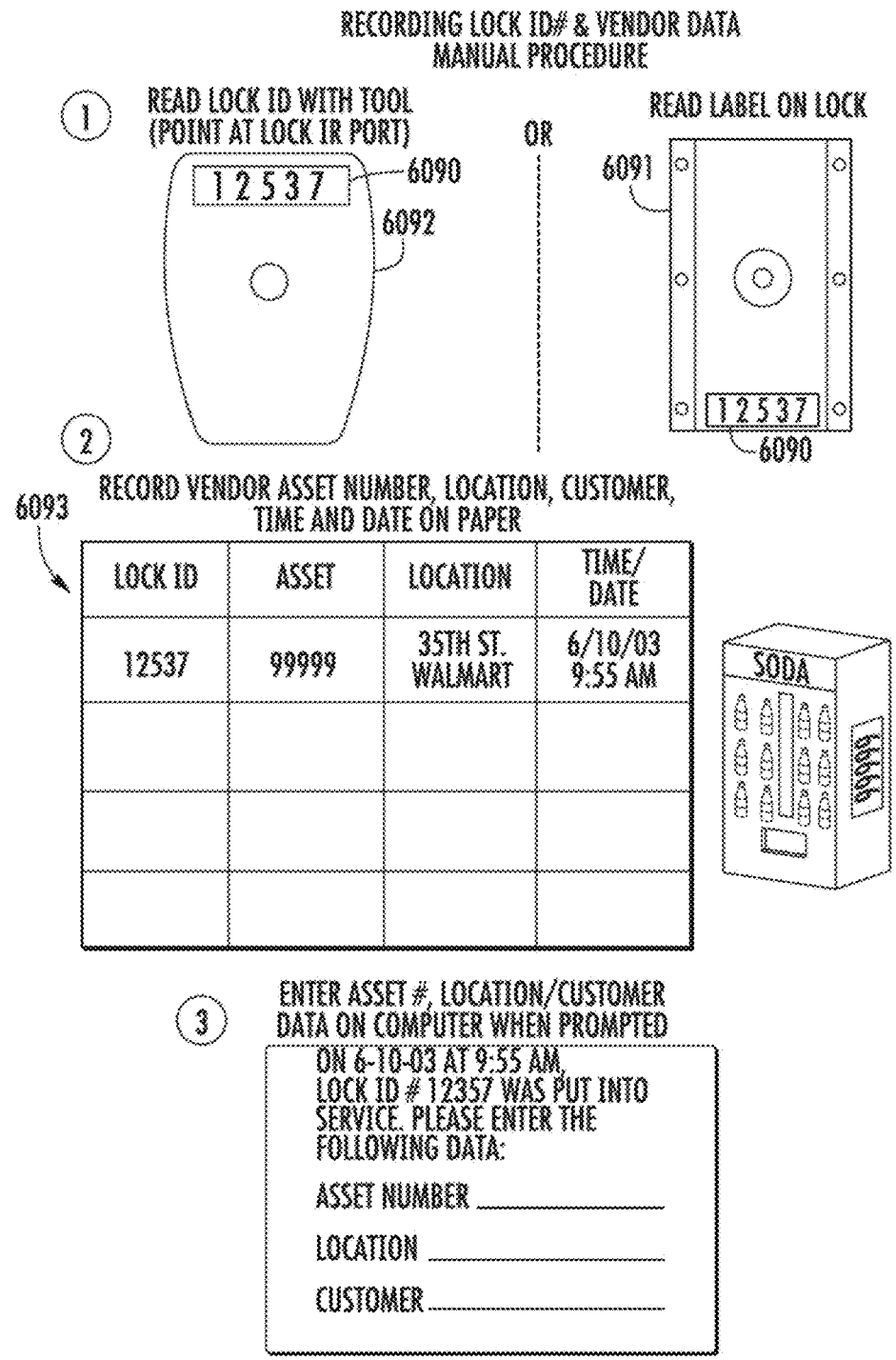
FIG. 44A is a schematic diagram showing a process of collecting electronic lock ID information.
Figure 44B:
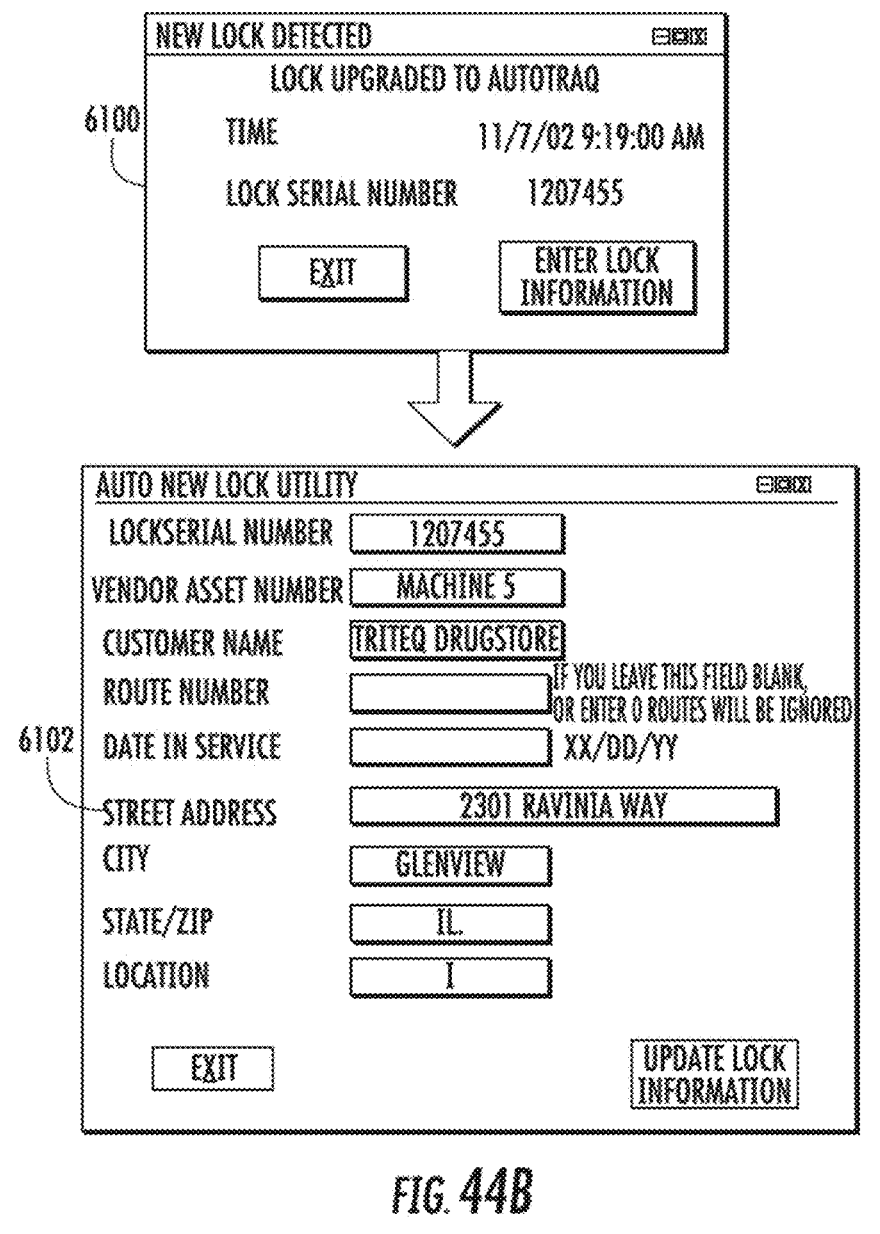
Figure 44C:
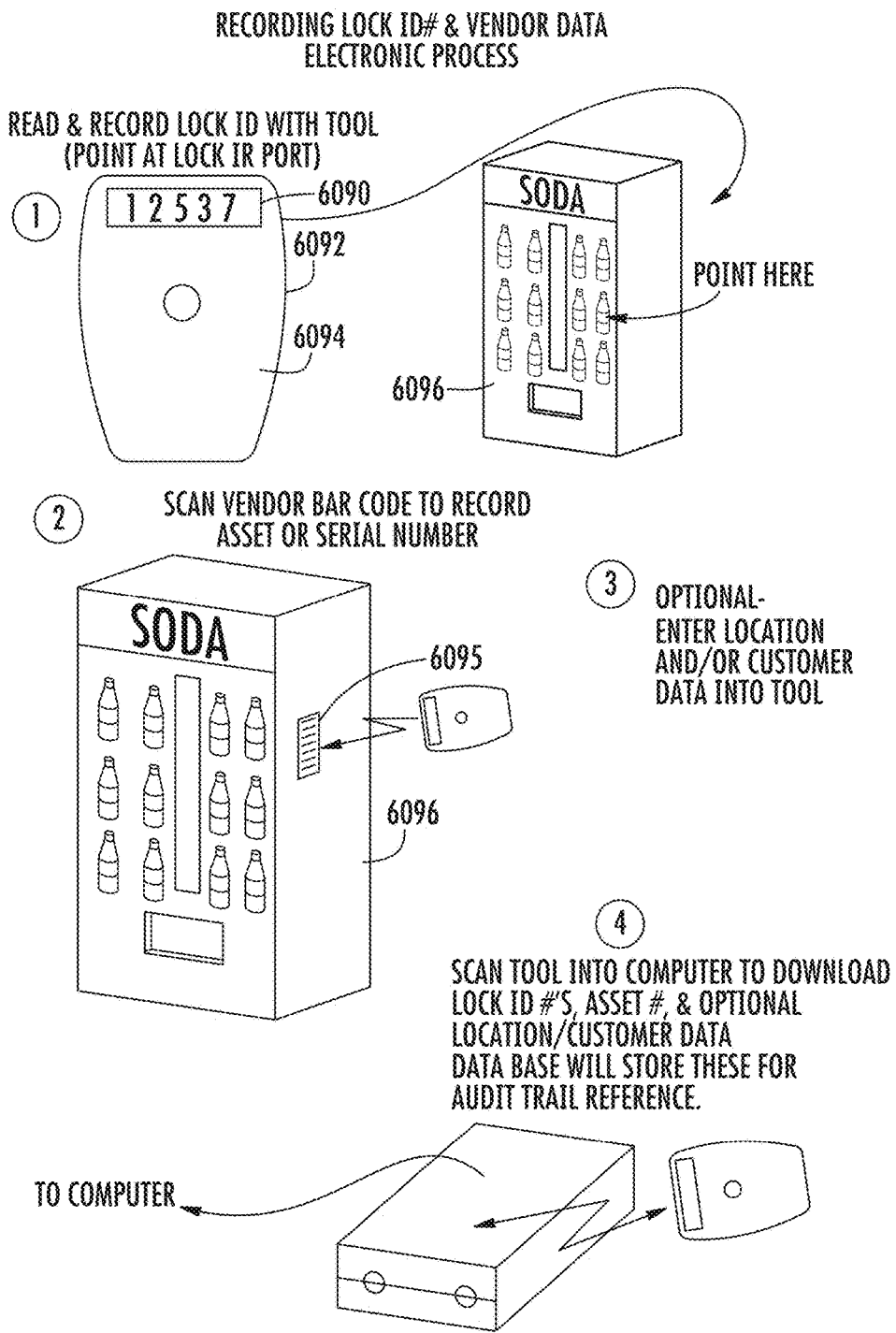
FIG. 44C is a schematic diagram showing an alternative process for collecting electronic lock ID information.

Next, the electronic locks to be accessed with the keys need to be assigned to Customers, locations, and/or asset identifier numbers (identification data). FIGS. 44A-44C illustrate two methods. This procedure is necessary because the lock is initially identified by the database using a lock serial number embedded inside the lock non-volatile memory that is not easy or obvious for the user of the system to reference or identify to. Once each lock is referenced to a number or name that the user can more easily identify with, understanding and using the audit trail data will be more likely. There are several possible procedures for entering the lock information. Each procedure is possible even if the lock is remotely located from the computer and either cannot or does not directly transfer its serial number to the computer and database.

In one procedure shown in FIG. 44A, the lock serial number 6090 is printed on a label 6091 attached to the lock as an alphanumeric number or as a barcode or other identifier. This number can be visually read and recorded in a form 6093 along with the customer, location, and/or asset identifier number for the lock, and then manually entered into the database 6035. The disadvantage of this system is if the serial number label is lost or not legible, it would be difficult to identify the electronic lock.

In another procedure also shown in FIG. 44A, the lock serial number 6090 is not printed on a label, but is read from the lock by a diagnostic tool 6092 to make certain the correct serial number is recorded. This number can be visually read from the tool display, recorded along with the customer, location, and/or asset identifier number, and manually entered into the database. In this procedure, a lost label on the lock will not impede the process.

FIG. 44B describes the manual entry process of entering the collected lock, vending machine, and location information and entering it into the database. In the shown example, a key assigned to a user "Gary Myers" has visited a new vending machine that are not registered in the database 6035. The electronic lock information is time-stamped into the key when the key is used to access the lock. When the key user returns to the key management system 6030 and places the electronic key into the cradle 6036 for key refreshing operation, the lock information is downloaded from the key to the computer. The program notices that the downloaded key data contains new lock information not already entered into the database. For each new electronic lock identified in the key data, the program presents a "New Lock Detected" window 6100 on the computer screen showing the lock serial number and the time at which the lock was accessed. When the user clicks the "Enter Lock Information" button, the program presents a "New Lock Data" screen window 6102 to allow the user to enter detailed information about the vending machine containing that electronic lock, such as the vending machine asset number, customer number, route number, date in service, and location address, etc. After entering the information, the user clicks the "Update Lock Information" button, and the information is stored into the database. The program than presents another "New Lock Data" screen for the next new lock identified in the downloaded key data.

In another procedure shown in FIG. 44C, the user has an electronic tool 6094 that electronically reads or scans the serial number 6090 from the electronic lock (either by communicating with the lock or reading the printed label) and electronically reads or scans an identifier label 6095 on the vending machine 6096. This electronic reader or scanning device links the two identifier numbers together in memory. This procedure can be repeated for many vending machines for as long as the reader does not run out of memory. After the scan/read process is completed, the reader 6094 can download its data into a computer that can ultimately transfer this data to the database. In this procedure, the lock and vending machine data is electronically linked, so the manual data entry procedure can be avoided.

Lock-Database Data Exchange

In accordance with an aspect of the embodiment, data may be exchanged to/from electronic locks of vending machines and the key management database 5035. One method involves using an electronic key to collect the audit information in the lock and ultimately transfer this data to the database 5035. In alternative embodiments, wireless communications may be used for the data transfer. For example, the lock can communicate directly (or indirectly) through a wireless medium to a computer transceiver interface to transfer the data to/from the database. The preferred embodiment described below uses the electronic keys to transfer the access limits and the audit trail information, but this embodiment is not limited to this method.

Figure 49:
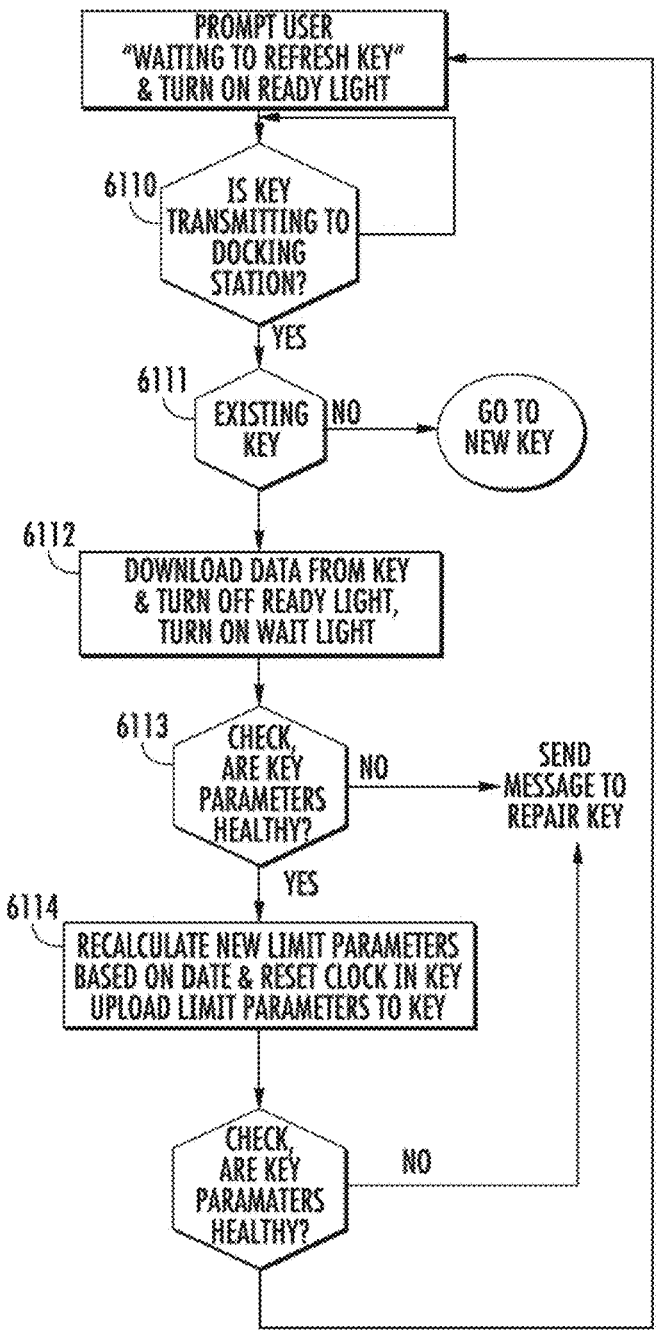
FIG. 49 is a flow chart showing a process of refreshing the memory of an electronic key.

During service of the key 5031, data is exchanged from the key to the computer 5032 and from the computer to the key as described in FIG. 49. Before this exchange takes place, the cradle 5036 is in the receive mode, wherein any transmission signal from the key will initiate the data exchange process. The timing and sequence of the data exchange is automatic, and it is only necessary to initiate one start operation at the key to exchange the data in both directions. The communication between the key and the cradle is preferably protected by bi-directional encryption methods. During the process, the program determines whether the key is transmitting to the cradle (step 6110). If the key transmission is received, the program determines whether the key is an existing key or new key (step 6111). If the key is an existing key, the data stored in the key is downloaded from the key (step 6112). The program then checks whether the key parameters are healthy (step 6113). If so, the program retrieves or recalculate new limit parameters for the key, reset the clock in the key, and upload the limit parameters into the key (step 6114). The computer will proceed to service the key provided it is authorized to do so. Such authorization may be provided in the database locally stored on the computer hard drive. One can have such authorization at multiple computers if the authority is granted.

In the event of multiple computers authorized to service the same keys, rather than having multiple computers with multiple databases local to the respective computers, it may be more convenient to have one database residing on a central server or shared drive so more than one computer and cradle can be used to service the keys. Thus, the authority to service the key resides in one database and all of the data exchanged is managed in one database rather than multiple databases. In that case, the data exchanged from the key to the computer may be immediately transported to the database or stored locally at the computer and later processed by the computer and loaded in the remotely located database. This may be a more desirable process since the data transfer may be very time consuming during heavy traffic hours on the network and may better and more reliably be transferred during low traffic times.

During this data exchange process, the health of the electronic key can be diagnosed. For example, the clock in the electronic key is read by the computer and compared to the clock in the computer. If there is a mismatch in time, the computer can alert the supervisor that the key can a faulty clock or battery. Likewise with the memory in the key. If the data exchange process is not successful, the battery or the memory may be suspect to be faulty, and the computer will display this fault for the user or the supervisor so the battery can be replaced or the key taken out of service.

Audit Data

During service of the key, the vending machine audit data collected by the key is downloaded from the key to the cradle 5036, next to the computer memory buffer 5064, and last to the database 5035 of the computer. The data is managed by the supervisor by allowing each lock serial number to be identified in the database by the customer, location, and/or asset identifier number as previously described is set-up. The software may allow several options for managing this data in the database. This process is executed only one time for identifying the asset number, and one time for each time the vending machine is assigned to a customer or a location. The processes for identifying this data are as follows:

Pop-Up Request Process

FIG. 44B illustrates this process. In this process, the software will run a test while in the supervisor mode that will search the lock serial number in the data base. If no such number is identified, the software will prompt the supervisor to enter the data. The software will provide as much information about the vending machine as possible to help for the identification, such as the time and data the lock was first put into service or accessed.

Manual Process

The software will provide a menu to select the identification process. Next, a drop down list will list in numerical order all lock serial numbers that are not identified. Next, the user will select the lock that he/she wishes to identify. After selected, a screen is provided to enter the data. Also provided is a field for entering the effective data in case the identification data is entered several days or weeks after the data the data is valid.

This process can also be executed when viewing audit events from the database. In this situation, the lock serial number is displayed to identify the vending machine (in lieu of the vending machine asset number, customer, and location data). By selecting this number from this display position and clicking, the screen to enter the vending machine data will pop-up for ease of data entry.

FIG. 44B also illustrates that this process is also used after a lock is identified but the user wishes to change or modify some of the data, such as changing the customer information or location if a vending machine is moved or relocated. In this situation, the effective date field is used to properly record the exact date the change took place in case the data entry follows the change by a delay period.

Automatic process. It is possible for the identification data to be transferred automatically into the lock database. This identification data will be entered separately from another computer and/or database which separately contains the vending machine identification data.

Figure 45:
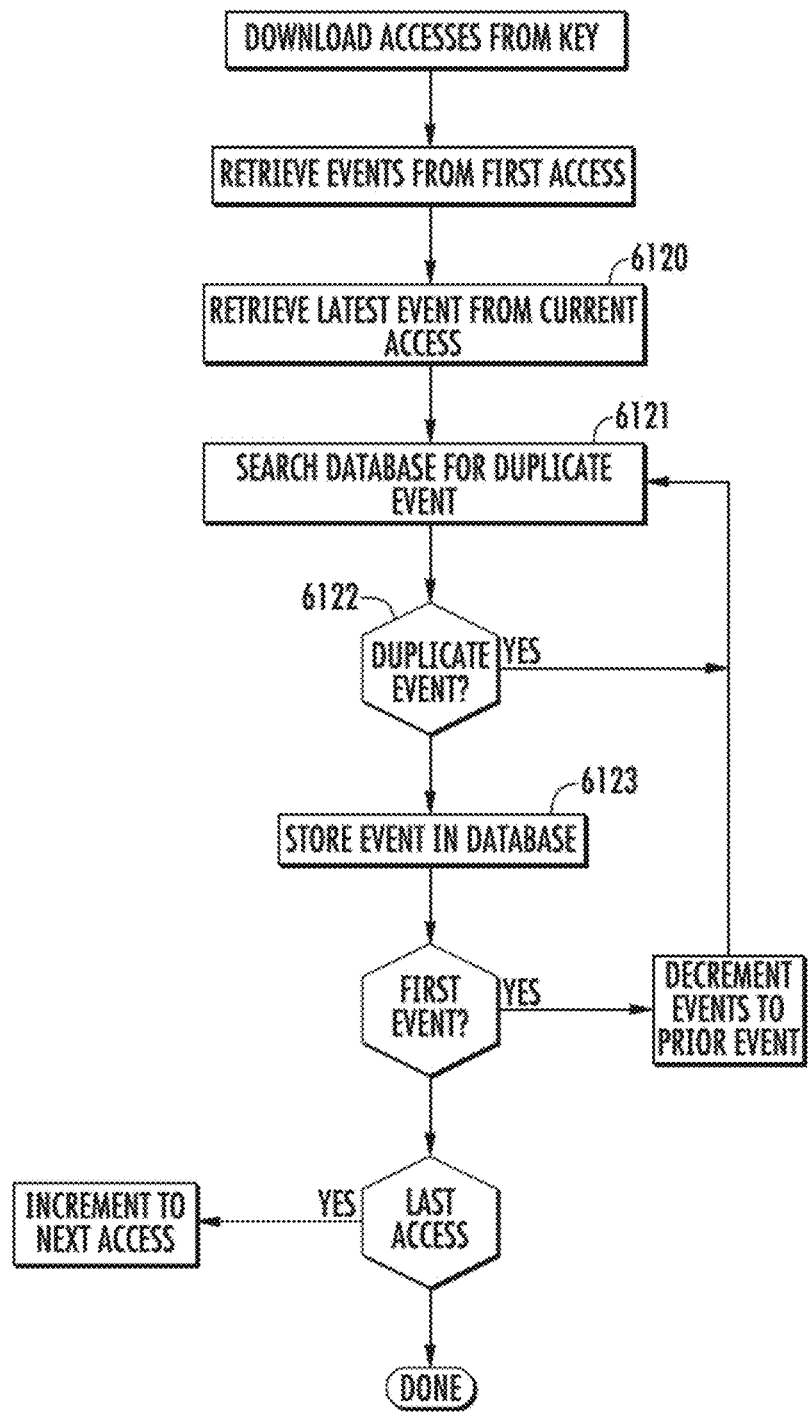
FIG. 45 is a flow chart describing a process of receiving and storing audit data.

Referring now to FIG. 45, as audit data is received from the key it is compared to previous data in the database. Since one or more key may bring duplicate access audit data back to the same database, it is necessary to compare the new data received from the keys with the data presently in the database and discard the like data so duplicate access data is not stored. To that end, when the program receives data downloaded from the key regarding an access attempt event (step 6120), it searches the database for any event that is duplicate to the downloaded event (step 6121). If a duplicate event is found in the database (step 6122), the downloaded event is discarded. Otherwise, the event is stored into the database (step 6123), and the program moves to the next event described in the downloaded data.

If access data is determined to be new, it is stored in the database 5035. Suitable data sorting techniques are preferably used in order to efficiently store this data, and to efficiently retrieve this data in the future, and in the future compare this data to new data collected. The software shall be configured such that the audit information in the database cannot be modified or deleted, either accidentally or on purpose, in order to preserve the integrity of the security monitoring system. After audit data is stored in the database, certain data sorting techniques are required to make the viewing of the data useful.

Figure 46:
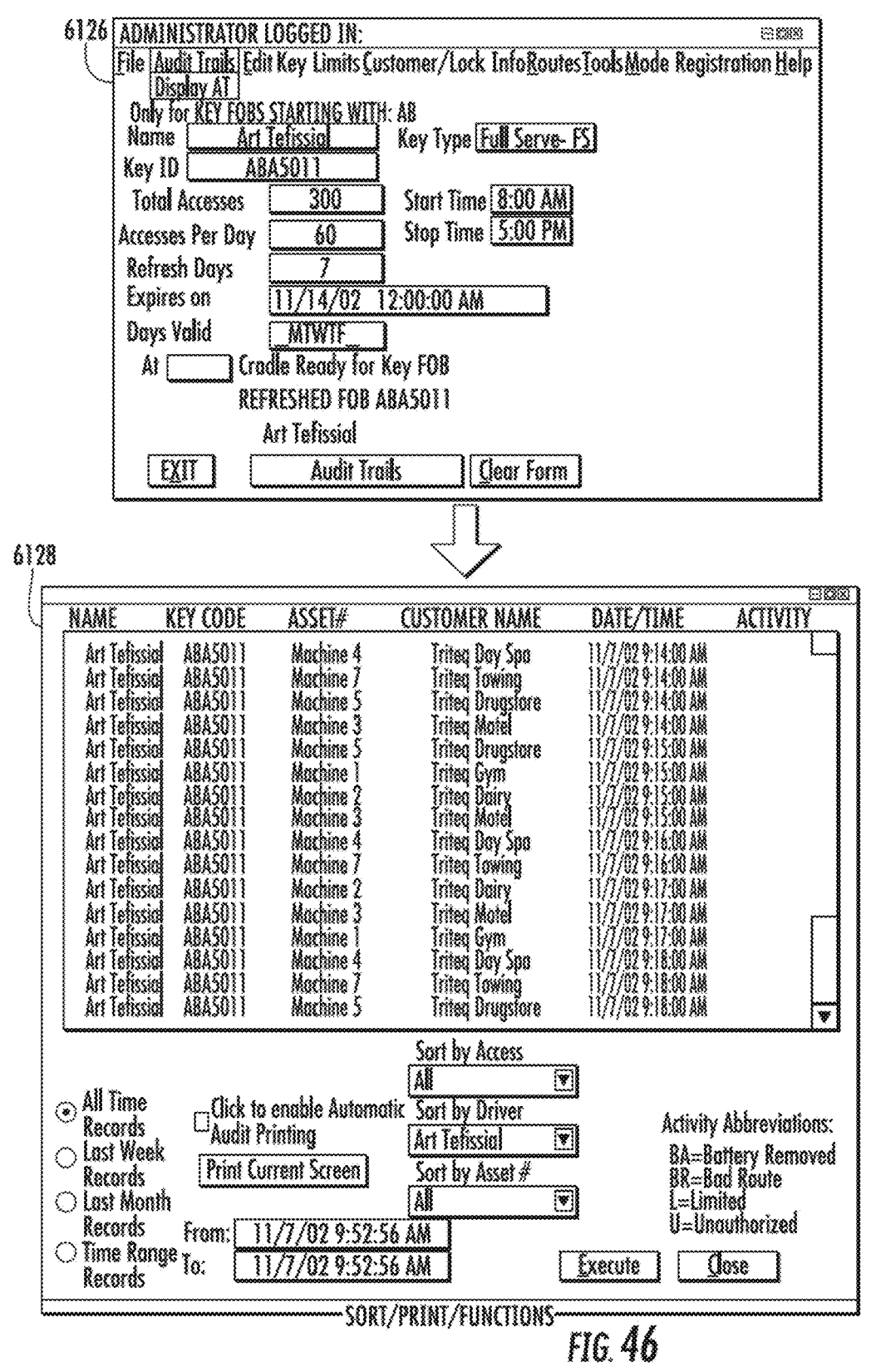

For example, FIG. 46 illustrates it is possible to sort and view the data by Access, by Driver or Employee, by Asset number, or between certain time and date periods. Each of these sort parameters can be combined to sort multiple combinations of parameters. Also, as the audit information is displayed, unusual activity that occurred before or during the access event can be displayed, such as Battery Removed (from the key), Bad Route, Limited, and Unauthorized. To view the audit trails data, the user either clicks the "Audio Trails" button at the bottom of the Key Control Data screen 6126 or use the task bar menu. This function is only available to supervisors and administrators. The program then displays the audit trails screen 6128. The bottom portion of the screen 6128 presents sorting options that allow the data to be sorted in various ways, such as by time, access, key user, or asset number, etc. Different combinations of these options may be used to refine a search.

The audit trails data may also be printed. In one implementation, the printing options available are "Automatic Audit Printing" and "Print Current Screen." Automatic printing allows for printing when a key refresh is executed and prints all the new events the key has encountered. The audit screen does not have to be displayed on the computer screen to enable printing.

Limiting Operational Parameters for Keys

Limiting operational parameters are available for keys. To ensure the security of the system, in a preferred embodiment such new limits can be assigned only when the computer is in the Supervisor or Administrator modes. FIGS. 47A-47C and FIG. 48 illustrate the process.

Figure 47A:
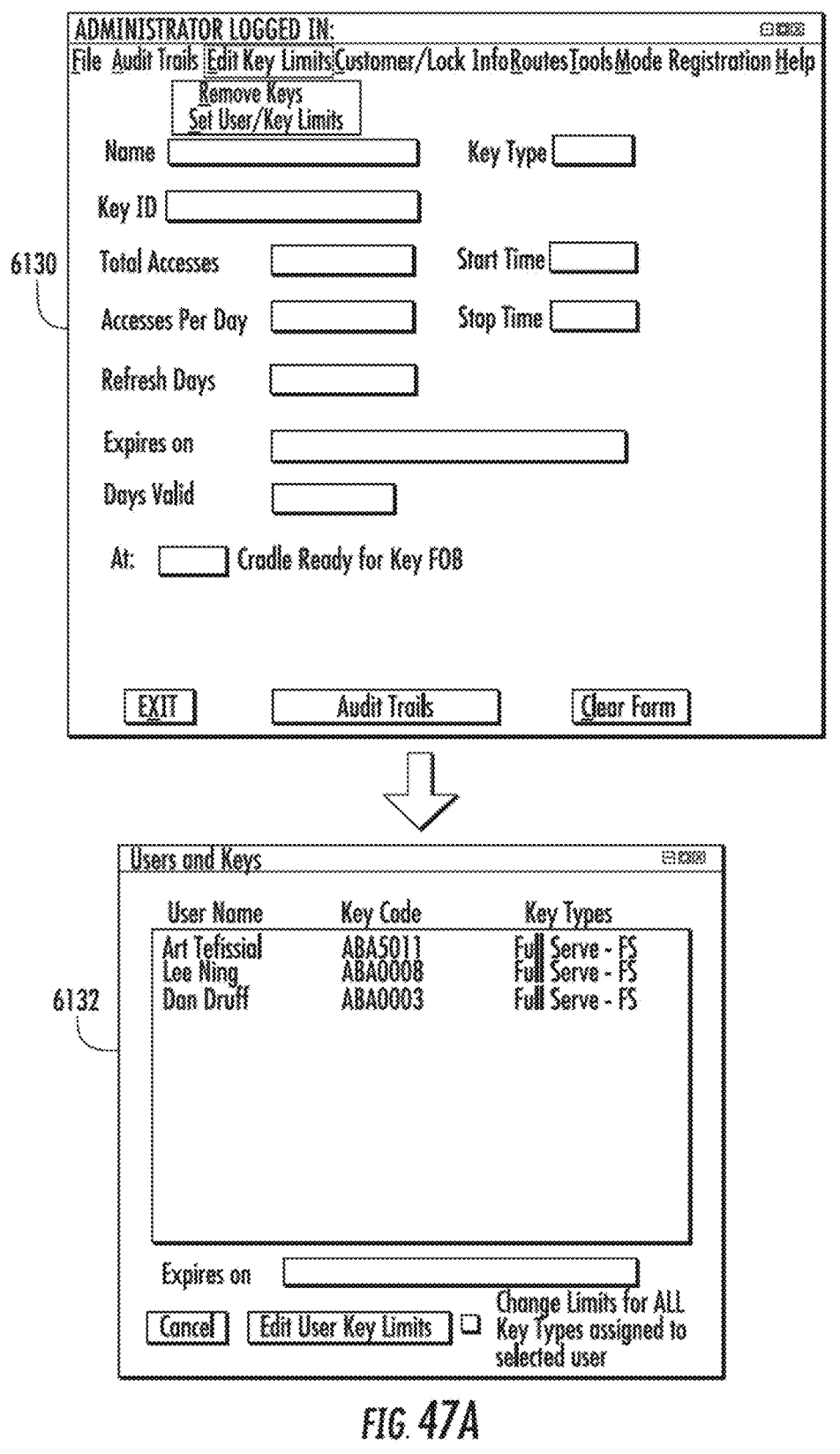
Figure 47B:
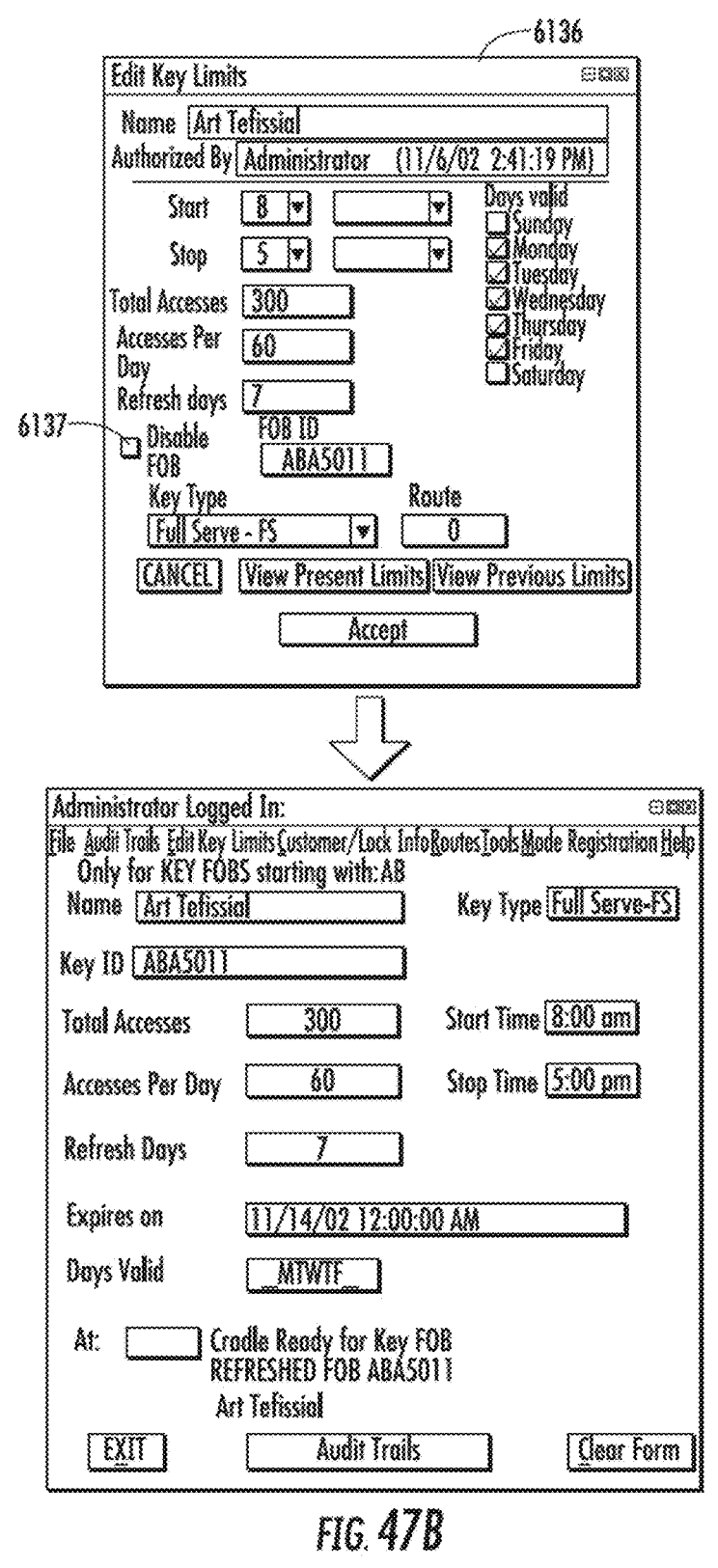
Figure 47C:
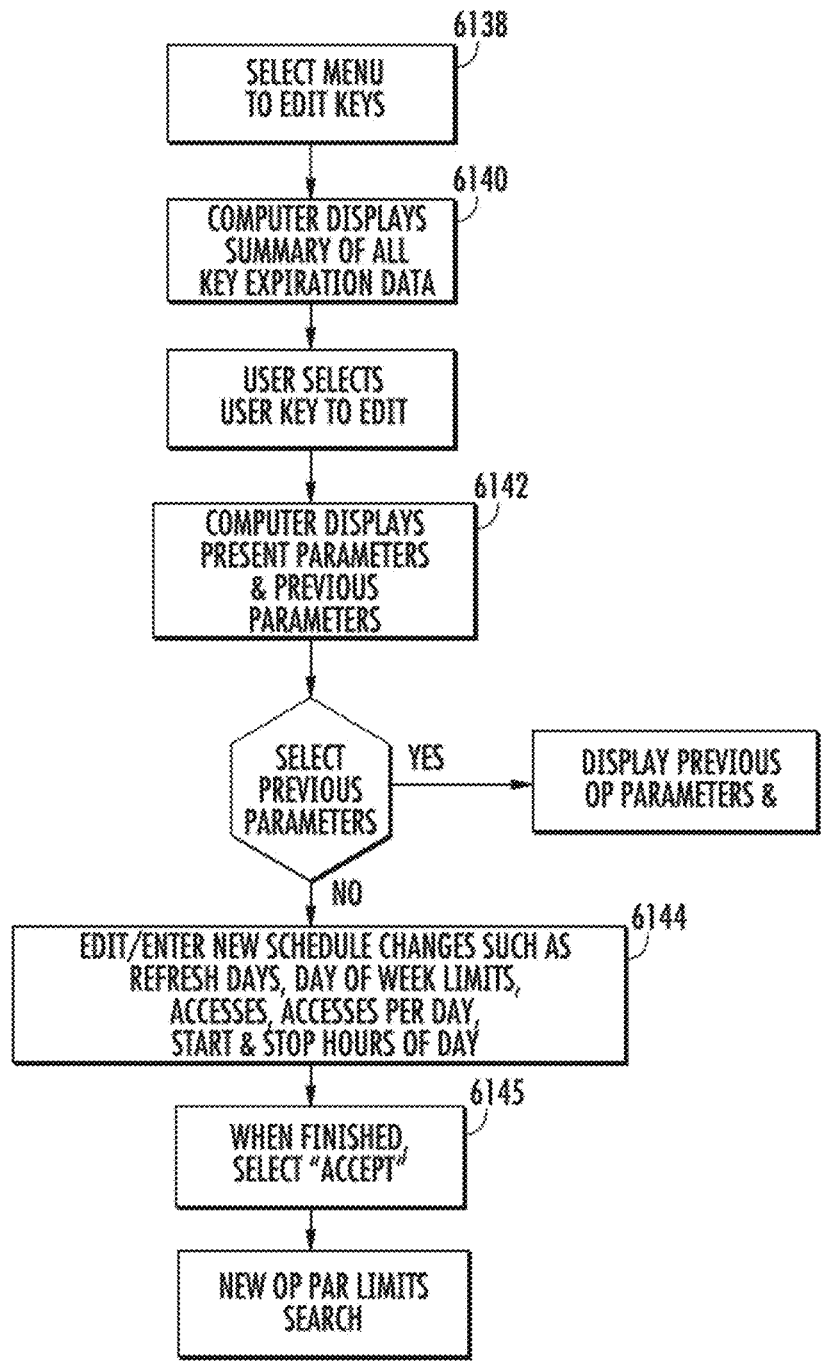
FIG. 47C is a flow chart showing a process of editing key limit parameters.

In FIG. 47A, if the supervisor wishes to assign a custom (non-default) set of parameters to this key, he selects the "Edit Key Limits" option in the menu bar of the screen 6130 and then selects the "Set User/Key Limit" option from the drop-down menu (step 6138 of FIG. 47C). In response, the system program presents a drop-down list 6132 of keys (by names assigned to the keys) which also displays the expiration dates of the keys (step 6140 of FIG. 47C). Next, as shown in FIG. 47B, the parameter customization screen 6136 is displayed by selecting the user or key. This screen shows the key parameters since the last key refresh operation. For security reasons, the software tracks which supervisor last authorized limit changes. By clicking on the two buttons "View Present Limits" and "View Previous Limits," the user can see when the last changes were made on the key and by which supervisor (step 6142 of FIG. 47C). On this screen, the pointer will move the cursor to the parameter the user wishes to change. The user then enters the desired value (step 6144 of FIG. 47C). After typing in the change, another parameter may be selected and changed. When all parameters have been changed, the "Accept" button is selected to record the new parameters in the database (step 6146 of FIG. 47C). At the time these are stored, the name of the supervisor operating the computer is also stored to archive the authorization in case a key is given limits beyond their approved level and an audit of who assigned these unauthorized limits is required.

A "Disable FOB" button 6137 is provided in the screen 6136 to disable the key at its next refresh. In this regard, if the key reaches any of the limits, it will become disabled. The key will indicate that it is disabled by flashing brightly three times when the key is in the cradle and the transmit button of the key is pressed.

After the new parameters have been stored, prior parameters for this key are also kept in the database for easy viewing. In addition, the time and date of the prior docking event and the parameters can be stored and easily viewed.

Figure 48:
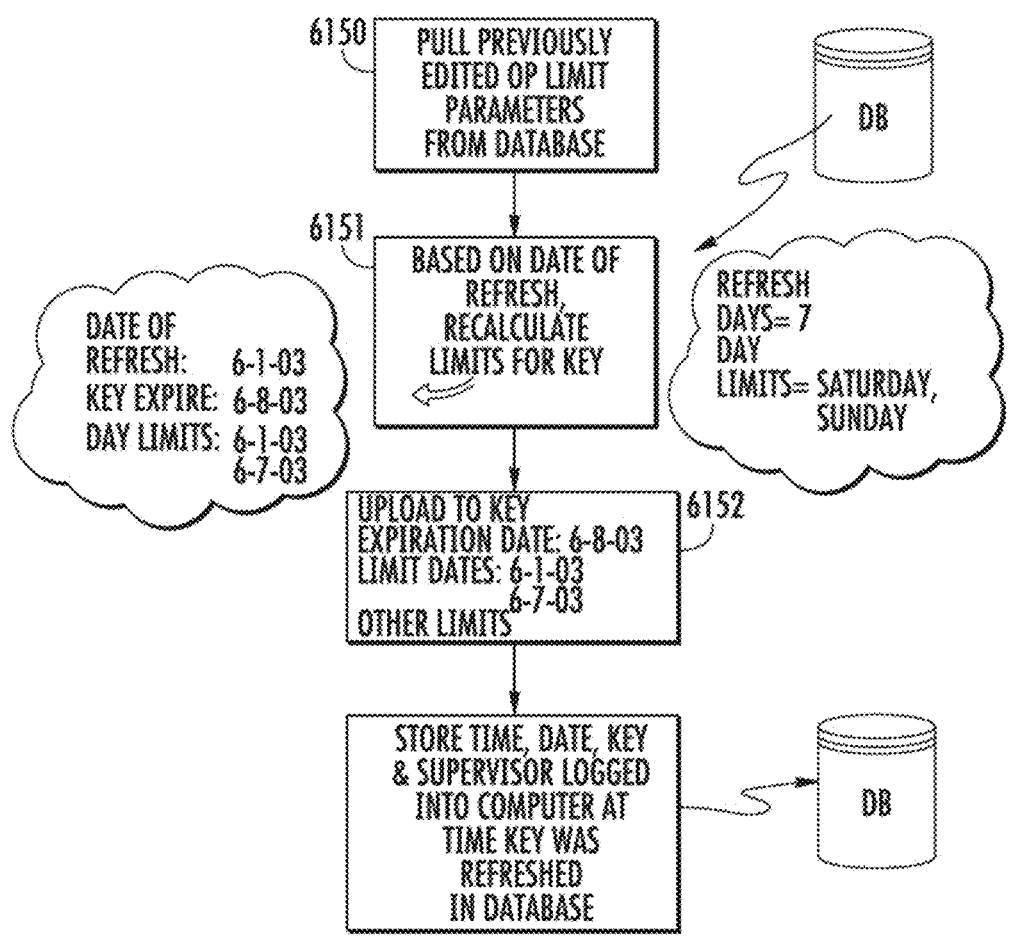
FIG. 48 is a flow chart showing a process of re-calculating key limit parameters during a key refresh operation.

Later, in a key refreshing operation, the button of the key is pressed on the key and the limit parameters are loaded into the memory of the key. FIG. 48 illustrates by way of example the process of re-calculating the limit parameters during the key refreshing operation. The program 5034 takes the limits defined for the key from the database (step 6150) and, at the time of refresh, using the existing date and time to calculate certain date specific limit parameters such as the date the key should expire and the days the key should operate (step 6151). Last, these parameters are loaded into the key (step 6152). This process allows the supervisor to maintain work schedules in the database for each employee and as long as the schedule does not change the expiration limits will be properly re-calculated at the time of each refresh. Thus, the supervisor does not need to maintain key parameters on a routine basis, as they are automatically calculated at each refresh based on the database information for each key.

In accordance with an aspect of the embodiment, it is advantageous to provide the capability of more than one docking station or cradle to service the same keys and vending machine locks. This is accomplished by providing a mechanism for either (1) multiple cradles communicating with multiple databases, wherein these databases would be synchronized and merged from time to time (FIG. 50); or (2) multiple cradles communicating with a single central database (FIGS. 51-53). The advantages and disadvantages of each configuration are described below.

Multiple Cradles Communicating with Multiple Databases

Figure 50:
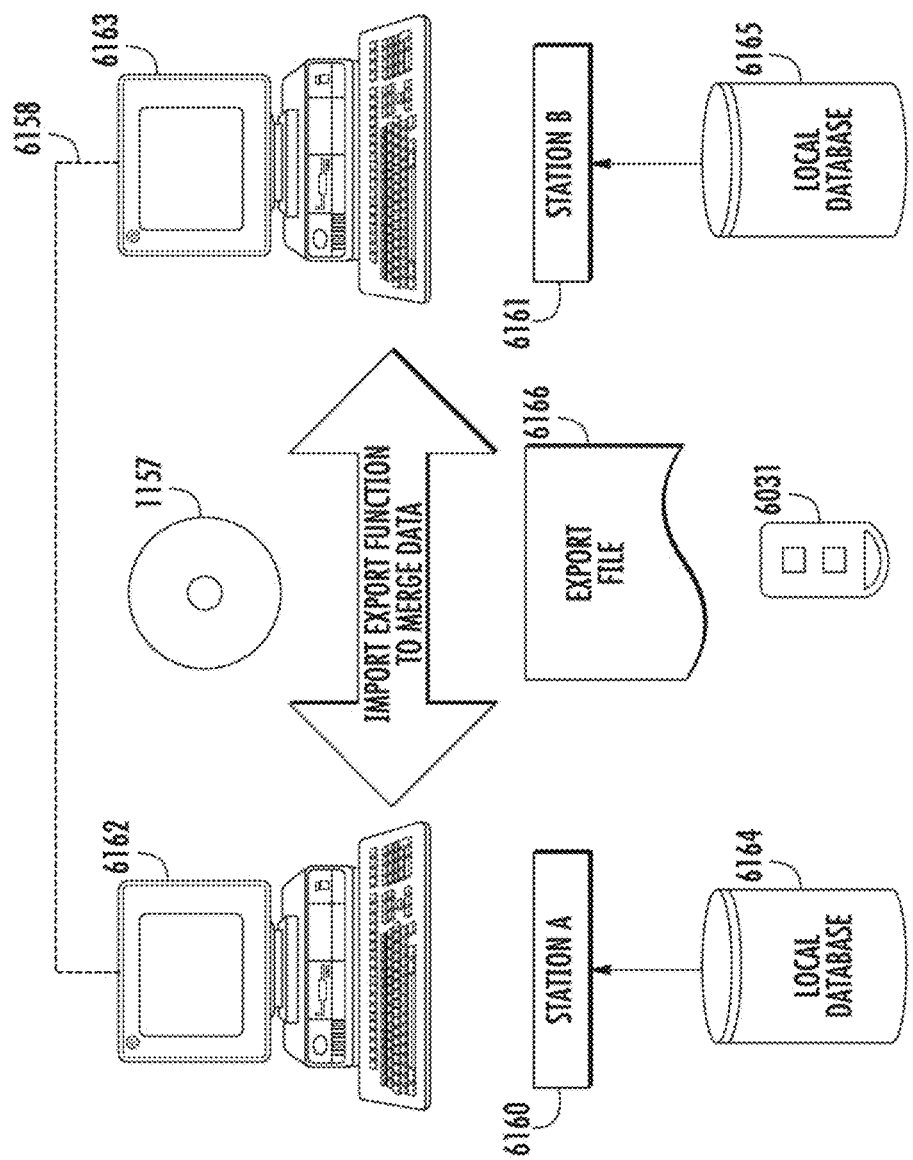
FIG. 50 is a schematic diagram showing a configuration of multiple key management databases that are synchronized using export files.
Figure 51:
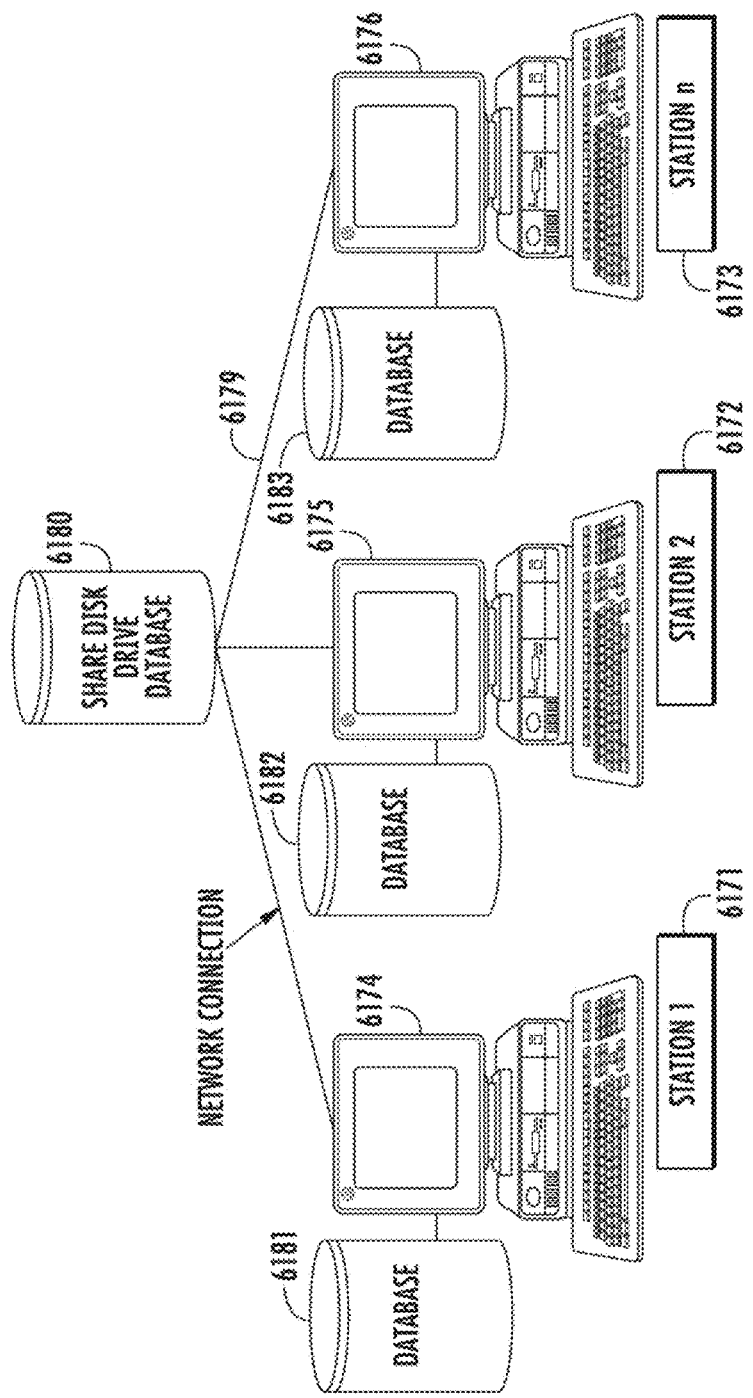
FIG. 51 is a schematic diagram showing a configuration with multiple key management stations connected via a network to a central key management database.

In one configuration illustrated in FIG. 50, multiple cradles are located at multiple separate locations, with each cradle interfaced to a PC containing separate databases. For simplicity of illustration, FIG. 50 shows only two cradles 6160 and 6161 attached to computers 6162 and 6163, respectively, but more cradles and computers at other locations may be included. In the illustrated embodiment, the database 6164 is accessible to the computer 6162, and the database 6165 is accessible to the computer 6163. The databases 6164, 6165 may be local to the computers 6162, 6163, respectively, or may be at remote locations and connected to the computers via network connections. It is possible to allow electronic keys to visit and be refreshed by more than one cradle/database. One way to accomplish this is to initialize each key into one cradle 6160 or PC database 6164. Once each key 6031 is initialized, the databases 6164 and 6165 may be synchronized. Synchronization is accomplished by exchanging the key and vending machine lock data from one database 6164 to another 6165 and vice versa until all databases share the same key and vending machine lock data. This may be accomplished, for example, by creating an "export" file by the export utility from each database that contains the key and vending machine data of the database.

The user interface screens 6167 and 6168 for this operation are shown in FIG. 54. In the screen 6167, the user selects to export the database, and in the screen the user identifies the path to the database file. In the illustrate example, the export directory contains the file DBOut.mdb as the container of the export file. The export file may be stored on a transportable medium, such as a floppy disk, a CD ROM 6157, a USB key, a memory card, etc. Alternatively, the export file may be transmitted to another computer via a network 6158, preferably in an encrypted format to ensure the security of the transmission. This export file 6166 is next presented to another computer database by using the import utility. This import utility will search for data in the export file that is not in the local database, and load this new data into the local database. If the data presented by the export file is a duplicate of data already existing in the database running the import utility, the data is not imported as a duplicate and is discarded. For example, if a vending machine lock serial number and location is in the export file 6166 and presented to the database 6164 by the import utility, but already exists in the database, it is not entered into the database. This import and export procedure should be executed on a regular basis and the key and vending machine data will stay consistent in each database.

Multiple cradles communicating with a single database: In an embodiment of this configuration shown in FIG. 51, multiple cradles 6171, 6172, 6173 are located at multiple remote locations, each interfaced to a separate PC 6174, 6175, or 6176 that has access to a shared database 6180 via a network connection such as a local-area network (LAN) 6179. Since there is only one database, there is no need for synchronization. In this embodiment, each cradle and PC has access to send/receive data to/from the network-centralized database 6180. There are several issues about giving access to the central database 6180 to more than one computer. One such issue is if two computers attempt to access the database at the same time, data could be lost or over-written. Another concern is the time it takes to access and communicate with the database. For example, if a significant amount of data must be downloaded from a key at one station, this download process could take several minutes to finish. If another key is also trying to download data and receive new access limits from another computer and cradle, the waiting time could be significant.

Thus, it is a feature of the embodiment to provide multiple cradles with access to the same database and provide a fast refresh time so employees are not delayed waiting for their keys to be refreshed. One mechanism to accomplish this is for each computer 6174, 6175, 6176 to hold a refresh buffer 6181, 6182, or 6183 locally in its PC in order to allow for fast refreshes during busy working hours, and during non-work hours when network traffic is minimized the PC will upload it's data in the database 6180 on the network. Also in this example the local PC may use the refresh buffer as a local database, or use a separate database, for holding the key limit data. This allows fast refresh of key limits, and would store the audit trail data in the buffer. A copy of the shared database is downloaded from the shared drive by each station and stored locally. In the case the connection to the shared database 6180 is interrupted, each individual station can continue servicing keys without interruption using the local database. In this mode, typically no changes or additions are allowed to the database such as key limits and vending machine information.

Database Compacting and Archive

Figure 55:
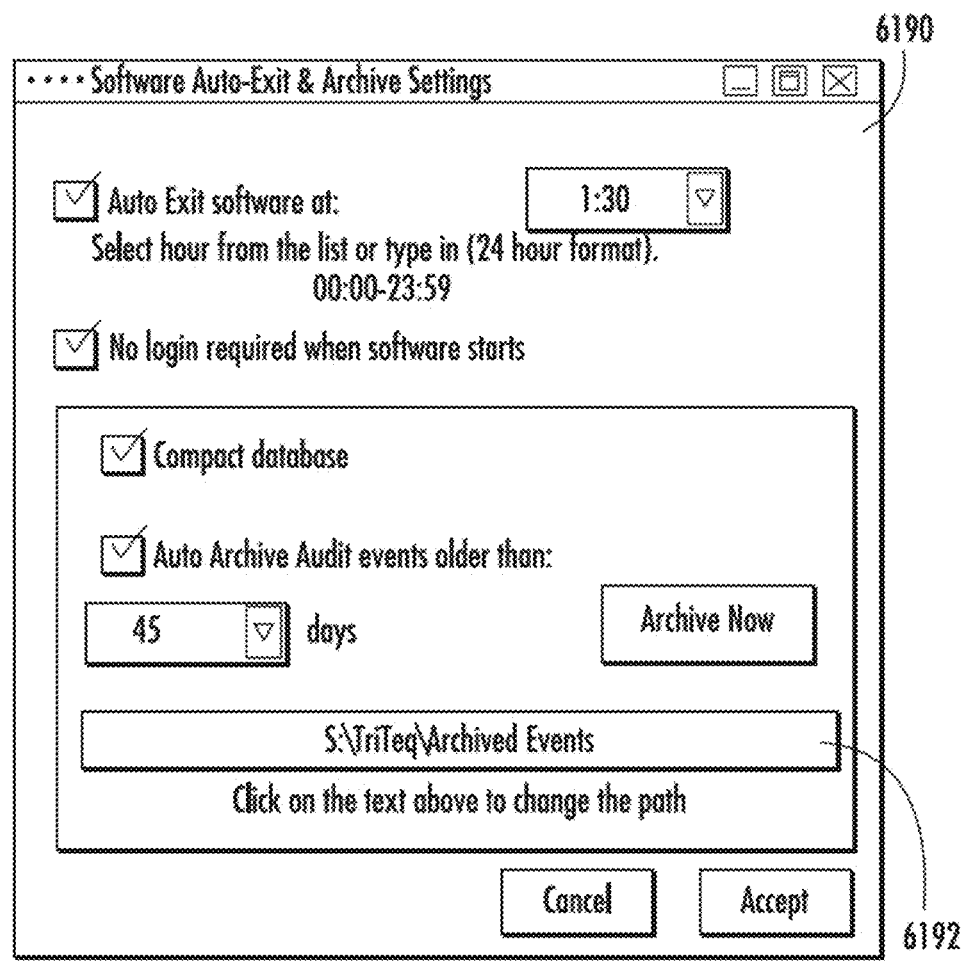
FIG. 55 shows a user interface screen for setting software auto-exit and archive settings.

Compacting and Archiving of the database are tasks that need to be executed at a frequency dependent on the amount of data that is being added to the database. The more data that is added, the more frequent these task should be executed. In one embodiment, the system allows the user to select an automatic compacting and archiving of the audit trail data. Also allowed is selecting automatic exiting of the software and automatic login of the software at selected intervals. FIG. 55 shows a user interface screen 6190 for a user to select the parameters. In this example, the user selects the system will automatically compact and archive each 45 days. Also selected is the path & location of the archive 6192. In addition, the system is capable of monitoring the amount of data entering the database and executing an automatic compaction and archive if a certain volume of data is moved into the database.

System Start/Exit

Figure 57:
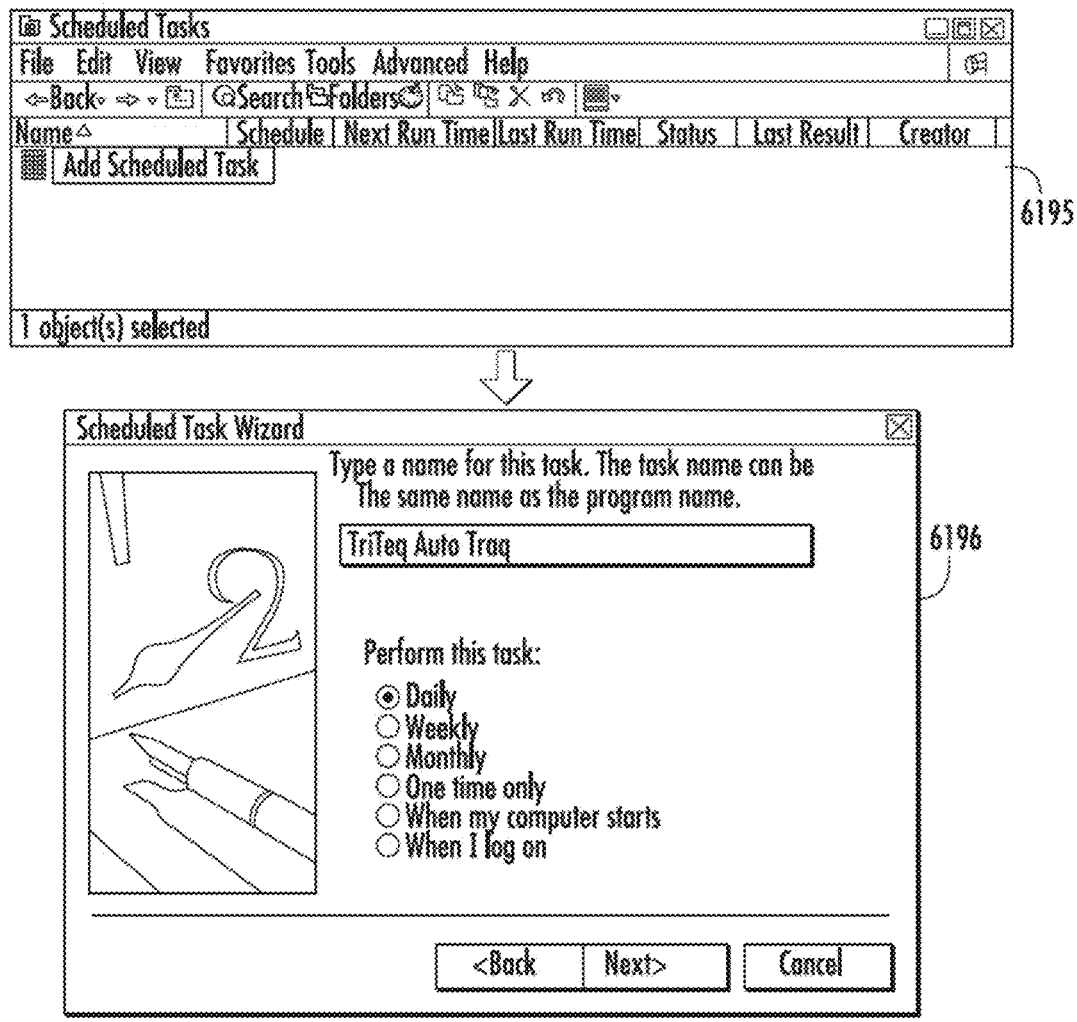
Figure 58:
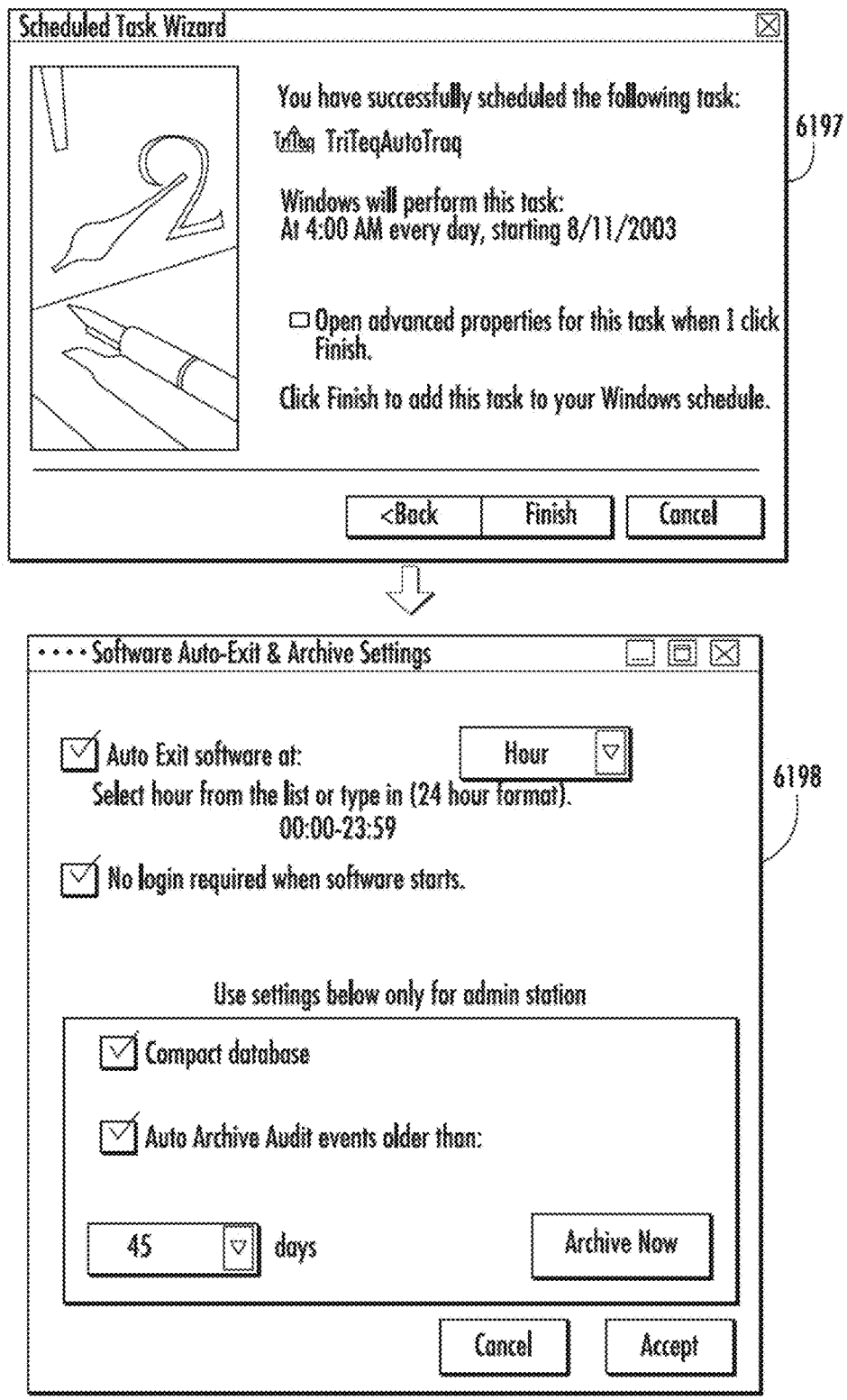
Figure 59:
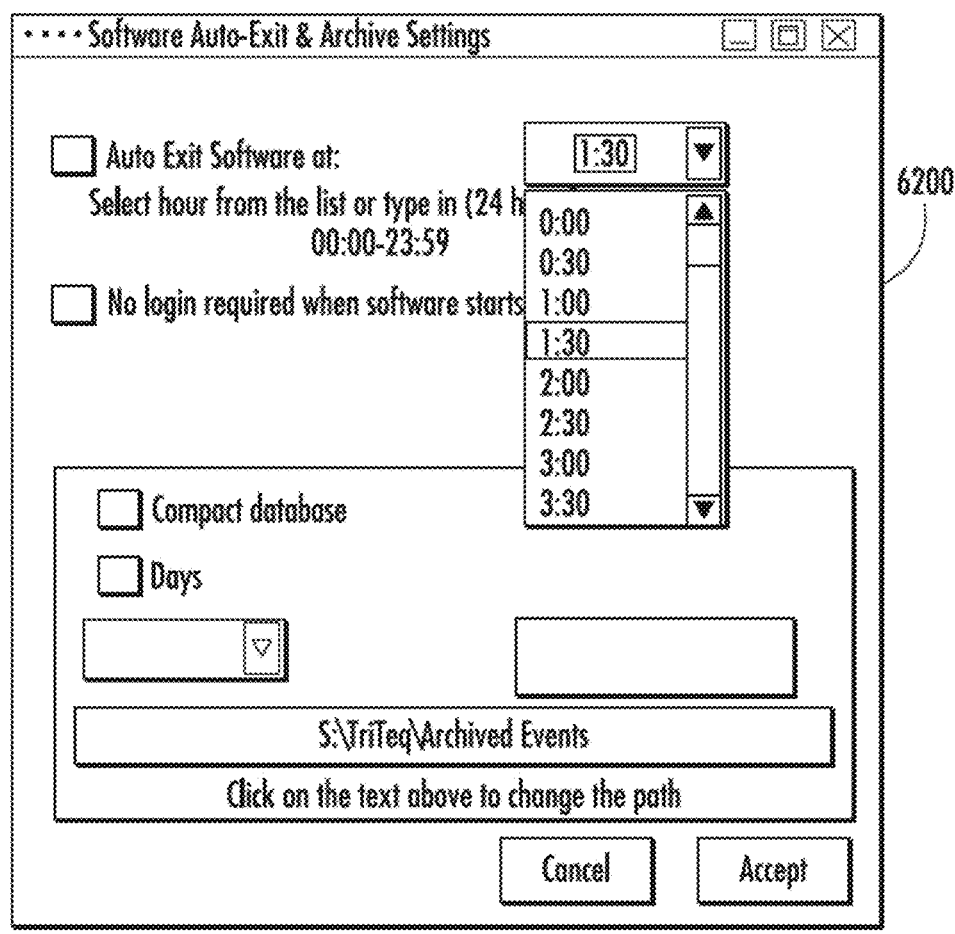
FIGS. 59 and 60 show user interface screens involved in setting the auto-exit time for the key management system.
Figure 60:
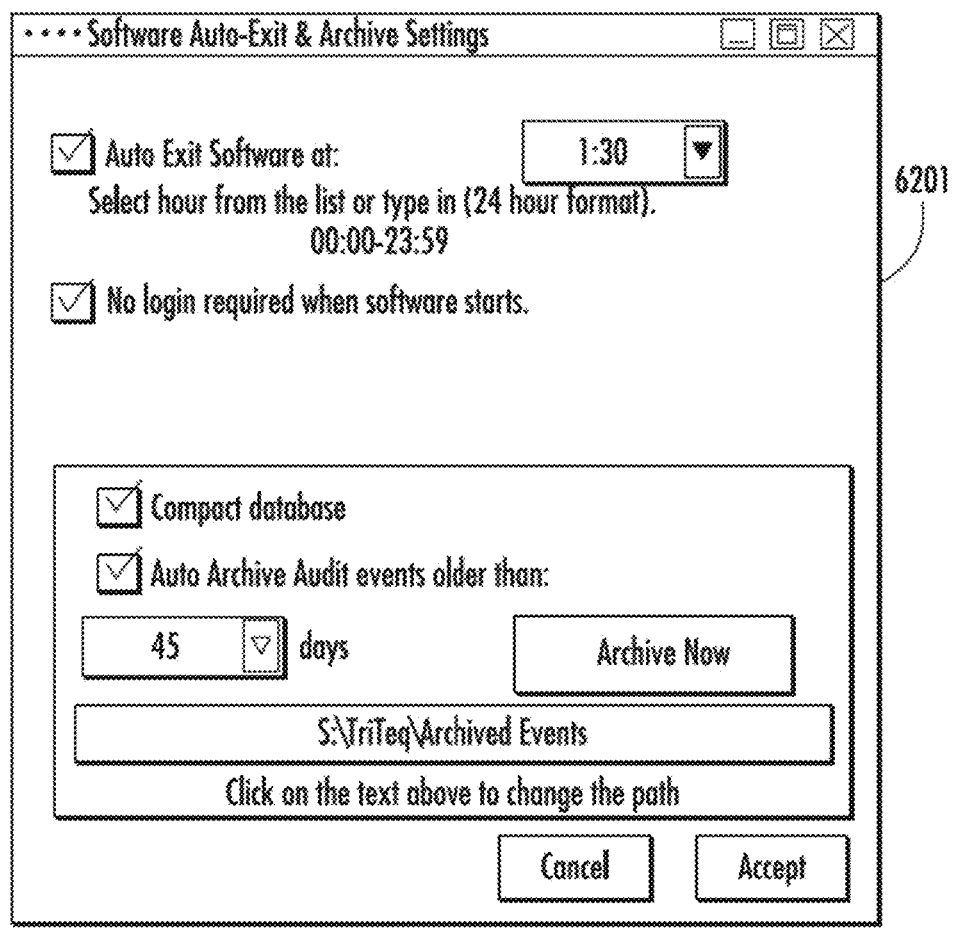

The system is capable of automatically starting up and exiting from operation on a daily basis. The start and stop times can be pre-determined and entered into the system as a scheduled task. FIGS. 56-58 show a sequence of user interface screens 6193, 6194, 6195, 6196, 6197, 6198 to illustrate an example of how the system is scheduled to start-up at 4:00 AM every day. FIGS. 59-60 contains user interface screens 6200, 6201 that illustrate an example of how the user selects the system to automatically exit from operation at 1:30 AM each day.

Figure 52A:
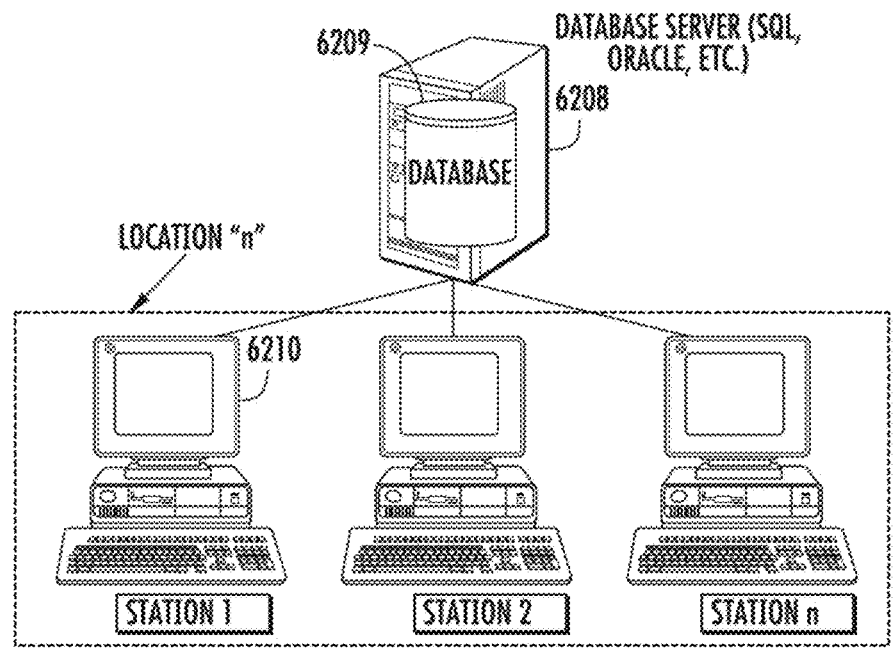
FIG. 52A is a schematic diagram showing a configuration of multiple key management stations connected to a central database with a database server.
Figure 53:
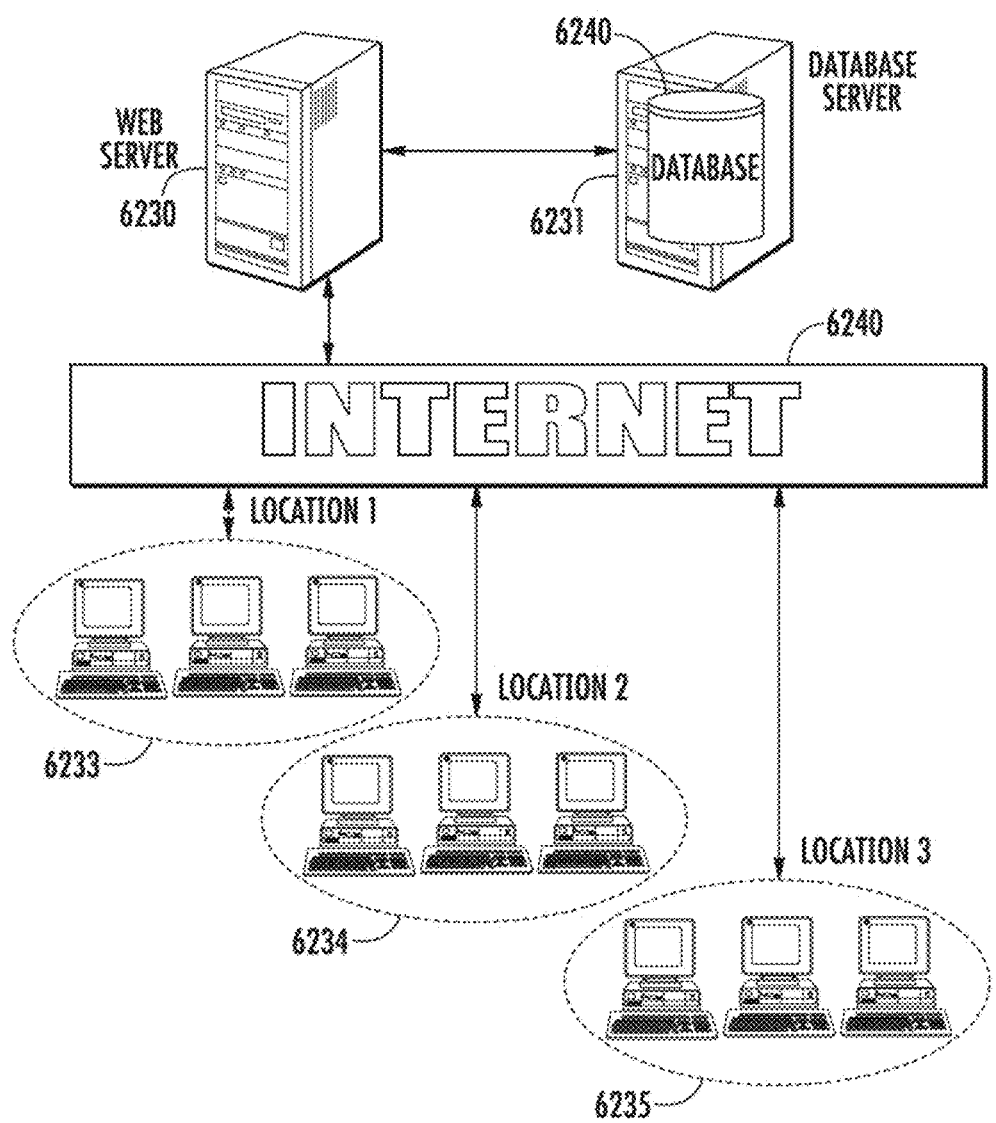
FIG. 53 is a schematic diagram showing a configuration with key management stations at different locations connected to a central database server through the Internet.

In an alternative embodiment illustrated in FIG. 52A referred to as the pre-enterprise configuration, the single database configuration uses a dedicated database server 6208. This configuration contains all of the above-described features from the LAN network single database embodiment, while each station is allowed to access a dedicated database server 6208 (SQL, Oracle, etc). A local station 6210 connecting to the database 6209 will be accomplished using the standard "Data Source (ODBC)" included in all Windows operating systems. After connection to database is accomplished, the user uses the key control operation features the same as in the previous configuration. Potential advantages of this configuration are increase database reliability, faster response time on accessing, changing, or adding records to the database, and significantly less data traffic.

Figure 52B:
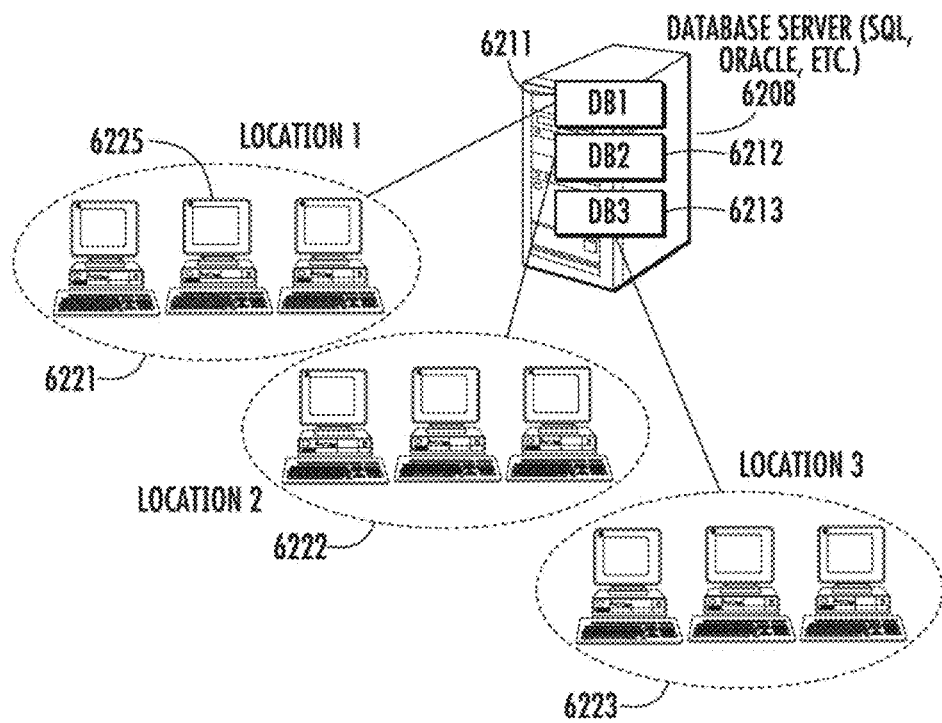
FIG. 52B is a schematic diagram showing a configuration of key management stations at multiple remote separate locations connected to a central database server with multiple databases for the separate locations.

Referring to FIG. 52B, the added capacity of a dedicated database server 6208 can be used by mounting multiple databases 6211, 6212, 6213 for serving multiple locations 6221, 6222, 6223, respectively. In such instances the databases 6211, 6212, 6213 can be identified by the specific city code, or group of city codes each database represents. A location can be, for instance, a cluster of bottling stations and/or a bottling station and several satellite locations. Stations from each location are assigned rights to access only the database they are associated with. For instance, computers at the location 6221 may access only the database 6211, and computers at the location 6222 may access only the database 6212. This configuration adds the benefit of creating global access reports that will include reports from all locations. Another benefit of this configuration is the option of remote control and administration of database from a remote location. For example, if appropriate rights are assigned to Station 6225 at Location 6221, this station can manage keys, users and vending machines at location 6221 as well as the other locations. By using a LAN type network, the security of this configuration should adequately prevent hackers from gaining access to the database and the security of the system.

In another alternative embodiment of the single database configuration illustrated in FIG. 53, a web server 6230 connected to a database server 6231 is used. This configuration is referred to as the Enterprise configuration. Each of the individual stations uses a simple web browser (e.g., Internet Explorer, Netscape, Opera, etc.) to communicate with the web server 6230 to access the database or databases 6240 maintained by the database server 6231. In this way, the individual stations can accomplish functions related to key refresh, adding keys and users, adding vending machines and asset numbers, and modify key settings as in the previously described configurations. In the event of lost Internet connection, the stations in this configuration operate a simplified version of the software as described in FIGS. 51 & 52 for refreshing keys while the connection with the web server 6230 is severed. One benefit of this configuration is the ability to use the Internet infrastructure to create a wide-area network for remotely operating the stations and thus eliminate the need to support a separate or dedicated structure to accomplish the same. Another benefit of this configuration is that software updates for the functionality of the stations as well as adding and deleting stations will be done in the web server and may not require user intervention at the station when these tasks are performed. One potential disadvantage is that hackers may attempt to get access to the database since the network is accessible to almost anyone with a browser and access to the web.

Figure 61:
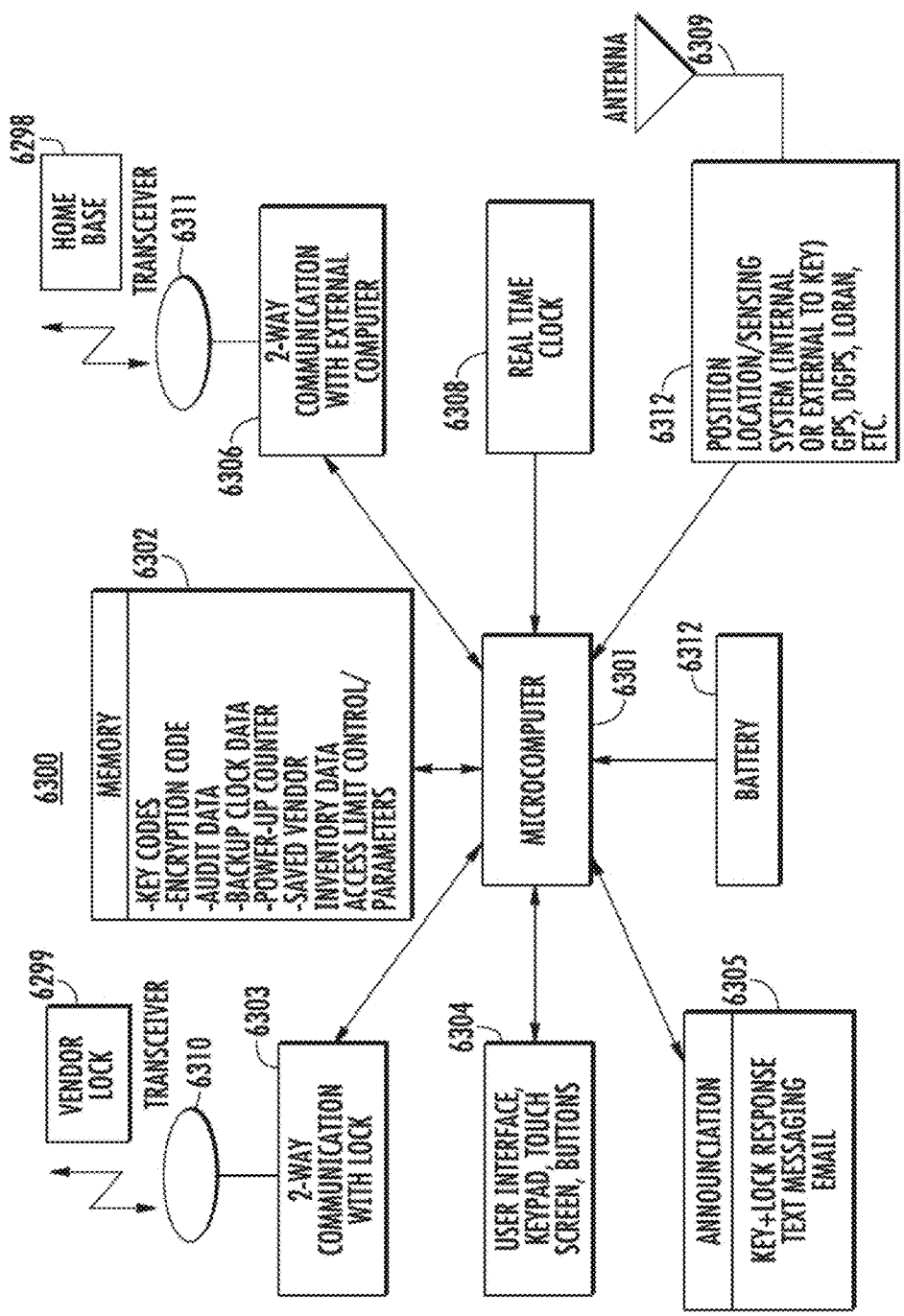
FIG. 61 is a schematic diagram showing in functional blocks an electronic key that has a position sensing component for detecting the locating of the electronic key during field operation.

An enhanced electronic key may be provided with additional hardware and software features to enhance the security, tracking, audit data control, and assisting of the employee to fill and service the vending machine. FIG. 61 is a functional block diagram of the enhanced electronic key 6300. The key 6300 has a microprocessor or microcomputer 6301, a non-volatile memory 6302, a real-time clock 6307, and a battery 6312 for powering the components of the key. The memory 6302 may contain software and data required for the operation of the key, such as key codes, an encryption code for use in encrypting and decrypting communications with an electronic lock, encryption/decryption algorithms, backup clock data, power-up counter. The key memory may also contain data collected form vending machines, such as access audit data and vending machine inventory data.

The key 6300 includes a two-way communication module 6303 with a transceiver 6310 for two-way communications with the electronic lock 6299 of a vending machine. The key may also include user interface features 6304 such as a keypad, touch screen, or buttons with specific functions. An annunciation component 6305, such as LCD screen, may be included for displaying key-lock responses, text messaging, email, etc. The key may include another two-way communication component 6306 that has a transceiver 6311 for communicating wirelessly with a home-base 6298.

As a feature of the embodiment, the electronic key 6300 may further include a position sensing component 6308 for identifying the current location of the key. This component, which may include an antenna 6309 and may communicate with a location sensor, which may be internal or external to the key and may be based on one of the positioning systems such as GPS, DGPS, LORAN, etc. When an external location sensor is used, the component 6308 functions as an interface for receiving location information from the external location sensor. The external location sensor preferably has the capability to record time and location data independently of the key 6300, and preferably is able to store an identification name or number to identify which user it is collecting data for. The data stored by the external location sensor may later be used as part of audit trail data for tracking and managing the field devices.

The advantage of including the position sensing system component 6308 in the key is the ability to track the location of each key used to access the vending machines. For example, electronic keys that include location tracking would pinpoint the geographical location of each vending machine the user of the key was attempting to access. Thus, and audit event for an access attempt would consist of the user of the key, the key code, the date and time of the attempt, the limits (if any) of the key, the serial or ID number of the vending machine, and the physical location (preferably at least 2-dimensional latitude and longitudinal coordinates, and possibly the third dimensional or altitude coordinate) of the vending machine being accessed. These coordinates could be translated by computer to common street address and location (for example, 100 W. Plainfield Rd, Countryside, Ill., second floor, suite 202).

When an electronic key has the capability of obtaining the location coordinates of a vending machine (either by receiving these coordinates itself by a position sensing system or by communication with a position sensing system at the vending machine location), the previously described step of reading the serial number of the vending machine (with a reader tool, or a bar code reading device, or by the electronic key) and entering the vending machine location data into the computer 5032 manually may be eliminated. Since the electronic key will produce or receive the location coordinates at the time it attempts to access the vending machine, this data can be provided to the database as the vending machine location in lieu of a manual entry, which is subject to human error.

An additional benefit of the position sensing feature in the electronic key 6300 is the ability to keep track of and/or locate keys if they are lost or stolen. Since this key has the data exchange feature described above, it can transmit its location coordinates to the central or home-base location or to a person possessing a computing device that would receive the location information.

An additional feature of this key 6300 is the data transfer capability. In additional to its capability of transferring data in short range to the docking cradle (as described for other keys in this system) this key may be equipped with the capability to transmit and receive data over longer distances. Thus, as a key is being operated the audit data and the vending machine sales and inventory data would be transferred back to a central or home-base location. The enhanced communication capabilities would include text messaging and email in order for the person using the key to send and receive information concerning the route they are working on, changes and additions, reports, etc.

In another implementation based on the embodiment described in FIG. 61, the electronic key 6300 utilizes the GPS position data to decide if it is enabled for operation. To that end, the electronic key 6300 includes additional registers or memory space, such as in the memory 6302, for storing limiting parameters concerning the relative position of the key for deciding whether the key should be enabled or disabled. The position limiting parameters may, for example, specify the coordinates of areas in which the key 6300 is allowed to be used to access locks of vending machines. The position limiting data may be downloaded to the key 6300 during a refresh operation when the key is placed in the cradle of the key management system (e.g., at the bottling facility) as described earlier. Alternatively, the position limiting data may be received by the key 6300 wirelessly via the transceiver 6311 when the key is in the field. Besides the position limiting parameters, the memory 6302 of the key may store other access limit parameters, such as days of the week, number of days, number of access events, hours of the day, etc.

In operation, the GPS receiver 6308 receives position data indicating the current position coordinates of the key 6300, and forwards the data to the processor of the key. The key 6300 compares the received position data with the position limiting data stored in it to determine whether the key is in a valid territory for operation as specified by the position limiting data. If the key is in a valid territory for operation, when key is actuated by the user, it will proceed with the unlocking operation, if the other operation limiting parameters are not exceeded. If, however, the key is not located in a valid territory, it will enter a disabled mode and cannot not used for accessing locks. If the key is later moved into a valid territory, it receives updated position coordinate data from the GPS receiver and determines that it is now in a valid territory, and returns to the enabled mode so that it can be used to access locks.

In accordance with a feature of invention, the concept of associating the location information with events of accessing a device in the field or controlling the operations of the device can be applied to various types of devices in different scenarios. One example of such an application is already described above in connection with the embodiment of FIG. 61, in which an electronic key 6300 is used to access a vending machine, and the location of the vending machine is one of the parameters used in determining whether the key should be allowed to open the lock of the vending machine. Other applications may involve field devices such as appliances, shipping containers, power tools, etc. As used herein, the term "appliances" includes vending machines, coolers, fountain drink dispensers, and other similar devices operated by AC power, DC power, or batteries. The types of operations of the devices to be controlled would depend on the particular devices.

Figure 62:
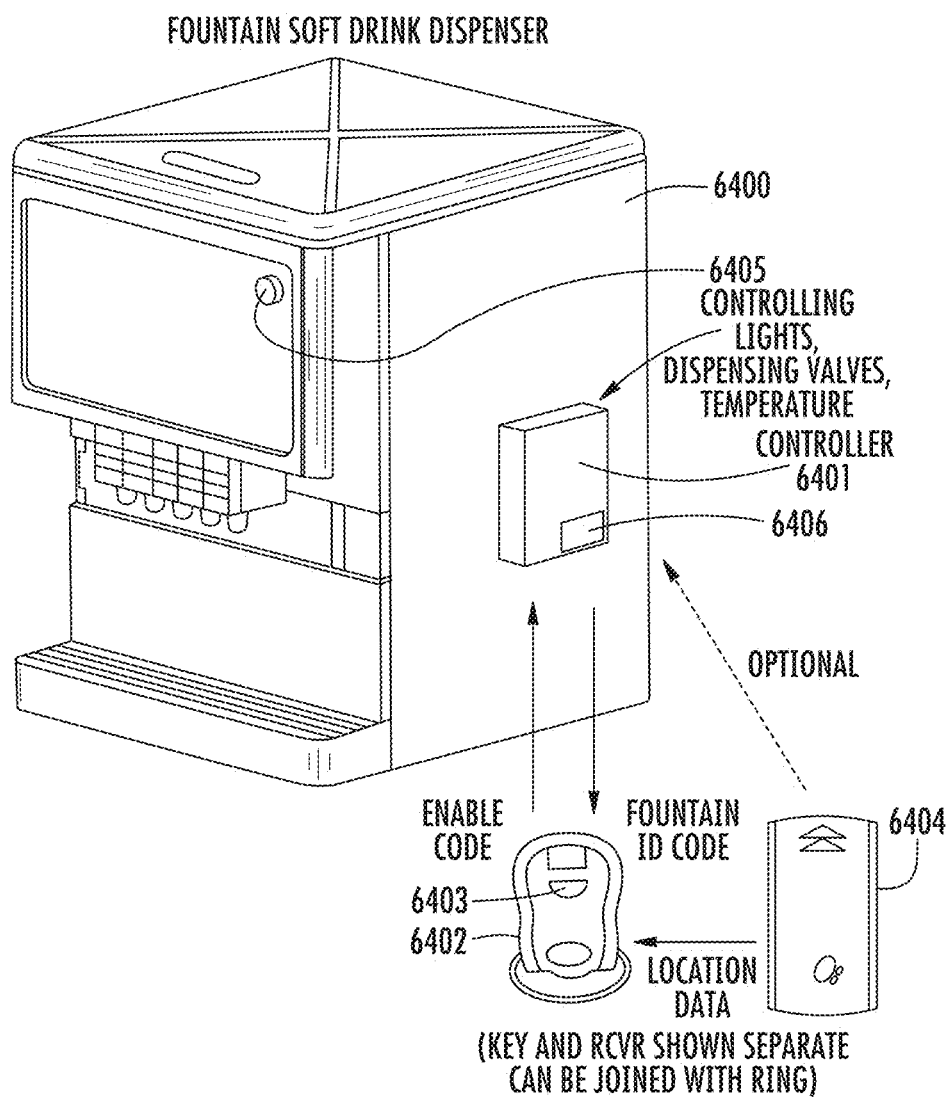
FIG. 62 is schematic diagram showing an appliance in the form of a fountain drink dispenser that is to be enabled using a mobile control device such as an electronic key.

By way of example, FIG. 62 shows a fountain drink dispenser 6400. In contrast to a vending machine, the fountain drink dispenser does not have openable door or closure guarded by a lock. Nevertheless, the dispenser 6400 has other functions and operations that can be controlled or enabled/disabled.

To that end, the dispenser has a controller 6401 that controls the functions and/or operations of the dispenser using actuator components such as motors, solenoids, relays, solid state switches, etc. The controller 6401 may be installed inside the appliance behind a surface wall of the appliance, or alternatively mounted on an outside surface of the appliance. The controller 6401 interacts with a mobile control device, which may be used to activate the dispenser at selected intervals. The mobile control device may be, for instance, an electronic key 6402 similarly constructed and programmed as the electronic key 6300 of the embodiment in FIG. 61. After being activated or enabled, the dispenser 6400 may work for a predetermined time period, such as one month, and then stop to be operational unless it is activated again by receiving an enable code from the key 6402. For instance, the controller 6401 of the dispenser 6400 may be programmed to control the components of the dispenser such that the lights or the dispensing valves cannot be turned on, or the refrigeration unit does not operate to cool the drink to a regular temperature, unless it is enabled by the key. As another example, the appliance may require preventative maintenance and may turn on an indicator such as a "Maintenance Required" light 6405 after the machine has been in operation for a predefined period of time. In that case, the key 6402 can be used to turn off the indicator light and restart the service period when it visits the appliance. This arrangement allows the owner of the appliances in the field to track whether the appliances are properly maintained as required.

As illustrated in FIG. 62, when the electronic key 6402 is used to control the operations of the dispenser 6400, the key establishes communications with the dispenser controller 6401. As part of the communication process, the dispenser controller 6401 sends the device ID of the dispenser to the key 6401. The key 6402 also obtains information regarding the current location of the dispenser 6400, either before, substantially simultaneously with, or after receiving the device ID. The location information may be provided by a location sensor built into the key, or from an external location sensing device, such as a GPS receiver 6404. When the key 6402 is actuated to communicate with the disperser controller 6401, it also establishes communications with the external location sensing device 6404 to obtain the location data. Alternatively, the location information may be first transmitted from the external location sensing device 6404 to the dispenser controller 6401, and then transmitted by the controller to the key 6402 as part of the communications between the key and the controller. In that case, the controller 6401 includes an interface 6406 for receiving the location data from the location sensing device 6404. One significant advantage of using a location sensor that is mobile, instead of one with a fixed location or one installed in the field device being tracked, is that the mobile location sensor can travel with the key to visit field devices at different locations. Thus, one location sensor can be used to provide the location information for many field devices. This results in a significant reduction of cost as compared to having multiple location sensors in fixed locations or installed in respective field devices.

In a preferred embodiment, the location information may be used by the key 6402 to determine whether the dispenser 6400 should be enabled. For instance, the memory of the key 6402 may have stored therein allowed or valid location(s) of the dispenser 6400 associated with the dispenser ID. The key 6402 can compare the current location of the dispenser with the allowed location data in its memory to determine whether the dispenser is at a valid location. One aspect that makes this arrangement advantageous, as compared to storing the valid location information in the field device and using the field device to do the location validation, is that a person responsible for visiting the field devices is normally associated with a key, not a particular field device. Thus, this arrangement allows control of both (1) the assignment of the key to the employee, and (2) the location at which the key is allowed to access or enable a field device.

If the current location for the dispenser 6400 is valid, the key proceeds to enable the dispenser or otherwise control the operations of the dispenser. As used herein, "enabling" a field device means to give authorization to the controller of the field device to enable one or more functions of the field device other than the unlocking or locking of a closure such as a door. If the actual location of the dispenser is, however, different from the valid location stored in the key, the key may decide not to enable the dispenser. Preferably also as part of the communication process, the key 6402 may transmit its key ID to the dispenser controller 6401. This allows the dispenser controller 6401 to learn which key is used to access it so that it can include that information in an audit trail record. The audit trail data concerning the control events, as well as other audit trail data concerning the usage of the dispenser over the last enabled operation period, can be downloaded to the key as part of the communication process.

The communications between the controller 6401 of the dispenser 6400 and the mobile control device 6402 may be wire-to-wire (i.e., through a cable connecting the dispenser controller and the mobile control device) or wireless (e.g., via RF or infrared transmissions). Non-encrypted communications may be used, but preferably encryption/decryption methods are used to protect the contents of the communications from eavesdropping.

Figure 63:
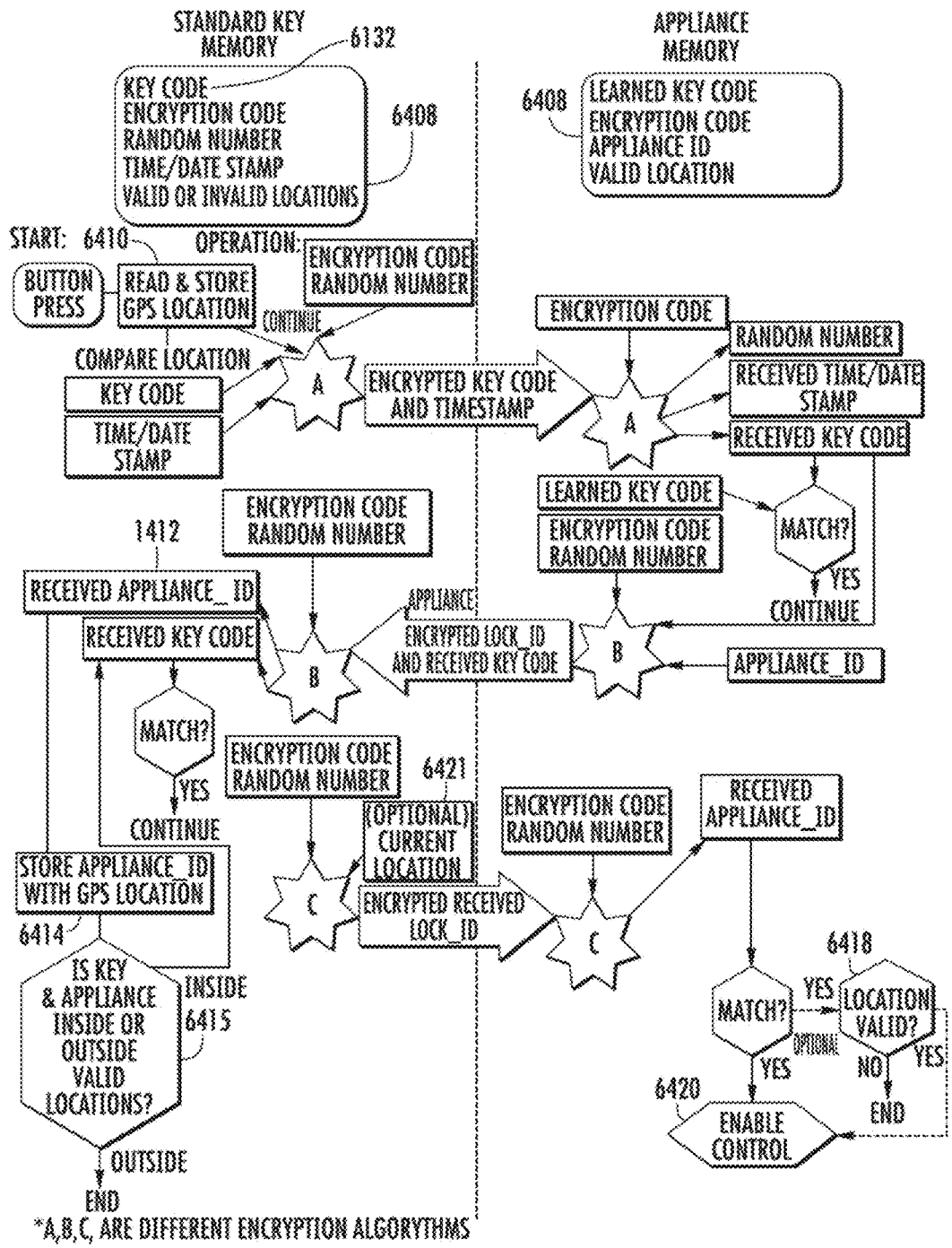
FIG. 63 is a data flow diagram showing a secured communication process between a controller of the appliance and the key for enabling the operation of the appliance.

When encryption/decryption is used to protect the communications, the communications may be performed according to the data flow diagram shown in FIG. 63. This flow diagram is generally similar to that shown FIG. 23, but with several additional steps performed in connection with location validation. Specifically, the memory 6132 of the key 6402 includes data representing the valid or invalid locations for one or more appliances in the field. When the user starts the communication process by pressing the button 6403 on the key 6402, the key first reads and stores the current location data 6408 (step 6410). When the key receives the appliance ID from the controller of the appliance (step 6412), it stores the appliance ID with the location data as part of a control event record (step 6414). The key then determines whether it or the appliance is within the valid location for that appliance by comparing the actual location data with the location data stored in its memory (step 6415). If the appliance is outside its valid location, the key terminates the communication process (step 6416). As a result, the appliance may not be enabled for further operation. If, on the other hand, the appliance is in a valid location, the key continues with the communication process to ultimately enable the appliance (step 6420).

Figure 64:
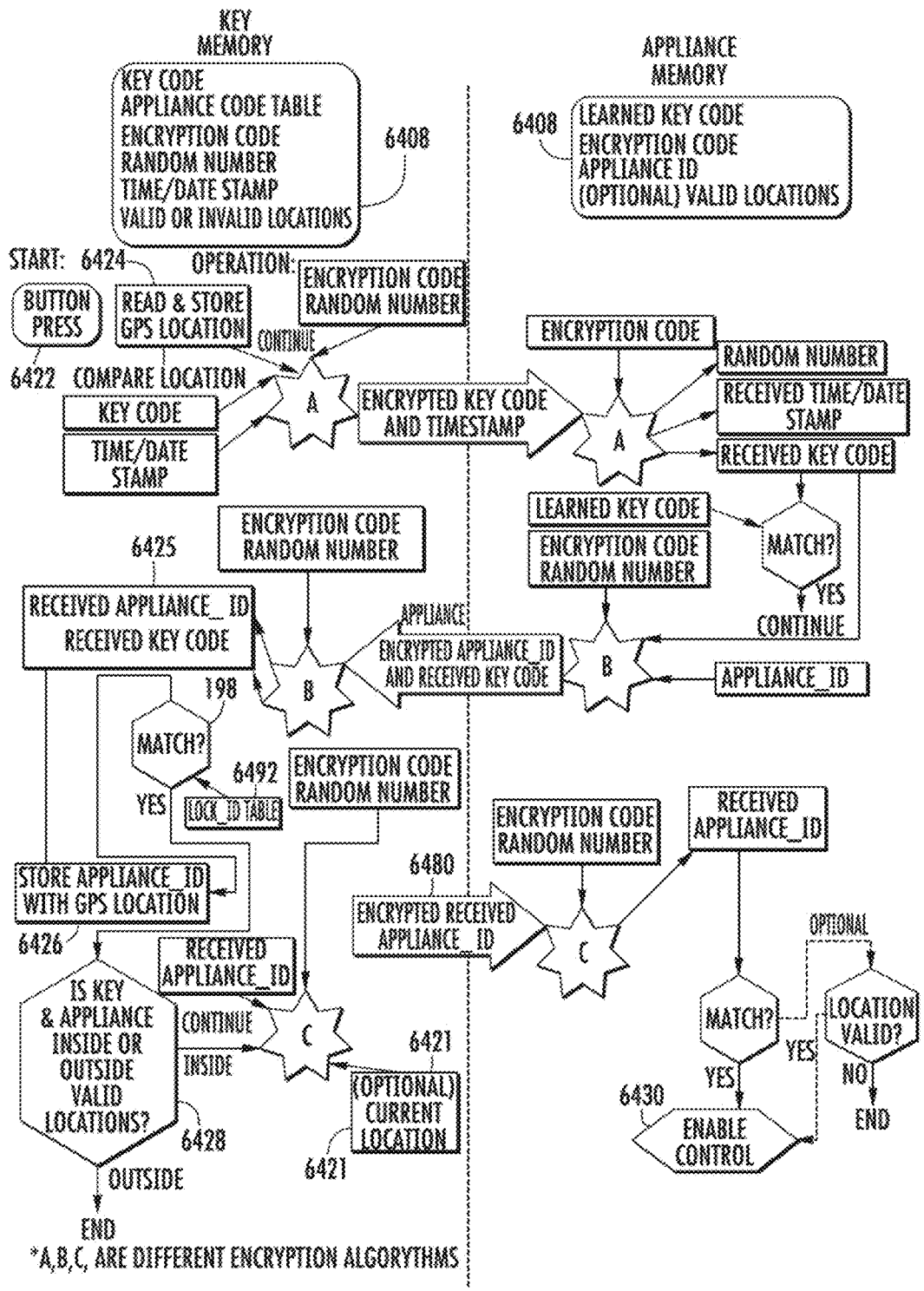
FIG. 64 is a data flow diagram showing an alternative communication process between the appliance controller and the key.

An alternative secured communication process for the key and the appliance is shown in FIG. 64. This data flow diagram is similar to that shown in FIG. 24, but with additional steps for location validation similar to those in FIG. 63. Again, when the user starts the communication process by pressing the button on the key (step 6422), the key first reads and stores the current location data (step 6424). When the key receives the appliance ID from the controller of the appliance (step 6425), it stores the appliance ID with the location data in a control event record (step 6426). The key then determines whether it or the appliance is within the valid location for that appliance based on the location data stored in its memory (step 6428). If the appliance is outside its valid location, the key terminates the communication process. As a result, the appliance may not be enabled for further operation. If the appliance is in a valid location, the key continues with the communication process to ultimately enable the appliance (step 6430).

In an alternative embodiment, the determination of whether the field device is at a valid location may be made by the controller of the field device, instead of the mobile control device. As shown in FIG. 63, the controller of the appliance may have the valid (or allowed) location data 6408 stored in its memory. To perform the location validation, the controller would require information regarding its current location. The controller may include an interface for receiving location data from a built-in location sensor or an external location sensor, such as a GPS receiver. Alternatively, the controller may receive the current location data from the key. To that end, the key may include the current location data 6421 as part of the encrypted transmission 6419 it sends to the appliance controller during the communication process.

In this optional arrangement, also shown in FIG. 63, the step 6415 of determining whether the location is valid is not performed by the key. Instead, it is now performed by the appliance controller (step 6418) by comparing the location data provided by the GPS sensor with the allowed location data stored in the memory of the appliance controller. If the location is valid, the controller enables the operation of the appliance. Similarly, in the alternative communication flow in FIG. 64, the current appliance location data 6421 may be transmitted to the appliance controller as part of the encrypted transmission 6430 to the appliance controller, and the step 6428 performed by the key to validate the location by comparing the current location with the allowed location is replaced by the step 6429 performed by the appliance controller.

Figure 65:
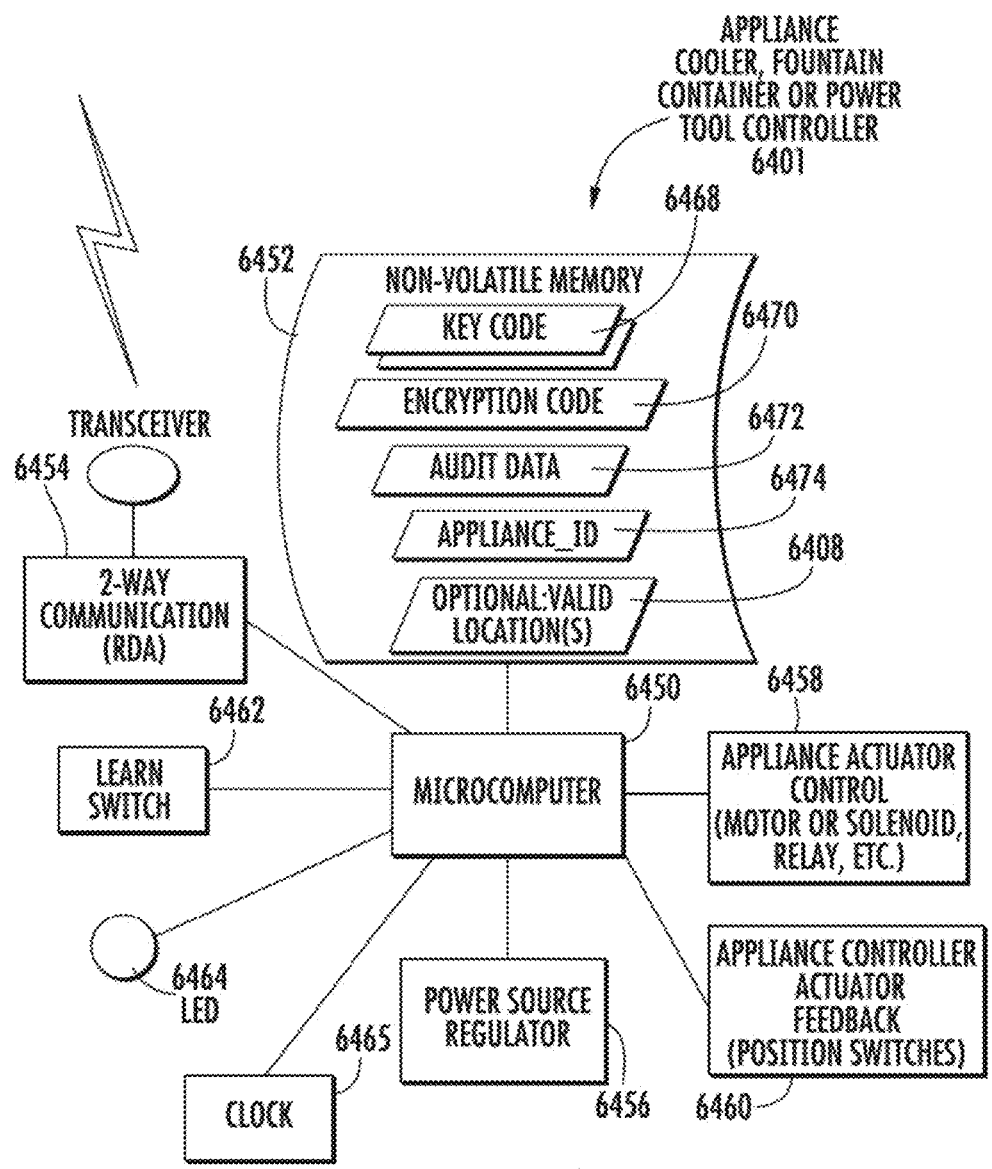
FIG. 65 is a functional block diagram showing the components of the appliance controller.

FIG. 65 shows in a functional block diagram the circuitry for a controller 6401 that may be used to control the operation of an appliance. Even though the embodiment in FIG. 65 is described as for controlling an appliance, it will be appreciated that it may also be used for controlling the access or operations of other types of field devices. The controller 6401 comprises a microcomputer 6450, a non-volatile memory 6452, a half-duplex IRDA infrared communication interface 6454 for communicating with an electronic key, a power supply voltage regulator 6456, an appliance actuator control 6458, an appliance operation actuator feedback 6460, a learn switch 6462 similar to the one mentioned earlier in another embodiment, and the LED 6464 for state indication. The non-volatile memory 6452 stores key codes 6468, encryption codes 6470, audit data 6472, and a device ID 6474 that identifies the appliance. The appliance operation actuator control 6458 may contain circuitry for controlling actuator components such as motors, solenoid, relays, etc., the actuation of which enables or disables one or more functions of the appliance. The actuator feedback 6460 provides feedback signals to the microprocessor for confirming the actuation states of the actuators. A clock 6465 provides time information so that the microprocessor 6450 can perform decisions such as whether the enabled operation period has expired and the machine should be disabled or whether the preventative maintenance indicator should be turned on.

Figure 66:
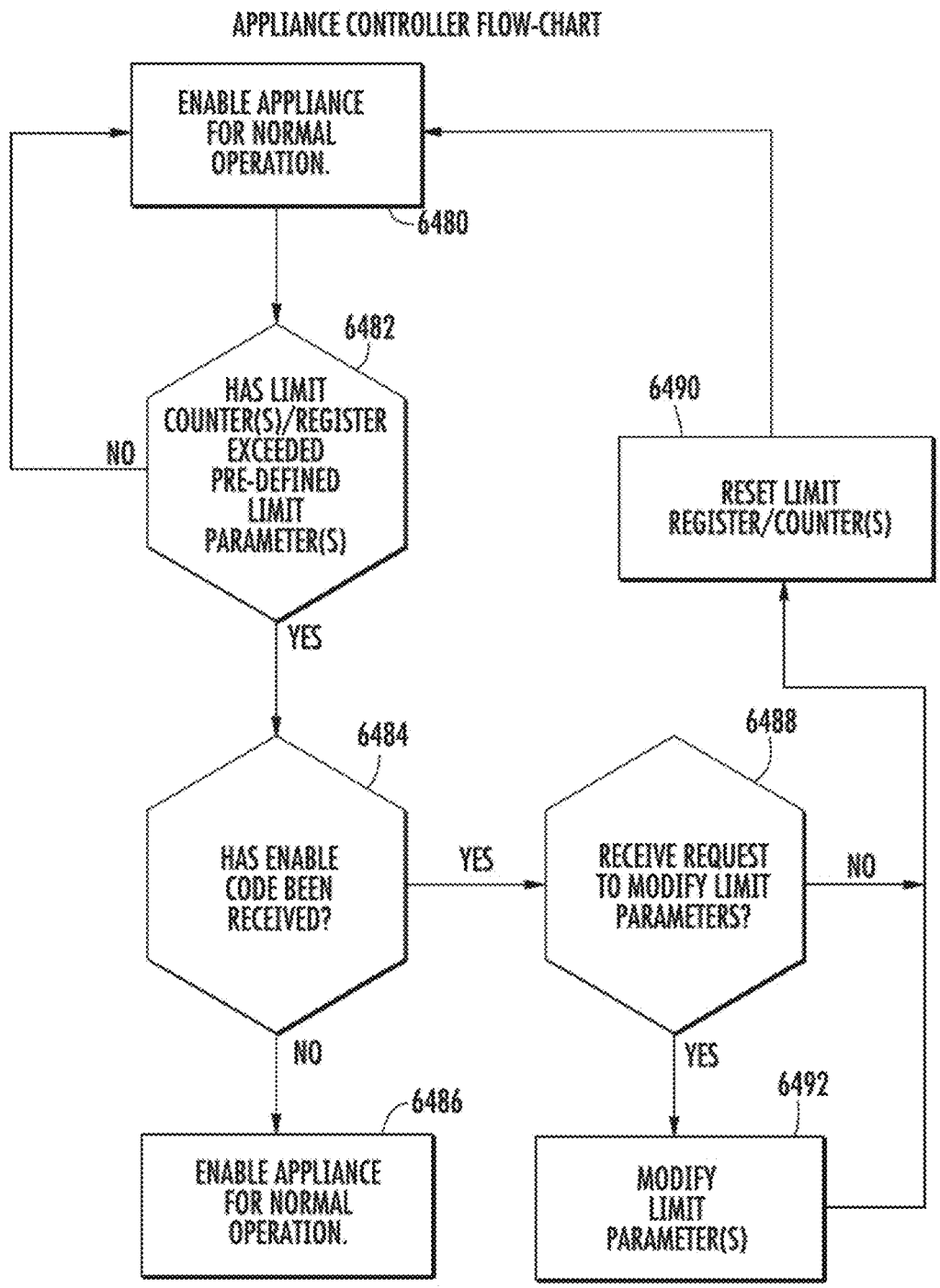
FIG. 66 is a flow diagram showing a process performed by the appliance controller for controlling the operation of the appliance.

The device control process performed by the controller 6401 of the appliance is generally illustrated in FIG. 66. The process starts at a state in which the appliance is enabled for normal operation (step 6480). The controller periodically checks whether the value in any of the limit counters or registers in its memory has exceeded a pre-defined limit parameter value (step 6482). The limit parameters include, for instance, the time period in which the appliance is allowed to operate. If no limit parameter has been exceeded, the controller returns to the state of normal operation. If, on the other hand, a parameter has exceeded its predefined limit value, the controller determines whether an enable code has been received (step 6484). If no enable code has been received, the controller disables the operations of appliance (step 6486). If an enable code has been received, the controller determines whether any request to modify limit parameters has been received (step 6488). If no, the controller resets the limit registers and counters (step 6490), and return to the normal operation state. If a request to modify limit parameters has been received, the controller modified the limit parameters as requested (step 6492). The controller then resets the limit registers and counters, and returns to the normal operation state.

Figure 67:
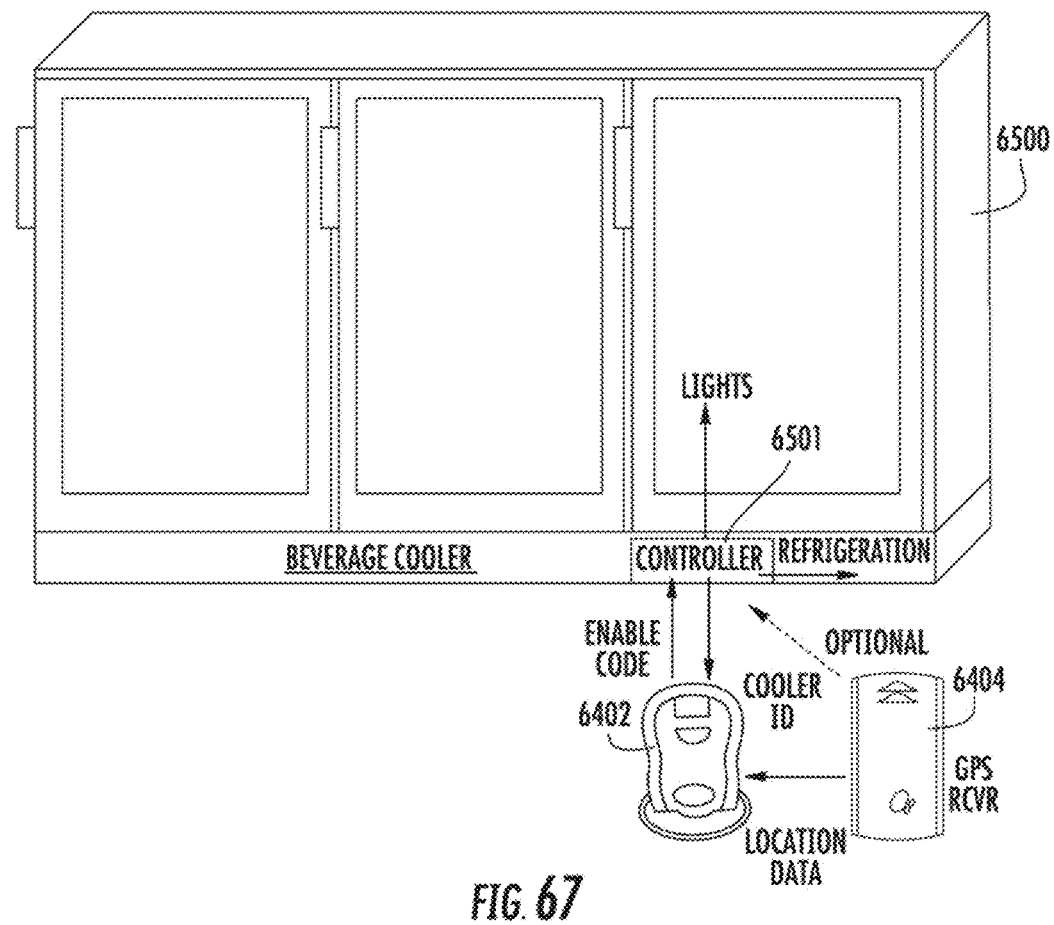
FIG. 67 is a schematic diagram showing an embodiment with an appliance in the form of a cooler.

As mentioned above, the collection and use of location data as part of a process of accessing or otherwise controlling the operations of a field device can be advantageously used in many different applications. A few more examples of such applications are provided below. FIG. 67 shows a beverage cooler 6500. The functions of the cooler, such as lighting and refrigeration, are controlled by a controller 6501, the construction of which may be similar to that described in FIG. 65. An electronic key (or a mobile control device) 6402 is used to control the operations of the cooler 6500 by enabling or disabling the functions of the cooler. To that end, the key 6402 initiates a communication process with the controller 6501 of the cooler. As part of the communication process, the key obtains location data indicating the current location of the cooler. The location data may be received from an external location sensing device 6404. Alternatively, the key may receive the location data from the cooler controller 6501 which in turn receives the location information from the external location sensing device 6303. The key 6402 also receives from the controller 6501 the device ID for the cooler 6500. If the key determines that the cooler is in a valid location, and other operation limit parameters are not exceeded, it transmits an enable code to the cooler controller 6501, thereby enabling the cooler to operate for a pre-selected period, such as six months. As part of the communication process, audit data concerning the usage of the cooler may be downloaded from the controller 6501 to the key 6402.

Figure 68:
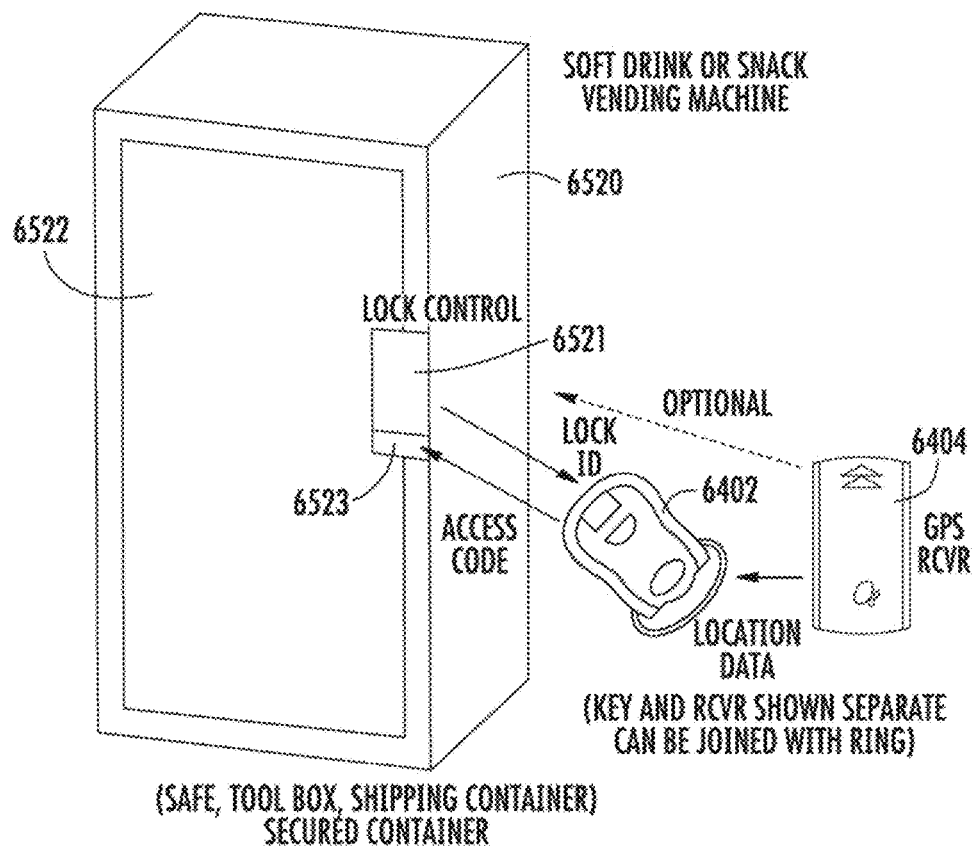
FIG. 68 is a schematic diagram showing an embodiment in which a field device being controlled is in the form of a secured container.

As another example, FIG. 68 shows a container 6520 having a door 6522 or closure secured by a lock 6523 controlled by a controller 6521. The container may be a safe, a tool box, or a shipping container, etc. The container 6520 may be placed at a fixed location, as in the case of a safe, or may be mobile as in the case of a truck-mounted tool box or a shipping container. A key 6402 is used to access the container to unlock the door 6522. The key 6402 receives data representing the current location of the container from an external GPS receiver 6404 directly or indirectly through the lock control 6521. The lock control 6521 transmits the lock ID to the key 6402. Based on the lock ID and the currently location data and the permitted location data stored in its memory, the key 6402 determines whether the container 6520 is at a valid location. If the container 6520 is at a valid location, and other operation limit parameters are not exceeded, the key 6402 transmits an access code to the lock controller 6521, which in response opens the door 6522.

Figure 69:
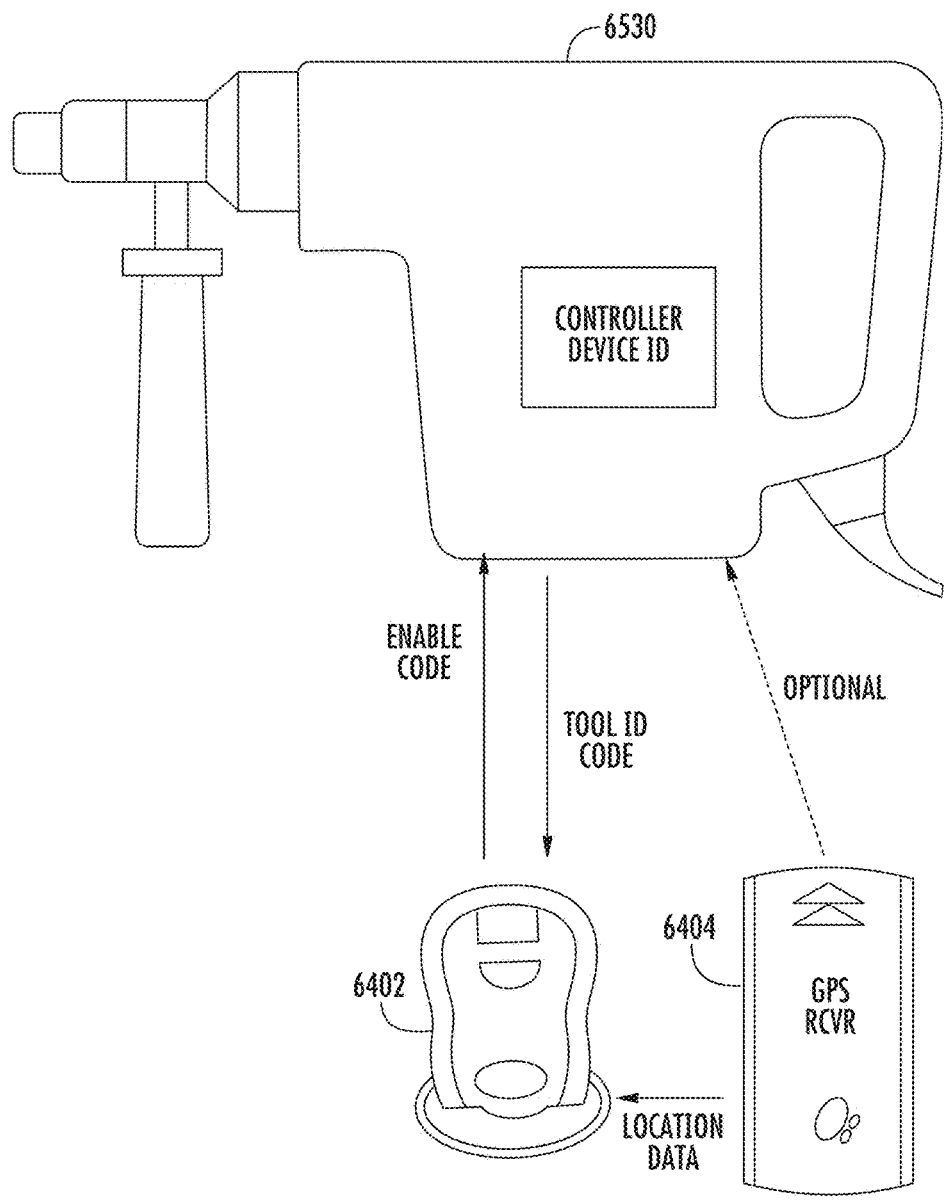
FIG. 69 is a schematic diagram showing an embodiment in which a field device being controlled is a power tool.

As a further example of a field device, FIG. 69 shows a power tool 6530, the operation of which may be enabled or disabled by a mobile control device such as a key 6402. The power tool 6530 includes a controller 6531, which is programmed to disable the power tool, such as by using a switch or relay to cut off power, if the power tool is not enabled. In the enabling operation, the key 6402 receives the current location from the GPS receiver 6404 and the device ID from the power tool controller 6531, and determines whether the power tool 6530 is at a valid location. If the location is valid and other operation limit parameters are not exceeded, the key 6402 transmits an enabling code to the power tool. The tool controller 6531 than enables the power tool to operate, such as by allowing electrical power to be passed to the power circuit of the tool. Once enabled, the power tool 6530 may operate for a pre-selected period, such as 24 hours, after which it has to be enabled again in order to operate further.

Figure 70:
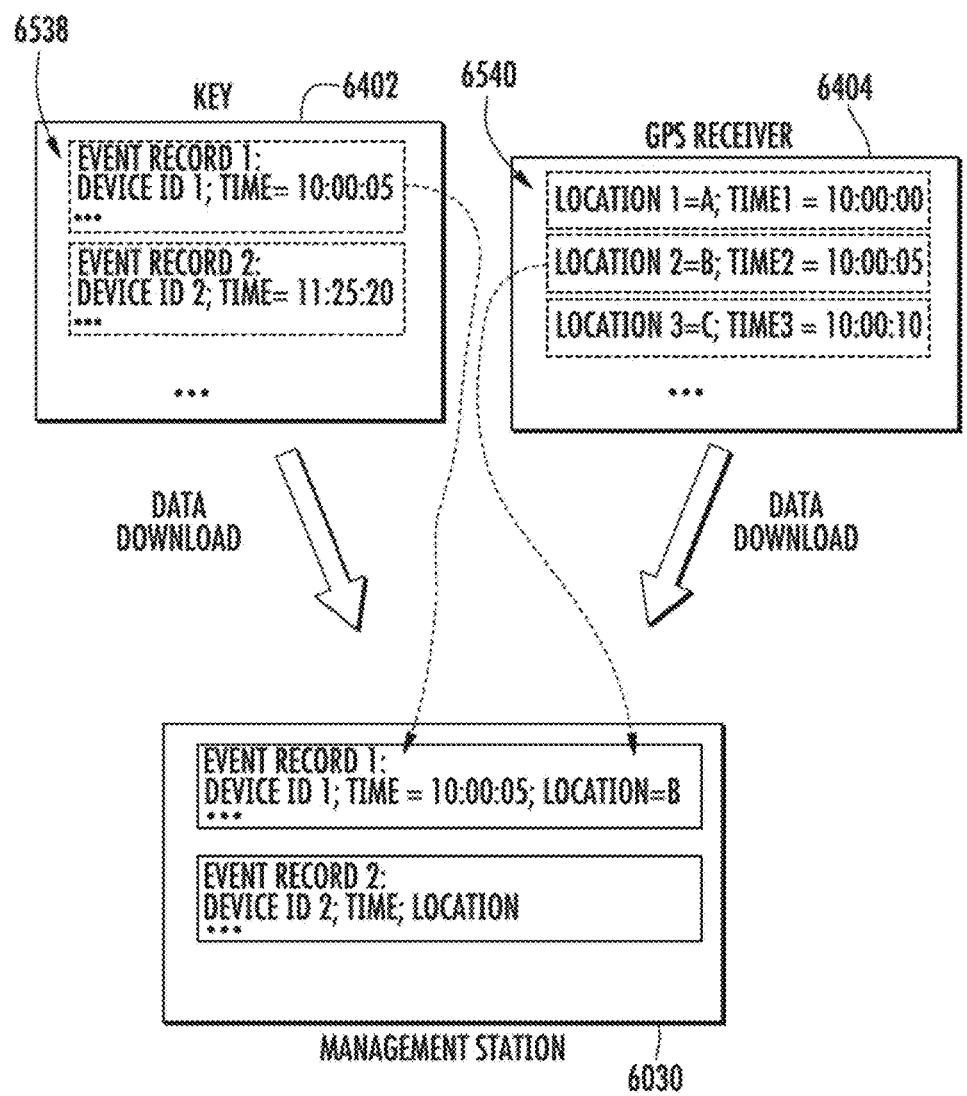
FIG. 70 is a schematic diagram showing an alternative embodiment in which location data recorded by a location sensing device are combined with access/control event records stored in a mobile control device.

Turning now to FIG. 70, in an alternative embodiment, instead of storing the location data for each access/control event in the key memory as part of the access/control event records, the location data may be stored in the external location sensing device and used later to reconstruct the event records. For instance, referring to the embodiment in FIG. 62, the key 6402 and the GPS receiver 6404 may be joined, such as being placed on a key chain, so that they travel together. Alternatively, the GPS receiver 6404 may have a fixed location, such as adjacent to the field device being tracked, or may be mounted to something that is external to the field device or the key and is mobile, such as a truck of the route operator. When the GPS device is mounted in a transportation vehicle, the GPS location might be limited to the location of the transportation vehicle instead of being the exact location of the appliance.

Figure 71:
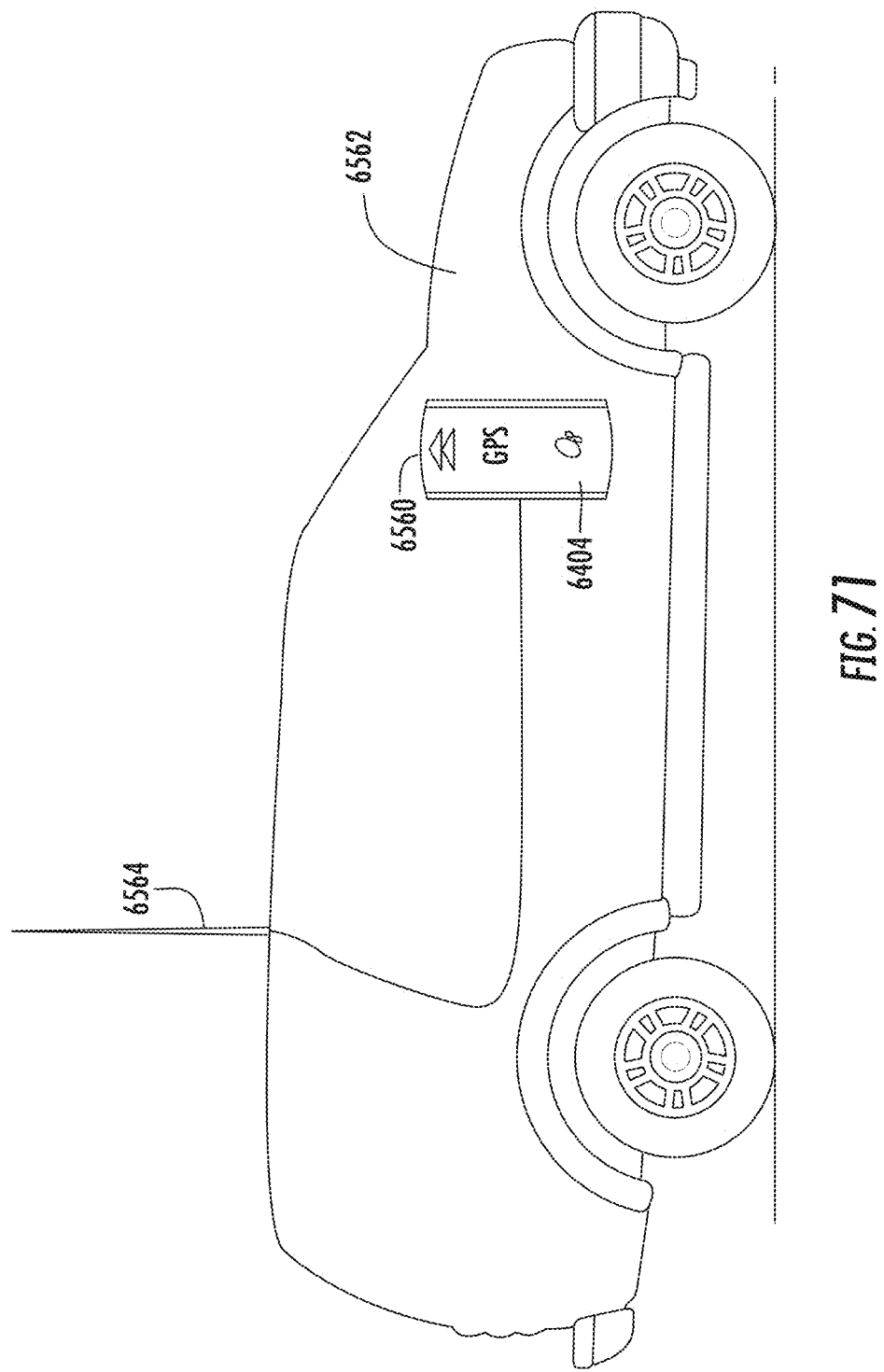
FIG. 71 is a schematic diagram showing a location sensing device, such as a GPS receiver, received in a cradle in a transportation vehicle.

In another alternative embodiment shown in FIG. 71, the GPS receiver 6404 is normally plugged into a cradle 6560 in a transportation vehicle 6562 but can be removed from the cradle to allow it to be carried to the site of the filed device. Thus, if the reception of the GPS satellite signals at the site of the field device is good, the GPS receiver 6404 can provide the accurate location of that site. Otherwise, the location of the vehicle 6562 provided by the GPS receiver when it is received in the cradle 6560 can be used as an approximate position for the field device being visited. The cradle 6560 in the transportation vehicle 6562 preferably is configured for recharging the battery of the GPS receiver 6404, and to enhance the reception of the GPS satellite location signals by connecting the GPS receiver 6404 to an antenna 6564.

In operation, the GPS receiver 6404 records in its memory the location data and the actual (or real) time on a regular basis, such as every 5 seconds. Each time the key 6402 is used to communicate with an appliance such as a fountain drink dispenser, it stores the device ID of the appliance and the time of the control event, but not the location information, in its memory as a control event record. The key 6402 may be used to enable multiple dispensers or other appliances in a work day. When the key 6402 and the GPS receiver 6404 are returned to the home base at the end of a day, the control event records 6538 are downloaded from the memory of the key into the management station computer 6030, as shown in FIG. 70. The location data 6540 as a function of time are also downloaded from the memory of the GPS receiver 6404 into management station. The management station 6030 then matches the timing of the control event records with the timing of the location records to identify the location for each control event. In this way, a complete control event record with location information can be reconstructed by the management station 6030. This approach has the advantage of reduced complexity and cost of the electronic key and the GPS device, as they are not required to have respective communication ports to allow them to communicate with each other when the key is operated. Preferred embodiments of this invention are described herein, including the best mode known to the inventors for carrying out the invention.

Figure 72:
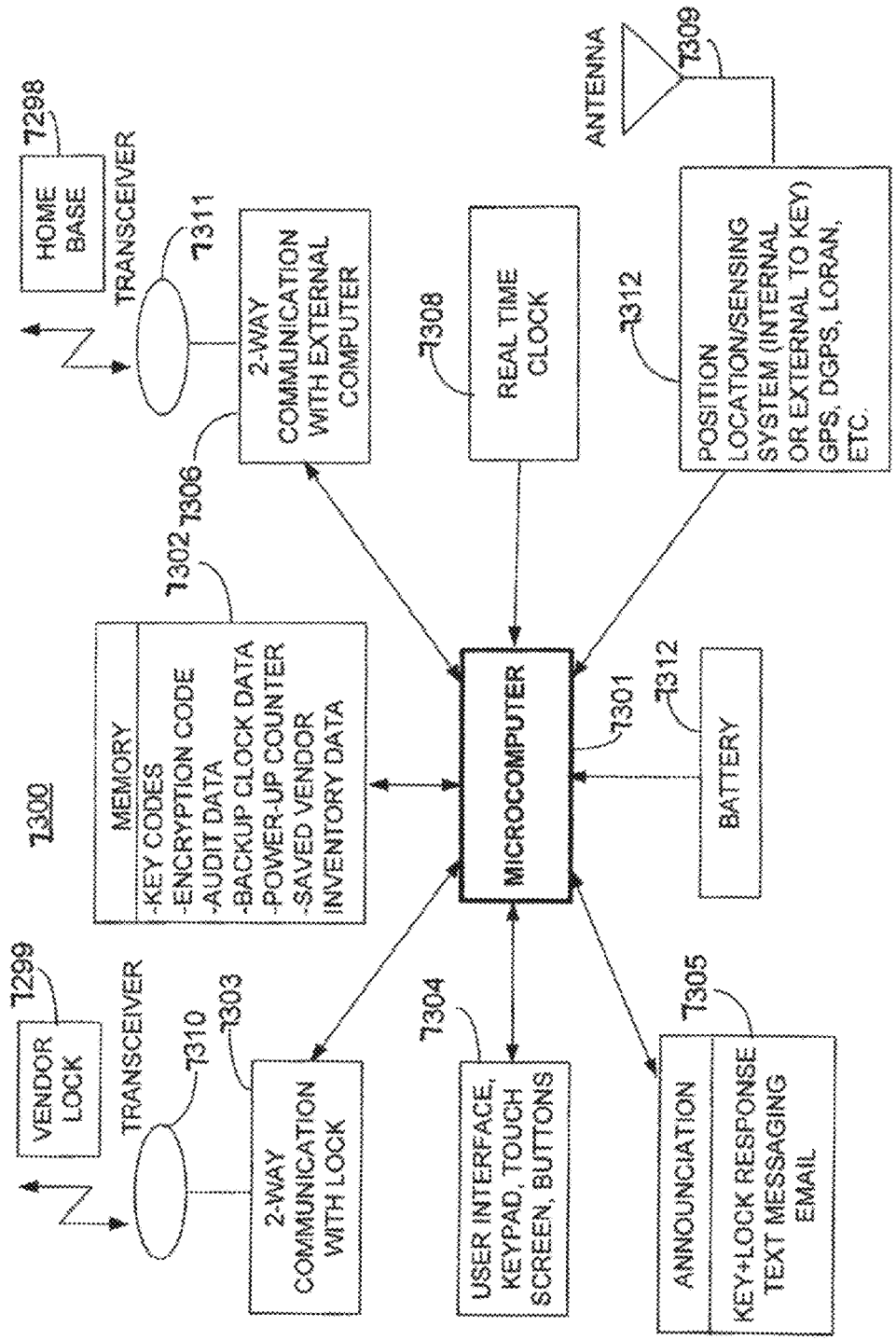
FIG. 72 is a schematic diagram showing in functional blocks an electronic key that has a position sensing component for detecting the locating of the electronic key during field operation.

An enhanced electronic key may be provided with additional hardware and software features to enhance the security, tracking, audit data control, and assisting of the employee to fill and service the vending machine. FIG. 72 is a functional block diagram of the enhanced electronic key 7300. The key 7300 has a microprocessor or microcomputer 7301, a non-volatile memory 7302, a real-time clock 7307, and a battery 7312 for powering the components of the key. The memory 7302 may contain software and data required for the operation of the key, such as key codes, an encryption code for use in encrypting and decrypting communications with an electronic lock, encryption/decryption algorithms, backup clock data, power-up counter. The key memory may also contain data collected form vending machines, such as access audit data and vending machine inventory data.

The key 7300 includes a two-way communication module 7303 with a transceiver 7310 for two-way communications with the electronic lock 7299 of a vending machine. The key may also include user interface features 7304 such as a keypad, touch screen, or buttons with specific functions. An annunciation component 7305, such as LCD screen, may be included for displaying key-lock responses, text messaging, email, etc. The key may include another two-way communication component 7306 that has a transceiver 7311 for communicating wirelessly with a home-base 7298.

As a feature of the embodiment, the electronic key 7300 may further include a position sensing component 7308 for identifying the current location of the key. This component, which may include an antenna 7309 and may be internal or external to the key, may be based on one of the positioning systems such as GPS, DGPS, LORAN, etc.

The advantage of including the position sensing system component 7308 in the key is that ability to track the location of each key used to access the vending machines. For example, electronic keys that include location tracking would pinpoint the geographical location of each vending machine the user of the key was attempting to access. Thus, and audit event for an access attempt would consist of the user of the key, the key code, the date and time of the attempt, the limits (if any) of the key, the serial or ID number of the vending machine, and the physical location (preferably at least 2-dimensional latitude and longitudinal coordinates, and possibly the third dimensional or altitude coordinate) of the vending machine being accessed. These coordinates could be translated by computer to common street address and location (for example, 100 W. Plainfield Rd, Countryside, Ill., second floor, suite 202).

When an electronic key has the capability of obtaining the location coordinates of a vending machine (either by receiving these coordinates itself by a position sensing system or by communication with a position sensing system at the vending machine location), the previously described step of reading the serial number of the vending machine (with a reader tool, or a bar code reading device, or by the electronic key) and entering the vending machine location data into the computer 7032 manually may be eliminated. Since the electronic key will produce or receive the location coordinates at the time it attempts to access the vending machine, this data can be provided to the database as the vending machine location in lieu of a manual entry, which is subject to human error.

An additional benefit of the position sensing feature in the electronic key 7300 is the ability to keep track of and/or locate keys if they are lost or stolen. Since this key has the data exchange feature described above, it can transmit its location coordinates to the central or home-base location or to a person possessing a computing device that would receive the location information.

An additional feature of this key 7300 is the data transfer capability. In additional to its capability of transferring data in short range to the docking cradle (as described for other keys in this system) this key may be equipped with the capability to transmit and receive data over longer distances. Thus, as a key is being operated the audit data and the vending machine sales and inventory data would be transferred back to a central or home-base location. The enhanced communication capabilities would include text messaging and email in order for the person using the key to send and receive information concerning the route they are working on, changes and additions, reports, etc.

Monitoring and/or Tracking Keys and Other Items

The present invention is directed to a security system and method for monitoring the locations of mechanical keys or other access control devices, and to provide secured storage for the keys. Although the security system and method of the invention are especially advantageous for managing access and use of mechanical keys, they can also be used to monitor and control access to other types of valuable items.

In another implementation based on the embodiment described in FIG. 72, the electronic key 7300 utilizes the GPS position data to decide if it is enabled for operation. To that end, the electronic key 7300 includes additional registers or memory space for storing limiting parameters concerning the relative position of the key for deciding whether the key should be enabled or disabled. The position limiting parameters may, for example, specify the coordinates of areas in which the key 7300 is allowed to be used to access locks of vending machines. The position limiting data may be downloaded to the key 7300 during a refresh operation when the key is placed in the cradle of the key management system (e.g., at the bottling facility) as described earlier. Alternatively, the position limiting data may be received by the key 7300 wirelessly via the transceiver 7311 when the key is in the field. In operation, the GPS receiver 7308 receives position data indicating the current position coordinates of the key 7300, and forwards the data to the processor of the key. The key 7300 compares the received position data with the position limiting data stored in it to determine whether the key is in a valid territory for operation as specified by the position limiting data. If the key is in a valid territory for operation, when key is actuated by the user, it will proceed with the unlocking operation, if the other operation limiting parameters are not exceeded. If, however, the key is not located in a valid territory, it will enter a disabled mode and cannot not used for accessing locks. If the key is later moved into a valid territory, it receives updated position coordinate data from the GPS receiver and determines that it is now in a valid territory, and returns to the enabled mode so that it can be used to access locks.

Figure 73:
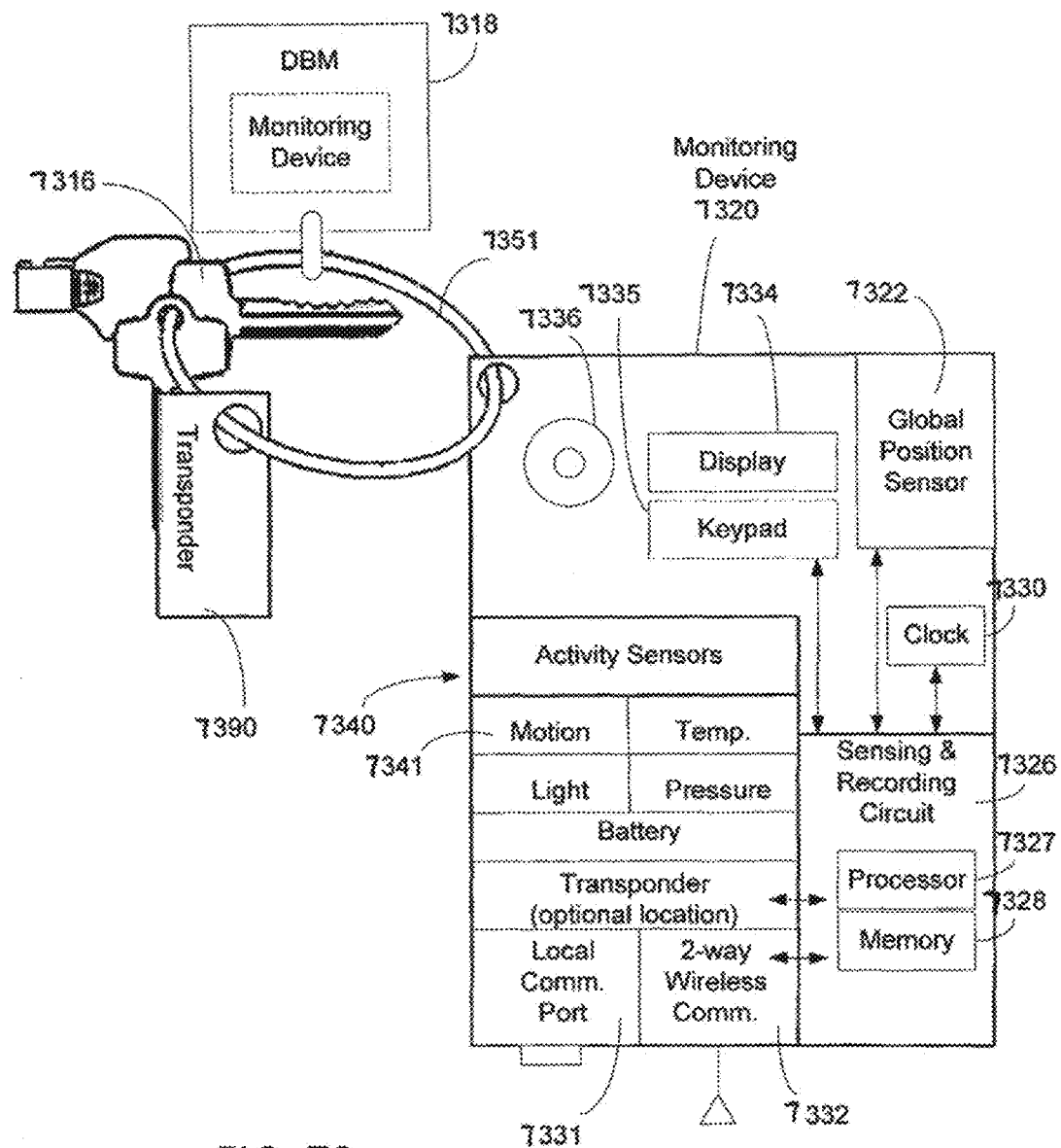
FIG. 73 is a schematic diagram of a monitoring device with location detection capability that is attached to items being monitored.

Turning to FIG. 73, in accordance with a feature of one embodiment of the invention, a monitoring device 7320 is provided to allow the tracking of the whereabouts of access control devices, such as mechanical keys 7316, so that the locations of the access control devices at different times can be monitored either in real time or audited at a later time. It will be appreciated, however, that the monitoring device 7320 can also be used to track the locations of other valuable items such as remote control devices, fire arms, tools, appliances, etc. The monitoring device 7320 is equipped with the capability of identifying its location, which may be implemented in different ways. In the embodiment shown in FIG. 73, the monitoring device 7320 is equipped with a Global Position System (GPS) device 7322 for identifying the current location of the monitoring device. Other types of positioning devices/systems can also be used. The monitoring device 7320 also has a digital sensing and recording circuit 7326 that includes a microprocessor 7327 and a memory 7328. The sending and recording circuit 7326 allows the monitoring device to detect the current location through the GPS sensor 7322, and record the location data in the memory 7328 for auditing purposes. A clock 7330 provides time information, which may be stored in the memory as part of the location and event records.

As shown in FIG. 73, the monitoring device 7320 is attached to or associated with the mechanical keys 7316 or any other device being monitored (hereinafter sometimes referred to as "DBM"), such as the device 7318. Due to the association between the monitoring device 7320 and the items to be monitored, the location of the monitoring device is also that of the items being monitored. To that end, the monitoring device 7320 is preferably attached to the mechanical keys 7316 and other DBM's in a way such that they cannot be easily separated. The means 7338 for attaching the monitoring device 7320 and the items being monitored may be, for example, a steel cable or closed ring. Alternatively, the monitoring device 7320 may be built into a device being monitored 7318, instead of being a physically separate device.

The monitoring device 7320 is used to monitor, record, and annunciate the location and activity of the devices being monitored, such as the mechanical keys 7316. The recording circuit 7326 tracks the location of the monitoring device (and thus the location of the keys 7316) and records in the memory 7328 the locations at different times. Thus, the recorded data provides a history of where the monitoring device 7320 and the items attached thereto have been. The recorded data preferably includes the date and time of the sensed locations. In addition, the recording circuit 7326 may also record the date and time of any detected activity of the devices being monitored.

To enable the monitoring device 7320 to communicate with other devices, the monitoring device further includes a communication port 7331 and a transceiver 7332, which preferably transmits and receives signals via a wireless band, such as infrared or radio frequency. The communication port 7331 allows a computer to download the position and time data from the monitoring device 7320 at a convenient time. For example, after a driver for a vending machine route returns to the company at the end of the day, the data from the monitoring device 7320 attached to the keys 7316 assigned to that driver can be downloaded to a system management station. In this way, it can be determined whether the driver has stayed on the vending machine route as scheduled or has deviated from that route. If real-time location monitoring is desired, the wireless transceiver 7332 can be used to transmit the location data in real time to a remote receiver, such as one located at the company.

The monitoring device 7320 can also be used to monitor and record other information that may indicate the activities occurring to the items being monitored and whether there have been attempts to tamper with the items. For example, events or conditions that are electronically measurable, such as the motion, temperature, barometer pressure, and ambient light, etc., can be sensed by respective sensors 7340 in the monitoring device 7320 and recorded for later analysis. Also, if the GPS sensor 7322 is not in operation or has been disabled or cannot receive a signal, the monitoring device 7320 can rely upon the activity sensors 7340 to detect activities or changes of conditions. Thus, in this sense, the activity sensors 7340 can be used to supplement the location identification by the GPS sensor 7322 to provide more information that can be used to determine what may have happened to the items attached to the monitoring device. The parameters detected by the activity sensors 7340 can be recorded locally (i.e., into the memory 7328) and downloaded at a later time for analysis. Alternatively, the parameters can be transmitted by the wireless communication component 7332 to a remote receiver to provide real-time information about activities concerning or surrounding the devices being monitored.

For purposes of interfacing with a user, the monitoring device 7320 has a display 7334 for displaying information and a keypad 7335 that can be used to enter data and commands. An audio annunciator 7336, such as an audio transducer or a buzzer, provides auditory information which may be used to indicate the various states of operations.

In accordance with another aspect of the invention, a security container with an electronic lock system and a closure that may be used to store the mechanical keys or other items in a secured manner to protect them unauthorized access. The security container is configured to ensure that the mechanical keys or other items to be protected are actually present in a secured location within it. The secured container is especially useful for storing items that are frequently taken out from and returned to it. For example, a driver for a given route of vending machines may receive the mechanical keys 7316 for accessing the vending machines at the beginning of a workday, and return the keys to the company at the end of the work day by placing the keys into the secured container. The security container of the invention can be advantageously used to store the returned keys and to record the time the keys are returned and the time the keys are taken out again. A detection mechanism of the security container ensures that the keys are actually placed in the container and stay in the container until the next time the keys are taken out.

In one embodiment shown in FIGS. 74A-D, the security container is in the form of a safe 7350, and the closure is a drawer 7352. The safe 7350 is illustrated in FIGS. 74A-D in a top view as a cabinet. The drawer 7352 is movable between an open position as shown in FIG. 74A and a closed position as shown in FIG. 74B. In this embodiment, the safe 7350 does not have a door, although a door may be added to provide further protection from attempts to physically break into the safe. Items 7353 to be protected, such as mechanical keys, are placed into the drawer 7352 when the drawer is in the open position. The drawer 7352 is then closed with the items to be protected in it. In this way, the items to be protected are placed in a secured position before the safe can be locked. The term "secured position" as used herein means that the items in that position are not accessible from outside the security container. Placing the items in the secured position, however, does not mean that they are locked in that position. For example, as shown in FIG. 74B, the space in the closed drawer 7352 represents the secured location, but the drawer may not be locked at that point and thus may still be pulled to expose the items to be protected. It will be appreciated that a closed drawer in a safe is only one example of providing a secured position, and there are many other ways to provide a secured position depending on the detailed implementation of the security container.

In accordance with a feature of the invention, the security container is configured such that it does not lock up unless the items to be protected are detected in the secured position. This feature ensures that the items to be protected are actually placed in the security container. It prevents, for example, a dishonest employee from pretending that he has returned the mechanical keys assigned to him to the safe 7350 by opening and closing the drawers 7352 without actually leaving the keys in the drawer.

To detect the presence of the items to be protected, the safe 7350 is provided with a detector 7356. By way of example, in FIG. 74B, the drawer 7352 is closed with the items 7353 to be protected in it. The detector 7356 of the safe then tries to detect the presence of the items 7353 to ensure that the items are really in the drawer 7352. If the items 7353 are detected in the drawer in the closed position (i.e., the items are in a secured position), the safe 7350 locks the drawer in the closed position, as illustrated in FIG. 74C. In this embodiment, the locking is by means of a latch 7354 of the electronic lock 7355 of the safe. An audit trail record is created for the locking event to indicate that the items 7353 have been locked in the safe. Later, the safe may be unlocked using an authorized electronic key 7358, and the drawer 7352 may be opened to allow retrieval of the items 7353, as illustrated in FIG. 74D. Another audit trail record for the unlocking event may be created to indicate that the safe has been unlocked to allow removal of the items 7353. The audit trail records for the locking and unlocking events may be stored in the memory of the electronic lock of the safe and later transferred to a computer system for auditing.

On the other hand, if the drawer 7352 is closed, but the detector 7356 cannot detect the presence of the items 7353 inside the drawer, the safe 7350 will not lock the drawer, and will not record a locking event. As a result, the items can still be accessed by opening the drawer, and the person attempting the locking event is still responsible for the security of the items as he has no proof that the items has been locked in the safe.

Figure 75:
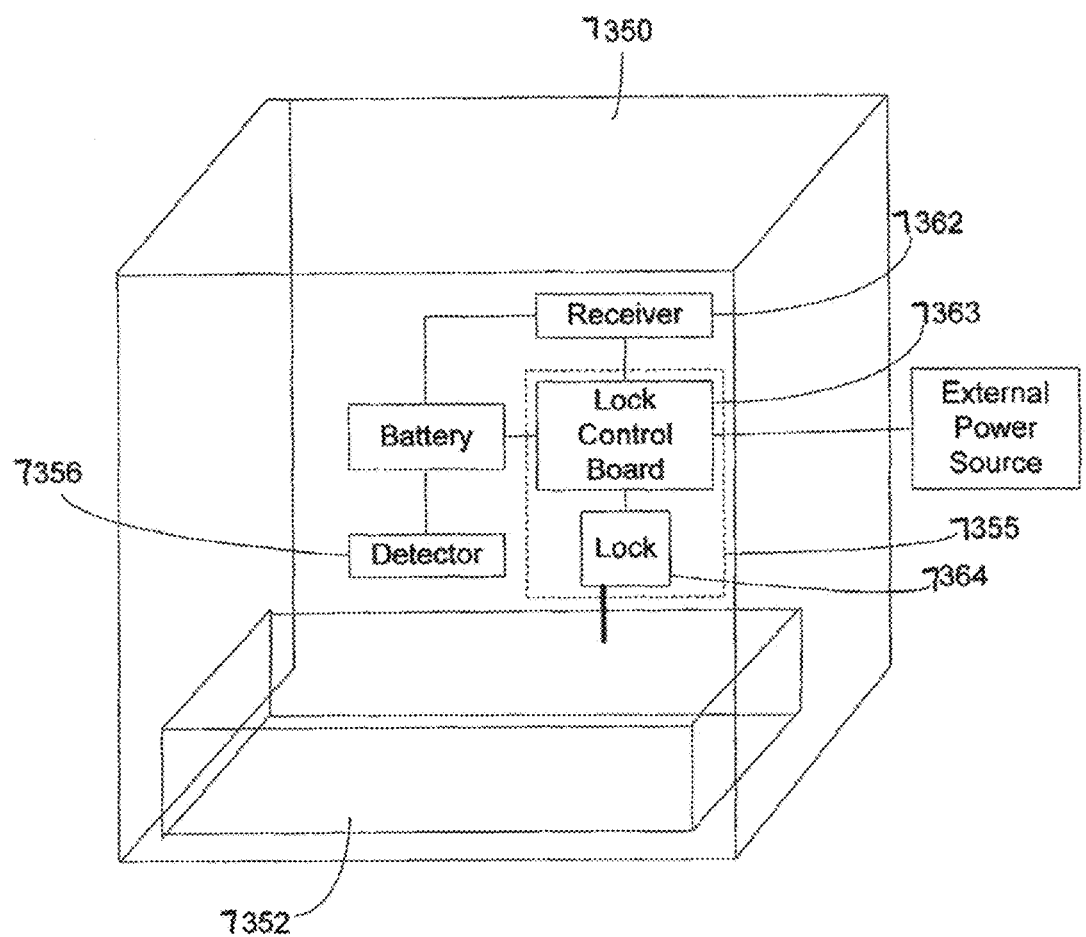
FIG. 75 is a schematic view of the safe in the embodiment of FIGS. 74A-D with electronic components for monitoring the presence of valuable items in the safe.
Figure 76:
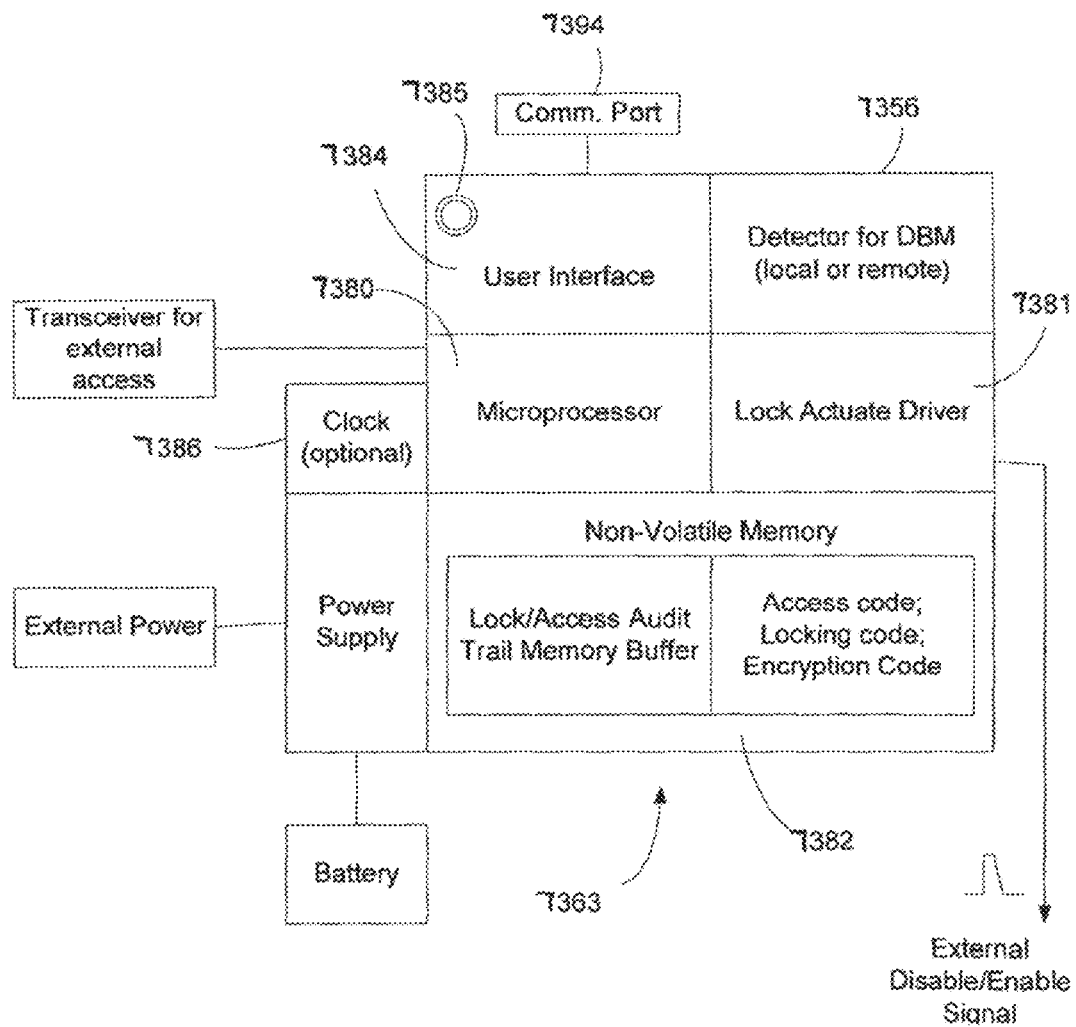
FIG. 76 is a functional block diagram showing features of an electronic lock control board of the safe in FIG. 75.

The electronic lock 7353 of the safe 7350 includes a locking mechanism 7364 controlled by a lock control circuit 7363 as shown in FIG. 75. A receiver or transceiver 7362 allows the lock control circuit to receive an access code from an external access control device such as the electronic key 7358 shown in FIG. 74. Referring to FIG. 76, the lock control circuit 7363 includes a microprocessor 7380, a lock actuator drive 7381 controlled by the microprocessor for actuating the lock, and a non-volatile memory 7382 for storing data. The data stored in the memory 7382 may include an access code for unlocking the safe, a locking code that when received from an external device will trigger the actuation of the lock, and encryption codes for encrypted communications. The memory 7382 further stores audit trail data for the lock/access events of the safe. The lock control circuit may also have components for user interface, such as push buttons for various functions.

To detect the presence of the items to be protected, the safe lock control circuit 7363 further includes a detector 7356, which may be placed together with the rest of the circuit or at a separate location in the safe, depending on the detection mechanism used and the physical layout of the safe. Returning to FIG. 74, the detector 7356 detects the presence of the items to be protected when the items are placed in the secured position. In the embodiment shown in FIG. 74, this means that the detector 7356 will detect the items 7353 when they have been placed in the drawer 7352 and the drawer is closed.

Various ways may be used by the detector to detect the items to be protected. For instance, the detector may use optical sensors to detect the presence of the items.

Alternatively, in a preferred embodiment, the detector may cooperate with an identification device attached to the items 7353 to facilitate the item detection. The identification device may transmit signals, interact with the detector via two-way communications, or otherwise enable the detector to determine its presence. Since the identification device is attached to the items to be protected, the detection of the identification device by the detector is an indication that the items to be protected are also present in the secured location. The identification device may be attached to the items to be protected by different ways, such as by means of gluing, strapping, mechanical fastening, chaining, etc., to provide a reliable association between the items 7353 and the identification device.

In the embodiment shown in FIGS. 74A-D, the identification device is a transponder 7390 attached to the items 7353 by means of an attachment device 7351, such as a ring. The transponder 7390 may be an item different than the items 7353 to be protected, or may be built into the items to be protected. The transponder 7390 may transmit and receive signals to and from the detector 7356 to allow the detector to sense its presence. The communications between the detector and transponder may be implemented in different ways, such as via a cable or through wireless transmissions in infrared or radio frequency. To enhance the security of the system, the communications may be encrypted, using encryption codes stored in the lock memory 7382 and the transponder 7390. The use of encrypted transmission would prevent a dishonest person from creating a fake locking event by placing an unauthorized transponder in the safe to deceive the detector.

In this regard, the transponder may be a part of an electronic key similar to the electronic keys for vending machines as in the embodiments described earlier. The electric key may be, for example, put on the same key ring with the mechanical keys. When the keys are moved to the secured position, the detector 7356 communicates with the electronic key to determine that a valid transponder has been put in the secured position, and then locks the drawer 7352 so that the electronic key with the mechanical keys attached to it are locked in the secured position.

Optionally, a location identification device, such as a GPS device, may be attached to the items to be protected to allow detection of the location of the items in the safe. This location identification device may be integrated with the transponder 7390, or may be a separated device. For example, FIG. 74A shows a monitoring device 7320 optionally attached to the items 7353 to be protected. As mentioned above, the monitoring device 7320 may include a GPS sensor for location identification. The GPS sensor in the monitoring device allows the detection and recording of the location of the items attached to the monitoring device 7320. The location of the safe can also be monitored this way, if the safe is being moved around, for example in the case where the safe is mounted in the vehicle of a driver for a vending machine route, or in the case where the safe has been stolen and removed from its normal location.

In accordance with a feature of the invention, to prevent falsification (or "spoofing") of item detection, it is advantageous to make the communications between the detector and the transponder short-ranged or directional, so that the detector can detect the presence of the transponder only when the transponder is placed in the secured location in the security container. For example, in the embodiment in FIG. 74B, the detector 7356 can detect the transponder 7390 only when the transponder is placed in the drawer 7352 and drawer is pushed in to the closed position. This feature is intended to eliminate the possibility of a dishonest user attempting to defeat the security by keeping the items outside the safe while simultaneously triggering the link between the detector and the transducer to cause the locking operation of the safe. Thus, the detection link is preferably designed to prevent the possibility of devices such as waveguides, light pipes, extension wires, mirrors, repeaters, etc. being used to cause the detector to decide that the items to be protected are in the secured location when they are not.

One example of preventing such deceptive tricks is to develop the communications between the detector and the transponder to be optical in nature so as to be highly directional. For instance, the transmission of the signals may be in the infrared band, and the detector may be located such that it can only receive or transmit signals over a very narrow angle. Another example is to set the power of communications between the detector 7356 and the transponder 7390 such that the communications are short in range, thus preventing the reception of deceptive signals sent over a long distance. This can be accomplished by either reducing the transmission powers of the detector 7356 and transponder 7390, or reducing their reception sensitivity. In this regard, the effective detection range for the detector 7356 to sense the presence of the transponder 7390 should be set according to the distance from the detector to the expected storage location of the items in the safe. For instance, for a small safe less than 1 cubit-foot in volume, a short detection range of several inches may be used, while in a large safe the detection range should be increased accordingly while still kept sufficiently short to prevent the detector from being able to sense the transponder when the latter is outside the safe. The high directionality of the transmission can be combined with the short communication range to enhance the effectiveness of the spoof prevention.

Once the presence of the items 7353 to be protected in the secured location is detected, the electronic lock control circuit 7363 actuates the lock 7355 of the safe 7350, thereby locking the items inside the safe. As part of the locking operation, an audit trail record is created for the storing and locking event. The audit trail data can be produced and stored either at the beginning or at the end of the lock event, and typically may include the time and date of the event. If a location device, such as a monitoring device 7320 with a GPS sensor, is attached to the items, the location data can also be stored as part of the audit trail record. The audit trail record may be stored into the memory 7382 of the lock control circuit of the safe. Alternatively, the audit trail record may be stored into a memory of the monitoring device 7320, if the transponder is part of the monitoring device.

The detector 7356 can monitor the item being locked in the safe before, during, and after the locking event to confirm that the items 7353 are indeed in the safe when the safe is locked. After the items 7353 are successfully locked in the safe, it may be advantageous to constantly or intermittently confirm that the items remain in safe while the safe is locked. For example, this may be accomplished by (a) the detector 7356 maintaining constant or intermittent detection of the transponder 7390, (b) the transponder maintaining constant or intermittent signaling to the detector, or (c) the transponder maintaining constant or intermittent detection of the detector. This feature will further discourage a dishonest person from rigging up an apparatus to trick the safe into locking without the items in it, because even if the safe can be somehow tricked into locking, the subsequent reconfirmation operation will show that the items are actually missing from the safe, and as a result audit trail records will be logged to alert an auditor of the records the breech of security.

Optionally, a monitoring device 7320, like the one used in embodiment of FIG. 73, can be attached to the items being protected to detect any unusual event while the items are in the safe. The monitoring device 7320 is placed in a monitoring mode in which it monitors the states of its activity sensors in addition to the GPS sensor. For example, if the motion detection sensor of the monitoring device senses movement, the monitoring device 7320 can communicate with the detector 7356 to ensure that it is still locked in the safe (i.e., the detector can still detect its presence).

If at any time the communication between the detector and the transponder is lost or missing after the safe is locked, the electronics of the safe lock may log an audit trail record to indicate that event. Alternatively, if the transponder is part of the monitoring device 7320 or has a communication link with the monitoring device, the monitoring device may log an audit trail record in its memory if the communication link between the detector and the transponder is broken. In addition, the safe lock electronics 7363 or the monitoring device 7320 can transmit an alarm signal, such as an audio alert signal for alerting a local user or a wireless signal transmitted to a remote monitoring station, to indicate a possible breech of security.

To determine the timing of the access/locking events for generating the audit trail data, the lock control circuit 7363 may include a clock 7386. The clock is optional because the time information may be provided by the transponder 7390, and/or by an external assess control device such as the electronic key 7358 used to access the safe, and the time data may be transferred to the electronic lock circuit 7363 of the safe during a communication event. Thus, the safe is not required to keep and maintain a clock in its electronic lock control circuit.

The transponder 7390 and the electronic key 7358 used to access the safe need to be synchronized or linked to the safe lock, so that duplicate devices (i.e. other transponders or keys) cannot be substituted in their place to overcome the security of the system. To that end, in one implementation, each transponder contains a unique identification (ID) code, such as a serial number. This unique ID code is "learned" by the electronic lock circuit of the safe during a setup operation, in which the ID code is transferred to the lock circuit and stored in the lock memory. Similarly, another unique ID code is assigned to the electronic key 7358, and that code is also transferred to the lock memory during the setup operation. The code transfer process may be initiated by the user pressing a learn button 7385 to put the lock control circuit 7363 in a learn mode, and the electronic key and transponder are then actuated to wirelessly transmit their access codes, including the respective ID codes, to the lock circuit. Alternatively, the access codes of the electronic key and transponder may be transferred to the lock control circuit of the safe via the communication port 7394. Alternatively or additionally, it is also possible to synchronize or link the transponder and the electronic key to the safe lock by transferring the codes from the safe lock to the transponder and the electronic key.

Thereafter, the ID codes learned into the lock memory will allow the safe lock control circuit to work only with those particular devices identified by those codes. When the detector 7356 receives transmissions from a transponder 7390, the lock control circuit compares the ID number in the received transmissions with the ID numbers stored in the lock memory. If no match is found, it is an indication that an unauthorized transponder is being used, and the safe will not trigger a locking event. In addition, the safe stores an audit trail record in the memory to indicate the detection of an unauthorized transponder. In this regard, the safe may store in the lock memory an audit trail record each time it detects a transponder when it is in the unlocked state, regardless of whether the transponder has been properly registered with the lock circuit.

In accordance with a feature of one embodiment of the invention, the safe is provided with the capability to display or read out from the lock electronics information regarding the items locked inside the safe. The information to be read out may be, for example, a code, ID number, or name associated with the transponder that is attached to the items being protected. The information display may use the display component 7334 of the lock control circuit, while the information readout may be through the communication port 7331 or the wireless communication component 7332. This feature is useful in a situation where a plurality of these safes are at a location and a person wants to retrieve a particular item but cannot tell which safe contains that item. Displaying or otherwise providing the information identifying the contents of the safes eliminates the need for the user to resort to the trial-and-error process of unlocking the safes until the item is found.

Figure 77:
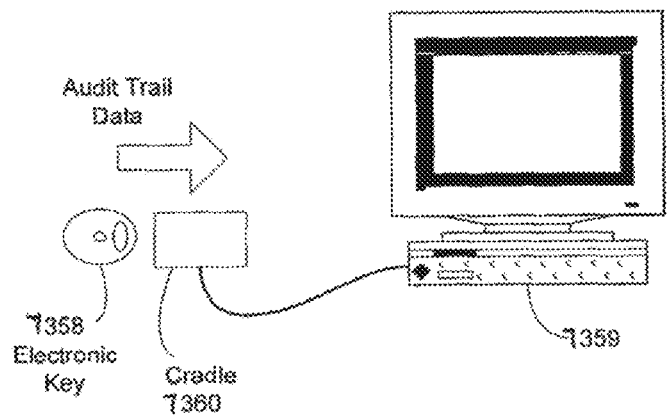
FIG. 77 is a schematic view showing an electronic key downloading audit trail records collected from the safe in the embodiment of FIGS. 74A-C to a computer.
Figure 78:
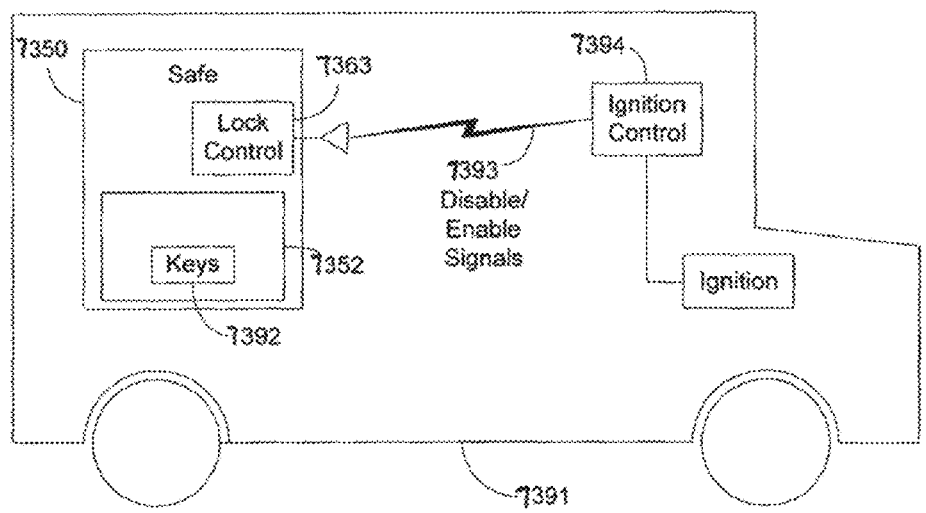
FIG. 78 is a schematic view showing an embodiment in which a safe transmits signals to disable or enable the ignition of vehicle.

When a user wants to retrieve the items 7353 stored in the safe, he needs to use an appropriate access control device to unlock the safe. For example, the safe lock may interface with an electronic key 7358 similar to the way an electronic key is used to access vending machines as described in earlier embodiments. The electronic key 7358 can be used to receive from the safe lock the audit trail records stored in the lock memory 7328, and store the retrieved records in its own memory. Later, as shown in FIG. 77, the audit trail records can be downloaded from the electronic key 7358 to a computer 7359 for sorting, viewing, and auditing purposes when the electronic key is returned to a key refresh station and placed in a cradle 7360 connected to the computer. Like the electronic keys for vending machines, the electronic key 7358 for the safe 7350 can also be given operation limit parameters to restrict the use of the key to access the safe and the items to be protected by the safe.

In an alternative embodiment, the operation of the external electronic key 7358 can also be used to trigger the locking operation of the safe once the items are placed in the secured location. The user first places the items to be protected at the secured location where the detector can detect the presence of the transponder attached to the items. In the embodiment shown in FIG. 74B, this means placing the items with the transponder in the drawer and then closing the drawer. Next, the external key 7358 communicates with the receiver of the electronic lock of the safe to trigger the locking operation. In response to the trigger signal from the key, the safe 7350 locks the drawer 7352 only if the detector 7356 senses the presence of the transponder 7390 in the secured location. In other words, instead of automatically locking itself upon detection of the items 7353, the safe will wait for the trigger signal sent by the electronic key. This additional step would ensure that the electronic key 7358 is outside the safe when the locking event takes place, thus preventing the user from accidentally putting the electronic key 7358 with the items 7353 to be protected in the drawer and locking them together in the safe. The trigger signal may also cause the safe lock circuit 7363 to transfer the audit trail records for locking and unlocking events to the electronic key 7358.

In another embodiment of the invention, the lock control circuit is configured to provide enable and disable signals for an external device depending on the status of the safe. For example, in a vending route drive application, mechanical or electronic keys are given to the driver of an assigned route. The safe 7350 may be placed inside the vehicle 7391 driven by the driver for temporary storage of the keys 7392 when the driver moves from one vending machine site to the next. In that case, the safe lock circuit 7363 may be configured to transmit signals 7393 to the ignition control circuit 7394 of the vehicle to enable or disable the ignition of the vehicle. When the driver arrives at a vending machine site, he unlocks the safe 7350 to take the vending machine keys 7392 out of the safe so that they can be used to access the vending machines. In response to the unlocking event, the safe lock circuit 7363 transmits a disable signal to the vehicle ignition control circuit 7394 to disable the ignition. Later, when the driver returns the keys 7392 to the safe, the safe lock circuit determines that the keys are indeed put back in the safe, locks the safe, and then transmits an enable signal to the vehicle ignition control circuit 7394 to enable the ignition. The route driver can then start the vehicle 7391 and drive it to the next vending machine site. Since the ignition is disabled if the keys are not in the safe, the route driver will not be able to operate the vehicle unless the keys are returned to the safe. In this way, if the driver forgets to take the keys after accessing the vending machines, he will be reminded of it since the vehicle will be inoperable.

Figure 79:
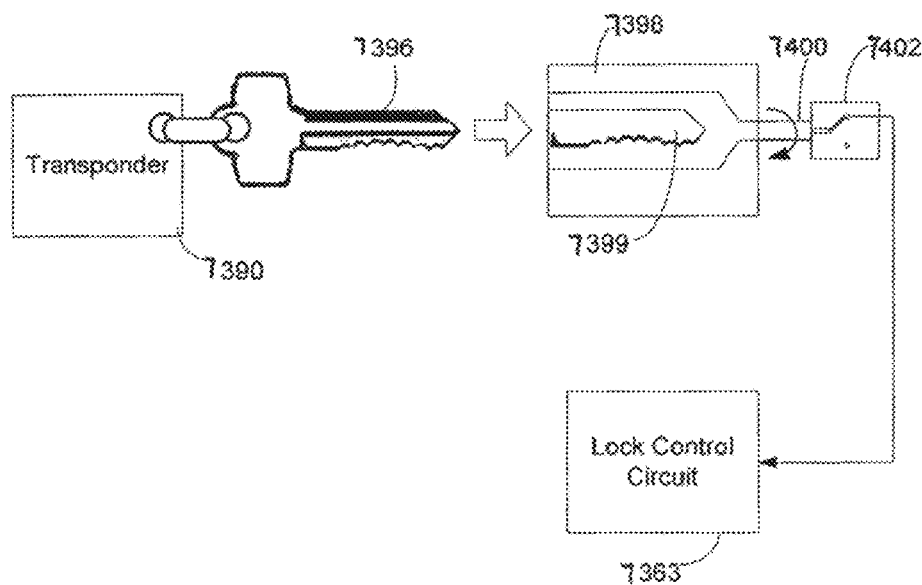
FIG. 79 is a schematic diagram showing an alternative embodiment of a security container for securely storing mechanical keys.

In an alternative embodiment designed for securing mechanical keys, in addition to using a transponder 7390 to facilitate detection of the keys in a security container, mechanical means is used to further ensure that the mechanical keys are properly placed inside the security container. As shown in FIG. 79, for a mechanical key 7396 to be stored in the safe, a mechanical lock plug 7398 is provided in the safe for interfacing with that key. The lock plug is secured in the drawer 7352 (see FIG. 74) of the safe 7350. The lock plug 7398 has a slot 7399 configured for receiving the blade of the corresponding mechanical key 7396. To secure the mechanical key, the key 7396 is inserted into the slot 7399 of the lock plug 7398 and rotated by a pre-determined angle, such as 180 degrees, into a storage position. The lock plug 7398 is configured such that the key 7396 in the rotated position cannot be removed from the lock plug. The lock plug 7398 has a shaft 7400 that is rotated when the key is turned. The shaft 7400 is coupled to an electrical switch 7402 such that the switch is closed when the key is rotated to the storage position. The electrical switch 7402 is linked to the electronic lock control circuit 7363 of the safe so that the lock control circuit can detect whether the switch is closed or open. A closed switch is an indication that the mechanical key 7396 correspond to the lock plug 7398 has been inserted into the lock plug and rotated to the storage position in which the key cannot be removed. The safe may have multiple lock plugs for different mechanical keys, and the lock control electronics of the safe may be configured to require that each of the switches associated with the lock plugs has been put in the closed position, i.e., all the corresponding mechanical keys have been inserted into the respective lock plugs and rotated to the stored position, before the lock can be actuated. The lock control circuit may further require the detection of the transponder 7390 in the drawer in the closed position as an additional condition for locking. Once these conditions are detected, the electronic lock circuit of the safe actuates the lock, either automatically or in response to a trigger from an external device such as the electronic key used to unlock the safe.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system comprising:
    an electronic key comprising:
        a key memory configured to store (1) a key identifier for the electronic key, and (2) an access code;
        a power source;
        a key wireless communication interface; and
        a button;
    an electronic lock comprising:
        a lock memory configured to store (1) an access code, and (2) audit data that describes a plurality of access attempts with respect to the electronic lock;
        a processor; and
        a lock wireless communication interface; and
    a computer system that is external to the electronic key and the electronic lock;
    wherein the electronic key, in response to user selection of the button with the electronic key being within wireless range of the electronic lock, is configured to wirelessly communicate with the electronic lock via the key wireless communication interface and the lock wireless communication interface to permit a comparison between the access code from the key memory and the access code from the lock memory;
    wherein the electronic lock is further configured to unlock contingent on the comparison resulting in a determination that the access code from the key memory matches the access code from the lock memory;
    wherein the electronic key is further configured to wirelessly transmit the key identifier in the key memory via the key wireless communication interface in response to user selection of the button;
    wherein the lock wireless interface is further configured to receive the transmitted key identifier in response to user selection of the button with the electronic key and the electronic lock being within wireless range of each other;
    wherein the processor is configured to record the received key identifier in the audit data in the lock memory as an access attempt with respect to the electronic lock;
    wherein, contingent on the electronic key being within wireless range of the electronic lock, the electronic lock is further configured to transfer the audit data from the lock memory to the electronic key for storage of the audit data in the key memory; and
    wherein the computer system is further configured to receive the audit data from the key memory of the electronic key.

2. The system of claim 1 wherein the audit data describes a plurality of time-stamped access attempts with respect to the electronic lock;
    wherein the processor is configured to record the received key identifier and an associated time stamp in the audit data in the lock memory as a time-stamped access attempt with respect to the electronic lock;
    the system further comprising a plurality of the electronic keys, each of a plurality of the electronic keys having a different key identifier in its key memory;
    wherein the lock memory is further configured to store a lock identifier for the electronic lock, and wherein the audit data includes the lock identifier; and wherein the audit data in the lock memory describes a plurality of time-stamped access attempts with respect to the electronic lock by a plurality of the electronic keys.

3. A system comprising:
a programmable electronic key comprising:
   a processor;
   a key memory;
   a power source;
   a key wireless communication interface configured to communicate via optical or radio frequency (RF) signals;
   an indicator; and
   a button;
a device for securely holding a product, the device comprising:
   a device memory;
   a device wireless communication interface configured for communication with the key wireless communication interface; and
   a circuit configured to selectively control a function for the device; and
a computer system that is external to the device and the programmable electronic key;
wherein the computer system is configured to (1) generate an access code for use with the programmable electronic key and the device, and (2) provide the access code to the programmable electronic key;
wherein the programmable electronic key is configured to receive the access code from the computer system and store the access code in the key memory;
wherein the programmable electronic key and the device are further configured to be operatively cooperative in response to a user selection of the button with the programmable electronic key and the device being within wireless range of each other such that (1) the programmable electronic key and the device will wirelessly communicate via the key wireless communication interface and the device wireless communication interface to permit a comparison between the access code from the key memory and an access code from the device memory, and (2) the circuit will change a control state of the function contingent on the comparison resulting in a determination that the access code from the key memory matches the access code from the device memory;
wherein the key memory is further configured to store temporal limit data that temporally limits an ability of the programmable electronic key to cause a change in the control state of the device function;
wherein the computer system is further configured to update the temporal limit data for the programmable electronic key in response to the programmable electronic key being in communication with the computer system;
wherein the computer system is further configured to communicate with the programmable electronic key to update the temporal limit data for the programmable electronic key in response to user selection of the button when the programmable electronic key is within wireless range of the computer system; and
wherein the indicator is configured to indicate an operational status for the programmable electronic key with respect to the temporal limit data.

4. The system of claim 3 wherein the device further comprises a processor, wherein the processor of the device is configured to perform the comparison and determine, based on the comparison, whether the access code from the key memory matches the access code from the device memory.

5. The system of claim 3 wherein the processor is further configured to perform the comparison and determine, based on the comparison, whether the access code from the key memory matches the access code from the device memory.

6. The system of claim 3 wherein the key wireless communication interface comprises a key infrared communication interface, and wherein the device wireless communication interface comprises a device infrared communication interface.

7. The system of claim 6 wherein the key infrared communication interface and the device infrared communication interface support bi-directional infrared communications between the programmable electronic key and the device.

8. The system of claim 7 wherein the device, in response to the comparison resulting in a determination that the access code from the key memory does not match the access code from the device memory, is further configured to communicate an infrared signal to the programmable electronic key indicative of a rejected access code; and
   wherein the programmable electronic key is further configured to produce an indication of the rejected access code for the user in response to the communicated infrared signal.

9. The system of claim 6 wherein the key infrared communication interface comprises an infrared transmitter arranged to directionally transmit infrared signals at a predefined transmission angle and at a limited transmission power so that the infrared signals are short range signals for close-proximity use with the device infrared communication interface.

10. The system of claim 3 wherein the device further comprises a processor, the device processor configured to (1) enter a sleep mode during an inactivity period for the device, and (2) wake up from the sleep mode in response to a wireless transmission from the programmable electronic key.

11. The system of claim 3 wherein the key memory includes a register that stores a value indicative of the temporal limit, and wherein the programmable electronic key further comprises a clock, wherein the processor is configured to determine whether the temporal limit has expired based on the register value and the clock.

12. The system of claim 3 wherein the programmable electronic key is further configured to condition wireless communication of the access code in response to user selection of the button on the temporal limit not being expired.

13. The system of claim 3 wherein the computer system is further configured to (1) provide a user interface through which a temporal limit input is received from a user, (2) define the temporal limit data based on the temporal limit input received through the user interface, and (3) provide the defined temporal limit data to the programmable electronic key for storage in the key memory.

14. The system of claim 3 wherein the indicator comprises a visual indicator that is configured for selective illumination to indicate the operational status for the programmable electronic key with respect to the temporal limit data.

15. The system of claim 14 wherein the programmable electronic key is further configured to selectively control illumination of the visual indicator to indicate the operational status in response to user selection of the button.

16. The system of claim 3 wherein the indicator comprises a first visual indicator;
   wherein the computer system further comprises a cradle for receiving the programmable electronic key to facilitate communication between the programmable electronic key and the computer system, the computer system further comprising a second visual indicator; and
   wherein the first and second visual indicators are configured for coordinated illuminations based on communications between the programmable electronic key and the computer system.

17. A system comprising:
   a programmable electronic key comprising:
      a processor;
      a key memory;
      a power source;
      a key wireless communication interface configured to communicate via optical or radio frequency (RF) signals;
      an indicator; and
      a button;
   an electronic lock comprising:
      a lock memory; and
      a lock wireless communication interface configured for communication with the key wireless communication interface; and
   a computer system that is external to the electronic lock and the programmable electronic key;
   wherein the computer system is configured to (1) generate an access code for use with the programmable electronic key and the electronic lock, and (2) provide the access code to the programmable electronic key;
   wherein the programmable electronic key is configured to receive the access code from the computer system and store the access code in the key memory; and
   wherein the programmable electronic key and the electronic lock are further configured to be operatively cooperative in response to a user selection of the button with the programmable electronic key and the electronic lock being within wireless range of each other such that (1) the programmable electronic key and the electronic lock will wirelessly communicate via the key wireless communication interface and the lock wireless communication interface to permit a comparison between the access code from the key memory and an access code from the lock memory, and (2) the electronic lock will unlock contingent on the comparison resulting in a determination that the access code from the key memory matches the access code from the lock memory;
   wherein the key memory is further configured to store temporal limit data that temporally limits an ability of the programmable electronic key to unlock the electronic lock;
   wherein the computer system is further configured to update the temporal limit data for the programmable electronic key in response to the programmable electronic key being in communication with the computer system;
   wherein the computer system is further configured to communicate with the programmable electronic key to update the temporal limit data for the programmable electronic key in response to user selection of the button when the programmable electronic key is within wireless range of the computer system; and
   wherein the indicator is configured to indicate an operational status for the programmable electronic key with respect to the temporal limit data.

18. The system of claim 17 wherein the electronic lock comprises a processor, the electronic lock processor configured to (1) not draw power during an inactivity period for the electronic lock, and (2) draw power for processing operations in response to a wireless transmission from the programmable electronic key.

19. The system of claim 17 wherein the electronic lock further comprises:
   an actuator that is operable to control a locking state for the electronic lock; and
   circuitry configured to selectively pulse power to the actuator.

20. The system of claim 17 wherein the lock memory is further configured to store data for controlling actuation of the electronic lock, wherein the data defines an amount of energization for unlocking the electronic lock.

21. A system comprising:
   a programmable electronic key comprising:
      a processor;
      a key memory;
      a power source;
      a first key wireless communication interface;
      a second key wireless communication interface; and
      a button;
   a device for securely holding a product, the device comprising:
      a device memory;
      a device wireless communication interface; and
      a circuit configured to selectively control a function for the device; and
   a computer system that is external to the device and the programmable electronic key;
   wherein the computer system is configured to (1) generate an access code for use with the programmable electronic key and the device, and (2) provide the access code to the programmable electronic key;
   wherein the programmable electronic key is configured to receive the access code from the computer system and store the access code in the key memory;
   wherein the programmable electronic key and the device are further configured to be operatively cooperative in response to a user selection of the button with the programmable electronic key and the device being within wireless range of each other such that (1) the programmable electronic key and the device will wirelessly communicate via the first key wireless communication interface and the device wireless communication interface to permit a comparison between the access code from the key memory and an access code from the device memory, and (2) the circuit will change a control state of the function contingent on the comparison resulting in a determination that the access code from the key memory matches the access code from the device memory;
   wherein the programmable electronic key and the device are further configured to be operatively cooperative in response to the user selection of the button with the programmable electronic key and the device being within wireless range of each other such that the programmable electronic key and the device will wirelessly communicate via the first key wireless communication interface and the device wireless communication interface to create audit trail data in the key memory that includes data indicative of an access history for the programmable electronic key with respect to the device; and wherein the programmable electronic key is further configured to wirelessly communicate the audit trail data from the key memory to the computer system via the second key wireless communication interface.

22. The system of claim 21 wherein the first key wireless communication interface comprises an infrared communication interface.

23. The system of claim 22 wherein the second key wireless communication interface comprises a radio frequency (RF) communication interface.

24. The system of claim 21 wherein the second key wireless communication interface comprises a radio frequency (RF) communication interface.

25. The system of claim 21 wherein the access history data comprises a plurality of time-stamped access events with respect to the device.

26. The system of claim 25 wherein the access history data links the time-stamped access events with an identifier for the programmable electronic key.

27. The system of claim 26 wherein the access history data links the time-stamped access events with the programmable electronic key identifier and an identifier for the device.

28. The system of claim 21 wherein the audit trail data in the key memory comprises a plurality of time-stamped access events with respect to a plurality of devices for securely holding products.

29. The system of claim 28 wherein the audit trail data in the key memory links the time-stamped access events with programmable electronic key identifiers.

30. The system of claim 29 wherein the audit trail data in the key memory links the time-stamped access events with programmable electronic key identifiers and device identifiers.

31. The system of claim 21 wherein the device further comprises a processor, wherein the processor of the device is configured to perform the comparison and determine, based on the comparison, whether the access code from the key memory matches the access code from the device memory.

32. The system of claim 21 wherein the processor is further configured to perform the comparison and determine, based on the comparison, whether the access code from the key memory matches the access code from the device memory.

33. The system of claim 21 wherein the computer system is further configured to randomly generate the access code.

34. The system of claim 21 wherein the first key wireless communication interface comprises a key infrared communication interface, and wherein the device wireless communication interface comprises a device infrared communication interface.

35. The system of claim 34 wherein the key infrared communication interface and the device infrared communication interface support bi-directional infrared communications between the programmable electronic key and the device.

36. The system of claim 35 wherein the device, in response to the comparison resulting in a determination that the access code from the key memory does not match the access code from the device memory, is further configured to communicate an infrared signal to the programmable electronic key indicative of a rejected access code; and wherein the programmable electronic key is further configured to produce an indication of the rejected access code for the user in response to the communicated infrared signal.

37. The system of claim 34 wherein the key infrared communication interface comprises an infrared transmitter arranged to directionally transmit infrared signals at a predefined transmission angle and at a limited transmission power so that the infrared signals are short range signals for close-proximity use with the device infrared communication interface.

38. The system of claim 21 wherein the device further comprises a processor, the device processor configured to (1) enter a sleep mode during an inactivity period for the device, and (2) wake up from the sleep mode in response to a wireless transmission from the programmable electronic key.

39. The system of claim 21 wherein the key memory is further configured to store operational limit data that limits an ability of the programmable electronic key to cause a change in the control state of the device function.

40. The system of claim 39 wherein the operational limit data comprises a temporal limit on the ability of the programmable electronic key to cause a change in the control state of the device function.

41. The system of claim 40 wherein the computer system is further configured to update the temporal limit data for the programmable electronic key in response to the programmable electronic key being in communication with the computer system.

42. The system of claim 41 wherein the computer system is further configured to communicate with the programmable electronic key to update the temporal limit data for the programmable electronic key in response to user selection of the button when the programmable electronic key is within wireless range of the computer system.

43. The system of claim 40 wherein the key memory includes a register that stores a value indicative of the temporal limit, and wherein the programmable electronic key further comprises a clock, wherein the processor is configured to determine whether the temporal limit has expired based on the register value and the clock.

44. The system of claim 40 wherein the programmable electronic key is further configured to condition wireless communication of the access code in response to user selection of the button on the temporal limit not being expired.

45. The system of claim 39 wherein the computer system is further configured to (1) provide a user interface through which an operational limit input is received from a user, (2) define the operational limit data based on the operational limit input received through the user interface, and (3) provide the defined operational limit data to the programmable electronic key for storage in the key memory.

46. The system of claim 39 wherein the programmable electronic key further comprises an indicator that is configured to indicate an operational status for the programmable electronic key with respect to the operational limit data.

47. The system of claim 46 wherein the indicator comprises a visual indicator that is configured for selective illumination to indicate the operational status for the programmable electronic key with respect to the operational limit data.

48. The system of claim 47 wherein the programmable electronic key is further configured to selectively control illumination of the visual indicator to indicate the operational status in response to user selection of the button.

49. The system of claim 21 wherein the programmable electronic key further comprises a visual indicator that is configured for selective illumination to indicate an operational status for the programmable electronic key.

50. The system of claim 21 wherein the programmable electronic key further comprises a first visual indicator;
wherein the computer system further comprises a cradle for receiving the programmable electronic key to facilitate communication between the programmable electronic key and the computer system, the computer system comprising a second visual indicator; and
wherein the first and second visual indicators are configured for coordinated illuminations based on communications between the programmable electronic key and the computer system.

51. The system of claim 21 wherein the device comprises a lockable enclosure.

52. The system of claim 17 wherein the electronic lock further comprises a processor, wherein the processor of the electronic lock is configured to perform the comparison and determine, based on the comparison, whether the access code from the key memory matches the access code from the lock memory.

53. The system of claim 17 wherein the processor is further configured to perform the comparison and determine, based on the comparison, whether the access code from the key memory matches the access code from the lock memory.

54. The system of claim 17 wherein the computer system is further configured to randomly generate the access code.

55. The system of claim 17 wherein the key wireless communication interface comprises a key infrared communication interface, and wherein the lock wireless communication interface comprises a lock infrared communication interface.

56. The system of claim 55 wherein the key infrared communication interface and the lock infrared communication interface support bi-directional infrared communications between the programmable electronic key and the electronic lock.

57. The system of claim 56 wherein the electronic lock, in response to the comparison resulting in a determination that the access code from the key memory does not match the access code from the lock memory, is further configured to communicate an infrared signal to the programmable electronic key indicative of a rejected access code; and
wherein the programmable electronic key is further configured to produce an indication of the rejected access code for the user in response to the communicated infrared signal.

58. The system of claim 55 wherein the key infrared communication interface comprises an infrared transmitter arranged to directionally transmit infrared signals at a predefined transmission angle and at a limited transmission power so that the infrared signals are short range signals for close-proximity use with the lock infrared communication interface.

59. The system of claim 17 wherein the electronic lock further comprises a circuit, the circuit configured to exhibit a different power draw characteristic during an inactive mode for the electronic lock as compared to an active mode for the electronic lock, and wherein the circuit is further configured to transition from the inactive mode to the active mode in response to a wireless transmission from the programmable electronic key.

60. The system of claim 17 wherein the key memory includes a register that stores a value indicative of the temporal limit, and wherein the programmable electronic key further comprises a clock, wherein the processor is configured to determine whether the temporal limit has expired based on the register value and the clock.

61. The system of claim 17 wherein the programmable electronic key is further configured to condition wireless communication of the access code in response to user selection of the button on the temporal limit not being expired.

62. The system of claim 17 wherein the computer system is further configured to (1) provide a user interface through which a temporal limit input is received from a user, (2) define the temporal limit data based on the temporal limit input received through the user interface, and (3) provide the defined temporal limit data to the programmable electronic key for storage in the key memory.

63. The system of claim 17 wherein the indicator comprises a visual indicator that is configured for selective illumination to indicate the operational status for the programmable electronic key with respect to the temporal limit data.

64. The system of claim 63 wherein the programmable electronic key is further configured to selectively control illumination of the visual indicator to indicate the operational status in response to user selection of the button.

65. The system of claim 17 wherein the indicator comprises a first visual indicator;
wherein the computer system further comprises a cradle for receiving the programmable electronic key to facilitate communication between the programmable electronic key and the computer system, the computer system further comprising a second visual indicator; and
wherein the first and second visual indicators are configured for coordinated illuminations based on communications between the programmable electronic key and the computer system.

66. The system of claim 17 wherein the computer system comprises a read/write interface for communicating with the programmable electronic key, and wherein the computer system is further configured to communicate with the programmable electronic key via the read/write interface to update the temporal limit data for the programmable electronic key in response to user selection of the button when the programmable electronic key is within wireless range of the read/write interface.

67. The system of claim 17 wherein the key wireless communication interface comprises an RF communication interface.

68. The system of claim 3 wherein the computer system comprises a read/write interface for communicating with the programmable electronic key, and wherein the computer system is further configured to communicate with the programmable electronic key via the read/write interface to update the temporal limit data for the programmable electronic key in response to user selection of the button when the programmable electronic key is within wireless range of the read/write interface.

69. The system of claim 3 wherein the computer system is further configured to randomly generate the access code.

70. The system of claim 3 wherein the key wireless communication interface comprises an RF communication interface.

* * * * *